United States Patent
Foote et al.

(10) Patent No.: US 7,322,710 B2
(45) Date of Patent: Jan. 29, 2008

(54) VEHICULAR MIRROR ACTUATOR WITH SINGLE MOTOR ACTUATION AND INBOARD CENTER OF GRAVITY AND VEHICULAR MIRROR INCORPORATING THE SAME

(75) Inventors: Keith D. Foote, Kentwood, MI (US); Ian Boddy, Ada, MI (US); Kris D. Brown, Lake Odessa, MI (US); Kenneth C. Peterson, Comstock Park, MI (US); James A. Ruse, Allegan, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 138 days.

(21) Appl. No.: 10/510,801

(22) PCT Filed: Apr. 8, 2003

(86) PCT No.: PCT/US03/10866

§ 371 (c)(1),
(2), (4) Date: Oct. 7, 2004

(87) PCT Pub. No.: WO03/086816

PCT Pub. Date: Oct. 23, 2003

(65) Prior Publication Data
US 2005/0141115 A1 Jun. 30, 2005

Related U.S. Application Data

(60) Provisional application No. 60/319,830, filed on Dec. 31, 2002, provisional application No. 60/319,829, filed on Dec. 31, 2002, provisional application No. 60/319,822, filed on Dec. 30, 2002, provisional application No. 60/319,753, filed on Dec. 4, 2002, provisional application No. 60/319,637, filed on Oct. 21, 2002, provisional application No. 60/319,520, filed on Sep. 4, 2002, provisional application No. 60/319,411, filed on Jul. 19, 2002, provisional application No. 60/319,410, filed on Jul. 19, 2002, provisional application No. 60/319,176, filed on Apr. 9, 2002.

(51) Int. Cl.
*G02B 7/182* (2006.01)
*B60R 1/06* (2006.01)

(52) U.S. Cl. ............... 359/876; 359/877; 359/874; 359/841

(58) Field of Classification Search ........ 359/841, 359/872, 874, 875, 876, 877
See application file for complete search history.

(56) References Cited

U.S. PATENT DOCUMENTS 4,050,776 A * 9/1977 Hsu ............... 359/876

(Continued)

*Primary Examiner*—Ricky D. Shafer
(74) *Attorney, Agent, or Firm*—McGarry Bair PC

(57) ABSTRACT

A rearview mirror tilt actuator comprises a clutch assembly that selectively transfers torque from an actuator motor to one of at least two output shafts based upon the speed of the motor. One output shaft can pivot the mirror about a first axis of rotation; another output shaft can pivot the mirror about a second axis of rotation. One output shaft can pivot the mirror housing; the other output shaft can extend and retract the mirror housing. At a low speed, the clutch assembly is disengaged, thus only the first output shaft is activated. At a high speed, the clutch assembly is engaged, thus both output shafts are activated The mirror assembly described herein also has an improved mass configuration which allows for lower moments of inertia in the direction of mirror travel.

7 Claims, 113 Drawing Sheets

U.S. PATENT DOCUMENTS

| | | | | |
|---|---|---|---|---|
| 4,502,759 A | * | 3/1985 | Herzog et al. | 359/876 |
| 4,512,633 A | * | 4/1985 | Manzoni | 359/876 |
| 4,540,252 A | * | 9/1985 | Hayashi et al. | 359/874 |
| 4,783,161 A | * | 11/1988 | Shamoto | 248/479 |
| 5,159,497 A | * | 10/1992 | Lynas | 359/843 |
| 5,177,642 A | * | 1/1993 | Wakimoto | 359/844 |
| 5,182,676 A | * | 1/1993 | Iwai et al. | 359/841 |
| 5,600,497 A | * | 2/1997 | Leonberger | 359/875 |
| 5,781,356 A | * | 7/1998 | Okada et al. | 359/872 |
| 5,818,650 A | * | 10/1998 | Nyhof et al. | 359/876 |
| 6,050,537 A | * | 4/2000 | Fimeri | 248/481 |
| 6,224,220 B1 | * | 5/2001 | Duroux et al. | 359/877 |
| 6,264,338 B1 | * | 7/2001 | MacFarland et al. | 359/871 |
| 7,070,287 B2 | * | 7/2006 | Foote et al. | 359/841 |
| 7,080,914 B1 | * | 7/2006 | Boddy | 359/879 |
| 7,090,363 B1 | * | 8/2006 | Boddy et al. | 359/872 |

* cited by examiner

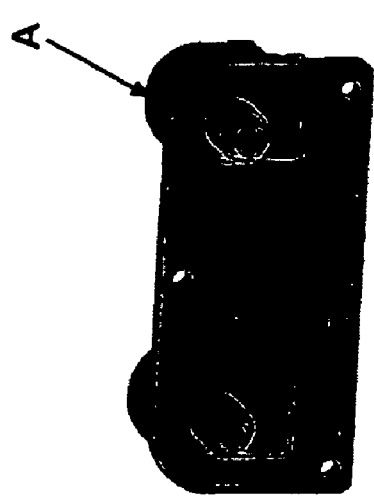
One motor actuator- 45g (NEW)
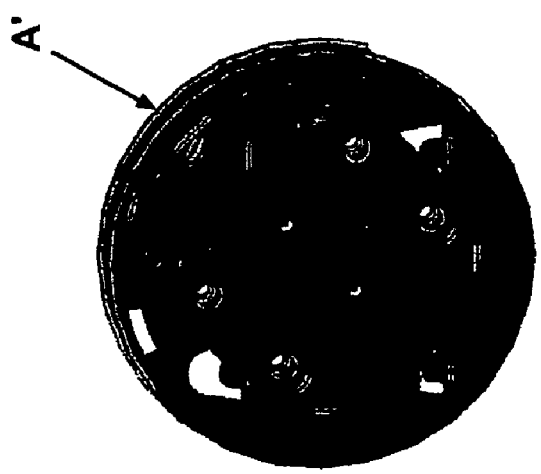
Two motor actuator- 225g (PRIOR ART)
Fig. 1B

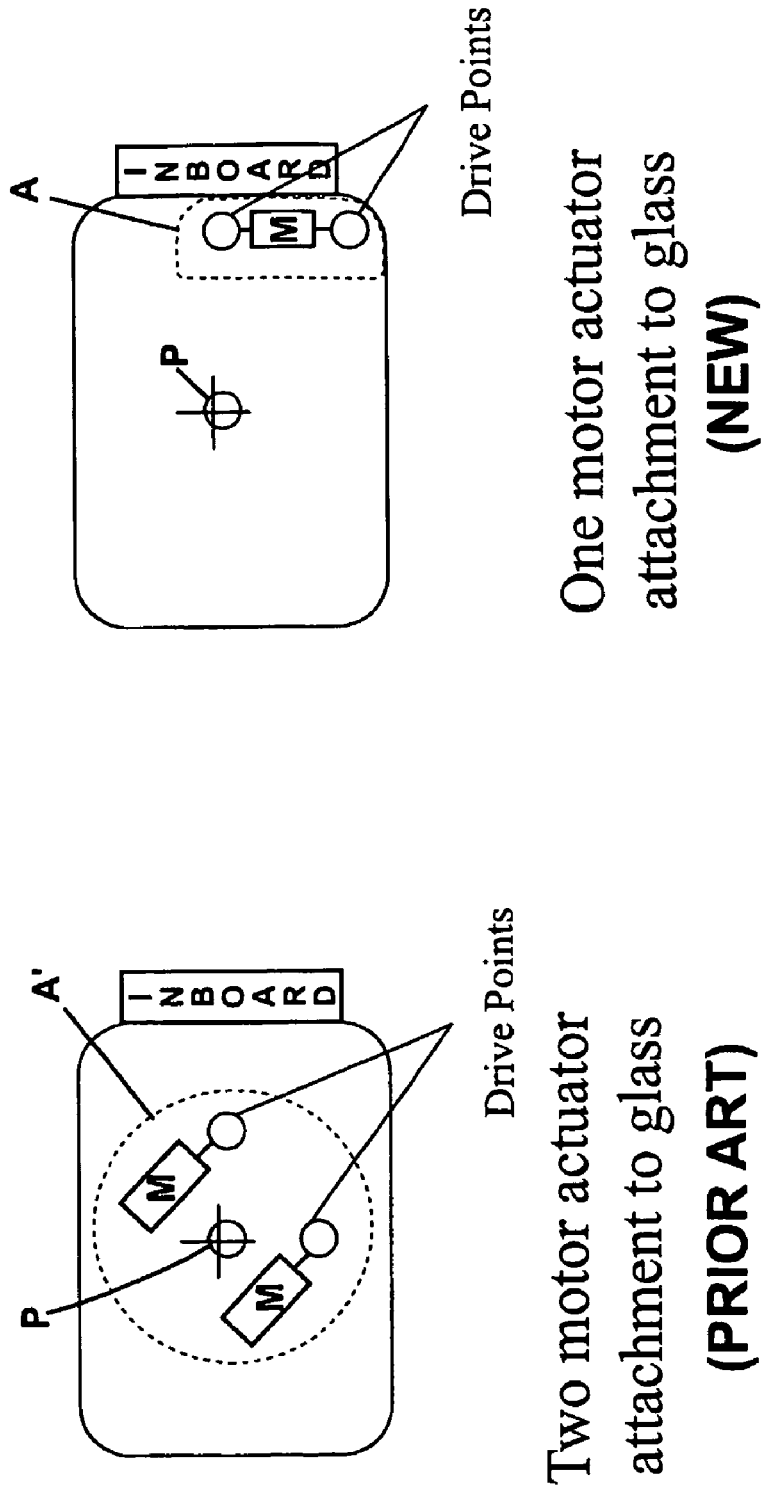

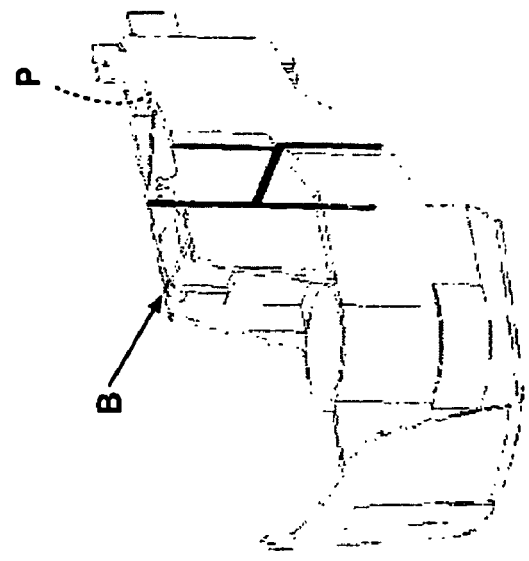
Next generation bracket X-sec
$I_{fa}=1.22E5$ mm$^4$
$I_v=1.87E5$ mm$^4$
(NEW)
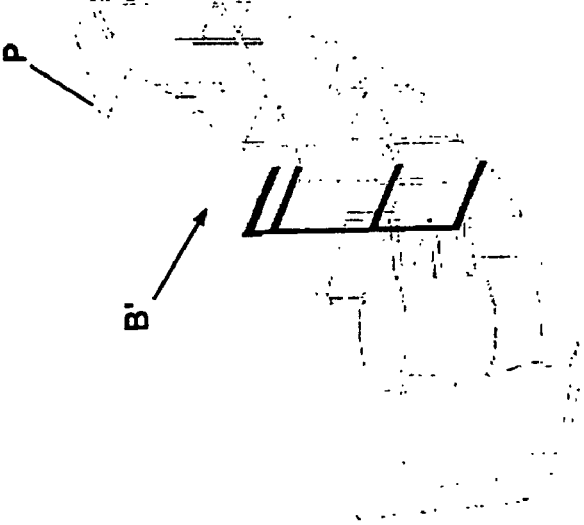
Current bracket X-sec
$I_{fa}=0.9E5$ mm$^4$
$I_v=5.2E5$ mm$^4$
(PRIOR ART)
Fig. 1F

VEHICULAR MIRROR ACTUATOR WITH SINGLE MOTOR ACTUATION AND INBOARD CENTER OF GRAVITY AND VEHICULAR MIRROR INCORPORATING THE SAME

CROSS-REFERENCE TO RELATED APPLICATIONS

This application claims priority on International Application No. PCT/US03/10866, filed Apr. 8, 2003, claims the benefit of U.S. provisional applications Ser. No. 60/319,176, filed Apr. 9, 2002; 60/319,411, filed Jul. 19, 2002; 60/319,410, filed Jul. 19, 2002; 60/319,520, filed Sep. 4, 2002; 60/319,637, filed Oct. 21, 2002; 60/319,753, filed Dec 4, 2002; 60/319,822, filed Dec. 30, 2002; 60/319,829, filed Dec. 31, 2002; and 60/319,830, filed Dec. 31, 2002, each of which are incorporated herein in their entirety.

BACKGROUND OF THE INVENTION

1. Field of the Invention

The invention relates to mirrors for automotive vehicles. In one aspect, the invention provides an improved mass configuration to the mirror assembly which allows for lower moments of inertia in the direction of travel of the mirror. In another aspect, the invention relates to a motor assembly utilizing a single motor with selection of the axis of the mirror being adjusted based upon the rotational speed of the motor.

2. Description of the Related Art

Side view mirrors are standard equipment on automotive vehicles. Frequently, the side view mirrors include mirrors on both the driver's side and the passenger's side of the vehicle. The passenger's side mirror will be difficult for the driver to manually adjust. Furthermore, manual adjustment of either mirror will require the operator to lower the window, exposing the operator and the interior of the vehicle to inclement weather. These problems have been solved by mirrors which can be adjusted by the operator from inside the vehicle.

Remote mirror adjustment typically involves tilting the mirror about a vertical axis and a generally perpendicularly-oriented horizontal axis through a motorized assembly typically employing two electric motors to control movement of the mirror about the two axes. One motor is used to tilt the mirror along the vertical axis. The other motor used to tilt the mirror along the horizontal axis. The output from the motors drives jackscrews connected to the mirror which move linearly to tilt the mirror.

The use of two motors adds cost and weight to the mirror. The mirror housing must also accommodate the volume occupied by the motors, expanding the profile of the mirror. Additionally, the motors can fail, thereby requiring replacement. The use of two motors increases the probability of a motor failure as compared to a mirror having only one motor.

A single motor actuator solves some of the problems attending the use of a two motor actuator. However, a sophisticated clutch assembly must be used to selectively transfer motor output to one or both the jackscrews in order to obtain the desired tilting of the mirror. The clutch assembly is frequently fabricated of plastic components in an attempt to optimize the weight and cost of the mirror assembly. However, the performance of the plastic components can be affected by the ambient temperature, leading to undesirable performance of the mirror tilt function. Further, these devices often include solenoids to interconnect the motor with a particular jackscrew, adding weight and increasing the probability of a malfunction due to failure of the solenoids.

While a single motor can be used to control both the vertical and horizontal movement of a mirror element, the relative location of the horizontal and vertical tilt actuators, pivot points, and axes of rotation necessary to provide a desired level of adjustment results in an assembly having a relatively large size. This size is unacceptable for some mirrors, particularly those used with smaller vehicles, such as compact cars.

It is common to pivot or fold the external mirror against the vehicle body to prevent the jarring of the mirror when the vehicle is not operated. The mirror folding function can incorporate a power assist, such as that disclosed in U.S. Pat. No. 5,684,646. External mirrors are also extendable away from the vehicle, which is useful when towing a trailer. Mirrors incorporating both the powered fold and powered extension functionality are known and have used separate motors for both the folding and extension functions. Examples of such mirrors are disclosed in U.S. Pat. Nos. 6,276,808 and 6,213,609, assigned to the assignee of the current application, and are incorporated by reference.

The use of separate motors for dual function applications such as folding and extending the external mirror is not desirable because it increases costs and part count, which are undesirable characteristics in the automotive parts supply industry. The extra motor also increases the volume of the mirror housing, which is also typically undesirable since increased volume can lead to increased drag, which negatively impacts fuel mileage, and increased wind-induced noise.

There are various ways of selecting which actuator is to operate in order to tilt the reflective element along a selected axis. One way is to selectively operate one or both actuators using a clutch assembly which is engaged or disengaged based upon the angular velocity of the motor.

Difficulty arises in selecting and maintaining the proper motor speed for the actuator assembly to properly operate. Complicated electromechanical devices for controlling the motor speed add cost and weight to the mirror assembly, and increase the likelihood that the tilt mechanism will fail, thereby requiring costly replacement. Furthermore, such devices can wear over time, with a consequent drop-off in performance.

While the use of a single motor and speed-activated clutch provides a simple, durable tilt actuator, it may be necessary at times to replace the motor assembly/actuator. Conventional design of rearview mirrors incorporating such a system requires that the mirror be disassembled in order to remove and replace the actuator. This requires costly technician time, and removal of the vehicle from service during the repair. Additionally, reassembly of the mirror must be done accurately in order to ensure that the mirror operates properly after the repair has been completed. It is not always possible to reassemble the mirror without introducing performance deficiencies which can lead to additional repair activities.

SUMMARY OF THE INVENTION

In one aspect, the invention relates to an actuator, with a pivot mounting positioned along a first axis and a second axis, for pivotally positioning a vehicular mirror comprising: a motor having at least one output shaft mounted for bi-directional rotational movement at least a first speed and a second speed; a first positioning member spaced from the pivot mounting and located on the first axis of the pivot mounting, the first positioning member mounted to the actuator for translating between a retracted and an extended position; a second positioning member spaced from the pivot mounting, the second positioning member being located on one of the second axis of the pivot mounting and an offset axis parallel to the second axis and which passes through the location of the first positioning member, the second positioning member mounted to the actuator for translating between a retracted and an extended position; a first drive linkage mounted to the first positioning member for receiving rotational movement and translating the first positioning member responsive to the imparted rotational movement; a second drive linkage mounted to the first positioning member for receiving rotational movement and translating the second positioning member and translating the second positioning member responsive to the imparted rotational movement; and a clutch mounted to the output shaft of the motor and to the first and second drive linkages, wherein the clutch driveably interconnects the output shaft of the motor to the first drive linkage at the first motor speed, and wherein the clutch driveably interconnects the output shaft of the motor to the second drive linkage at the second motor speed.

In another aspect, the invention relates to an actuator, with a pivot mounting positioned along a first axis and a second axis, for pivotally positioning a vehicular mirror comprising: at least one motor having at least one output shaft mounted for bi-directional rotational movement; a first positioning member spaced from the pivot mounting and located on the first axis of the pivot mounting, the first positioning member mounted to the actuator for translating between a retracted and an extended position; a second positioning member spaced from the pivot mounting, the second positioning member being located on an offset axis parallel to the second axis and which passes through the location of the first positioning member, the second positioning member mounted to the actuator for translating between a retracted and an extended position; wherein rotational movement from the at least one motor is selectively applied to the first positioning member to position a vehicular mirror about the first axis, and rotational movement from the at least one motor is selectively applied to both the first positioning member and to the second positioning member to translate a vehicular mirror about the second axis.

In yet another aspect, the invention relates to an actuator, with a pivot mounting defining a first axis and a second axis, for pivotally positioning a vehicular mirror comprising: drive means for imparting bi-directional rotational movement at least a first speed and a second speed; positioning means for positioning a vehicular mirror about the first axis and the second axis; and clutch means for selectively actuating the positioning means to position the vehicular mirror about the first axis at the first motor speed and to position the vehicular mirror about the second axis at the second motor speed.

The invention also relates to a mirror assembly comprising: a housing with an opening therein; a reflective element mounted in the housing in register with the opening; an actuator operably mounted to the reflective element for imparting positional movement thereto, with a pivot mounting positioned along a first axis and a second axis; a motor having at least one output shaft mounted for bi-directional rotational movement at least a first speed and a second speed; a first positioning member spaced from the pivot mounting and located on the first axis of the pivot mounting, the first positioning member mounted to the actuator for translating between a retracted and an extended position; a second positioning member spaced from the pivot mounting, the second positioning member being located on one of the second axis of the pivot mounting and an offset axis parallel to the second axis and which passes through the location of the first positioning member, the second positioning member mounted to the actuator for translating between a retracted and an extended position; a first drive linkage mounted to the first positioning member for receiving rotational movement and translating the first positioning member responsive to the imparted rotational movement; a second drive linkage mounted to the first positioning member for receiving rotational movement and translating the second positioning member and translating the second positioning member responsive to the imparted rotational movement; and a clutch mounted to the output shaft of the motor and to the first and second drive linkages, wherein the clutch driveably interconnects the output shaft of the motor to the first drive linkage at the first motor speed, and wherein the clutch driveably interconnects the output shaft of the motor to the second drive linkage at the second motor speed.

In a further aspect, the invention relates to a mirror assembly comprising:

a housing having an opening therein; a reflective element mounted within the housing in register with the opening; an actuator operably interconnected to the reflective element for imparting pivotal movement thereto through a pivot mounting positioned along a first axis and a second axis, the actuator comprising: at least one motor having at least one output shaft mounted for bi-directional rotational movement; a first positioning member spaced from the pivot mounting and located on the first axis of the pivot mounting, the first positioning member mounted to the mirror assembly for translating between a retracted and an extended position; a second positioning member spaced from the pivot mounting, the second positioning member being located on an offset axis parallel to the second axis and which passes through the location of the first positioning member, the second positioning member mounted to the mirror assembly for translating between a retracted and an extended position; wherein rotational movement from the at least one motor is selectively applied to the first positioning member to position a vehicular mirror about the first axis, and rotational movement from the at least one motor is selectively applied to both the first positioning member and to the second positioning member to translate a vehicular mirror about the second axis.

In yet an additional aspect, the invention relates to a mirror assembly comprising: housing means mountable to a vehicle; reflective means provided in the housing for providing a rearward-directed image; drive means for imparting bi-directional rotational movement at least a first speed and a second speed; positioning means for positioning the reflective means about at least a first axis and a second axis; and clutch means for selectively actuating the positioning means to position the vehicular mirror about the first axis at the first motor speed and to position the vehicular mirror about the second axis at the second motor speed.

In another aspect, the invention relates to a mirror assembly for a vehicle comprising: a housing having an opening therein and a mounting portion at a first end adapted to be mounted to a vehicle; a bracket mounted within the housing having a mounting portion in register with the opening, the bracket having a medial vertical axis dividing the bracket into an outboard portion and an inboard portion, the outboard portion being distal to the mounting portion of the housing, the inboard portion being proximal to the mounting portion of the housing; a pivot provided on the outboard portion of the bracket in register with the opening of the housing; an actuator provided on the inboard portion of the bracket in register with the opening of the housing, the actuator being operably configured to provide adjustable movement about at least two axes; a reflective element mounted to the outboard pivot of the bracket in register with the opening in the housing and to the inboard actuator for movement imparted by the actuator about the at least two axes.

The bracket can have an H-shaped cross section in at least a portion thereof. The actuator can include at least one motor adapted to impart pivotal movement to the reflective element about the at least two axes. The actuator can also include two motors adapted to impart pivotal movement to the reflective element about a corresponding one of the at least two axes. The actuator can have a first moveable actuator rod mounted to the reflective element and a second moveable actuator rod mounted to the reflective element, the second moveable actuator rod being vertically spaced from the first moveable actuator rod. The pivot, the first moveable actuator rod and the second moveable actuator rod can be positioned at vertices of a right triangular configuration with respect to the bracket. Movement of the first moveable actuator rod can position the reflective element about one of the at least two axes. Movement of the second moveable actuator rod can position the reflective element about another of the at least two axes. Generally contemporaneous movement of the first and second moveable actuator rods can position the reflective element about another of the at least two axes.

Various embodiments of the aspects of the invention described herein are also contemplated without limitation. The clutch can comprise a rotatable driven member mounted to the at least one output shaft of the motor and a rotatable drive member mounted to at least one of the first and second drive linkages, and the drive member engages the driven member at the second motor speed to urge the rotation of the driven member.

The drive member can comprise at least one pivotable shoe mounted for movement between a retracted position wherein the drive member does not engage the driven member and an extended position wherein the drive member contacts the driven member when the drive member rotates at the second motor speed. The drive member can comprise at least one radially translatable shoe that contacts the driven member when the drive member rotates at the second motor speed. The drive member can comprise at least one pivotable clutch ring that contacts the driven member when the centrifugal drive member rotates at the second motor speed. The drive member can comprise at least one spring clutch that contacts the driven member when the drive member rotates at the second motor speed. A return spring can be provided for disengaging the drive member from the driven member when the motor slows from the second speed to the first speed. The drive member can comprise a circular plate. The driven member can comprise a rotatable drum.

The driven member can comprise a circular plate adapted to frictionally engage the drive member when the motor rotates at the second speed. The clutch can comprise a rotatable driven member and a rotatable drive member, and the drive member engages the first drive linkage at the first motor speed. The drive member can comprise at least one pivotable shoe that contacts the first drive linkage when the drive member rotates at the first motor speed. The drive member can comprise at least one radially translatable shoe that contacts the first drive linkage when the drive member rotates at the first motor speed. The drive member can comprise at least one pivotable clutch ring that contacts the first drive linkage when the drive member rotates at the first motor speed. A spring can be provided for disengaging the drive member from the driven member. The drive member can comprise a circular plate. The driven member can comprise a circular plate. The drive member can comprise at least one pivotable arm adjacent a fixed bearing surface and the pivotable arm engages the fixed bearing surface to urge the drive member into contact with the driven member when the drive member rotates at the second motor speed.

The actuator can be mounted in a vehicular rearview mirror assembly comprising a mirror housing and a mounting frame. The pivot mounting can be located at an outboard end of the mounting frame. The mounting frame can comprise an actuator chamber for containing the actuator and the actuator chamber is adapted to maximize the distance between the pivot mounting and the actuator chamber. The mounting frame can comprise a chamber and the actuator is enclosed within the chamber. The mirror housing can comprise an opening for accessing the chamber. The mirror housing can comprise an access door for closing the opening.

An electrical resistance element can be provided for decreasing the current to the motor. The electrical resistance element can comprises a resistor. The electrical resistance element can also comprise a heating circuit.

BRIEF DESCRIPTION OF THE DRAWINGS

In the drawings:

FIG. 1B is a comparison view of the mass of a prior art actuator for a mirror assembly compared with the mass of an actuator according to the invention described herein.

FIG. 1C is a comparison view of the coaxial drive points of a prior art actuator for a mirror assembly compared with inboard-located drive points of the actuator according to the invention described herein.

FIG. 1F is a comparison view of the moment of inertia of a prior art actuator for a mirror assembly compared with the moment of inertia of an actuator according to the invention.

FIG. 108 is a perspective view of the assembled tilt actuator assembly of FIG. 107.

FIG. 109 is a close-up perspective view of the underside of a mirror assembly according to the invention showing a hinged access door in an open position for gaining access to the tilt actuator assembly installed in the mounting frame.

FIG. 110 is a sectional view of the mounting frame taken along line 110-110 of FIG. 103.

FIG. 111 is a sectional view similar to FIG. 106 of a mounting frame and tilt actuator assembly housing a dual-motor tilt actuator.

FIG. 112 is an exploded view of the tilt actuator assembly of FIG. 111 showing an assembly of operable components housed in an actuator case comprising an enclosure and a cover.

FIG. 113 is a perspective view of the assembled tilt actuator assembly of FIG. 112.

DESCRIPTION OF THE PREFERRED EMBODIMENT

Figure 1:
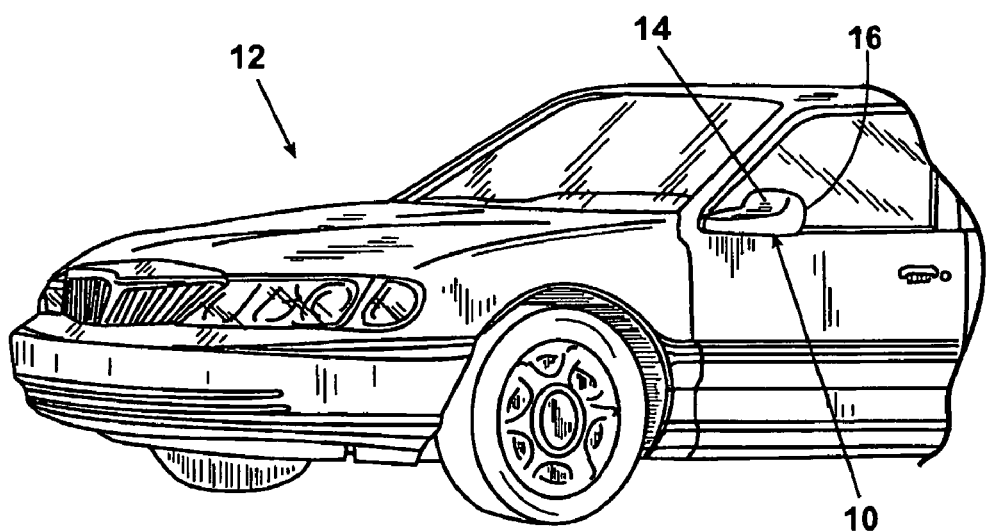
FIG. 1 is a perspective view of a portion of an automotive vehicle having a side view mirror assembly according to the invention.

As shown in FIG. 1, a rearview mirror assembly 10 according to the invention is installed on an automotive vehicle 12 on or near the front of the driver's side door. An identical mirror assembly can be similarly mounted to the vehicle 12 on the passenger's side. The description of the structure and operation of the mirror presented hereinafter will be equally applicable to both mirror assemblies. Although the invention is described with respect to an embodiment comprising a rear view mirror for an automotive vehicle, the concept of adjusting the tilt of a panel through a clutch assembly as described herein driven by a single variable-speed motor can have other applications, and the exemplary embodiments of the inventive concepts described herein are not to be considered as limiting, except where the claims expressly state otherwise. Several embodiments of the invention are shown and described herein, and comprise elements which are common to more than one embodiment. Thus, like numbers will be used to identify like elements, except where otherwise indicated.

Before the specifics of the various embodiments of the mirror assembly 10 are described in detail, it shall be understood that, while a single motor actuator for the mirror assembly 10 is described as a feature of the invention, the invention, when used with the improved inboard center of gravity, is equally applicable to actuators with more than one actuating motor.

Two important features are part of the invention described herein. First, the invention contemplates moving the actuator mass to an inboard side of the mirror assembly, thus repositioning the center of mass of the mirror assembly toward the vehicle, thus creating a lower moment of inertia of the mirror assembly and requiring less force for pivotal movement of the mirror. Second, the overall mass of the mirror assembly is reduced, in one exemplary way by removing one of the motors which actuates the mirror about an axis and thereby performing actuation of the mirror about two axes with a single motor.

The inventive concept of moving the center of gravity of the mirror assembly 10 inboard from a central, vertical medial axis will now be described further with respect to FIGS. 1A-1F. In these drawings both a conventional and an inventive mirror assembly are shown. The inventive mirror assembly is shown in these drawings as a bracket B which mounts an actuator A and has a pivot P. The conventional mirror assembly is shown in these drawings as a bracket B' which mounts an actuator A' and has a pivot P.

As shown in Table 1 below, in a conventional exterior rearview mirror, the base bracket is the heaviest component, followed by the shell, the actuator, the mirror glass, and the shell bracket. The actuator is the most expensive of the components. Generally, the mirror glass and shell sizes cannot be reduced without adversely impacting the rearward view of the mirror. Furthermore, the weight of the base bracket and shell bracket is directly related to the mass and location of the actuator. Thus, reduction in the mass and position of the actuator in the mirror assembly can have a significant impact on the overall weight of the mirror assembly.

TABLE 1

| Component | Mass (%) | % Material Cost (%) |
|---|---|---|
| Base Bracket | 26 | 13 |
| Shell | 15 | 6 |
| Actuator/Harness | 15 | 43 |
| Mirror Glass | 12 | 4 |
| Shell Bracket | 8 | 14 |

Figure 1A:
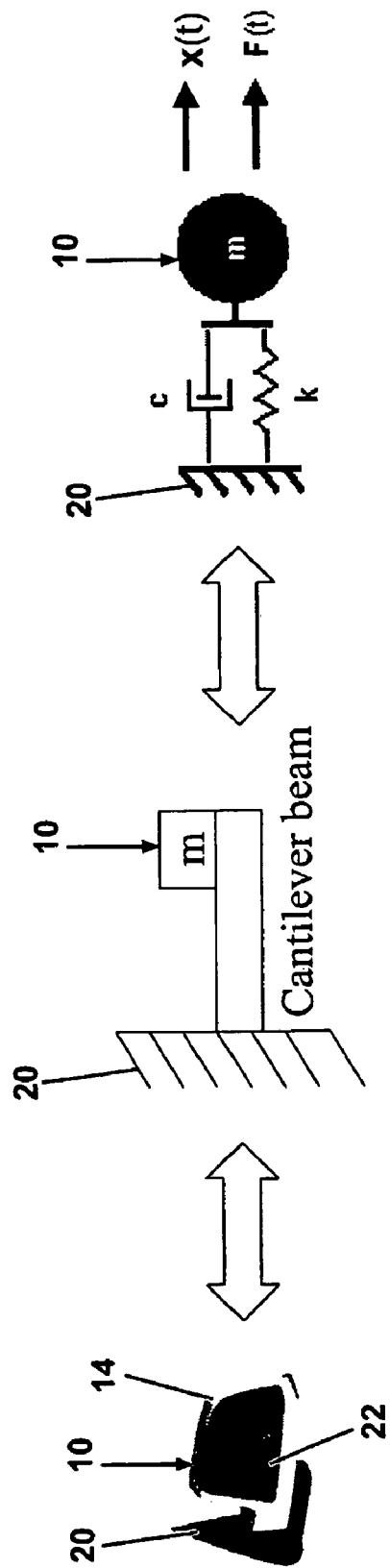
FIG. 1A is a schematic view of a mirror assembly shown modeled as a cantilevered beam for purposes of explanation of the physics involved in improving the mass and moment of inertia configuration of a vehicular mirror assembly according to the invention.

Conventional exterior rearview mirrors, specifically the shell bracket, can be modeled as a single-degree-of-freedom cantilevered beam having an attached mass, m, a spring characterized by a spring constant, k, and a dashpot-type damper characterized by a damping coefficient, c (see FIG. 1A). The mass comprises the actuator and the mirror glass. The spring and the damper are characteristic of the materials and configuration comprising the bracket. The basic force balance relationship for this system as a function of time is:

$$\Sigma F = m \cdot a = -c \cdot v - k \cdot x + F(t)$$

where F(t)=an external force applied to the system at a time, t,
v=the velocity of the mass in a given direction,
x=the displacement of the mass in the given direction, and
t=time.

The displacement of the mass as a function of time can be determined by solving a differential equation, resulting in:

$$x(t) = X \cdot e^{-\zeta \omega_n t} \sin(\sqrt{1-\zeta^2} \omega_n t + \Phi)$$

where x(t)=the displacement of the mass,
X=an initial displacement of the mass,
$\zeta$=a damping factor which is characteristic of the beam material,
$\omega_n$=the natural frequency of the system, and
$\Phi$=the phase angle.

The natural frequency is of principal interest in the design of external rearview mirrors. The natural frequency is related to the spring constant and mass, as follows:

$$\omega_n = \sqrt{\frac{k}{m}}$$

For a cantilevered beam, $$k = 3EI/L^3$$

where E=the modulus of elasticity for the beam material,
I=the moment of inertia of the beam, and
L=the distance of the mass from the beam anchor point. In this case, L is the distance between the point of attachment to the vehicle to the center of mass of the mirror assembly.
Thus, $$\omega_n = \sqrt{\frac{3EI}{L^3 m}}$$

The modulus of elasticity correlates to the modulus of elasticity in flexure of the materials used for the base bracket and the shell bracket. The length is the distance of the center of gravity of the shell subassembly from the base mount. The mass is the mass of the shell, the mirror glass, and of the actuator.

Higher natural frequencies are preferred. A typical specification for manufacture of a vehicular mirror assembly calls for a natural frequency of at least 70 Hz. It can be seen from the above relationship that the natural frequency can be increased by increasing the modulus of elasticity (E) and/or the moment of inertia (I), or decreasing the length (L) and/or the mass (m).

The natural frequency is frequently increased by increasing the modulus of elasticity, which typically means utilizing heavier materials, such as a die-cast bracket, which can result in an increase in assembly cost and mass. Conversely, for a given natural frequency, an increase in the moment of inertia, and a decrease in the length and the mass enable the modulus of elasticity to be decreased, which can lead to a more cost-effective selection of material. In actuality, the mass is reduced by reducing the mass of the actuator, the length is reduced by moving the actuator closer to the base bracket, and the moment of inertia is increased by adjusting the geometry of the shell bracket.

As shown in the example structures in FIG. 1B, the use of a single motor actuator (such as that described herein) can reduce the mass from, e.g., 225 g for a dual-motor actuator to 45 g for a single-motor actuator, a reduction in mass of 80%. Furthermore as shown in FIG. 1C, the unique operation of the single-motor actuator described herein allows for drive points for the selective actuation of the motor axes to be moved to the inboard end of the mirror assembly.

Figure 1D:
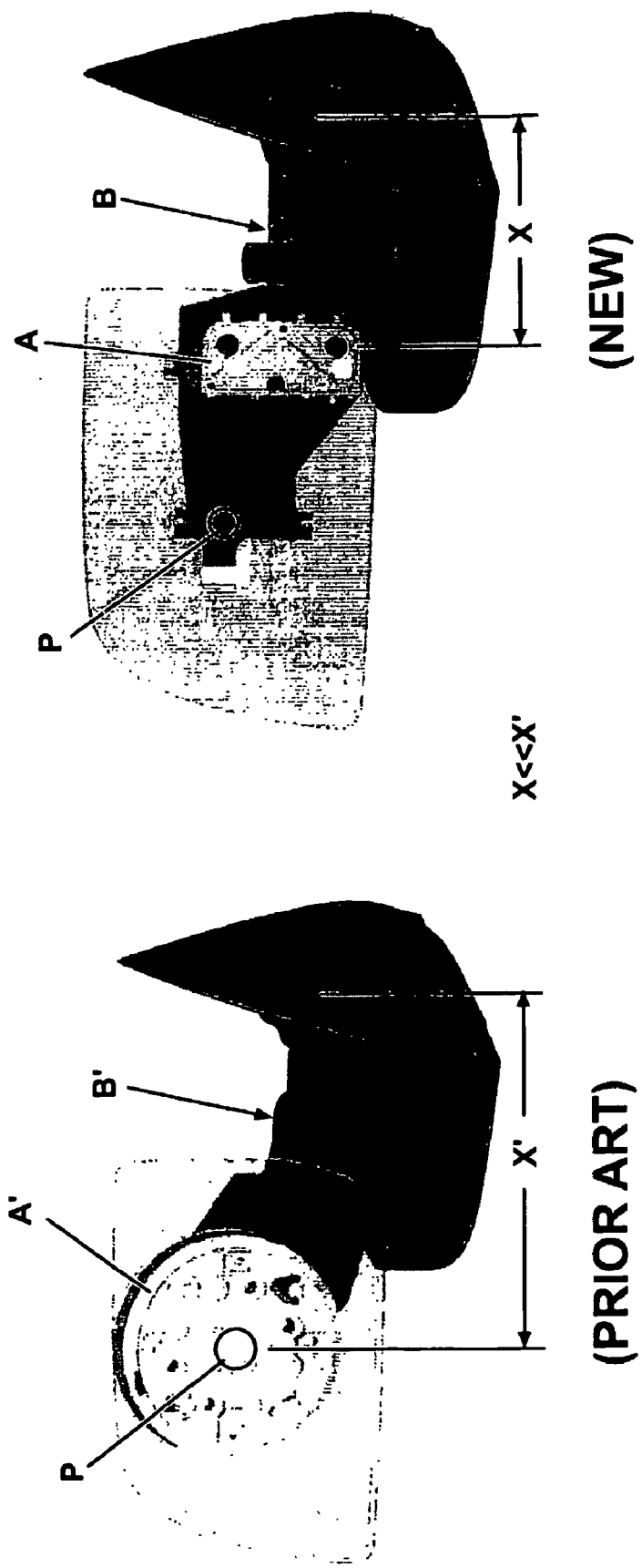
FIG. 1D is a comparison view of the mounting arm length of a prior art actuator for a mirror assembly compared with mounting arm length of the actuator according to the invention described herein.

As can be seen, conventional mirror assemblies have a large, coaxially located actuator positioned about the center of the mirror assembly, locating the center of gravity distal from the inboard end of the mirror assembly. In the inventive mirror assembly described herein, the drive points (i.e., the points where the actuator contacts the mirror to adjust it) are located adjacent to the inboard end of the mirror assembly, repositioning the mass of the actuator A far closer to the inboard end of the mirror assembly as can be seen in FIG. 1C. This repositioning of the drive points of the actuator A enables the actuator A to be positioned inboard, i.e. toward the base bracket, relative to the conventional dual-motor actuator A'. The inventive movement of the actuator to an inboard position can result in a reduction in arm length (i.e., the distance between the mounting point of the mirror assembly to the vehicle and to the mass point of the actuator) of 30% (as shown in FIG. 1D). For example, for a conventional arm length of x' shown in FIG. 1D, the repositioned actuator A in the new inventive version described herein results in a reduced arm length of x. This reduction can be over 30%, for example, a conventional arm length of 220 mm can be reduced to approximately 140 mm.

Figure 1E:
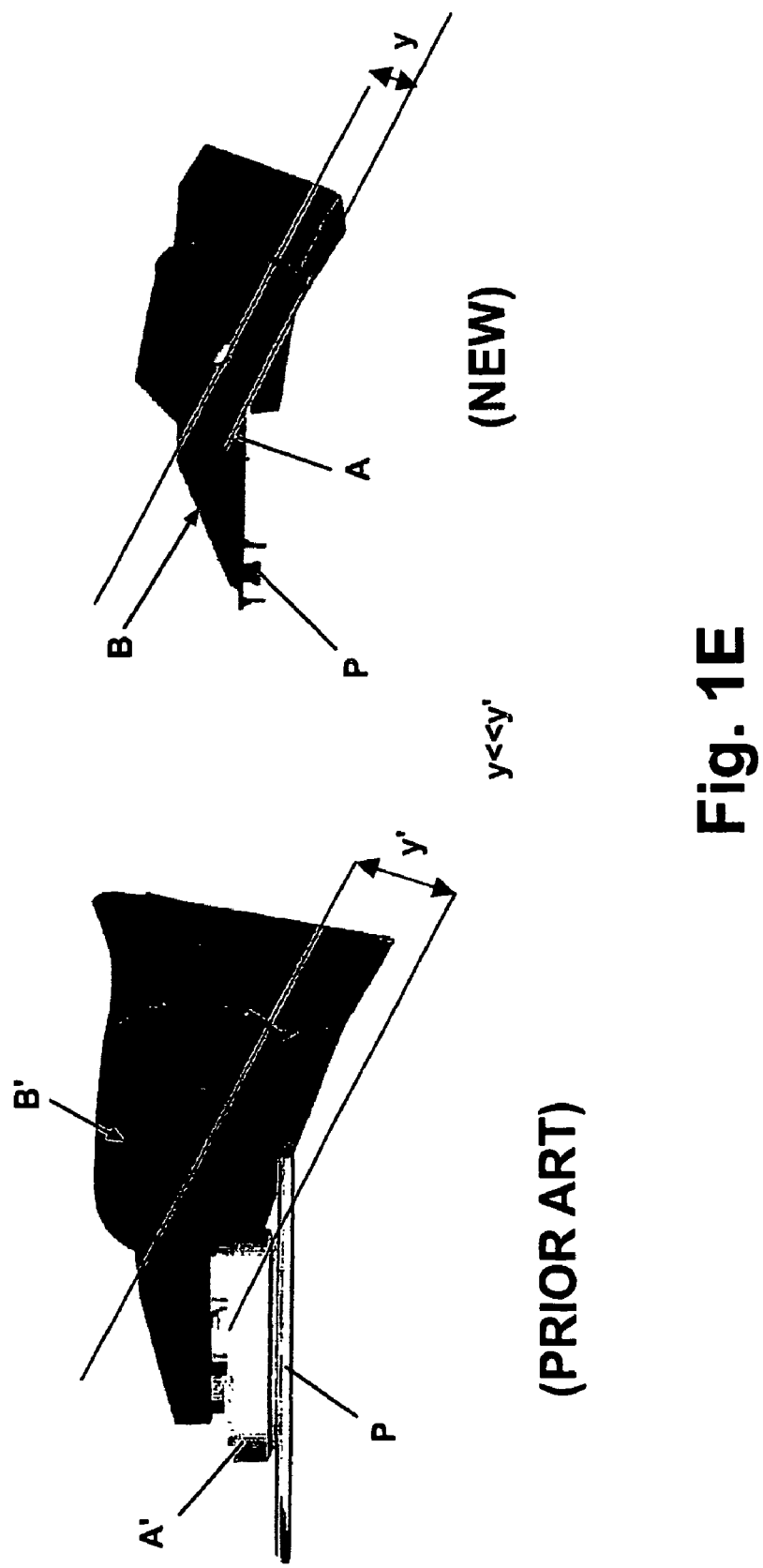
FIG. 1E is a comparison view of the forward mounting position of a prior art actuator for a mirror assembly compared with the more-aligned forward mounting position of an actuator according to the invention.

Additionally as shown in FIG. 1E, the single-motor actuator can be mounted further forward, closer to the neutral axis of the shell bracket, which causes less twisting of the shell bracket. For example, for a conventional forward mounting length of y' shown in FIG. 1D, the repositioned actuator A in the new inventive version described herein results in a reduced arm length of y. This reduction can be over 30% as well.

Finally as shown in FIG. 1F, the reduced size of the single-motor actuator allows the structural components of the shell bracket to be optimized. For example, a typical conventional bracket has a moment of inertia in the fore/aft direction of $0.9 \times E^5$ mm$^4$, and a moment of inertia in the vertical direction of $5.2 \times E^5$ mm$^4$. In contrast, the shell bracket described herein with respect to FIGS. 101-106 and 110 has a moment of inertia in the fore/aft direction of at least $1.22 \times E^5$ mm$^4$, and a moment of inertia in the vertical direction of at least $1.87 \times E^5$ mm$^4$. In general, the present invention enables achievement of a moment of inertia in the vertical direction of $2.5 \times E^5$ mm$^4$ or lower and in the fore/aft direction of at least $1 \times E^5$ mm$^4$.

An analytical study was performed of a conventional mirror assembly and a mirror assembly comprising a single-motor actuator as described herein. The conventional mirror assembly consisted of a dual-motor actuator, mounted in a conventional location toward the outboard end of the shell bracket, utilizing a conventional shell bracket configuration. The mirror assembly described herein consisted of a single-motor actuator mounted toward the base bracket, and utilizing the shell bracket configuration shown in FIGS. 101-106 and 110. The results are shown in the following Table 2.

TABLE 2

| Type | Version | Mass (g) | $\omega_n$ (Hz) |
|---|---|---|---|
| Conventional | Zinc base, 50% GF bracket | 1959 | 97 |
| Conventional | 50% GF base, 15% GF bracket | 1169 | 47 |
| Single-motor, Inventive | 50% GF base, 15% GF bracket | 1033 | 75 |

The first conventional assembly, utilizing a zinc base and a plastic bracket, has a natural frequency greater than 70 Hz, but high mass. The second conventional assembly, utilizing a plastic base and bracket, has less mass, but the natural frequency is too low. The single-motor actuator, utilizing a plastic base and a bracket, has the least mass and a natural frequency greater than 70 Hz. As a result of the use of the single-motor actuator, the mass of the base bracket can be reduced 67%, the mass of the shell bracket can be reduced 20%, and the mass of the actuator is reduced 82%.

A bench study was performed using a conventional mirror assembled with conventional components and with the single-motor actuator components. The natural frequency of both mirror assemblies was 50 Hz, but the mass of the single-motor mirror was 1585 g contrasted with the 2500 g mass of the conventional mirror.

Figure 2:
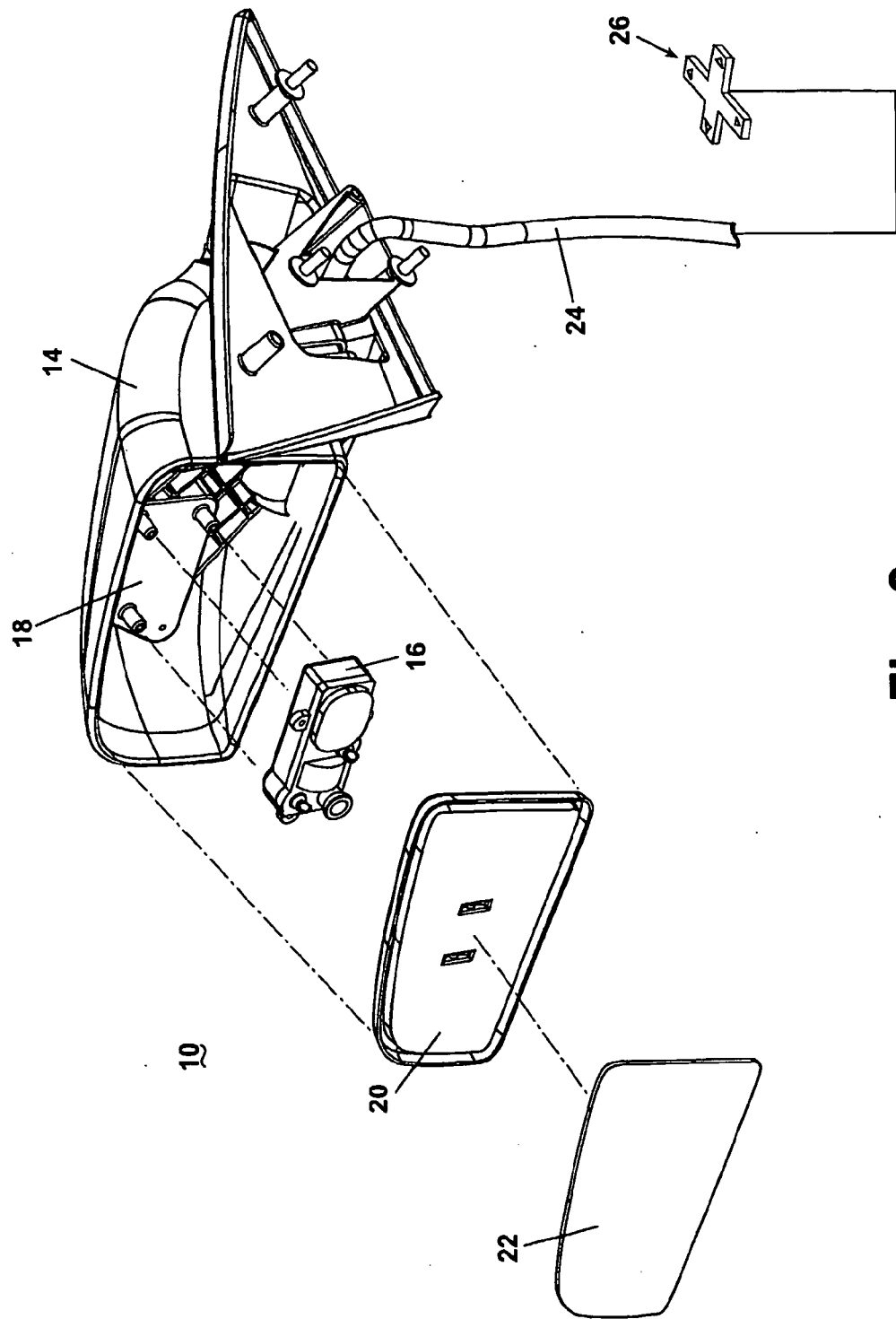
FIG. 2 is an exploded view of a first embodiment of the mirror assembly of FIG. 1, the mirror assembly including a motor assembly and a clutch assembly.

As shown in FIG. 2, the rearview mirror assembly 10 is a generally conventional rearview mirror assembly comprising a shell 14, a motor assembly 16, a mounting panel 20, and a mirror 22, which is mounted to the vehicle 12 in a conventional manner, and is connected to a remote control pad 26 through a control cable 24. The shell 14 houses a motor mounting bracket 18, preferably integrally formed therein, to mount the motor assembly 16 in a conventional manner, such as with threaded or snap-fit connectors (not shown). The motor assembly 16 is operably connected to the mounting panel 20 for adjustment of the vertical and horizontal tilt of the panel 20 as hereinafter described. A basic embodiment of the mounting between the motor assembly 16 and the mounting panel 20 is shown in U.S. Pat. No. 4,740,068, issued Apr. 26, 1988, which is incorporated herein by reference.

The panel 20 fixedly mounts a mirror 22 thereby enabling the mirror 22 to tilt vertically and horizontally with the tilting of the panel 20. The control cable 24 preferably comprises electrical wiring for operably connecting the motor assembly 16 with the remote control pad and the vehicle's electric power supply. The motor assembly 16, panel 20, and mirror 22, are encased within the shell 14 in a conventional manner to provide the mirror assembly 10.

Figure 3:
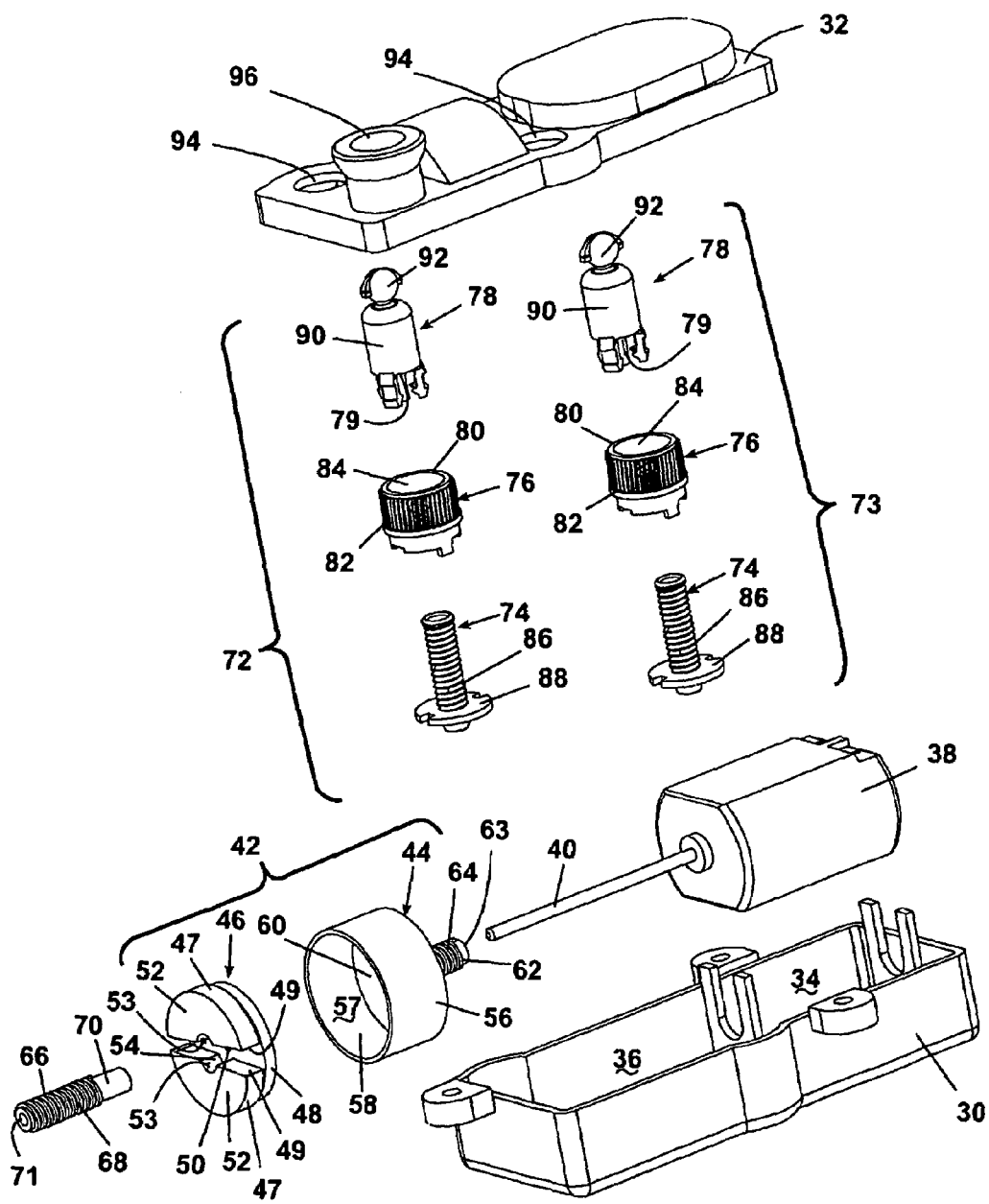
FIG. 3 is an exploded view of the mirror assembly of FIG. 2.
Figure 4:
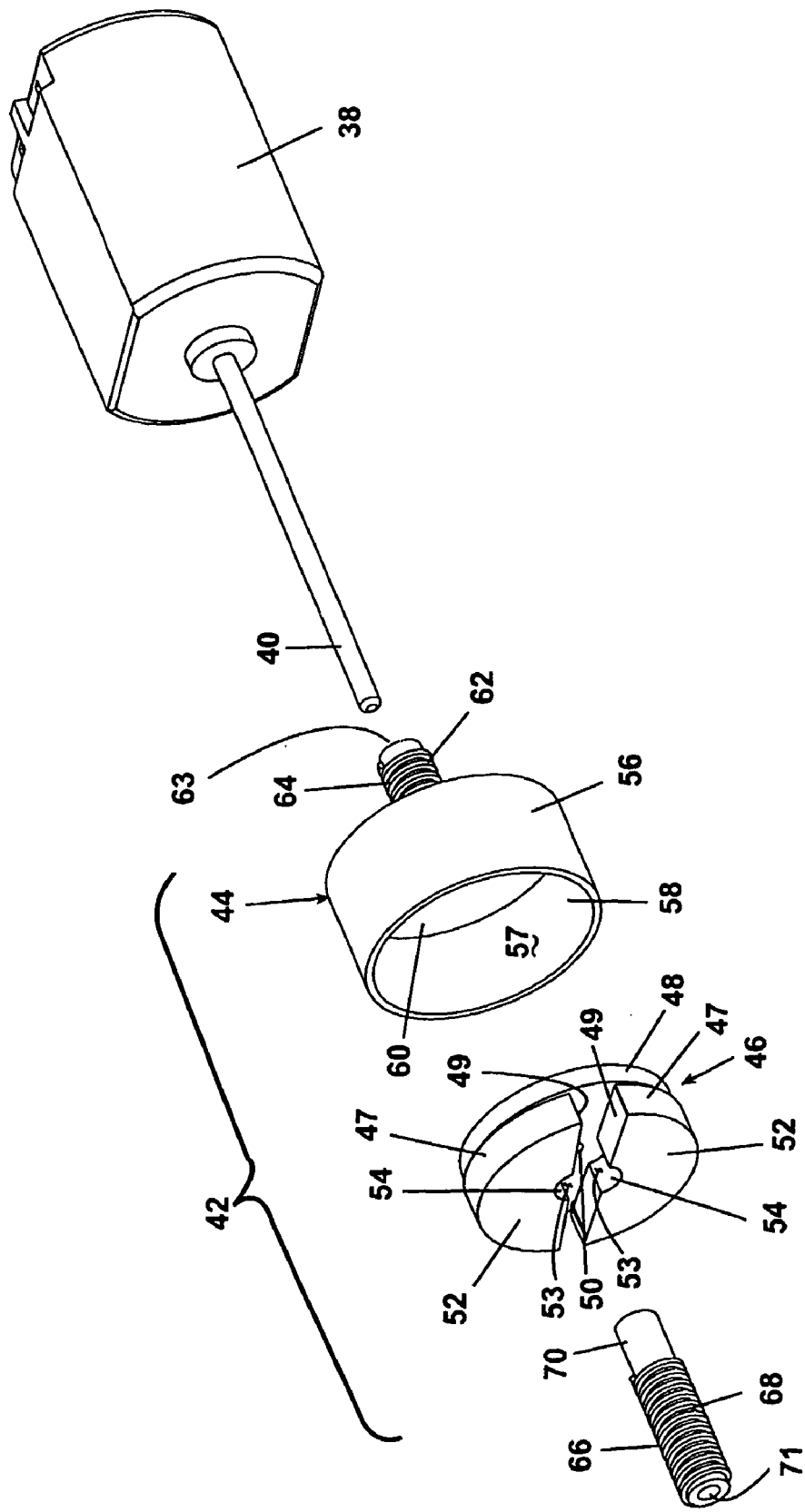
FIG. 4 is an exploded view of a first embodiment of the motor assembly and the clutch assembly of FIGS. 2 and 3.
Figure 5:
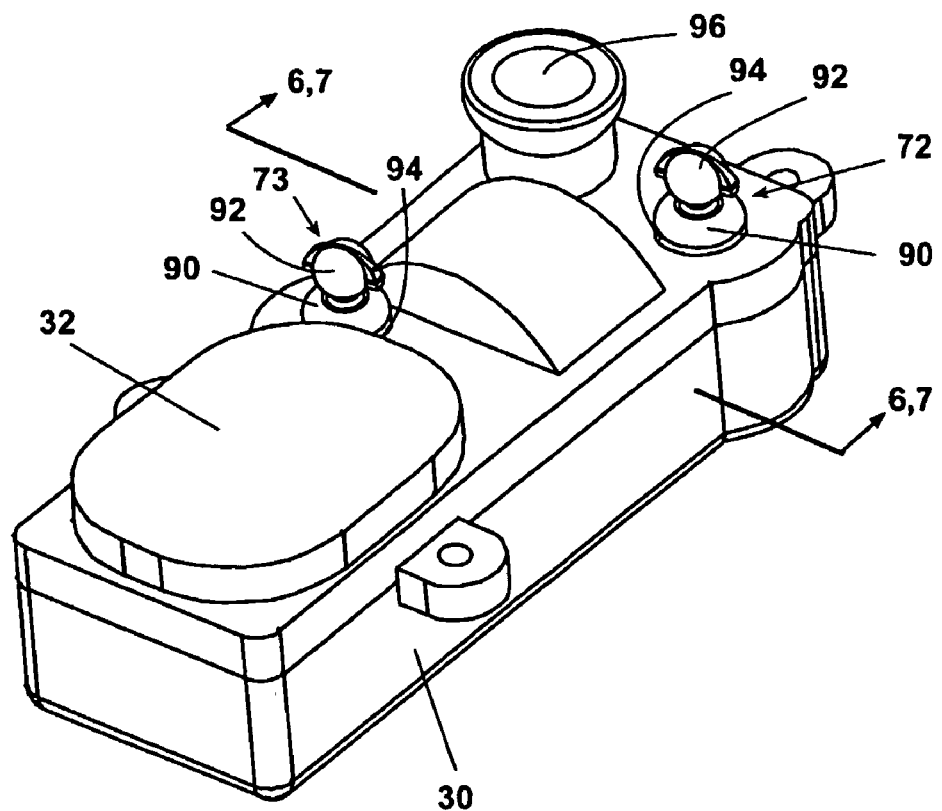
FIG. 5 is a perspective view of the motor assembly of FIG. 2 assembled for installation in the mirror assembly.

The motor assembly 16 is shown in FIGS. 3-5 preferably comprising a generally oblong, box-like motor housing 30 and a removable mating cover 32, forming an enclosed container when the cover 32 is installed on the housing 30, for enclosing a motor 38, a clutch assembly 42, worm gears 62, 66, and actuators 72, 73. The motor 38, the clutch assembly 42, the worm gears 62, 66, and the actuators 72, 73 can alternatively be mounted to a bracket, a receptacle molded into the shell 14, or another structure capable of securing each component in operable interconnection for operation of the rear view mirror assembly 10 as hereinafter described.

The motor housing 30 is divided into a motor receptacle 34 and a gear receptacle 36. The cover 32 is fixedly installed on the motor housing 30, such as through suitable connectors or a snap-fit mechanism, with an appropriate weather-tight seal, such as a cover gasket, thereby forming a weathertight enclosure for a motor 38 and a clutch assembly 42.

The motor 38 is preferably a generally conventional variable-speed 12 volt DC electric motor having sufficient power for operation of the mirror assembly 10 as described herein. The motor 38 is provided with a driven rotating shaft 40 which operably interconnects the motor 38 and the clutch assembly 42 as hereinafter described.

The clutch assembly 42 comprises a drum 44 and a centrifugal drive member 46. The centrifugal drive member 46 comprises a circular plate 48 having a center aperture 50 therethrough, and a pair of diametrically-opposed shoes 52. The center aperture 50 frictionally engages the shaft 40 for rotation of the clutch assembly 42 with rotation of the shaft 40. Other suitable interconnections of the shaft 40 and the clutch assembly 42 can be employed for rotation of the clutch assembly 42 by the shaft 40 without departing from the scope of this invention.

Each shoe 52 is a generally plate-like, D-shaped member having a curved edge 47 and a straight edge 49, and preferably formed of an elastomeric material capable of controlled deformation under the influence of centrifugal forces. A generally arcuately-shaped cutout 53 is formed in the center of each straight edge 49. Alternatively, the cutout 53 can have a straight-segment profile, such as rectilinear, or semi-hexagonal. The radius of the curved edge 47 is generally the same as the radius of the circular plate 48 so that the curved edge 47 has the same curvature as the circumference of the plate 48.

The shoes 52 are in spaced-apart opposed relationship with the cutouts 53 forming a generally semicircular grip surface 54 axially aligned with the aperture 50. The shoes 52 are pivotably or slidably attached to the plate 48, such as through one or more living hinges, a pivot and pin assembly, or a post and slot assembly (not shown) in which the plate 48 is provided with pins extending through slots or apertures in the shoes 52. The elastomeric properties of the shoes 52 and the living hinges (to the extent living hinges are utilized) enable the shoes 52 to partially deform under the influence of centrifugal forces due to the rotation of the centrifugal drive member 46 into frictional communication of the curved edges 47 with the drum 44.

The drum 44 is an annular member having a rim 56 with an inner surface 58. The drum has an open side 57 for axially-aligned receipt of the centrifugal drive member 46, and a circular wall 60 from which the rim 56 extends. Extending outwardly from the circular wall 60 is a generally cylindrically-shaped high-speed worm gear 62 axially aligned with the drum 44 and having a center aperture 63 extending therethrough. It should be noted that, for purposes of the description of the embodiments set forth herein, a convention is adopted identifying a "high-speed" and a "low-speed" adjustment of the mirror, and the "high-speed" and "low-speed" component assemblies associated therewith. The references to "high-speed" and "low-speed" should not be construed as implying any differences between the two characteristics other than the different mirror-tilting functions that the assemblies perform. The center aperture 63 extends through the circular wall 60 to form a passageway for slidable communication with the motor shaft 40. The worm gear 62 comprises a threaded portion 64.

The motor assembly 16 has a low-speed worm gear 66 comprising a generally cylindrically-shaped elongated member having a threaded portion 68, an unthreaded shaft 70, and a center aperture 71 extending therethrough. The unthreaded shaft 70 can be semi-circular for frictional communication with semi-circular grip surfaces 54, or can comprises a plurality of planar surfaces, such as square or hexagonal, for keyed communication with rectilinear or hexagonal surfaces comprising the cutout 53. The center aperture 71 can slidably communicate with the motor shaft 40.

The motor assembly 16 also comprises a pair of actuators 72, 73, the first of which comprises a low-speed actuator 72 and the second of which comprises a high-speed actuator 73 for the purposes of this invention. Each actuator 72, 73 comprises an output shaft 74, an actuator gear 76, and an actuator shaft 78. Each output shaft 74 comprises a generally elongated, cylindrically-shaped member having a threaded portion 86 and a slotted flange 88. The output shafts 74 are rotatably attached to the interior of the motor housing 30 for operable communication of each actuator 72, 73 with the low-speed worm gear 66 and the high-speed worm gear 62, respectively. The actuator gear 76 is a generally wheel-like member comprising a rim 80, an outer threaded portion 82, and an inner surface 84. The threaded portion 82 operably meshes with the threaded portions 64, 68 of the worm gears 62, 66 so that rotation of the worm gears 62, 66 will urge the actuator gears 76 into rotation.

The actuator shaft 78 comprises a generally elongated, cylindrically-shaped member having a sliding surface 90 and a mounting ball 92. The sliding surface 90 slidably communicates with the inner surface 84 of the actuator gear 76. The actuator shaft 78 also comprises an axially-aligned circular interior channelway 79 having threads for communication with the threaded portion 86 so that rotation of the actuator shaft 78 relative to the output shaft 74 will urge the actuator shaft 78 into linear, axial movement. The actuator shaft 78 is also keyed to the actuator gear 76 so that the actuator shaft 78 is urged into rotation by the rotation of the actuator gear 76, yet can move linearly relative to the actuator gear 76.

The cover 32 is provided with a pair of cover apertures 94 which are axially aligned with the actuators 72, 73 to enable the actuator shaft 78 to move into and out of the motor assembly 16 through the apertures 94, as shown in FIG. 5. The cover 32 is also provided with a mirror mounting socket 96 for mounting the mounting panel 20 to the motor assembly 16 and enabling the mounting panel 20 to pivot along the vertical and horizontal axes relative to the motor assembly 16.

Figure 8:
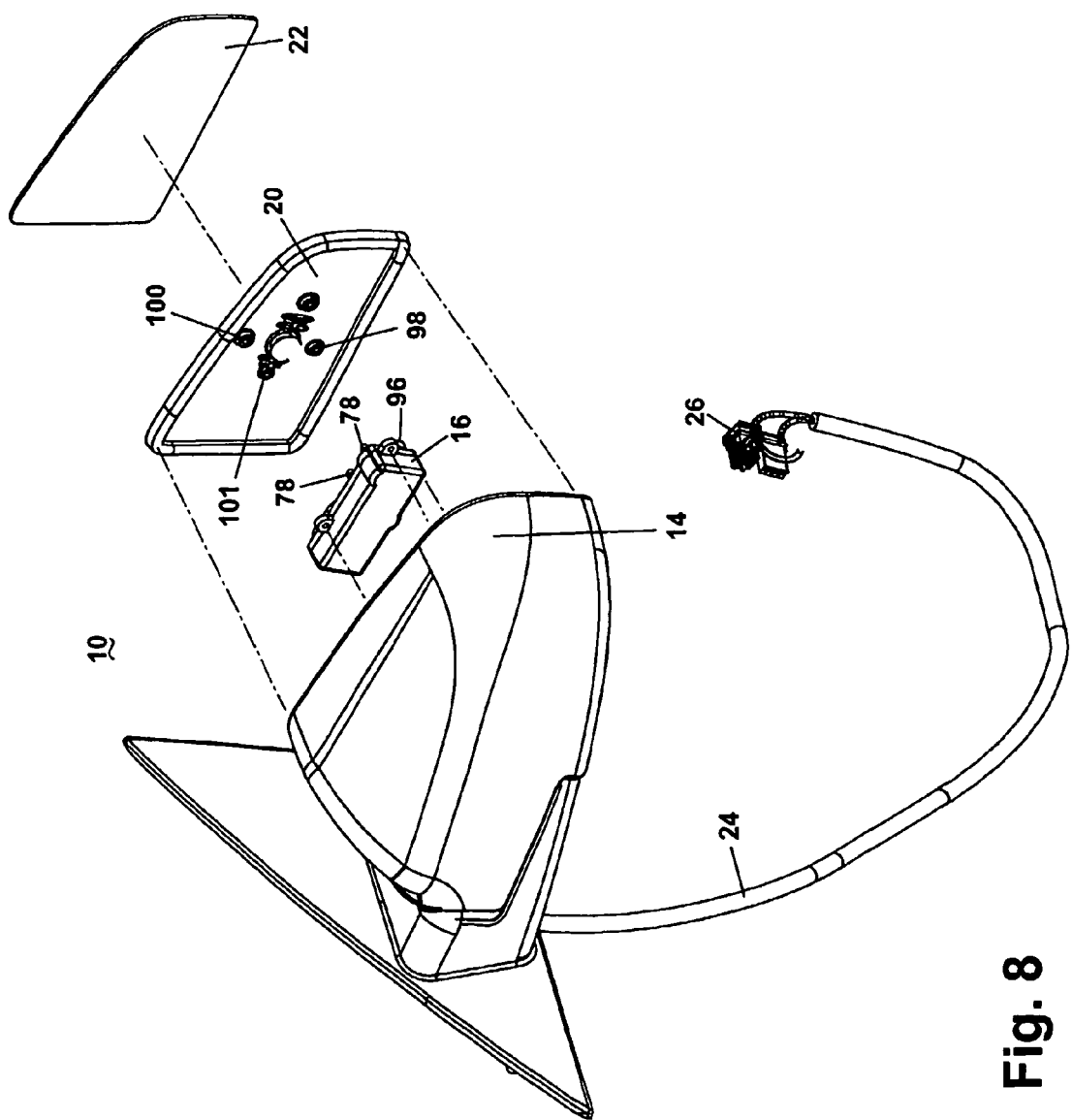
FIG. 8 is an exploded view of the mirror assembly of FIG. 1 showing a wire harness used for the connection of the motor assembly to internal vehicle components.

As shown in FIG. 8, the mounting panel 20 is provided with a mounting ball 98 and a pair of sockets 100, 101. The mounting ball 98 is pivotably received in the mirror mounting socket 96 for pivotable movement of the panel 20 relative to the motor assembly 16. The sockets 100, 101 pivotably receive the mounting balls 92 for pivotable movement of the panel 20 relative to the actuators 72, 73.

The assembly of the rearview mirror assembly 10 will now be described. Referring to FIGS. 2-8, the clutch assembly 42 is assembled by inserting the centrifugal drive member 46 into the drum 44 with the circular plate 48 in slidable communication with the circular wall 60. The clutch assembly 42 is inserted over the shaft 40 by passing the shaft 40 through the apertures 50, 63. The centrifugal drive member 46 is operably connected to the shaft 40 for rotation of the centrifugal drive member 46 with rotation of the shaft 40. The low speed worm gear 66 is inserted over the shaft 40 so that the unthreaded shaft 70 is in operable communication with the grip surfaces 54.

The low-speed actuator 72 and high-speed actuator 73 are installed in the gear receptacle 36 of the motor housing 30 for rotational movement therein. The motor assembly 16 comprising the motor 38 with the clutch assembly 42 is installed into the motor housing 30 with the motor 38 installed in the motor receptacle 34 and the clutch assembly 42 installed in the gear receptacle 36 so that the low-speed worm gear 66 threadably engages the low-speed actuator 72, and the high-speed worm gear 62 threadably engages the high-speed actuator 73. The cover 32 is then secured to the motor housing 30 with the actuators 72, 73 extending through the cover apertures 94.

The motor assembly 16 is attached to the motor mounting bracket 18, such as through conventional threaded or snap-fit connections, so that the low-speed actuator 72 pivotably engages a first socket 100 on the mounting panel 20, the high-speed actuator 73 pivotably engages a second socket 101 on the mounting panel 20, and the mounting ball 98 on the mounting panel 20 is pivotably received in the mirror mounting socket 96 on the cover 32. The mirror 22 is fixedly attached to the mirror mounting panel 20. The interconnection of the mounting bracket 18, the motor assembly 16, the mounting panel 20, and the mirror 22 within the shell 14 comprises the assembled rearview mirror assembly 10.

Figure 6:
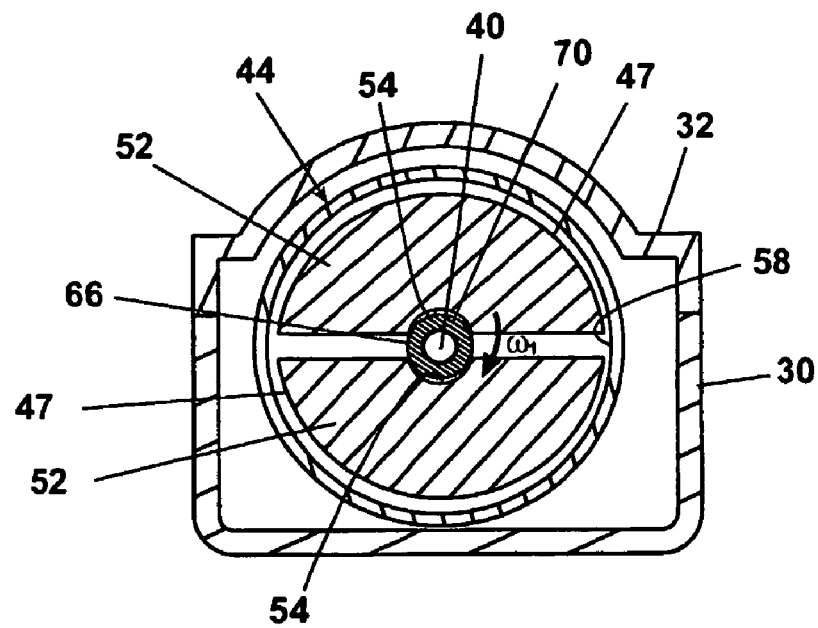
FIG. 6 is a cross-sectional view of the clutch assembly taken along line 6-6 of FIG. 5 operably engaged for low-speed operation of the side view mirror assembly.
Figure 7:
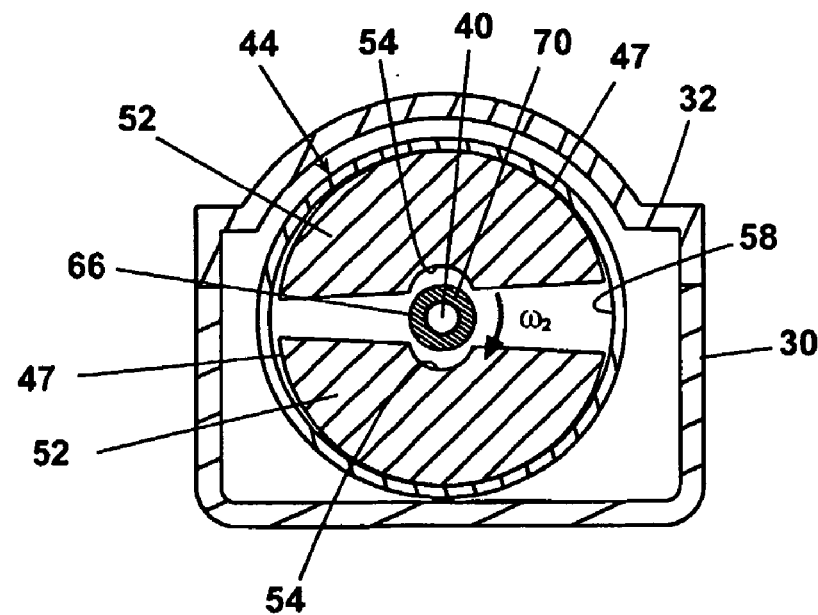
FIG. 7 is a cross-sectional view of the clutch assembly taken along line 7-7 of FIG. 5 operably engaged for high-speed operation of the side view mirror assembly.

Referring now to FIGS. 3, 6, and 7, the operation of the clutch assembly 42 will be described. The centrifugal drive member 46 rotates with the rotation of the motor shaft 40. Preferably, the shaft 40 frictionally engages the aperture 50 through the centrifugal drive member 46 by which the clutch assembly 42 will be urged to rotate with the rotation of the shaft 40. Other suitable interconnections of the shaft 40 and the centrifugal drive member 46 can be employed for rotation of the clutch assembly 42 by the shaft 40. The drum 44 and attached high-speed worm gear 62 are urged to rotate relative to the shaft 40. Similarly, the low-speed worm gear 66 is urged to rotate relative to the shaft 40.

As shown in FIG. 6, in an at-rest position or at low speeds, the shoes 52 are urged toward each other, thereby gripping the unthreaded shaft 70 between the grip surfaces 54. Rotation of the shaft 40 urges rotation of the centrifugal drive member 46, which in turn rotates the low-speed worm gear 66. As shown in FIG. 7, at high speeds, the shoes 52 are urged outwardly by centrifugal force, causing the surfaces 54 to separate and releasing the unthreaded shaft 70 so that the low-speed worm gear 66 is disengaged from the motor shaft 40. At the same time, the centrifugal force urges the shoes 52 against the inner surface 58 of the drum 44, thereby driving the drum 44 and the high-speed worm gear 62. Similarly, at low speeds, the shoes 52 are disengaged from the inner surface 58 and the shaft 44 thus rotates in the aperture 63 without driving the drum 44 and high-speed worm gear 62.

At low speeds, the low-speed actuator 72 is driven by the low-speed worm gear 66. At high speeds, the high-speed actuator 73 is driven by the high-speed worm gear 62. The low-speed actuator 72 is connected to the mounting panel 20 to effect the tilting of the panel 20, for example, along a vertical axis. The high-speed actuator 73 is connected to the mounting panel 20 to effect the tilting of the panel 20, for example, along a horizontal axis. Thus, a single motor assembly 16 is used to adjust the mirror 22 in both the vertical and horizontal directions.

Figure 16:
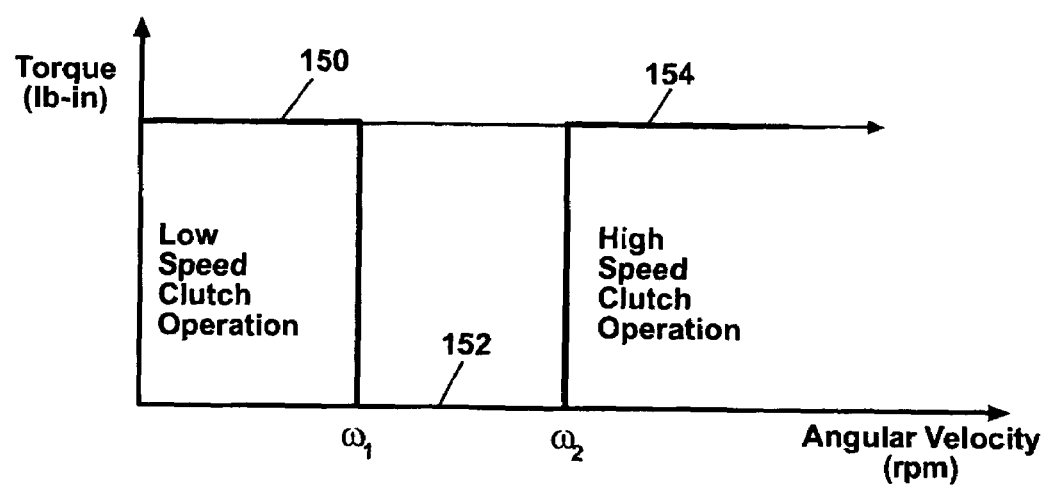
FIG. 16 is a graphical representation of the torque delivered by the motor as a function of the angular velocity of the motor and the shaft to which the torque is delivered.

FIG. 16 shows the output of the clutch assembly 42 for the high and low angular velocities generated by the motor 38. At low angular velocities between zero and the angular velocity represented as $\omega_1$, the low-speed worm gear 66 is driven, represented by the line 150. At high angular velocities at or above the angular velocity represented as $\omega_2$, the high-speed worm gear 62 is driven, represented by the line 154. At angular velocities between $\omega_1$ and $\omega_2$, the clutch assembly 42 is inoperable, providing a transition region separating the mirror tilt operations, represented by the line 152.

Due to the rotational inertia of the components of the motor assembly 16, the motor 38, the clutch assembly 42, and the actuators 72, 73 will not respond instantaneously to a change from, for example, low speed operation to high speed operation. If, for example, the motor 38 is operated at a high angular velocity to adjust the mirror 22 in the vertical direction, once the proper tilt of the mirror 22 is achieved, the motor 38 will be deactivated. Once the angular velocity slows to $\omega_1$, the low speed worm gear will be activated until the motor 38 and clutch assembly 42 come to a complete stop. This will cause a tilting of the mirror 22 somewhat in the horizontal direction, moving the mirror 22 out of position and necessitating a readjustment in the horizontal direction. In order to avoid this phenomenon, the motor 38 is preferably provided with an electric brake feature, such as a short across the motor terminals or grounding of the terminals when the motor 38 is shut off, in order to bring the motor 38 to an instantaneous stop, preventing the unwanted tilting from occurring.

If operation of the motor 38 at a high angular velocity is desired, for example to adjust the mirror 22 only in the direction controlled by the high-speed actuator 73, starting the motor 38 at a high angular velocity $CO_2$ will immediately urge the clutch assembly 42 into high-speed operation with the centrifugal drive member 46 or 109 operably engaging the drum 44. This will bypass the operation of the unselected actuator 72, such as would occur if the clutch assembly 42 were operated through a range of increasing angular velocities until the selected high angular velocity $\omega_2$ was reached, thereby avoiding an undesirable movement of the mirror in the unselected direction.

Figure 9:
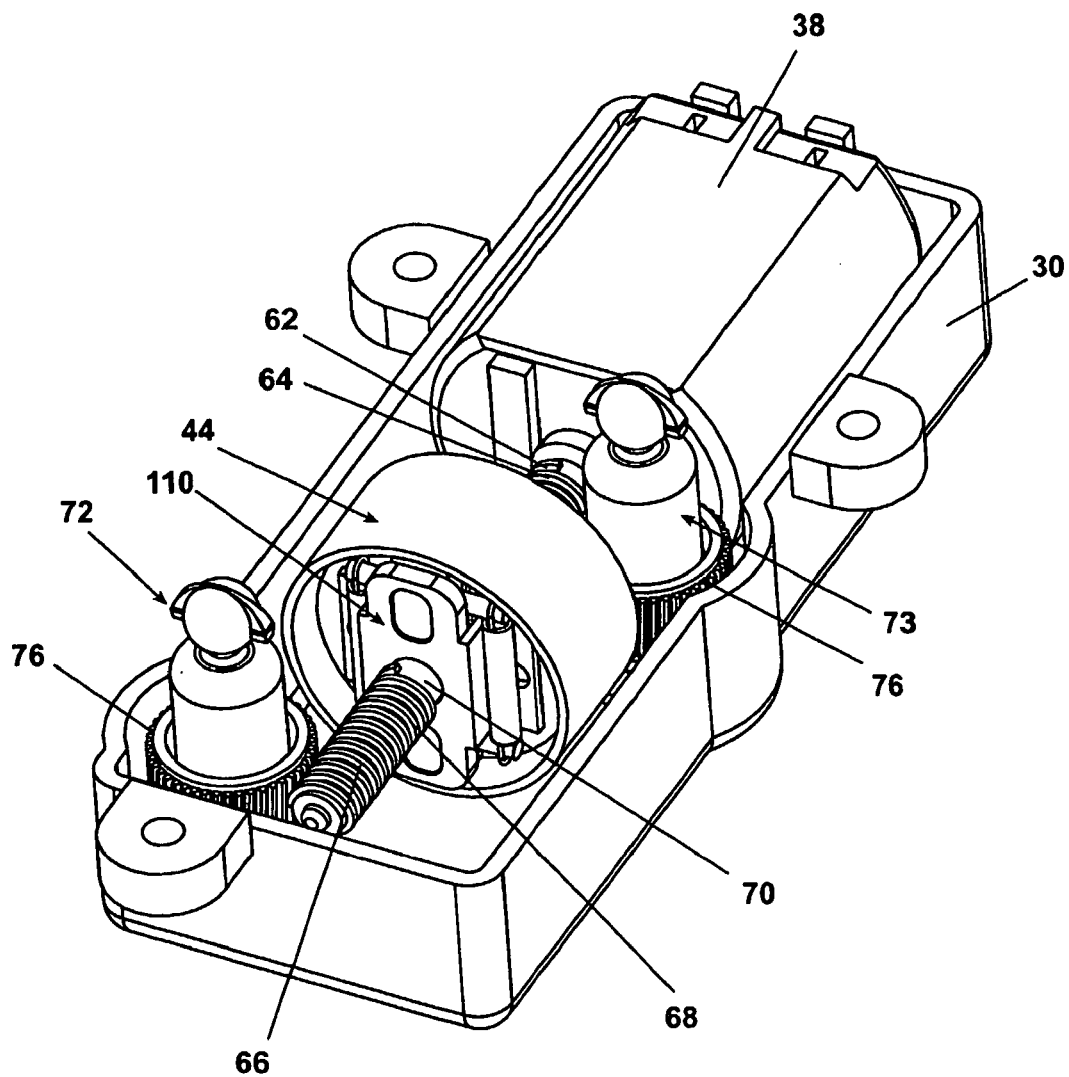
FIG. 9 is a perspective view of a second embodiment of the motor assembly and the clutch assembly of FIG. 2 with a cover portion removed for purposes of displaying internal components thereof.
Figure 10:
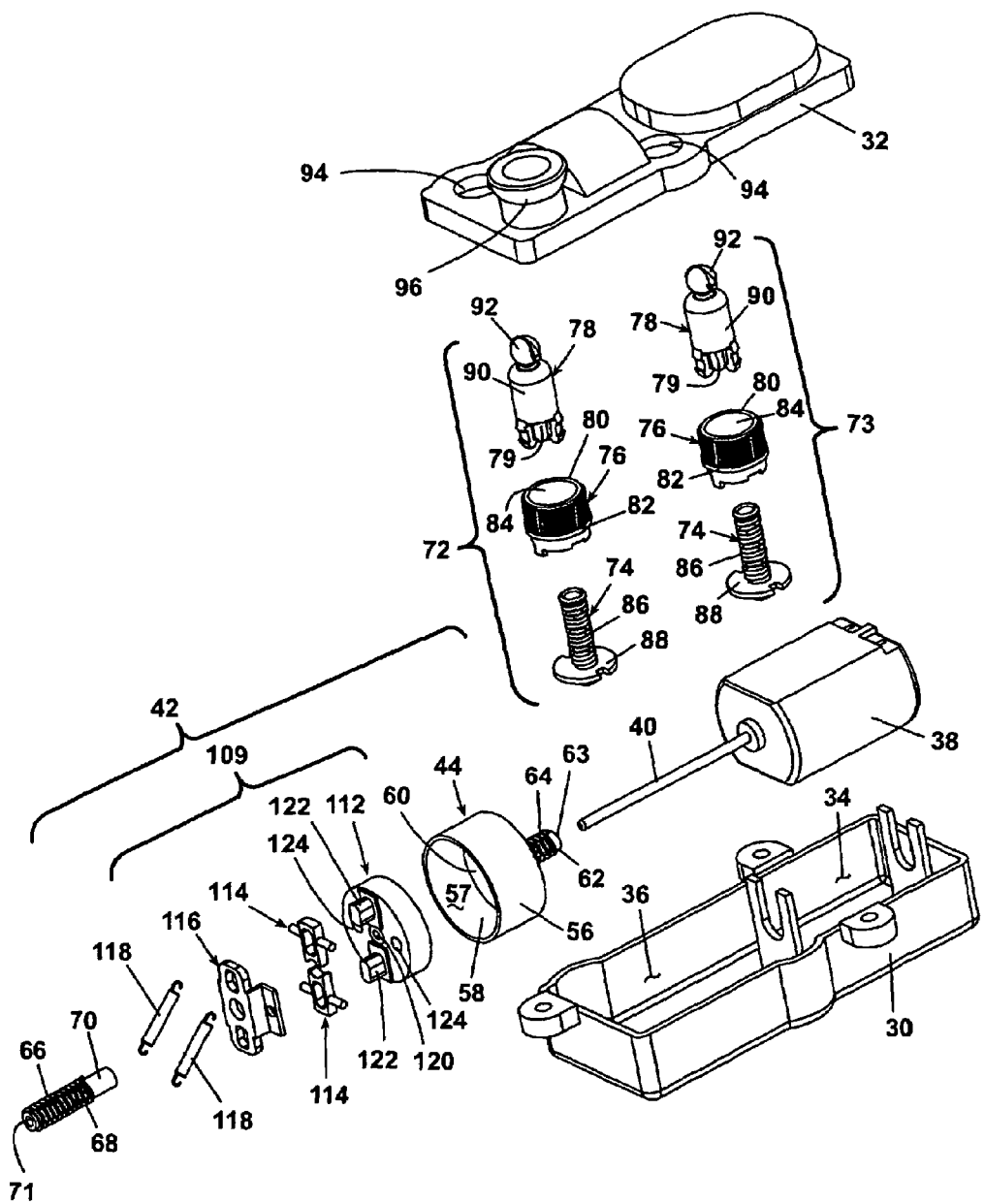
FIG. 10 is an exploded view of the motor assembly and the clutch assembly of FIG. 9.
Figure 11:
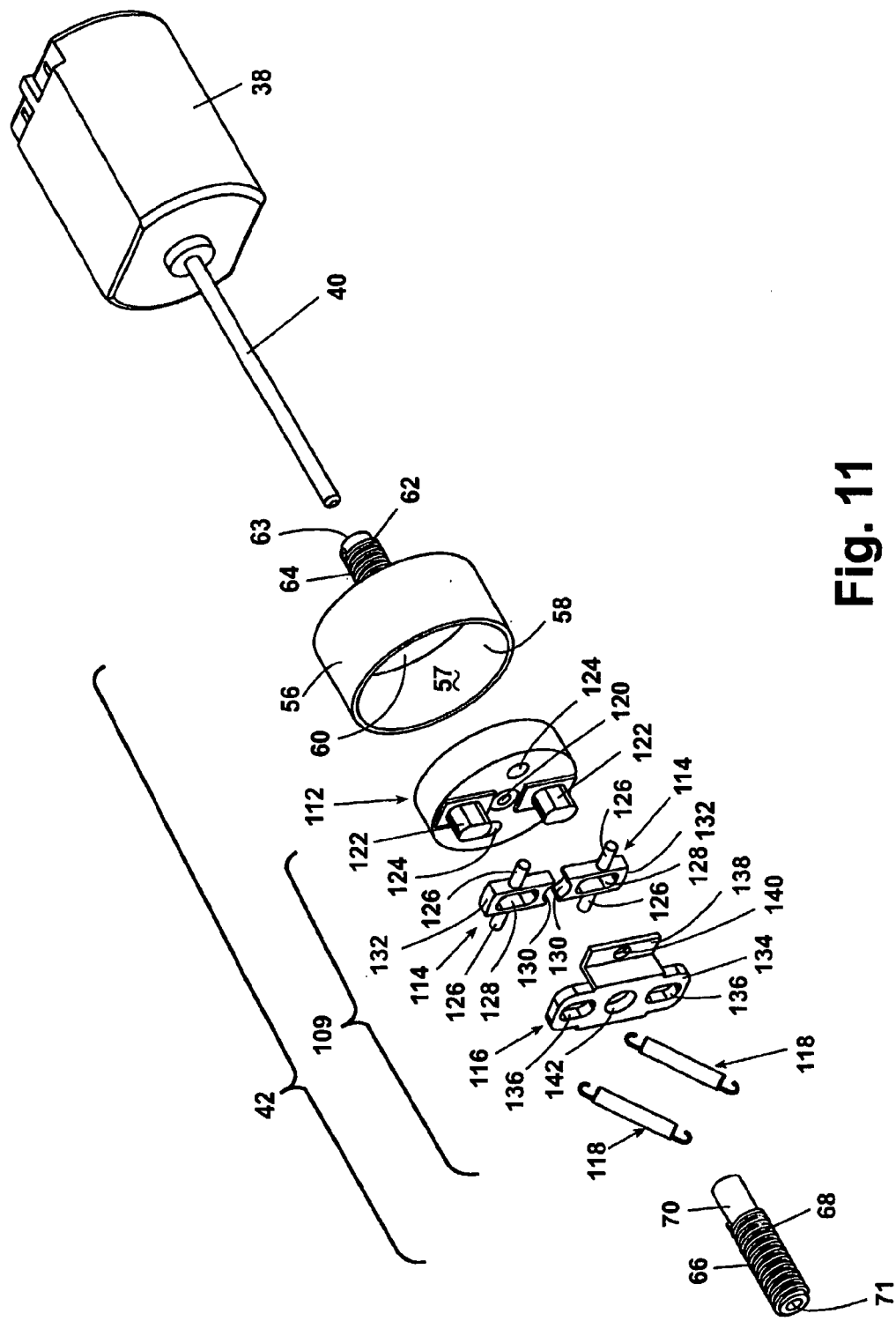
FIG. 11 is an exploded view of the motor assembly and the clutch assembly of FIG. 10.
Figure 12A:
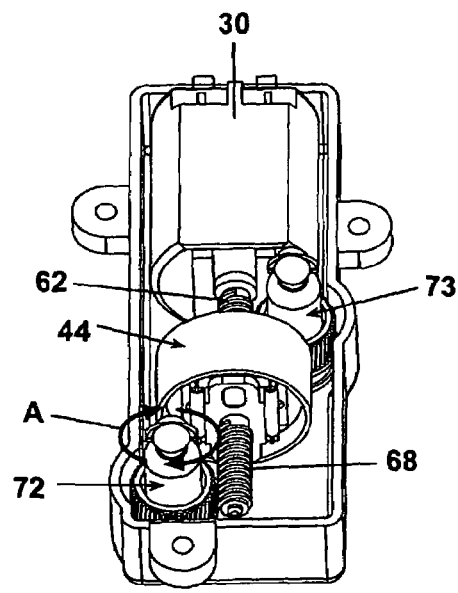
FIGS. 12A-B are views of the motor assembly and a four-arm remote control pad showing a first directional operation of the motor in response to actuation of a first arm of the pad.
Figure 12B:
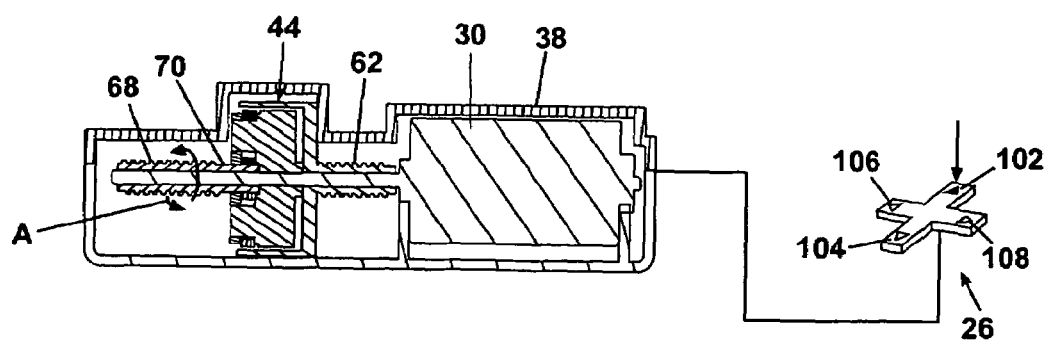
Figure 13A:
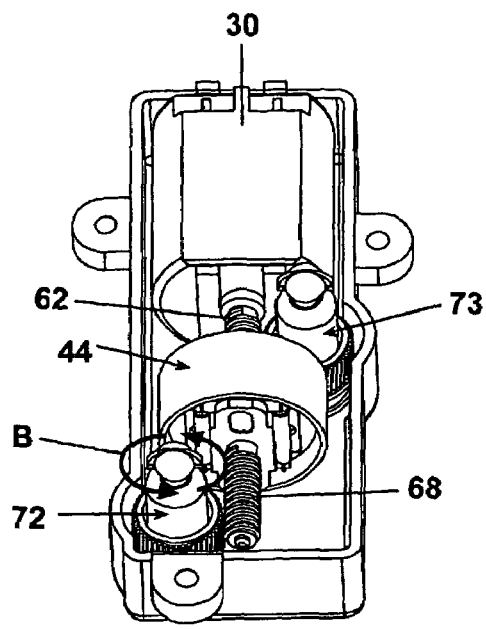
FIGS. 13A-B are views of the motor assembly and a four-arm remote control pad showing a second directional operation of the motor in response to actuation of a second arm of the pad.
Figure 13B:
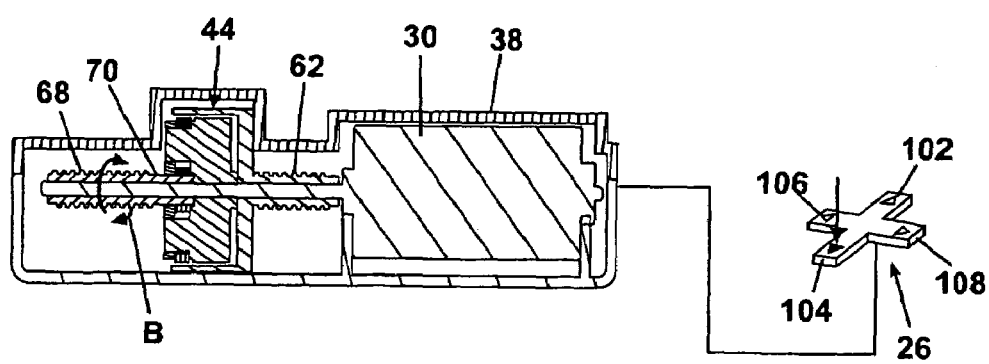

Referring now to FIGS. 9-11, a second embodiment of the motor assembly is shown. The second embodiment is identical to the first embodiment except for the configuration of the centrifugal drive member 109. Thus, like elements will be given like numerals, and only the structure and operation of the centrifugal drive member 109 will be described.

In the second embodiment, the centrifugal drive member 109 comprises a drum 44 and a shoe assembly 110. The shoe assembly 110 is inserted into the drum 44 in axial alignment therewith, and comprises a circular plate 112, a pair of diametrically-opposed shoes 114, a retainer 116, and a pair of springs 118. The diameter of the circular plate 112 is somewhat less than the inner diameter of the drum 44 for slidable movement of the plate 112 within the drum 44. The plate 112 is provided with a center aperture 120 for frictional communication with the motor shaft 40. The plate 112 is provided with a pair of diametrically-opposed lugs 122 extending orthogonal to the plate 112 intermediate the aperture 120 and the circumference of the plate 112. On the diagonal of the plate 112 intermediate the aperture 120 and the circumference of the plate 112 and perpendicular to the diagonal on which the lugs 122 are located are a pair of diametrically-opposed threaded apertures 124.

The shoes 114 are irregularly-shaped, platelike members having an internal slot 128 and a pair of spaced-apart mounting posts 126 extending laterally therefrom. A first end 113 of each shoe 114 has a generally concave arcuate shape defining an inner contact surface 130. The inner contact surface 130 can have a semi-circular shape for frictional communication with the unthreaded shaft 70 of the low-speed worm gear, or a straight-segment profile, such as rectilinear, or semi-hexagonal, for keyed communication with rectilinear or hexagonal surfaces comprising the unthreaded shaft 70. A second end 115 of each shoe 114 has a convex arcuate shape defining an outer contact surface 132.

The retainer 116 is an irregularly-shaped member comprising a cover plate 134 and a pair of spaced-apart mounting flanges 138 parallel to the cover plate 134 and connected thereto by a pair of connecting plates 137 orthogonal to the cover plate 134 and the mounting flanges 138. Each mounting flange 138 is provided with a generally centrally-located mounting aperture 140, aligned with a corresponding threaded aperture 124. The cover plate 134 is provided with an axle aperture 142 extending preferably through the center of the cover plate 134. A pair of slots 136 extend through the cover plate 134 on either side of the axle aperture 142 in axial alignment with the lugs 122.

The shoes 114 are attached to the circular plate 112 by inserting the slot 128 over the lugs 122. Retainer 116 is inserted over the shoes 114 so that the lugs 122 are received within the slots 136, and secured to the circular plate 112 by threaded connectors (not shown) inserted through the mounting apertures 140 into the threaded apertures 124. The retainer 116 enables slidable movement of the shoes 114 on the lugs 122. The springs 118 are attached to the shoes 114 by connecting each springs 118 to the pair of posts 126 on either side of the shoes 114 for urging the shoes 114 radially toward the center of the plate 112.

The centrifugal drive member 109 comprising the circular plate 112, the shoes 114, the retainer 116, and the springs 118, is inserted into the drum 44 with the circular plate 112 in slidable communication with the circular wall 60. The clutch assembly 42 is inserted over the shaft 40 by passing the shaft 40 through the apertures 120, 63. The centrifugal drive member 109 is operably connected to the shaft 40 for rotation of the centrifugal drive member 109 with rotation of the shaft 40, preferably by frictional communication of the shaft 40 with the aperture 120. The low-speed worm gear 66 is inserted over the shaft 40 so that the unthreaded shaft 70 is in operable communication with the inner contact surfaces 130.

The unthreaded shaft 70 is received through the axle aperture 142 for operable engagement with the inner contact surfaces 130. The springs 118 urge the inner contact surfaces 130 into operable communication with the unthreaded shaft 70 so that rotation of the circular plate 112 will induce rotation of the low-speed worm gear 66. The aperture 120 frictionally grips the shaft 40 for rotation of the circular plate 112 with the rotation of the shaft 40. At low angular velocities, the shoes 114 grip the unthreaded shaft 70 of the low-speed worm gear 66 to rotate the low-speed actuator 72 interconnected with the low-speed w her orm gear 66. At high angular velocities, the shoes 114 are urged by centrifugal force away from the unthreaded shaft 70 and against the inner surface 58 of the drum 44. The frictional contact of the shoes 114 with the inner surface 58 of the drum 44 urges the drum 44 and the high-speed worm gear 62 to rotate, thereby rotating the government actuator shaft 78 interconnected with the high-speed worm gear 62. The operation of the second embodiment of the motor assembly 16 controls the tilting of the mirror 22 in the same manner as for the first embodiment.

The motor 38 operates at a low speed through the provision of a low-voltage direct current to the motor 38. Similarly, the motor 38 operates at a high speed through the provision of a high-voltage direct current to the motor 38. The high and low voltages are selectively provided through a conventional voltage control system, such as a resistor control circuit or a microcontroller, which will be apparent to one of ordinary skill in the art.

Referring now to FIGS. 12-15, a conventional mirror control pad 26 is shown schematically interconnected with the motor assembly 16. The mirror control pad 26 comprises a cross-shaped member having a first arm designated as 102, a second arm designated as 104, a third arm designated as 106, and a fourth arm designated as 108. Depressing the first arm 102 (FIG. 12B) actuates the motor 38 to rotate the shaft 40 at a low angular velocity in a first direction, shown in FIGS. 12A-B as clockwise, as indicated by the arrow designated as "A". The combination of low angular velocity and direction turns the actuator shaft 78 interconnected with the low-speed worm gear 66 to tilt the mirror 22, for example, upwardly of the shell 14 in a vertical direction to redirect the driver's line of sight upwardly. Depressing the second arm 104 (FIG. 13B) actuates the motor 38 to rotate the shaft 40 at a low angular velocity in a second direction, shown in FIGS. 13A-B as counterclockwise, as indicated by the arrow designated as "B". The combination of low angular velocity and direction turns the actuator shaft 78 interconnected with the low-speed worm gear 66 to tilt the mirror 22, for example, downwardly of the shell 14 in a vertical direction to redirect the driver's line of sight downwardly. The passenger's side mirror would be similarly repositioned upwardly or downwardly with the operation of the mirror control pad 26 as heretofore described.

Figure 14A:
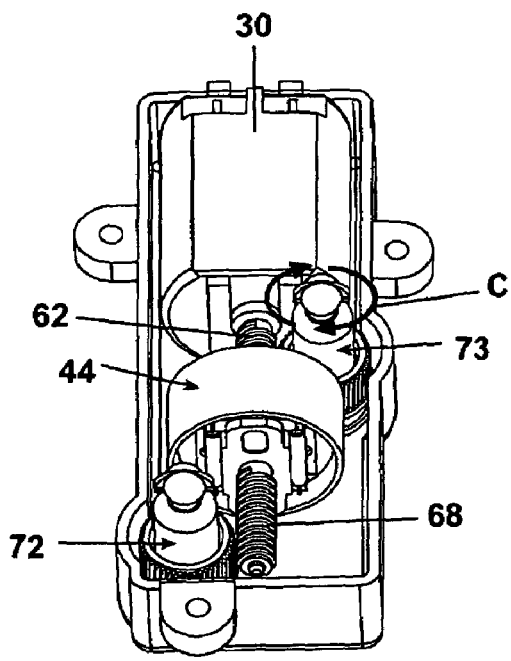
FIG. 14A-B are views of the motor assembly and a four-arm remote control pad showing a third directional operation of the motor in response to actuation of a third arm of the pad.
Figure 14B:
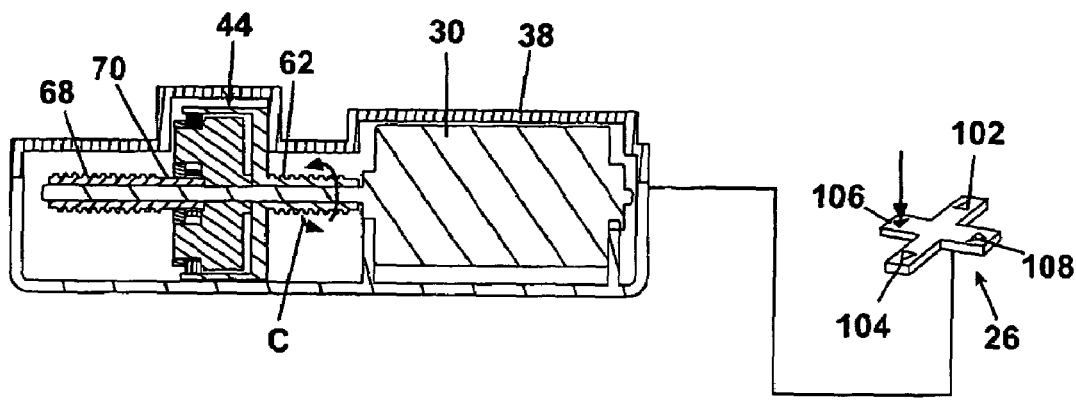
Figure 15A:
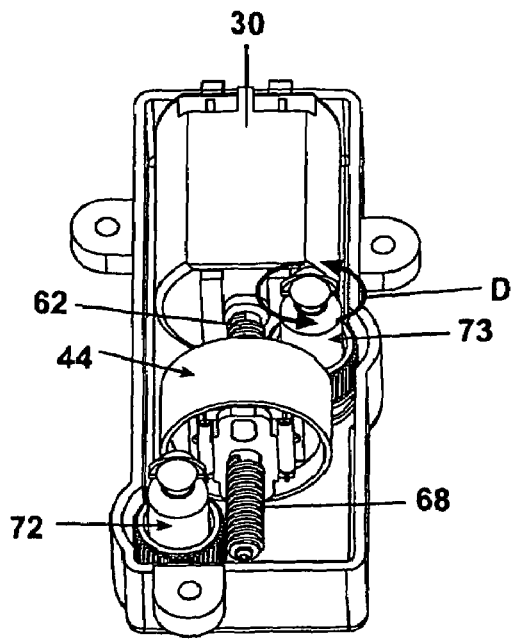
FIG. 15A-B are views of the motor assembly and a four-arm remote control pad showing a fourth directional operation of the motor in response to actuation of a fourth arm of the pad.
Figure 15B:
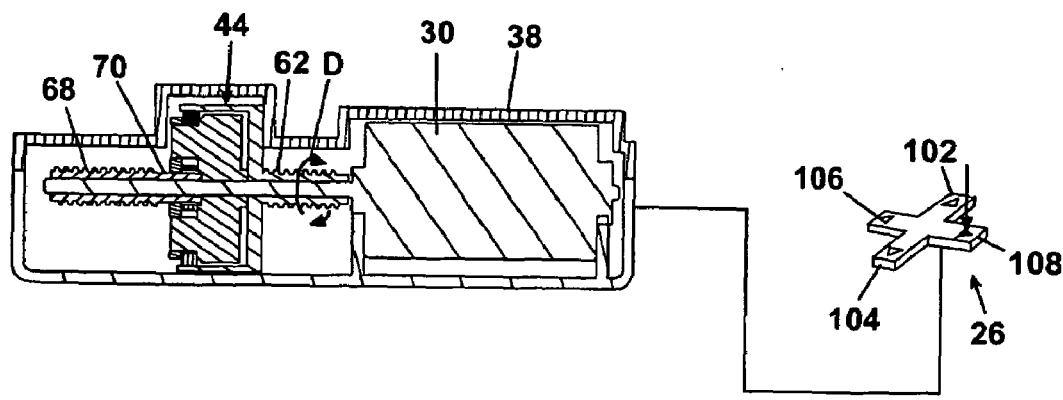

In the same way, depressing the third arm 106 (FIG. 14B) actuates the motor 38 to rotate the shaft 40 at a high angular velocity in a first direction, shown in FIGS. 14A-B as clockwise, as indicated by the arrow designated as "C". The combination of high angular velocity and direction turns the actuator shaft 78 interconnected with the high-speed worm gear 62 to tilt the mirror 22, for example, outwardly of the shell 14 in a horizontal direction to redirect the driver's line of sight outwardly in the case of a driver's side mirror or inwardly in the case of a passenger's side mirror. Finally, depressing the fourth arm 108 (FIG. 15B) actuates the motor 38 to rotate the shaft 40 at a high angular velocity in a second direction, shown in FIGS. 15A-B as counterclockwise, as indicated by the arrow designated as "D". The combination of high angular velocity and direction turns the actuator shaft 78 interconnected with the high-speed worm gear 62 to tilt the mirror 22, for example, inwardly of the shell 14 in a horizontal direction to redirect the driver's line of sight inwardly in the case of a driver's side mirror or outwardly in the case of a passenger's side mirror. Thus, the single motor assembly 16 provides complete adjustment of the orientation of the rear view mirror assembly 10 by the operator of the automotive vehicle 12.

The clutch assembly 42 has been shown and described in terms of two exemplary embodiments for operation of two actuators for tilting a mirror in a horizontal direction and a vertical direction using a single motor. Other embodiments of the clutch assembly 42 are possible, such as, for example, a planetary gear assembly, or a sealed hydraulic-type transmission assembly, for adjusting the tilt of the mirror in response to variations in the angular velocity of a single motor. Furthermore, a clutch assembly can be adapted to drive multiple actuators for controlling mirror tilt as well as other operations, such as extension of the mirror assembly outwardly of the vehicle, or folding the mirror assembly against the side of the vehicle, and are encompassed within the inventive concepts addressed herein.

Figure 17:
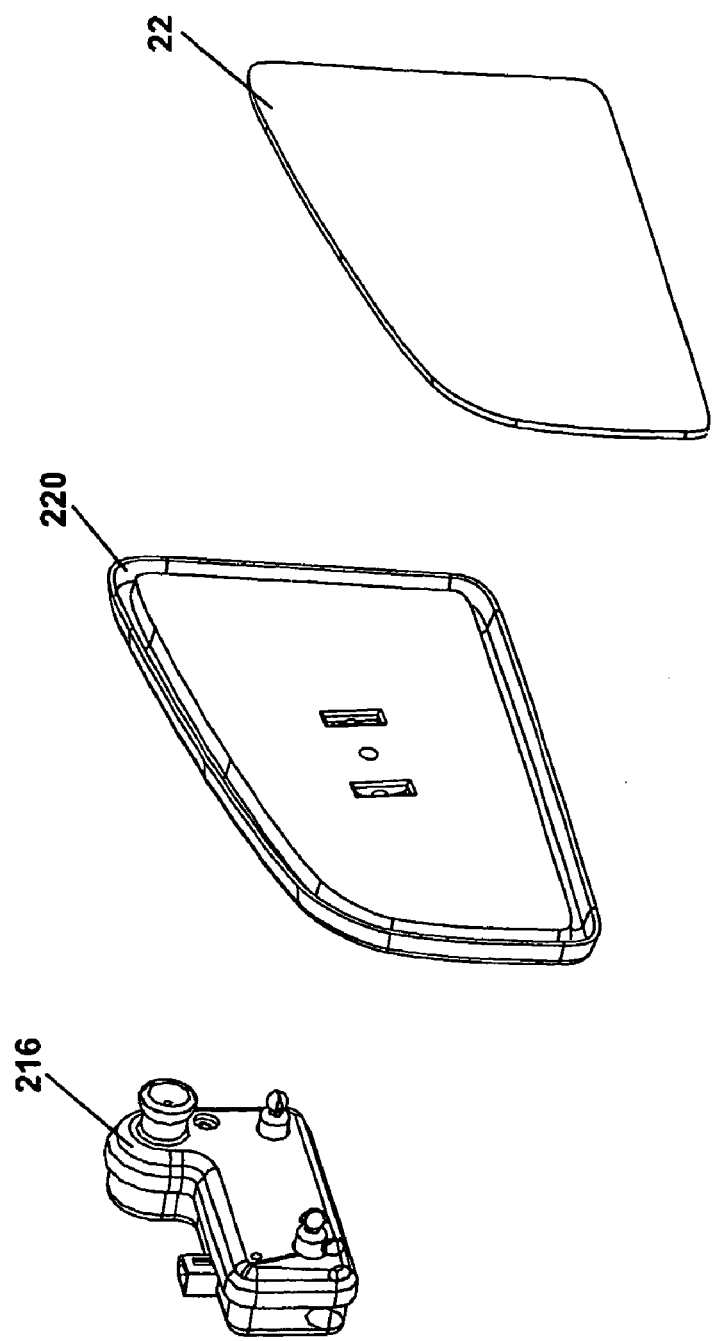
FIG. 17 is an exploded view of a second embodiment of the mirror assembly of FIG. 1, the mirror assembly including a tilt actuator.
Figure 18:
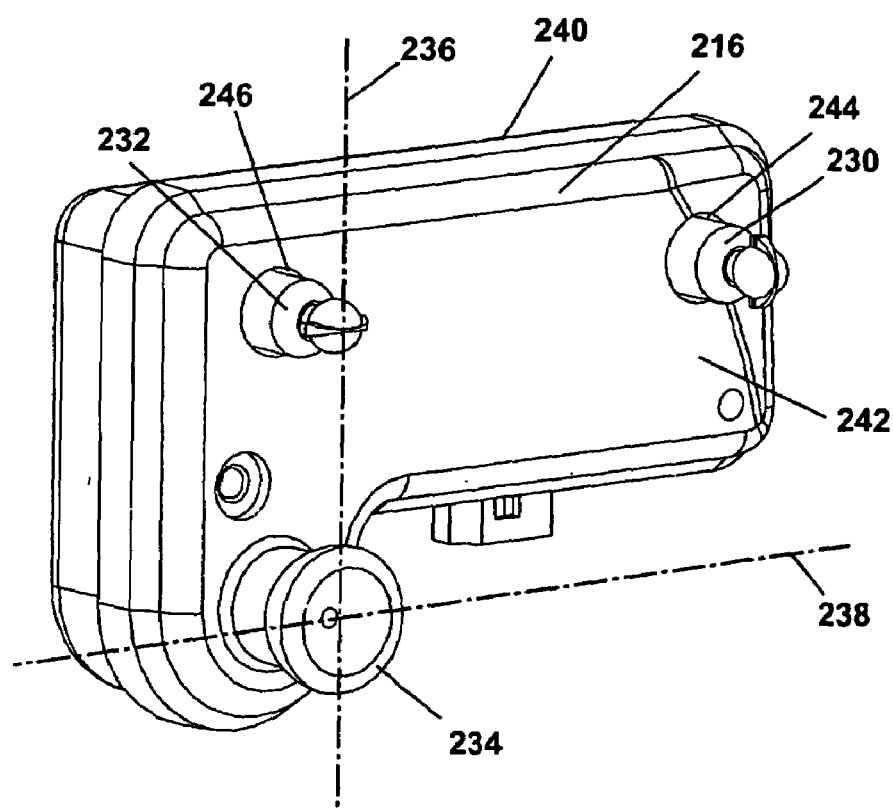
FIG. 18 is a perspective view of the tilt actuator shown in FIG. 17.

Referring now to FIG. 17, a second embodiment of the rearview mirror assembly 10 comprises a shell 14, a tilt actuator 216, a mounting panel or glass case 220, and a reflective element or mirror 22. The shell 14 houses a motor mounting bracket (not shown) to mount the tilt actuator 216 in a generally conventional manner, such as with threaded or snap-fit connectors (not shown). The tilt actuator 216 is operably connected to the mounting panel 220 for adjustment of the vertical and horizontal tilt of the panel 220 as hereinafter described. A basic embodiment of the mounting between the tilt actuator 216 and the mounting panel 220 is shown in U.S. Pat. No. 4,740,068, issued Apr. 26, 1988, which is incorporated herein by reference.

The panel 220 fixedly mounts a reflective element 22 thereby enabling the reflective element 22 to tilt vertically and horizontally with the tilting of the panel 220, thus adjusting the driver's field of view. The control cable preferably comprises electrical wiring for operably connecting the tilt actuator 216 with the remote control pad and the vehicle's electric power supply. The tilt actuator 216, panel 220, and mirror 22, are encased within the shell 14 in a conventional manner to provide the mirror assembly 10.

Figure 19:
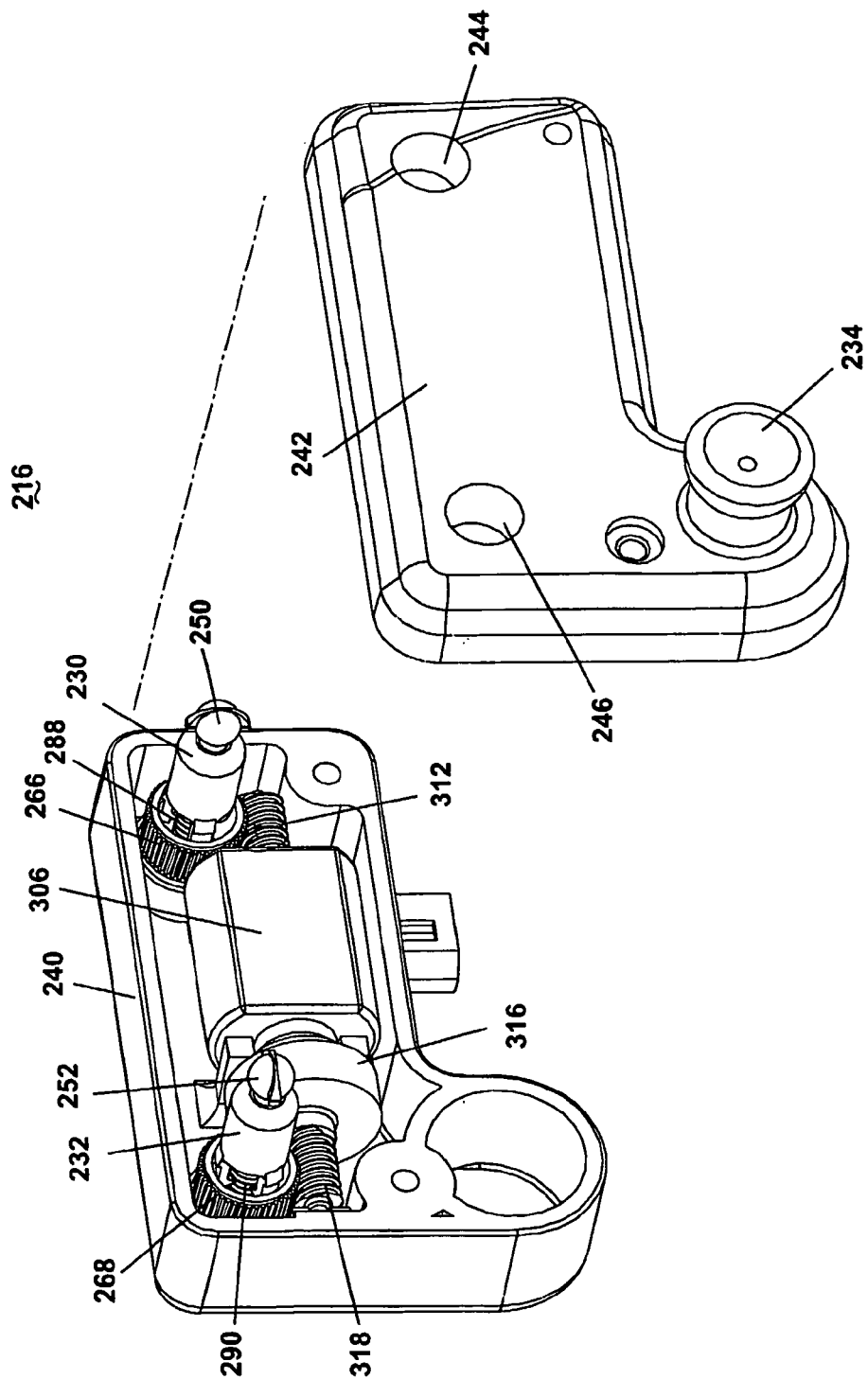
FIG. 19 is a perspective view of the interior of the tilt actuator of FIG. 18.
Figure 20:
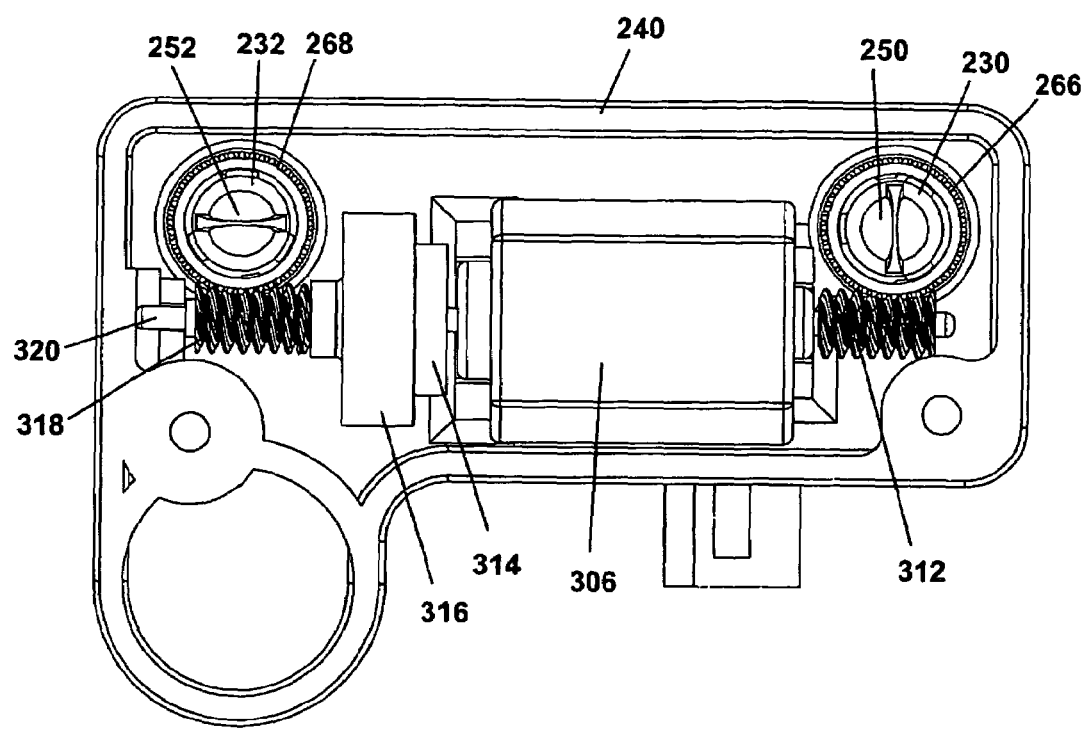
FIG. 20 is a side elevational view of the interior of the tilt actuator of FIG. 18 showing an assembly of operable components.
Figure 21:
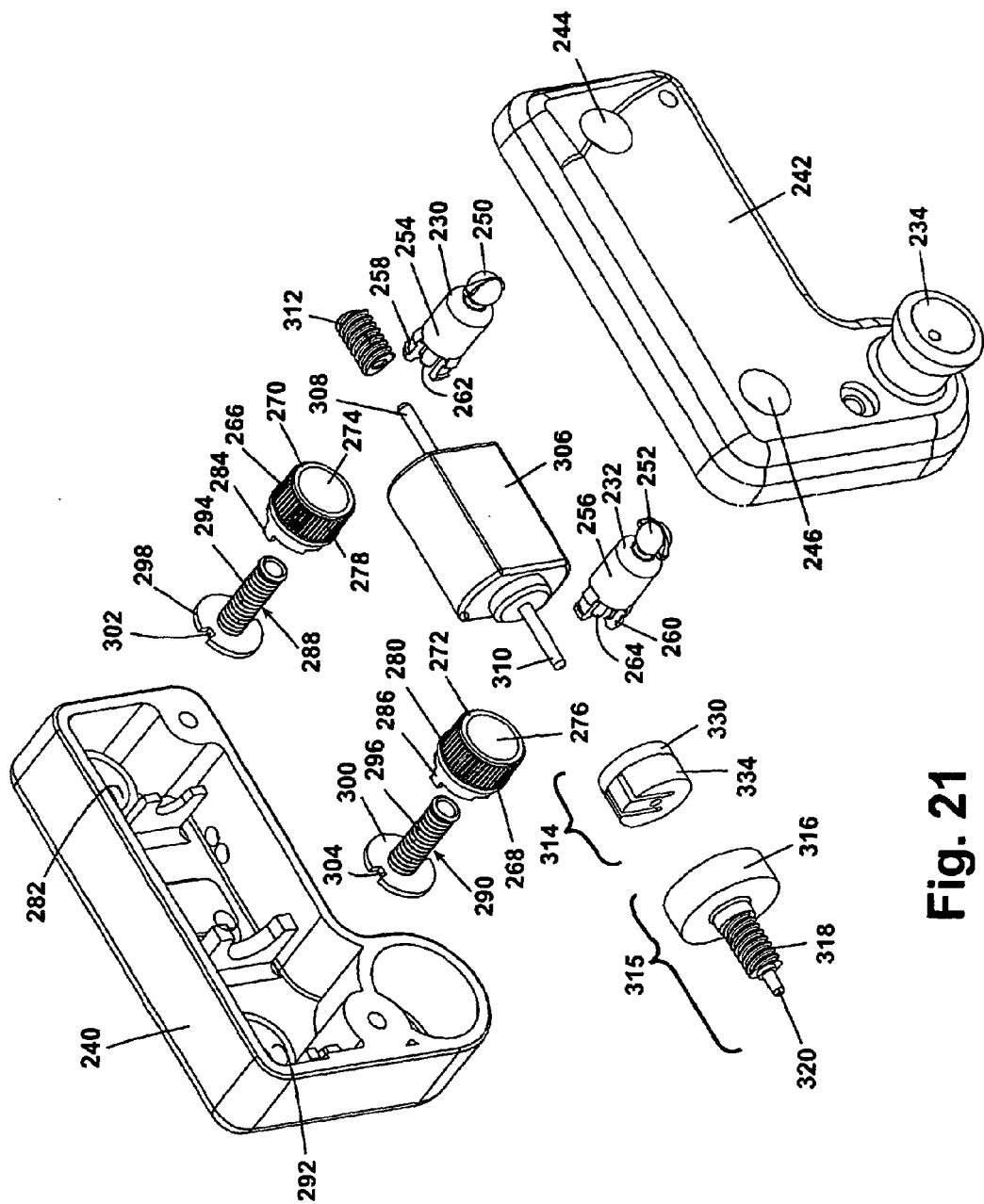
FIG. 21 is an exploded view of the tilt actuator of FIG. 18.

The tilt actuator 216 is shown in FIGS. 18-21 preferably comprising a generally oblong, box-like actuator case 240 and a removable mating cover 242, forming an enclosed container when the cover 242 is installed on the case 240, for enclosing a motor 306, a first actuator shaft 230, a second actuator shaft 232, a centrifugal drive member assembly 314, a drum assembly 316, and operably interconnected gears and shafts as hereinafter described. The motor 306, the actuator shafts 230, 232, the centrifugal drive member assembly 314, the drum assembly 316, and the gears and shafts can alternatively be mounted to a bracket, a receptacle molded into the shell 14 as shown in FIG. 19, or another structure capable of securing each component in operable interconnection for operation of the rear view mirror assembly 10 as hereinafter described.

The cover 242 is provided with a first aperture 244 and a second aperture 246 for insertion of the first actuator shaft 230 and the second actuator shaft 232, respectively, therethrough. The cover 242 is also provided with a panel pivot mount 234 in the preferred embodiment for universally pivotable connection of the panel 220 to the tilt actuator 216. Alternatively, the panel pivot mount 234 can be mounted to a bracket or another structure capable of fixedly maintaining the panel pivot mount 234 in operable interconnection with the panel 220 for operation of the rear view mirror assembly 10 as hereinafter described. A conventional antirotation assembly (not shown) well-known in the industry is also provided to prevent rotation of the panel 220 about an axis extending through the panel pivot mount 234 orthogonal to the plane of the panel 220 while allowing vertical and horizontal tilting of the panel 220 as hereinafter described. The cover 242 is fixedly installed on the actuator case 240, such as through suitable connectors or a snap-fit mechanism, with an appropriate weathertight seal, such as a cover gasket, thereby forming a weathertight enclosure for the motor 306 and operable components of the tilt actuator 216.

The motor 306 is preferably a generally conventional variable-speed 12-volt DC electric motor having sufficient power for operation of the mirror assembly 10 as described herein. In the preferred embodiment, the motor 306 is connected to the vehicle electrical system through a conventional controller (not shown) that can provide electrical power in selected voltages for operating the motor 106 at correspondingly selected speeds. For example, such a controller can selectively switch between either of two circuits, a first circuit for low speed operation and a second circuit for high-speed operation, providing current to the motor 306. The voltage in the low speed circuit can be selectively reduced by inserting a resistor in the low speed circuit in series between the power supply and the motor 306; the reduced voltage results in the lower angular velocity of the motor 306. The first actuator shaft 230 comprises an elongated, hollow, generally cylindrical body having a first ball mount 250 at a distal end thereof, a cylindrical first shaft surface 254, and a plurality of longitudinal fingers 258 at a proximal end thereof. A first bore 262 having internal threads extends from the fingers 258 to the first ball mount 250. The second actuator shaft 232 is identical to the first actuator shaft 230 and comprises an elongated, hollow, generally cylindrical body having a second ball mount 252 at a distal end thereof, a cylindrical second shaft surface 256, and a plurality of longitudinal fingers 260 at a proximal end thereof. A second bore 264 having threads extends from the fingers 260 to the second ball mount 252. The ball mounts 250, 252 are adapted for universally pivotable mounting to the panel 220, preferably through a snap-fit connection.

A first actuator gear 266 comprises a hollow, generally cylindrical body having an annular first rim 270 at a distal end thereof, a cylindrical first inner surface 274, a cylindrical first outer threaded portion 278 extending around the periphery of the actuator gear 266, and a plurality of posts 284 extending longitudinally from a distal end thereof. The first inner surface 274 is adapted for slid able communication with the first shaft surface 254. A second actuator gear 268 is identical to the first actuator gear 266 and comprises a hollow, generally cylindrical body having an annular first rim 272 at a distal end of thereof, a cylindrical second inner surface 276, a cylindrical second outer threaded portion 280 extending around the periphery of the actuator gear 268, and a plurality of posts 286 extending longitudinally from a distal end thereof. The second inner surface 276 is adapted for slidable communication with the second shaft surface 256.

A first output spindle 288 comprises a generally elongated, cylindrical body comprising a threaded shaft 294 adapted for threadable communication with the first bore 262. A circular flange 298 is rigidly connected in axial alignment with and orthogonal to the shaft 294 at a distal end thereof. A second output spindle 290 comprises a generally elongated, cylindrical body comprising a threaded shaft 296 adapted for threadable communication with the second bore 264. A circular flange 300 is rigidly connected in axial alignment with and orthogonal to the shaft 296 at a distal end thereof. The flanges 298, 300 are provided with a plurality of slots 302, 304 adapted for operable communication with the posts 284, 286, respectively.

The first actuator gear 266 is inserted over the shaft 294 so that the posts 284 are slidably retained in the slots 302. The first actuator shaft 230 is threaded over the shaft 294 to occupy the annulus between the shaft 294 and the first actuator gear 266. Rotation of the first actuator gear 266 will urge the rotation of the first output spindle 288, which will, in turn, urge linear movement of the first actuator shaft 230 along the shaft 294. Similarly, the second actuator gear 268 is inserted over the shaft 296 so that the posts 286 are slidably retained in the slots 304. The second actuator shaft 232 is threaded over the shaft 296 to occupy the annulus between the shaft 296 and the second actuator gear 268. Rotation of the second actuator gear 268 will urge the rotation of the second output spindle 290, which will, in turn, urge linear movement of the second actuator shaft 232 along the shaft 296. The assembly comprising the first actuator shaft 230, the first output spindle 288, and the first actuator gear 266 is rotatably received in a spindle receptacle 282 formed in a first end of the actuator case 240. The assembly comprising the second actuator shaft 232, the second output spindle 290, and the second actuator gear 268 is rotatably received in a spindle receptacle 292 formed in a second end of the actuator case 240.

A motor 306, preferably electrically powered, comprises a low speed shaft 308 and a high-speed shaft 310. The motor is suitably held in the actuator case 240 for operable communication of the low-speed shaft 308 with the first actuator gear 266 and the high-speed shaft 310 with the second actuator gear 268. A low speed worm gear 312 is frictionally retained over the low speed shaft 308 and operably communicates with the first actuator gear 266 so that rotation of the low speed worm gear 312 will urge the rotation of the first actuator gear 266.

Figure 23:
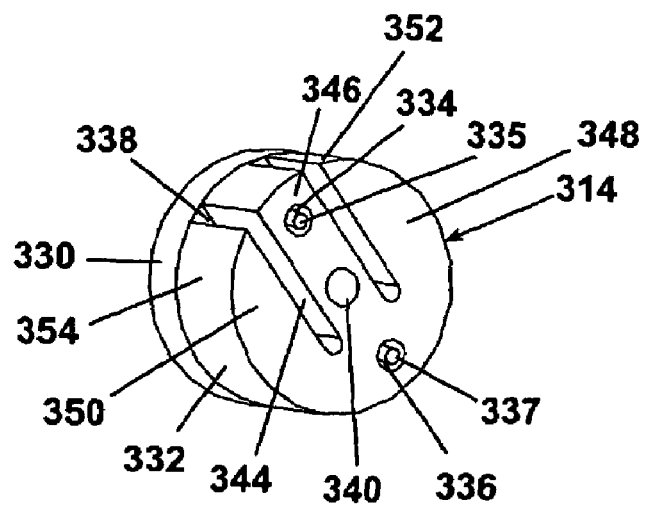
FIG. 23 is a close-up perspective view of a drum assembly comprising a component of the tilt actuator of FIG. 18.

A centrifugal drive member assembly 314 is shown in FIG. 23. The centrifugal drive member assembly 314 comprises a circular plate 330 and a resilient body 332. The circular plate 330 comprises a circular, thin plate-like body having a center axle aperture (not shown) extending therethrough and a plate surface 338. Posts 334, 336 extend orthogonally from the plate surface 338 in radial, spaced-apart juxtaposition. The resilient body 332 comprises a cylindrical body having a center axle aperture 340 extending therethrough and post apertures 335, 337 extending therethrough for frictional receipt of the posts 334, 336. A first slot 342 extends through the resilient body 332 partially along a chord of the resilient body 332 to form a first wing portion 348 having a first wing face 352. A second slot 344 extends through the resilient body 332 partially along a chord of the resilient body 332 to form a second wing portion 350 having a second wing face 354. The first slot 342 is in parallel, spaced-apart juxtaposition with the second slot 344, to form a center portion 346 having the post aperture 335 and the axle aperture 340 therein. The resilient body 332 is mounted to the circular plate 330 by insertion of the posts 334, 336 into the post apertures 335, 337. The first wing portion 348 and the second wing portion 350 can translate centrifugally outwardly in slidable movement relative to the plate surface 338.

Figure 22:
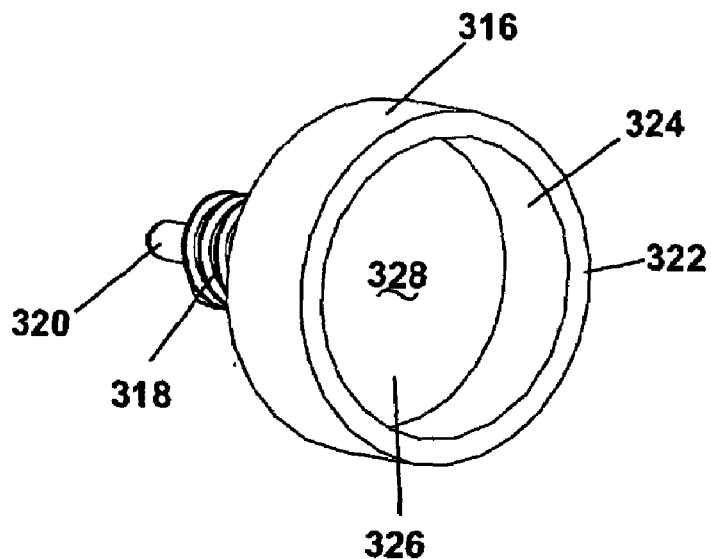
FIG. 22 is a close-up perspective view of a centrifugal drive member comprising a component of the tilt actuator of FIG. 18.

Referring now to FIG. 22, a drum assembly 316 comprises an annular drum wall 322 terminating in a circular wall 326 rigidly connected to a high-speed worm gear 318 and an axle 320 extending coaxially from the circular wall 326. The annular drum wall 322 has an inner surface 324 and defines a cavity 328. The resilient body 332 is adapted for slidable insertion into the cavity 328 so that the wing faces 352, 354 slidably communicate with the inner surface 324. At low angular velocities, the resilient body 332 will rotate within the cavity 328 with the wing faces 352, 354 in slidable contact with the inner surface 324. At high angular velocities, the wing portions 348, 350 will be urged outwardly so that the wing faces 352, 354 will be in frictional communication with the inner surface 324, thus urging the rotation of the drum assembly for 16 with rotation of the resilient body 332. The resilient body 332 is frictionally attached to the high-speed shaft 310 for rotation of the resilient body 332 with rotation of the high-speed shaft 310. The axle 320 is journaled into a suitable bearing (not shown) in the actuator case 240 for operable communication of the high-speed worm gear 318 with the second actuator gear 268 so that rotation of the high-speed worm gear 318 will urge rotation of the second actuator gear 268.

Figure 24:
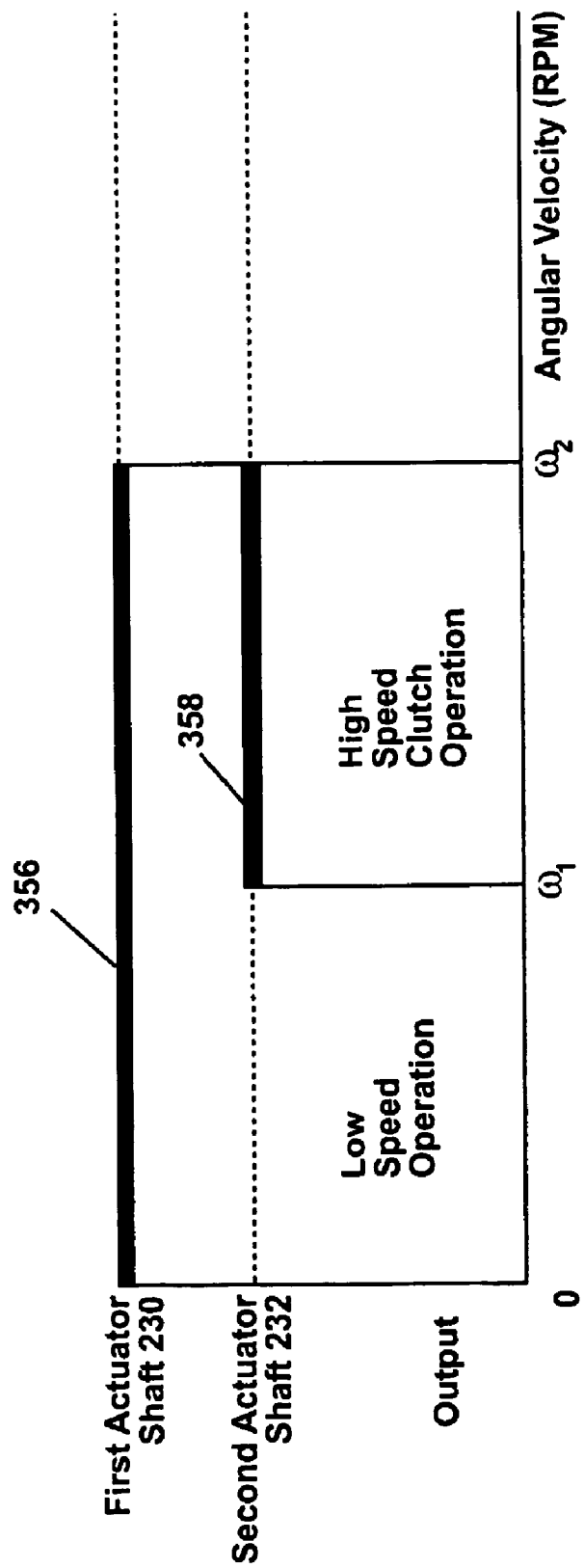
FIG. 24 is a graph depicting rotation of output shafts of the tilt actuator of FIGS. 17-18.

Referring now to FIG. 24, at an angular velocity between 0 and $\omega_1$ rpm, the first actuator shaft 230 will rotate. The motor 306 will turn the low speed shaft 30a and the high-speed shaft 310. The low speech shaft 308 will turn the low speed worm gear 312, which will turn the first actuator gear 266. The first actuator gear 266 will urge the rotation of the first actuator spindle 288, which will urge the linear movement of the first actuator shaft 230, as previously described herein. The high-speed shaft 310 will rotate the centrifugal drive member assembly 314. However, the angular velocity of the centrifugal drive member assembly 314 will be insufficient for the wing portions 348, 350 to move outwardly for frictional communication of the wing faces 352, 354 with the inner surface 324 of the drum assembly for 16. This is characterized as the low-speed output line 356 in FIG. 24. At angular velocities greater than $\omega_1$ rpm, the first actuator shaft 230 will continue to rotate as previously described and as characterized as line 356. However, the angular velocity of the centrifugal drive member assembly 314 will be sufficient for the wing portions 348, 350 to move outwardly for frictional communication of the wing faces 352, 354 with the inner surface 324, thus urging the rotation of the second actuator shaft 232 as previously described herein. This is characterized as the high-speed output line 358 in FIG. 24.

Figure 25:
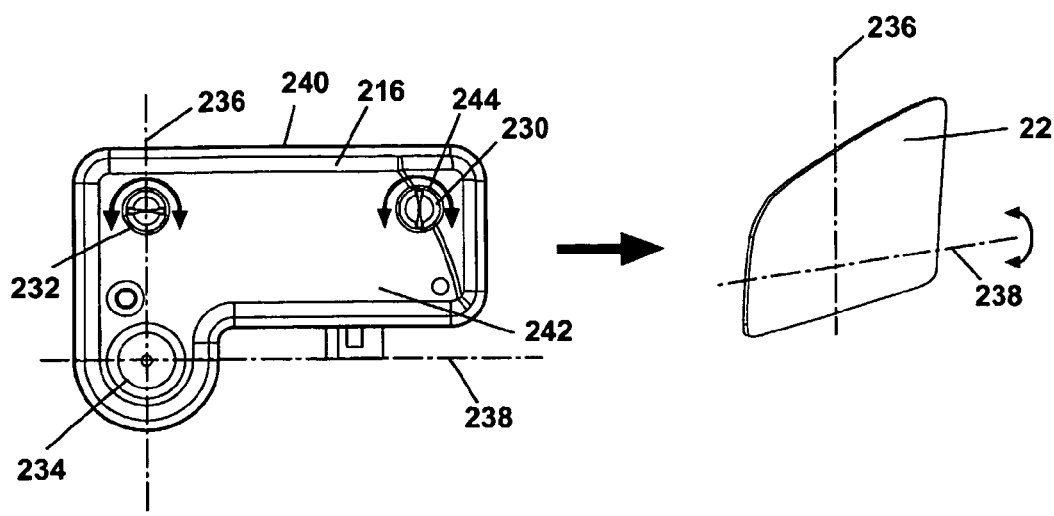
FIG. 25 is a schematic view of the tilt actuator of FIGS. 17-18 having a pair of rotating shafts which, in turn, causes a mirror interconnected thereto to rotate in a first direction.
Figure 26:
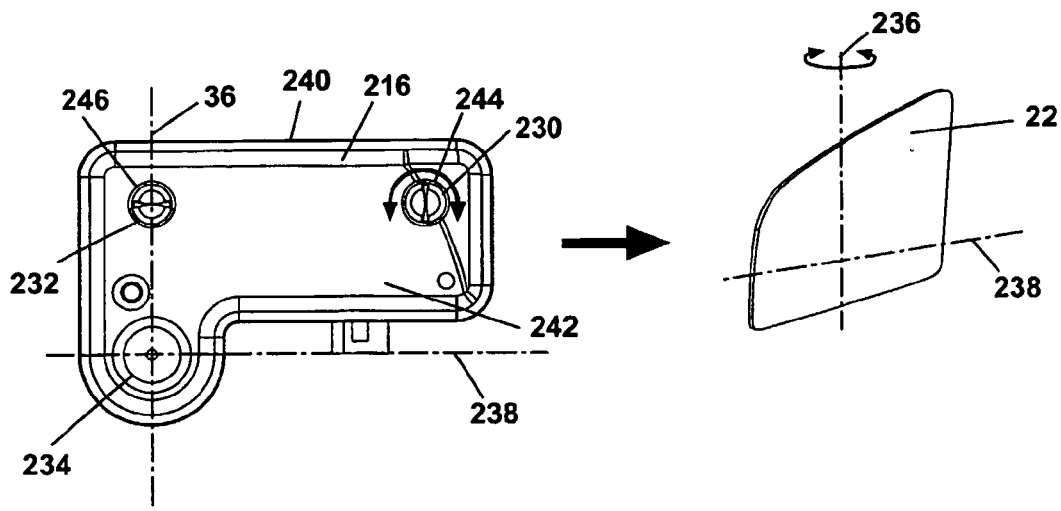
FIG. 26 is a schematic similar in orientation to FIG. 25 in which only one of the shafts rotates which, in turn, causes a mirror interconnected thereto to rotate in a second direction due to the offset positioning of the mirror pivot relative to the shafts.

Referring again to FIG. 18, at angular velocities less than $\omega_1$ rpm, only the first actuator shaft 230 will move inwardly or outwardly (see FIG. 26). The panel 220 will be effectively immovably pinned to the tilt actuator 216 at the connection of the second actuator shaft 232 and the panel pivot mount 234 to the panel 220. The panel 220 will pivot about the vertical axis 236 for inward and outward adjustment of the reflective element 22. At angular velocities greater than $\omega_1$ rpm, both actuators 230, 232 will move inwardly or outwardly. The panel 220 will be effectively immovably pinned only to the tilt actuator 216 at the connection of the panel pivot mount 234 to the panel 220. The panel 220 will pivot about the horizontal axis 238 for upward and a downward adjustment of the reflective element 22 (see FIG. 25). It will be obvious that, for proper adjustment of the mirror, the motor 306 and gearing described herein must urge linear movement of the actuator shafts 230, 232 in the same direction and at the same rate when both shafts 230, 232 are operated at an angular velocity greater than $\omega_1$ rpm. A conventional electrical brake circuit can be employed to counter the inertial effects of the operation of the assembly, thereby avoiding unwanted "runover" movement when the assembly is stopped or the speed changed.

Figure 27:
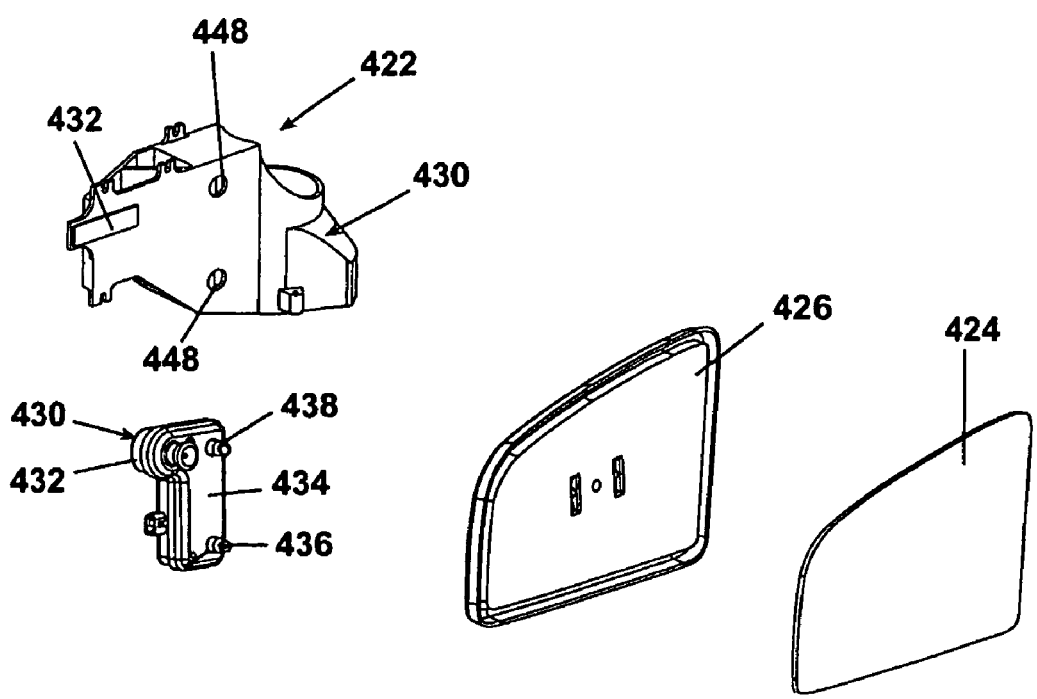
FIG. 27 is an exploded view of a third embodiment of the mirror assembly of FIG. 1 showing the tilt actuator assembly with a spring-biased centrifugal clutch assembly.

Referring now to FIG. 27, a third embodiment of the rearview mirror assembly 10 comprises a shell 14 enclosing a reflective element assembly 416 comprising a reflective element 424 mounted to a mounting panel or glass case 426, and a single motor tilt actuator assembly 430. The tilt actuator assembly 430 is fixedly mounted to a mounting frame 422. The reflective element 424 is attached in a generally conventional manner to the glass case 426, which is in turn operably connected to the tilt actuator assembly 430 for adjustment of the vertical and horizontal tilt of the reflective element 424 as hereinafter described.

Figure 28:
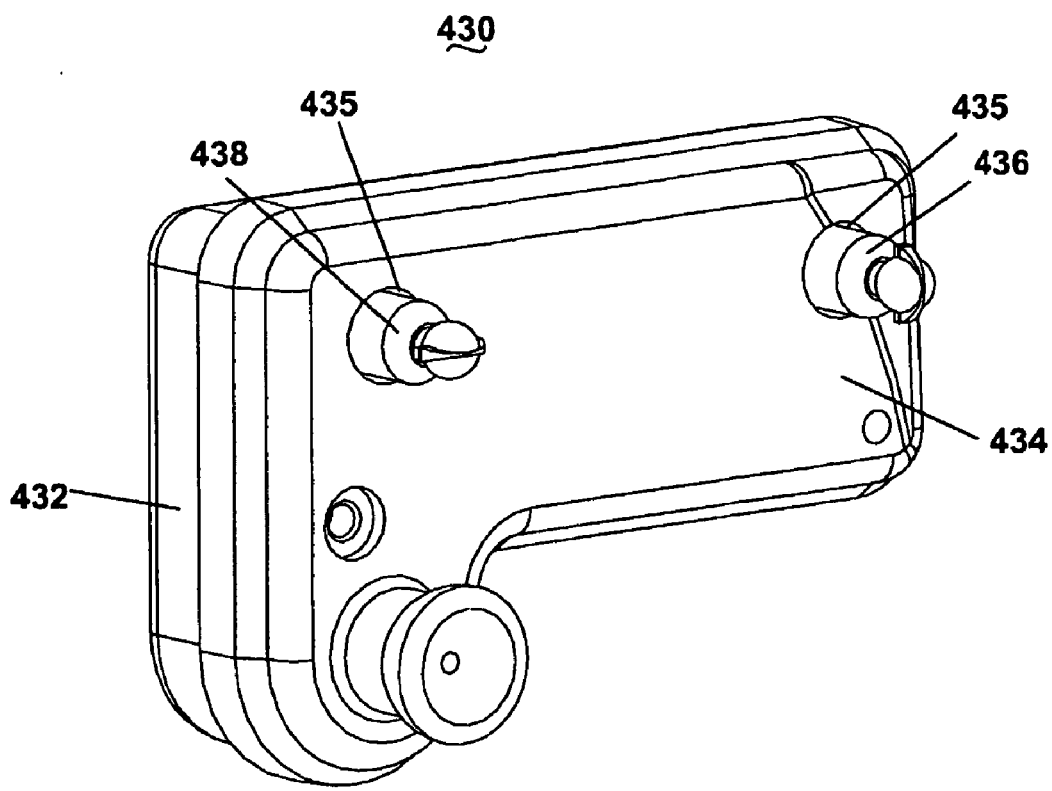
FIG. 28 is a perspective view of the assembled tilt actuator assembly of FIG. 27.
Figure 29:
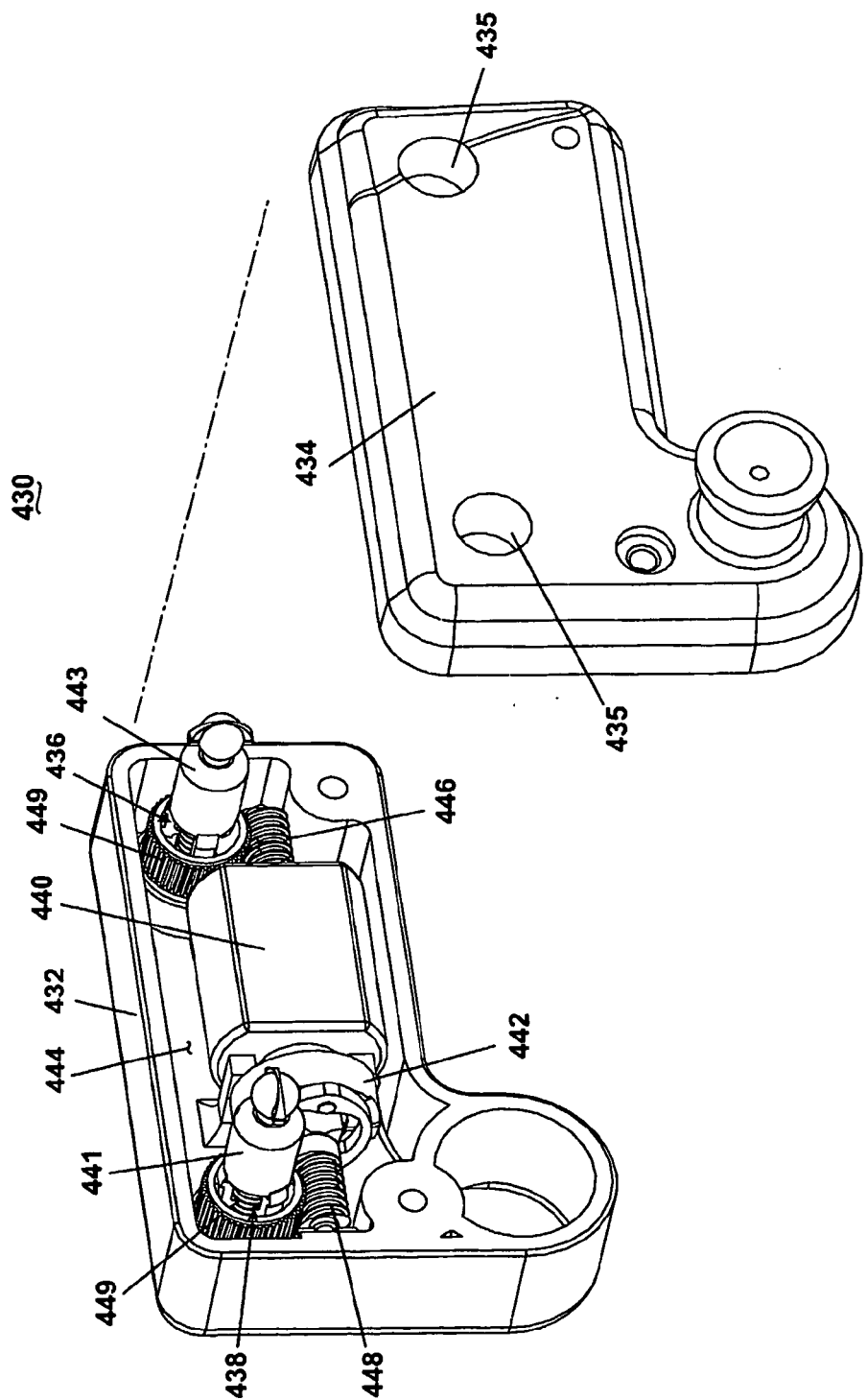
FIG. 29 is a perspective view of the tilt actuator assembly of FIG. 27 with the interior exposed to show the assembly of operating components and a first embodiment of the spring-biased centrifugal clutch assembly.

Referring now to FIGS. 28 and 29, the actuator assembly 430 comprises a base portion 432, and a cover 434 having a pair of spaced-apart apertures 435 extending therethrough, defining a chamber 444 containing in cooperative relationship a motor 440, a first jackscrew assembly 436 and a second jackscrew assembly 438 in spaced-apart, generally parallel juxtaposition extending through the apertures 435 as shown in FIG. 28, a pair of worm gears 446, 448, a pair of drive gears 449, and a clutch assembly 442 for controlling the delivery of torque from the motor 440 to the jackscrews 436, 438 to comprise a single motor mirror tilt actuator assembly 430 for selectively adjusting the vertical and horizontal tilt of the reflective element assembly 416. Each jackscrew 436, 438 is threadably attached in a generally well-known manner to its respective drive gear 449 so that the jackscrew 436, 438 will translate axially inwardly and outwardly of the tilt actuator assembly 430 when the drive gear 449 is rotated. It should be noted that the tilt actuator assembly 430 is exemplary only, and tilt actuator assemblies having alternative structure and operation can be employed consistent with the inventive concepts described herein.

Figure 30:
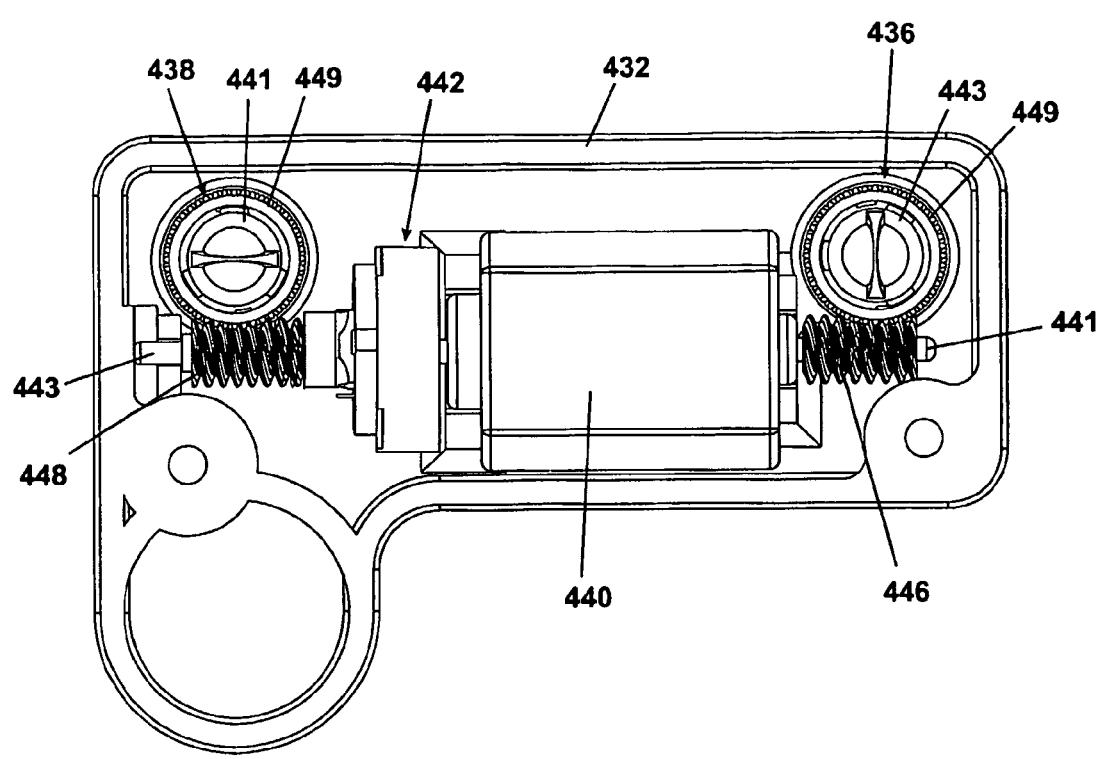
FIG. 30 is a plan view of the tilt actuator assembly of FIG. 29.
Figure 31:
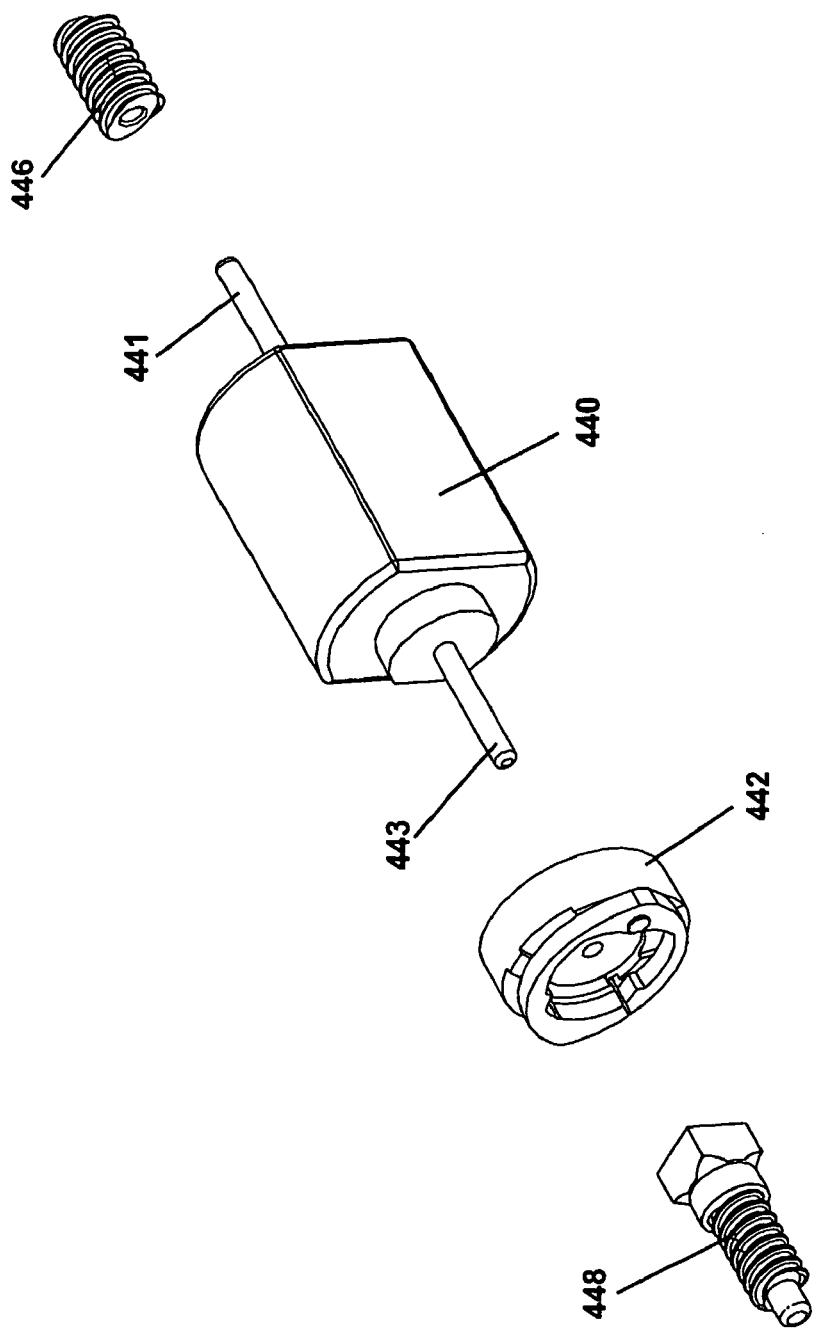
FIG. 31 is an exploded view of the spring-biased centrifugal clutch assembly of FIG. 29 comprising a threaded shaft, a clutch assembly, a motor, and a worm gear.

As shown in FIGS. 30 and 31, the motor 440, preferably electrically powered, comprises a low speed shaft 441 and a high-speed shaft 443. The motor is suitably held in the base portion 432 for openable cooperation of the low-speed shaft 441 with the first jackscrew assembly 436 and the high-speed shaft 443 with the second jackscrew assembly 438. A first worm gear 446 is frictionally retained over the low speed shaft for under 41 and operably cooperates with the first jackscrew assembly 436 so that rotation of the worm gear 446 will urge the rotation of the first jackscrew assembly 436.

Figure 33:
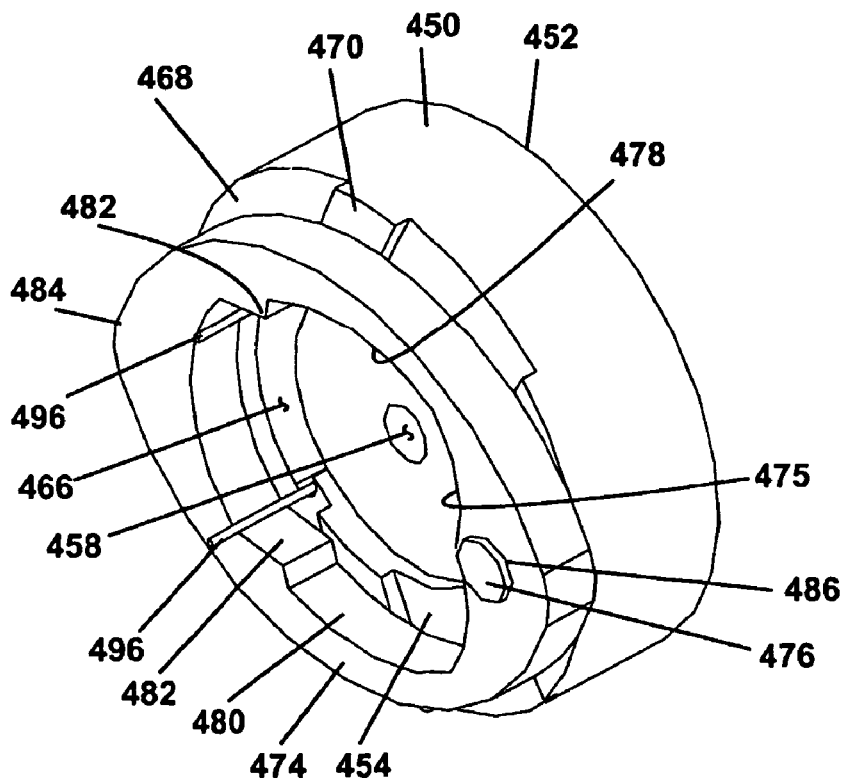
FIG. 33 is a close-up perspective view of an obverse side of the clutch assembly shown in FIG. 31.
Figure 34:
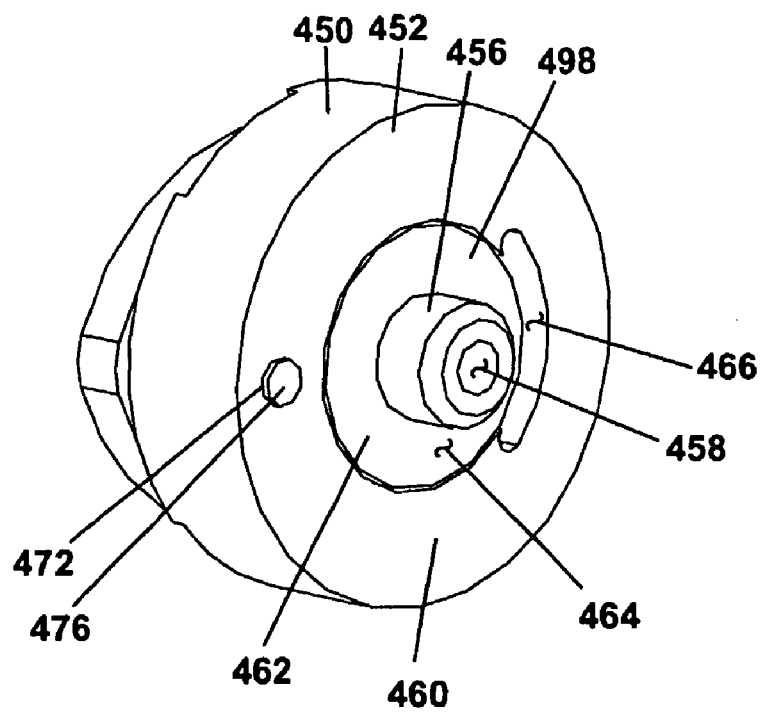
FIG. 34 is a close-up perspective view of a reverse side of the clutch assembly shown in FIG. 31.
Figure 35:
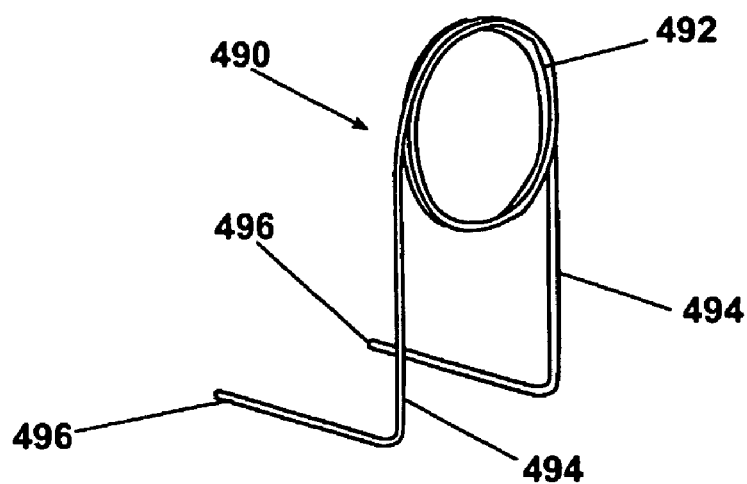
FIG. 35 is a close-up perspective view of a helical spring comprising a portion of the clutch assembly shown in FIG. 31.

A centrifugal clutch assembly 442 is shown in FIGS. 29, 30, and 31. As also shown in FIGS. 33 and 34, the centrifugal clutch assembly 442 comprises a generally circular clutch plate 450 having a reverse side 452 and an obverse side 454, and a clutch ring 474 pivotably attached thereto. A cylindrical axle 456 extends orthogonally and coaxially from the reverse side 452. A motor shaft aperture 458 extends coaxially through the clutch plate 450 and the axle 456 and is adapted for a frictional fit with the high-speed shaft 443 so that the clutch plate 450 rotates with the rotation of the high-speed shaft 443.

Extending downwardly from the reverse side 452 is an annular wall 460 transitioning to an annular floor 462 in generally parallel, spaced-apart juxtaposition with the reverse side 452 to define an annular receptacle 464. A thin, arcuate slot for hundred 66 extends through the clutch plate 450 adjacent to the annular receptacle 464.

The obverse side 454 comprises a generally circular face 468 having a pair of arcuate bosses 470 extending from the arcuate slot 466 to the periphery of the clutch plate 450. A pivot aperture 472 extends through the clutch plate 450 between the annular receptacle 464 and the periphery of the clutch plate 450 in diametric juxtaposition with the arcuate slot 466.

A clutch ring 474 is a generally flattened ring-shaped oval body having an irregularly-shaped aperture 475 extending therethrough. The aperture 475 comprises a pair of spaced-apart lateral arcuate rims 478 separated by a medial arcuate rim 480 to define a pair of spaced-apart teeth 482 therebetween. The arc length of the medial arcuate rim 480 is preferably the same as the arc length of the arcuate slot 466. The perimeter of the clutch ring 474 comprises a pair of spaced-apart arcuate edges 484. A pivot aperture 486 extends through the clutch ring 474 in opposed juxtaposition to the medial arcuate rim 480. The clutch ring 474 is preferably fabricated of a suitable metal, such as steel.

A helical spring 490 comprises a coil 492 terminating in a pair of spring arms 494 having fingers 496 extending orthogonal thereto.

The clutch ring 474 is attached to the clutch plate 450 by a fastener 476 extending through the pivot aperture 472 and the pivot aperture 486. The fastener 476 preferably comprises a rivet, although other fasteners suitable for the purposes described herein can be used. The clutch ring 474 is attached to the clutch plate 450 so that the clutch ring 474 is supported on the arcuate bosses 470 such that the clutch ring 474 can freely pivot relative to the clutch plate 450 while supported against the arcuate bosses 470.

The helical spring 490 is inserted over the axle 456 so that the coil 492 is received within the annular receptacle 464 and the fingers 496 extend through the arcuate slot 466 adjacent to the medial arcuate rim 480 at the intersection of the medial arcuate rim 480 and the tooth 482. An annular cover 498 is press fit over the axle 456 and into the annular receptacle 464 to retain the helical spring 490 in the annular receptacle 464. As the clutch ring 474 pivots to one side or the other, a spring finger 496 will be elastically deflected along the arcuate slot 466, which will tend to resist the movement of the clutch ring 474 and return the clutch ring 474 to a central, at-rest position.

As the clutch plate 450 spins about the axle 456, the clutch ring 474 will be urged to pivot by the centrifugal force generated by the spinning of the clutch plate 450. This pivoting will be resisted by the spring 490 at low angular velocities. As the angular velocity of the clutch plate 450 increases, the centrifugal force will increase until a point at which the centrifugal force will be sufficient to overcome the resisting force of the spring 490. At this point, the clutch ring 474 will begin to pivot outwardly. The higher the angular velocity, the greater the force tending to pivot the clutch ring 474 outwardly.

Figure 36:
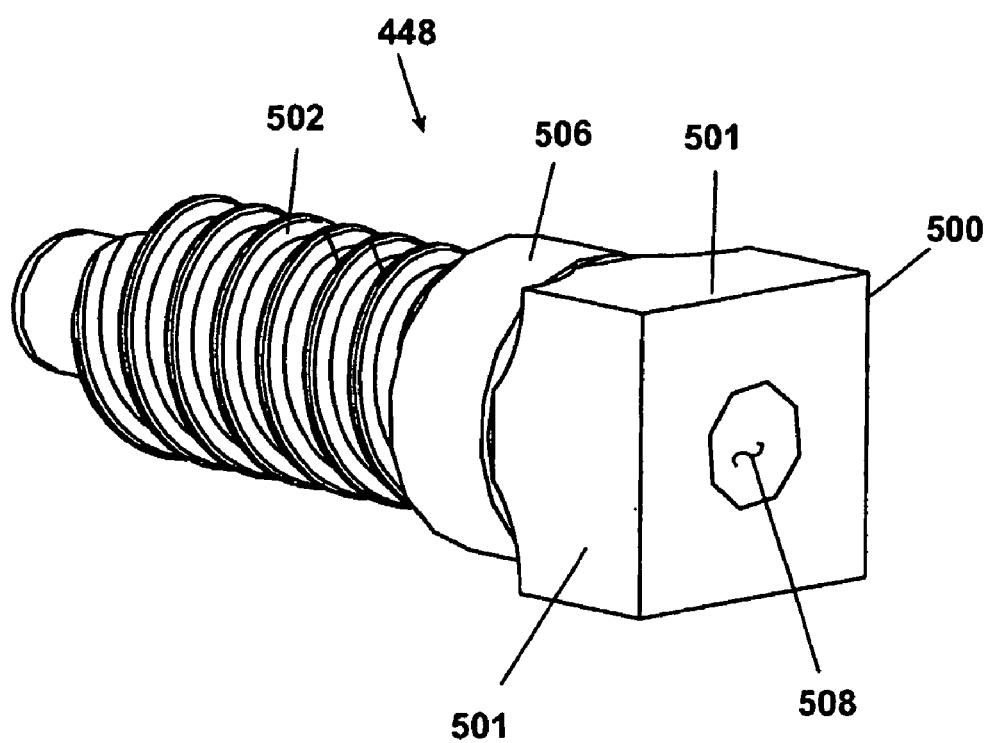
FIG. 36 is a close-up perspective view of the threaded shaft shown in FIG. 31.

As shown in FIG. 36, a second worm gear 448 is an elongated, partially threaded member comprising a clutch shaft 500 transitioning coaxially to a threaded shaft 502 through a cylindrical collar 506. The clutch shaft 500 comprises four orthogonal faces 501 forming a shaft portion having a generally square cross-section. A bore 508 extends coaxially through the worm gear 448, and is adapted for slidable insertion over the high-speed shaft 443 so that the worm gear 448 can spin on the high-speed shaft 443.

Figure 43:
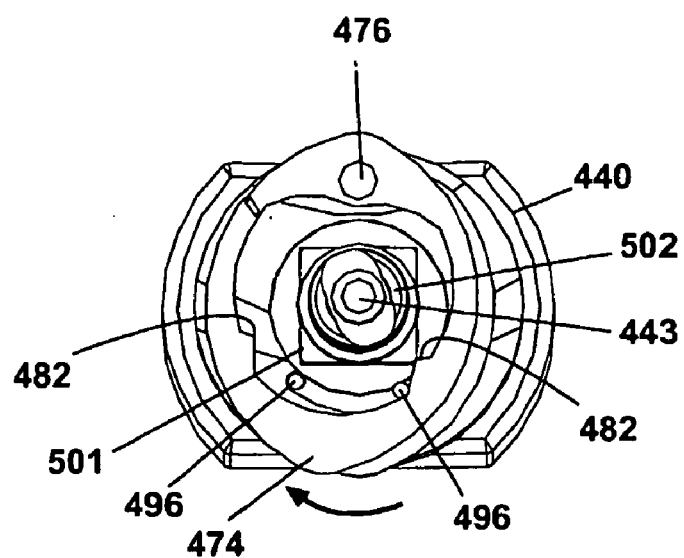
FIG. 43 is a plan view of the first embodiment of the spring-biased centrifugal clutch assembly showing the operation of the clutch assembly.
Figure 44:
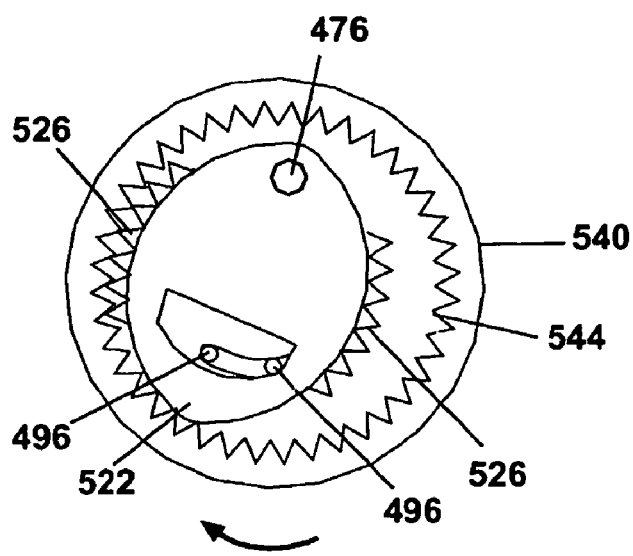
FIG. 44 is a plan view of the second embodiment of the spring-biased centrifugal clutch assembly showing the operation of the clutch assembly.

The clutch assembly 442 is attached to the high-speed shaft 443 for rotation of the clutch assembly 442 with rotation of the high-speed shaft 443 so that the obverse side 454 and to the clutch ring 474 face away from the motor 440. The second worm gear 448 is inserted over the high-speed shaft 443 so that the clutch shaft 500 extends into the clutch ring aperture 475. As shown in FIG. 43, as the clutch assembly 442 is rotated through increasing angular velocities, the clutch ring 474 will be pivotally displaced as previously described. As the clutch ring 474 is displaced, the lateral arcuate rim 478, the medial arcuate rim 480, and the teeth 482 will cooperatively engage the clutch shaft 500 so that the clutch shaft 500 will rotate with the rotation of the clutch assembly 442. As the angular velocities decrease, the clutch ring 474 will be returned to its at rest position through the action of the helical spring 490 so that the clutch assembly 442 will rotate free of the clutch shaft 500.

Figure 37:
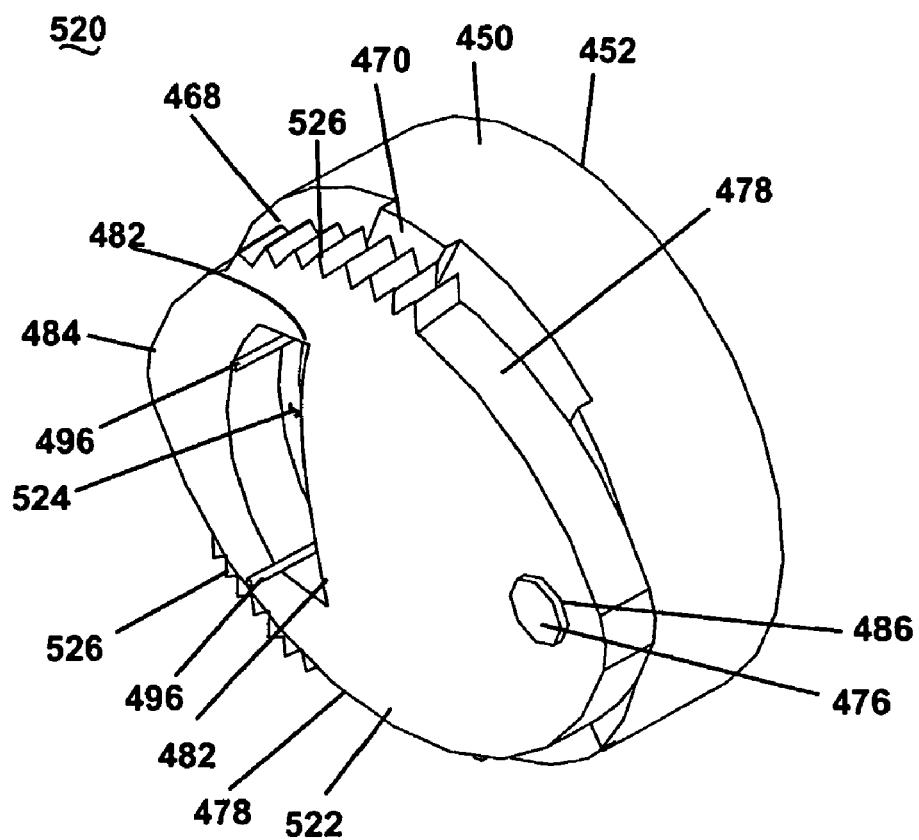
FIG. 37 is a close-up perspective view of a clutch assembly comprising a portion of a second embodiment of the spring-biased centrifugal clutch assembly of FIG. 27.

Referring now to FIG. 37, a second embodiment of the clutch assembly 520 is shown. As several of the elements of the second embodiment are identical to the first embodiment, like numbers will be used to identify like elements. The clutch ring 474 is replaced with a clutch plate 522 pivotably attached to the clutch plate 450 in a similar fashion to the first embodiment. The clutch plate 522 is a generally plate-like, oval shaped body having an arcuate slot 524 extending therethrough into cooperative juxtaposition with the arcuate slot 466 for receipt of the fingers 496. The clutch plate 522 comprises a pair of juxtaposed lateral arcuate rims 478 having a plurality of teeth 526 extending outwardly therefrom. The clutch plate 522 is preferably fabricated of a suitably rigid metal, such as steel.

Figure 38:
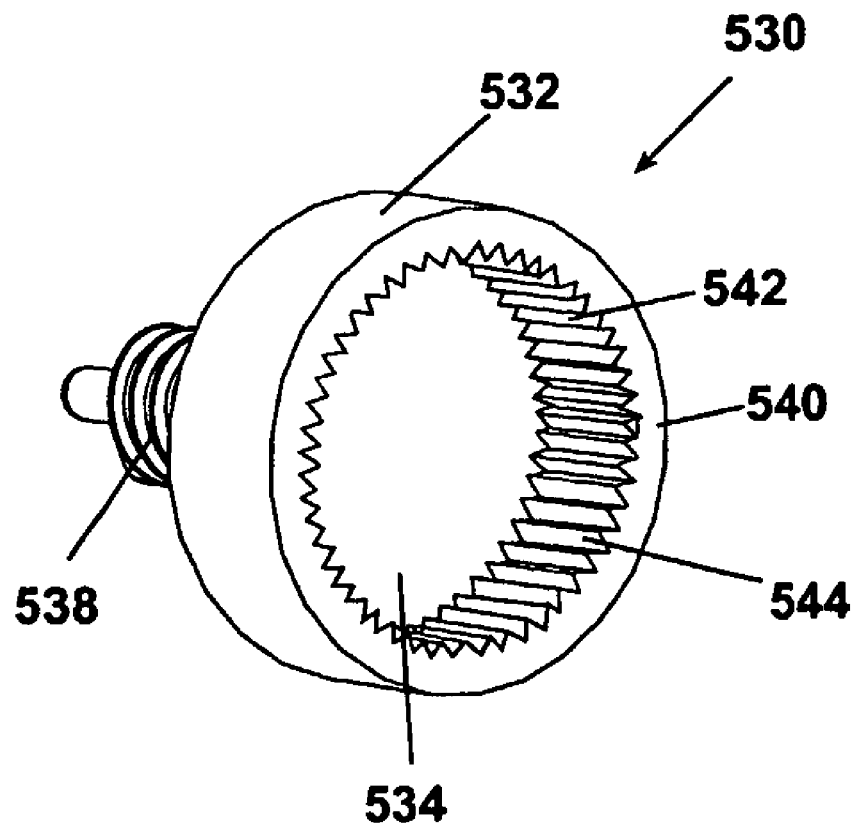
FIG. 38 is a close-up perspective view of a drum comprising a portion of the second embodiment of the spring-biased centrifugal clutch assembly of FIG. 27.

As shown in FIG. 38, a drum assembly 530 comprises a drum 532 and a worm gear 538. The drum 532 is a generally cylindrically shaped body comprising an annular wall 540 extending away from a circular floor 534 around its circumference to define a clutch chamber 528. The annular wall 540 has a drum surface 542 extending along the inner circumference thereof. Extending coaxially from the floor 534 away from the annular wall 540 is a cylindrical collar 536 transitioning into a worm gear 538. An axial bore 548 extends through the circular floor 534 and the cylindrical collar 536, and into the worm gear 538, and is adapted for rotation about the high-speed shaft 443. The drum surface 542 is provided with a plurality of regularly-spaced, inwardly-extending longitudinal ribs 544 into which the teeth 526 will interlock as the clutch plate 522 is urged outwardly against the drum surface 542.

The clutch assembly 520 is press fit onto the high speed shaft 443 for rotation of the clutch assembly 520 with rotation of the high-speed shaft 443. The drum assembly 530 is inserted over the high-speed shaft 443 so that the clutch assembly 520 is received within the clutch chamber 528.

At low angular velocities, the clutch assembly 520 will spin free of the drum assembly 530, the worm gear 538 will not rotate, and the high-speed jackscrew assembly will not rotate. However, as the angular velocity of the clutch assembly 520 increases, the clutch plate 522 will be urged into pivotal movement under the influence of the centrifugal force generated by the annular velocity of the clutch assembly 520. As the clutch plate 522 pivots laterally under the influence of centrifugal force, the teeth 526 will be urged into contact with the ribs 544 or the drum surface 542 so that the drum assembly 530 will rotate with rotation of the clutch assembly 520. As the angular velocity of the clutch assembly 520 decreases, the clutch plate 522 will be returned to the at rest position under the influence of the helical spring 490, returning the drum assembly 530 to a free spinning condition. In an alternate embodiment, the drum assembly 530 comprises a drum 532 without the ribs 544, such as the drum shown in FIG. 32.

In yet another embodiment, the teeth 526 are replaced with a frictional material, such as rubber, which is applied along the lateral arcuate rims 478. As the clutch plate 522 is urged into outward pivotal movement by the spinning of the clutch assembly 520, the frictional material will be urged against the drum surface 542 so that the drum assembly 532 rotates with rotation of the clutch assembly 520.

Figure 39:
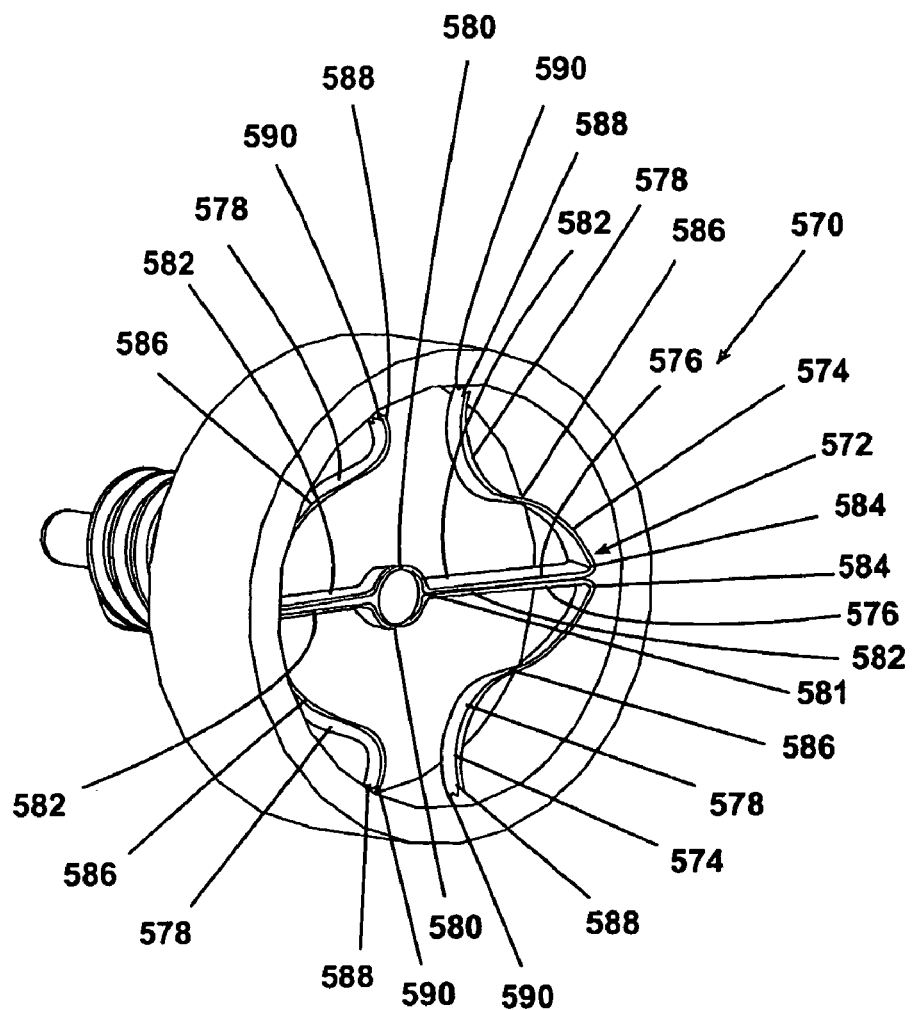
FIG. 39 is a close-up perspective view of a third embodiment of the spring-biased centrifugal clutch assembly of FIG. 1.

Referring now to FIG. 39, a third embodiment of the clutch assembly 570 is shown comprising a spring clutch 572 and an alternate drum assembly 530. The spring clutch 572 comprises thin strap-like members formed into a pair of generally D-shaped frames 574 suitably connected to each other, such as by welding, riveting, or an adhesive, in cooperating juxtaposition. Preferably the spring clutch 572 is fabricated of a suitable material having a high modulus of elasticity, such as spring steel.

Each frame 574 comprises a strap 576 having at each end a pair of cooperatively juxtaposed spring fingers 578. An arch 580 is formed at the midpoint of the strap 576 so that when a pair of straps 576 are connected to each other, the arches 580 are aligned to form an aperture 581. Extending away from the arch 580 are a pair of straight sections 582 transitioning into a pair of bight sections 584, in turn transitioning into a pair of arcuate sections 586. Each arcuate section 586 terminates in a tooth 588 extending somewhat outwardly from the arcuate section 586. Alternatively, the arcuate section 586 can terminate in serrations 590 or pads (not shown) comprising a frictional material, such as rubber.

Figure 32:
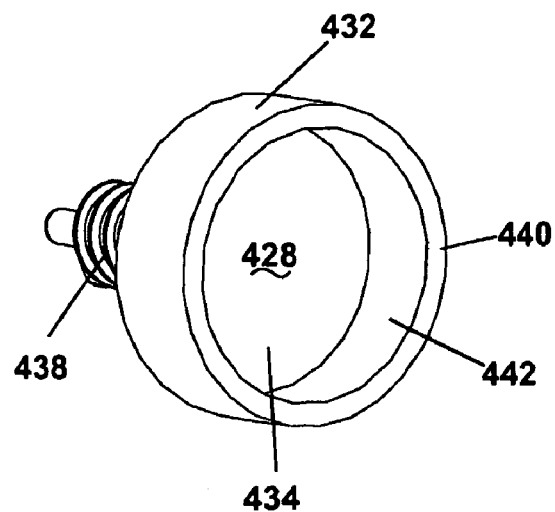
FIG. 32 is a perspective view of a drum comprising a portion of an alternate embodiment of the spring-biased centrifugal clutch assembly of FIG. 27.

As shown in FIG. 32, the drum assembly 530 comprises a drum 532 and a worm gear 538. The drum 532 is a generally cylindrically shaped body comprising an annular wall 540 extending away from a circular floor 534 around its circumference to define a clutch chamber 528. The annular wall 540 has a drum surface 542 extending along the inner circumference thereof. Extending coaxially from the floor 534 away from the annular wall 540 is a cylindrical collar 536 transitioning into a worm gear 538. An axial bore 548 extends through the circular floor 534 and the cylindrical collar 536, and into the worm gear 538, and is adapted for rotation about the high-speed shaft 443. This embodiment of the drum assembly 530 is not provided with the ribs 544.

Figure 45:
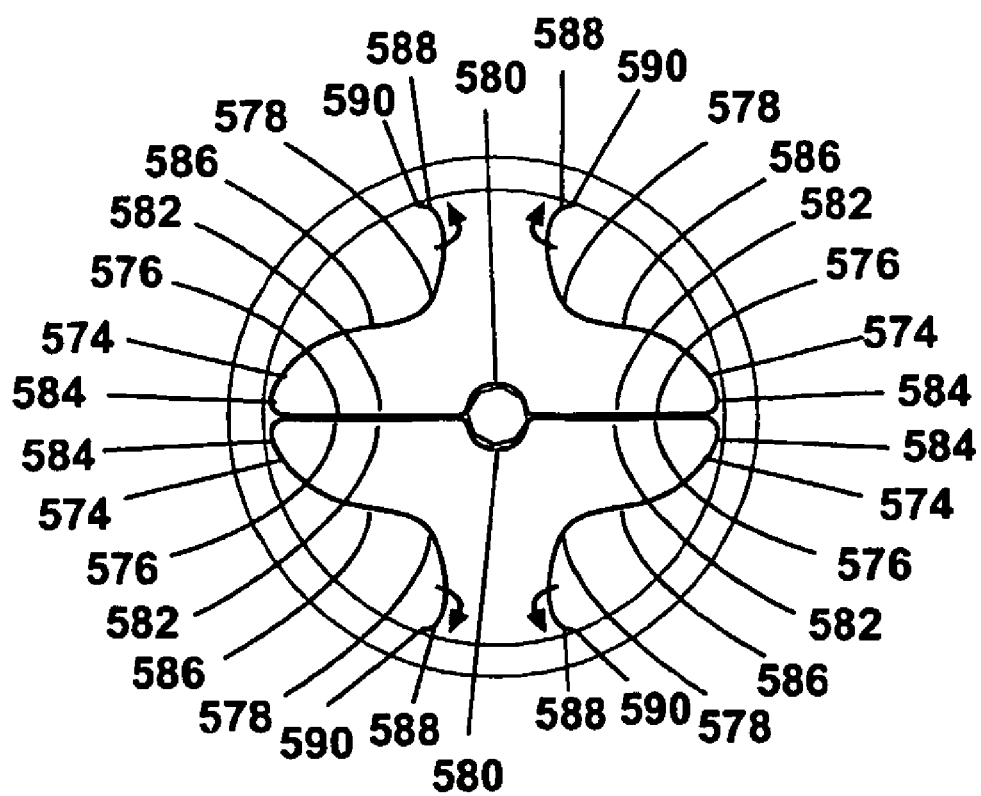
FIG. 45 is a plan view of the third embodiment of the spring-biased centrifugal clutch assembly showing the operation of the clutch assembly.

The spring clutch 572 is press fit onto the high-speed shaft 443 by inserting the high-speed shaft 443 into the aperture 581. The drum assembly 530 is then inserted over the high-speed shaft 443 so that the spring clutch 572 is received within the clutch chamber 528. At low angular velocities, the spring clutch 572 will spin free of the drum assembly 530, the worm gear 538 will not rotate, and the high-speed jackscrew assembly will not rotate. However, as the angular velocity of the spring clutch 572 increases, the arcuate sections 586 will be urged outwardly by centrifugal force so that the teeth 588 are urged against the drum surface 542 so that the drum assembly 532 rotates with rotation of the spring clutch 572, as shown in FIG. 45. As the angular velocity of the clutch assembly 520 decreases, the arcuate sections 586 will return to an at-rest position in which the teeth 588 do not contact the drum surface 542 and the drum assembly 530 is in a free-spinning condition.

As with the second embodiment, the drum surface 542 can be provided with a plurality of regularly-spaced, inwardly-extending longitudinal ribs 544 as shown in FIG. 38 into which the teeth 588 will interlock as the arcuate sections 586 are urged outwardly against the drum surface 542.

Figure 40:
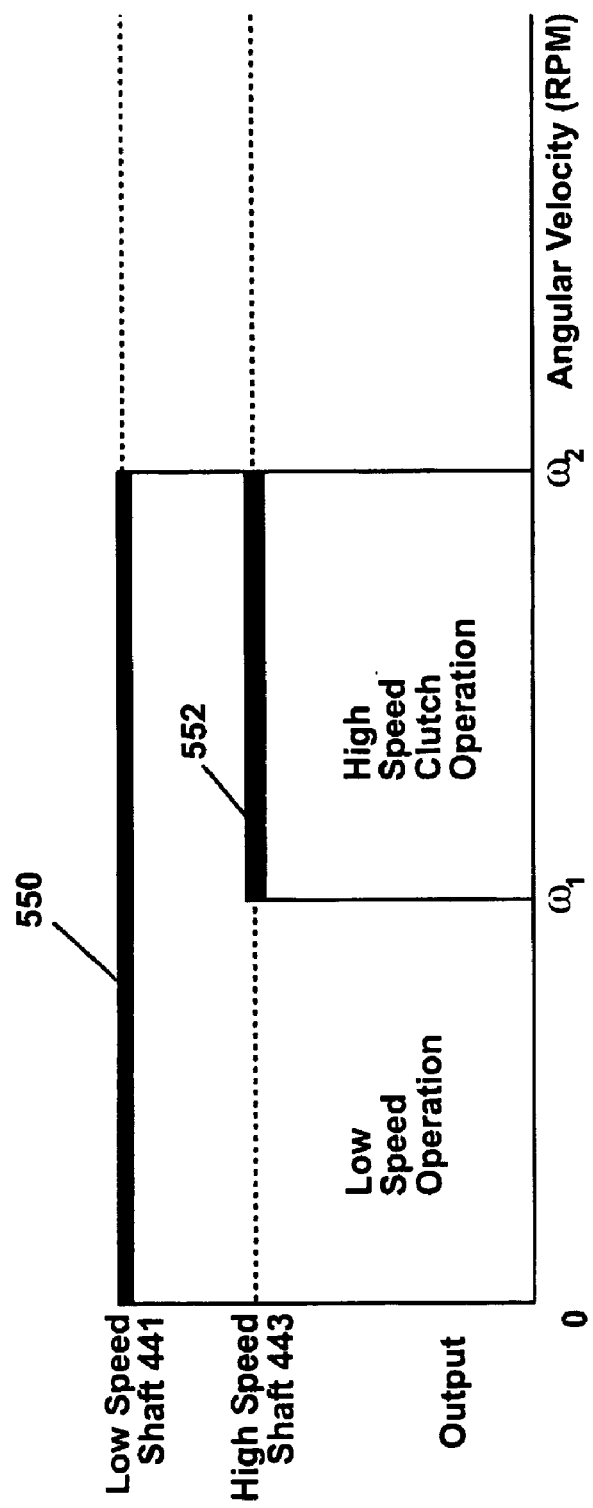
FIG. 40 is a graph depicting the rotation of output shafts of the tilt actuator assembly of FIG. 27.

Referring now to FIG. 40, at an angular velocity between 0 and $\omega_1$ rpm, the low speed shaft 441 will rotate. The motor 440 will turn the low speed shaft 441 and the high-speed shaft 443. The low speed shaft 441 will turn the first worm gear 446, which will urge the linear movement of the first jackscrew assembly 436, as previously described herein. The high-speed shaft 443 will rotate the clutch assembly 442. However, the angular velocity of the clutch assembly 442 will be insufficient for the clutch ring 474 to move outwardly for frictional communication of the arcuate edge 484 with the inner surface 542 of the drum 532. This is characterized as the low-speed output line 550 in FIG. 40. At angular velocities greater than col rpm, the first worm gear 446 will continue to rotate as previously described and as characterized as line 550. However, the angular velocity of the clutch assembly 442 will be sufficient for the clutch ring 474 to move outwardly for frictional communication of the arcuate edge 484 with the inner surface 542, thus urging the rotation of the second worm gear 448 as previously described herein. This is characterized as the high-speed output line 552 in FIG. 40. It will be readily apparent to one of ordinary skill in the art that an assembly comprising the clutch plate 522 or the spring clutch 572 will operate in the same manner, i.e. engaging as the angular velocity increases, and disengaging as the angular velocity decreases.

Figure 41:
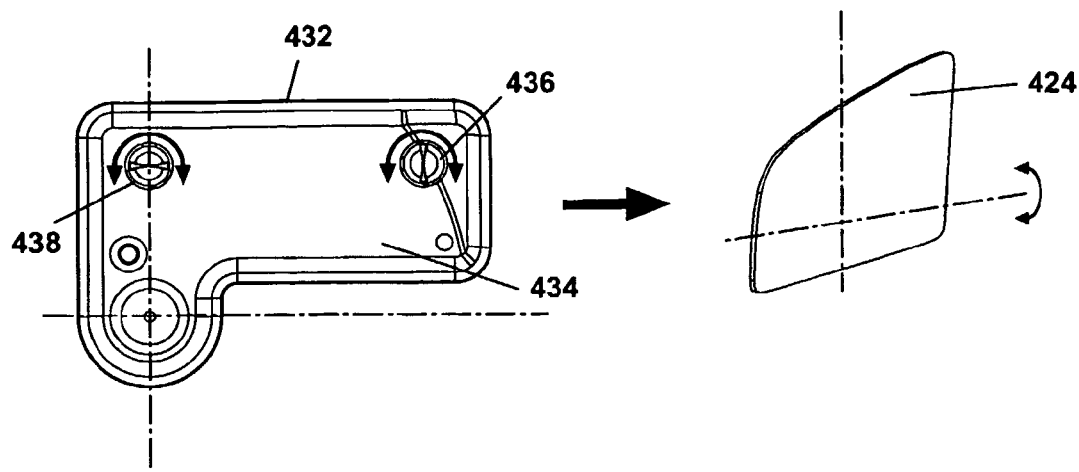
FIG. 41 is a schematic view of the tilt actuator of FIG. 27 having a pair of rotating shafts which, in turn, causes a mirror interconnected thereto to rotate in a first direction.
Figure 42:
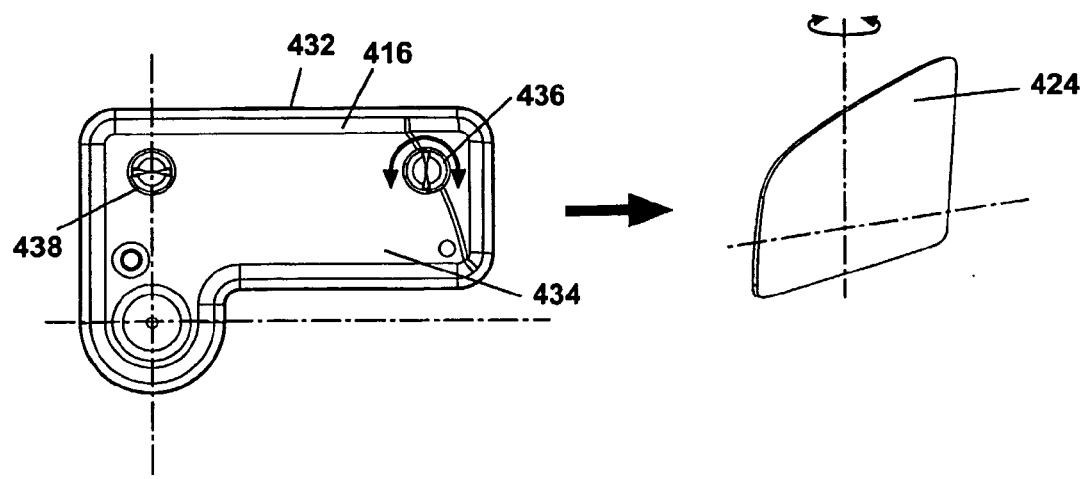
FIG. 42 is a schematic view similar in orientation to FIG. 41 in which only one of the shafts rotates which, in turn, causes a mirror interconnected thereto to rotate in a second direction.

At angular velocities less than $\omega_1$ rpm, only the first jackscrew assembly 436 will move inwardly or outwardly (see FIG. 42). The glass case 426 will be effectively immovably pinned to the tilt actuator 430 at the connection of the second jackscrew assembly 438 and the panel pivot mount to the glass case 426. The glass case 426 will pivot about a vertical axis for inward and outward adjustment of the reflective element 424. At angular velocities greater than $\omega_1$ rpm, both jackscrew assemblies 436, 438 will move inwardly or outwardly. The glass case 426 will be effectively immovably pinned to the frame 422 only at the connection of the panel pivot mount to the glass case 426. The glass case 426 will pivot about a horizontal axis for upward and downward adjustment of the reflective element 424 (see FIG. 41). It will be obvious that, for proper adjustment of the mirror, the motor 440 and gearing described herein must urge linear movement of the jackscrew assemblies 436, 438 in the same direction and at the same rate when both shafts 441, 443 are operated at an angular velocity greater than $\omega_1$ rpm. A conventional electrical brake circuit can be employed to counter the inertial effects of the operation of the assembly, thereby avoiding unwanted "runover" movement when the assembly is stopped or the speed changed.

Figure 46:
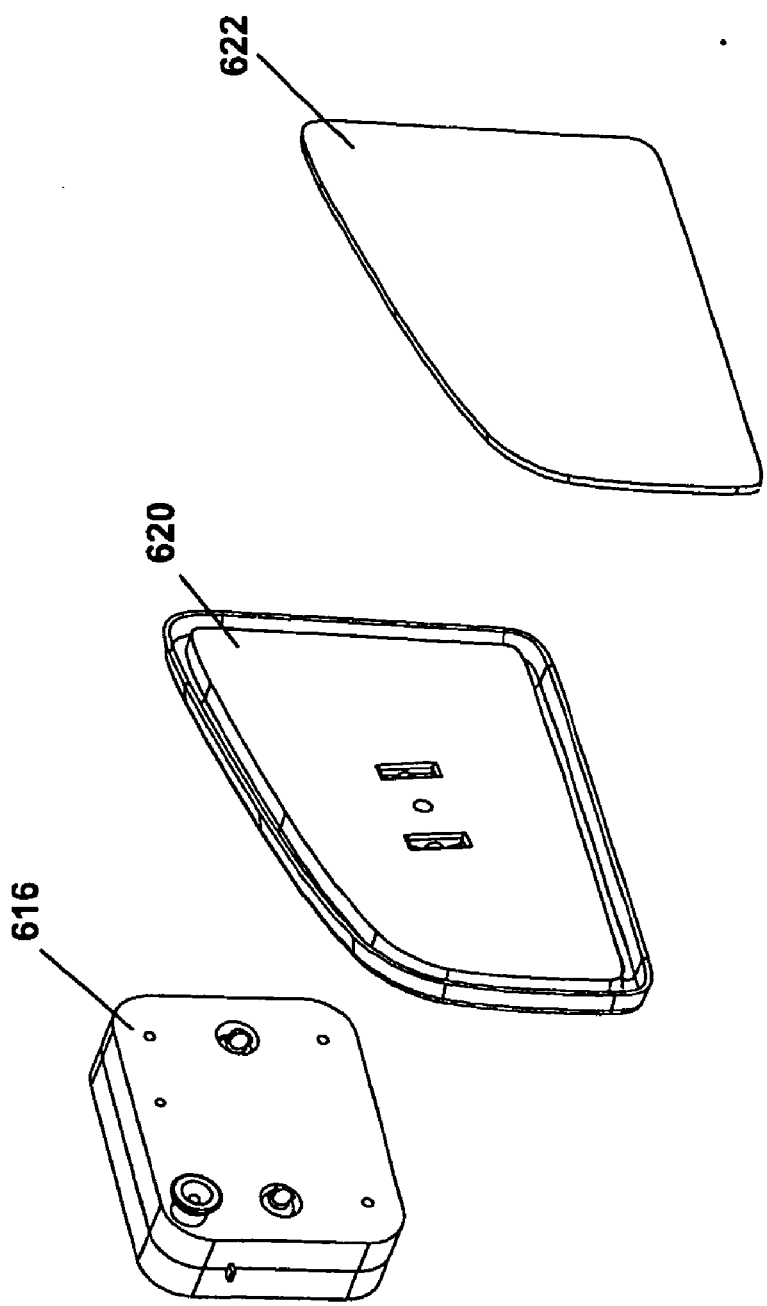
FIG. 46 is an exploded view of a fourth embodiment of the mirror assembly of FIG. 1, the mirror assembly including a reflective element and a single motor tilt actuator assembly for selectively tilting the reflective element.

As shown in FIG. 46, a fourth embodiment of the rearview mirror assembly 10 comprises a single-motor tilt actuator assembly 616, a mounting panel 620, and a reflective element or mirror 622. The single-motor tilt actuator assembly 616 is operably connected to the mounting panel 620 for adjustment of the vertical and horizontal tilt of the panel 620 as hereinafter described.

The panel 620 fixedly mounts a reflective element 622 thereby enabling the reflective element 622 to tilt vertically and horizontally with the tilting of the panel 620, thus adjusting the driver's field of view. The single-motor tilt actuator assembly 616, the panel 620, and the mirror 22, are encased within the shell 14 in a conventional manner to provide the mirror assembly 10.

Figure 47:
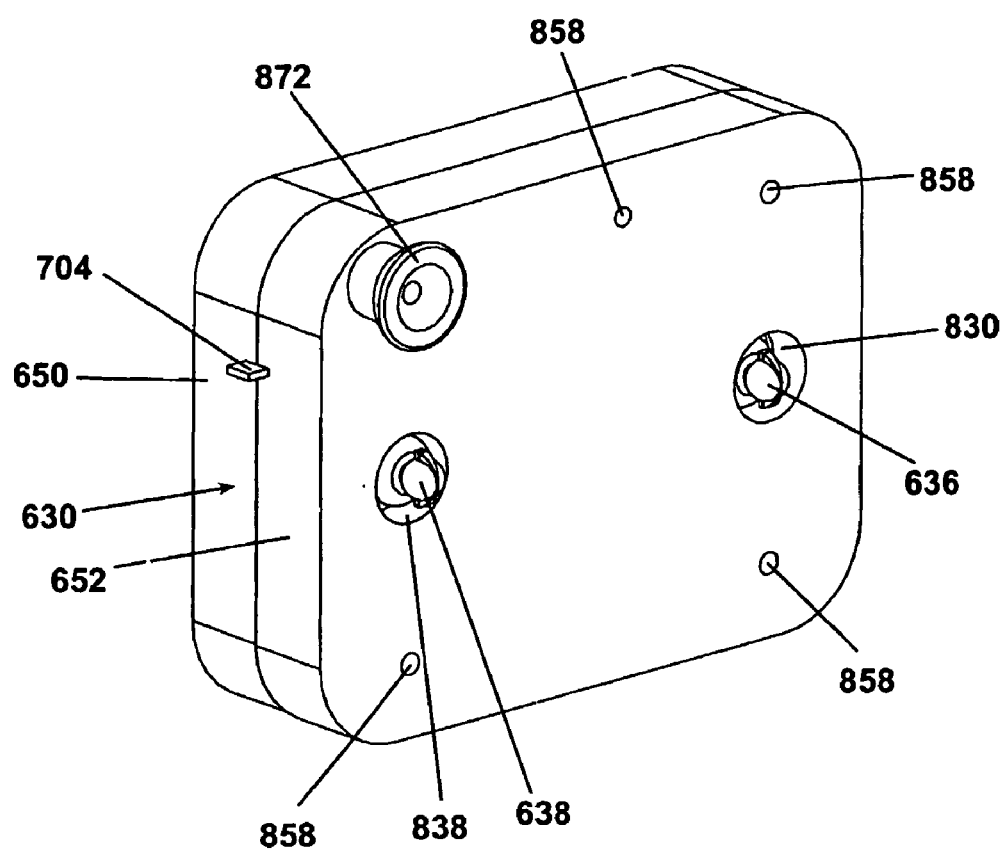
FIG. 47 is a close-up perspective view of the exterior of the single motor tilt actuator assembly of FIG. 46 with a cover portion attached to a base portion.
Figure 48:
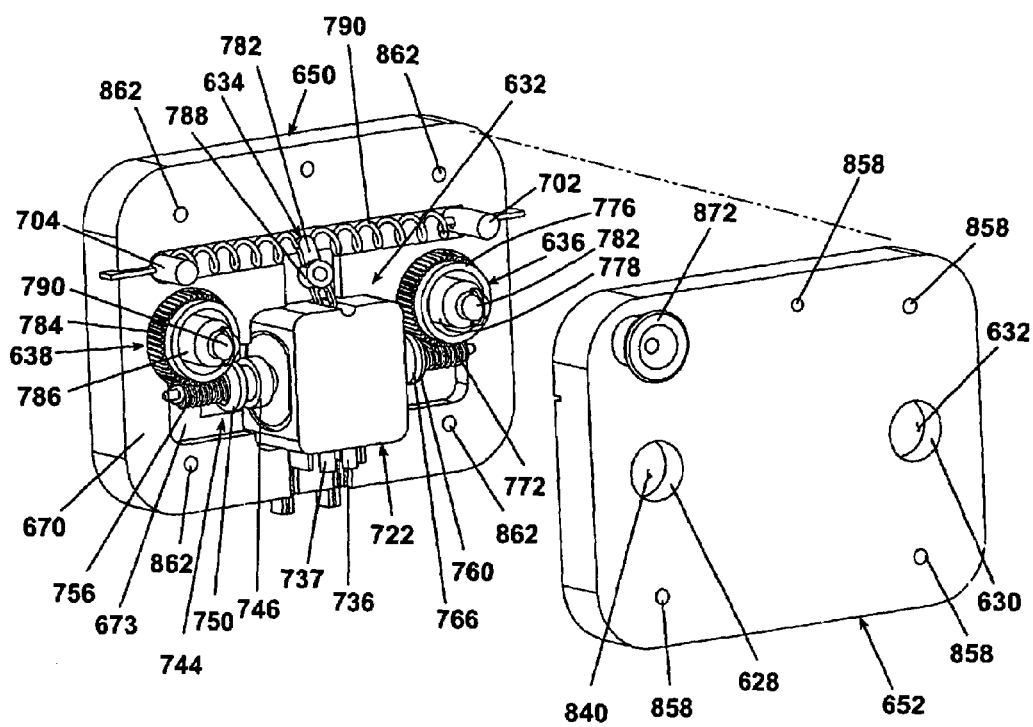
FIG. 48 is a close-up perspective view of the interior of the single motor tilt actuator assembly of FIG. 47 with the cover portion removed from the base portion.

Referring now to FIGS. 47 and 48, the actuator assembly 616 comprises an actuator casing 630, a motor assembly 632 having a pair of drive clutch assemblies 744, 760, a pivot assembly 634, a first actuator 636, and a second actuator 638. The actuator casing 630 comprises a base portion 650 and a cover portion 652. In the preferred embodiment, the actuator casing 630 is shown as a generally block-like assemblage. However, the actuator casing 630 can be of any suitable shape to accommodate the various components described herein and the mounting of the casing 630 in the rearview mirror assembly 10.

The cover portion 652 of the actuator casing 630 is provided with a first actuator bore 832 defined by a circular first actuator receptacle sidewall 630 extending therethrough, and a second actuator bore 840 defined by a circular second actuator receptacle sidewall 838 extending therethrough, in spaced-apart juxtaposition and adapted for slidable insertion of the first actuator 636 and the second actuator 638, respectively, therethrough. A plurality of cover fastener apertures 858 extend through the cover portion 652 for attachment of the cover portion 652 to the base portion 650, preferably utilizing suitable conventional threaded fasteners, such as screws (not shown). A generally conventional panel pivot mount 872 is rigidly attached to the cover portion 652 adjacent a corner of the cover portion 652 for pivotable attachment of the tilt actuator assembly 616 to the mounting panel 620 in a well-known manner. The panel pivot mount 872 is positioned relative to the actuators 636, 638 so that a line extending diametrically through the panel pivot mount 872 and the second actuator 638 is perpendicular to a line extending diametrically through the second actuator 638 and the first actuator 636.

Figure 49:
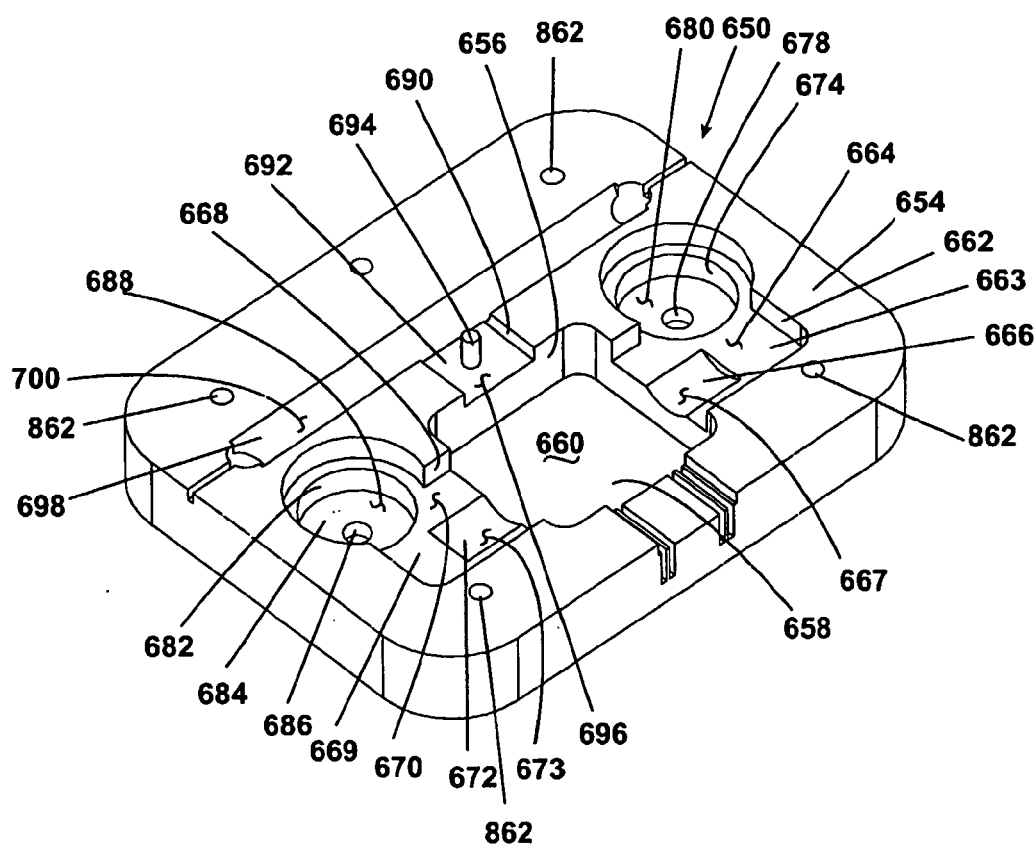
FIG. 49 is a close-up perspective view of the base portion shown in FIG. 48.

Referring also to FIG. 49, the base portion 650 is a generally block-like piece having a planar interior face 654. Depending generally orthogonally from the interior face 654 is a motor assembly receptacle sidewall 656 which transitions to a motor assembly receptacle bottom wall 658 in spaced-apart, parallel juxtaposition to the interior face 654 to define a motor assembly receptacle 660. The motor assembly receptacle 660 is shown in FIG. 49 as having a generally rectilinear shape.

Depending generally orthogonally from the interior face 654 in operable juxtaposition to the motor assembly receptacle 660 is a generally elongated first clutch/worm receptacle side wall 662 which transitions to a first clutch/worm receptacle bottom wall 663 in spaced-apart, parallel juxtaposition to the interior face 654 to define a first clutch/worm receptacle 664. Depending from the bottom wall 663 is a generally arcuate first clutch receptacle wall 666 to define a first clutch receptacle 667.

Depending generally orthogonally from the interior face 654 in operable juxtaposition to the motor assembly receptacle 660 in opposed juxtaposition to the first clutch/worm receptacle 664 is a second clutch/worm receptacle side wall 668 which transitions to a second clutch/worm receptacle bottom wall 669 in spaced-apart, parallel juxtaposition to the interior face 654 to define a second clutch/worm receptacle 670. Depending from the bottom wall 669 is a generally arcuate second clutch receptacle wall 672 to define a second clutch receptacle 673.

Adjacent to the first clutch/worm receptacle 664 is a generally cylindrical first actuator receptacle sidewall 674 depending generally orthogonally from the interior face 654 which transitions to a circular first actuator receptacle bottom wall 676 in spaced-apart, parallel juxtaposition to the interior face 654 to define a first actuator receptacle 680. The first actuator receptacle 680 opens radially into the first clutch/worm receptacle 664. Depending orthogonally from the bottom wall 676 is a shaft socket 678 in coaxial alignment therewith. Adjacent to the second clutch/worm receptacle 670 is a generally cylindrical second actuator receptacle sidewall 682 depending generally orthogonally from the interior face 654 which transitions to a circular second actuator receptacle bottom wall 684 in spaced-apart, parallel juxtaposition to the interior face 654 to define a second actuator receptacle 688. The second actuator receptacle 688 opens radially into the second clutch/worm receptacle 670. Depending orthogonally from the bottom wall 684 is a shaft socket 686 in coaxial alignment therewith.

Adjacent the motor assembly receptacle 660 is a shift assembly slot sidewall 690 depending orthogonally from the interior face 654 which transitions to a shift assembly slot bottom wall 692 in spaced-apart, parallel juxtaposition to the interior face 654 to define a shift assembly slot 696. The shift assembly slot 696 opens into the motor assembly receptacle 660. Extending orthogonally upwardly from the bottom wall 692 is a cylindrical pivot shaft 694. Adjacent the shift assembly slot 696 is a generally arcuate memory element wall 698 depending from the interior face 654 and extending across the width of the base portion 650 to define a linear memory element receptacle 700.

Figure 53:
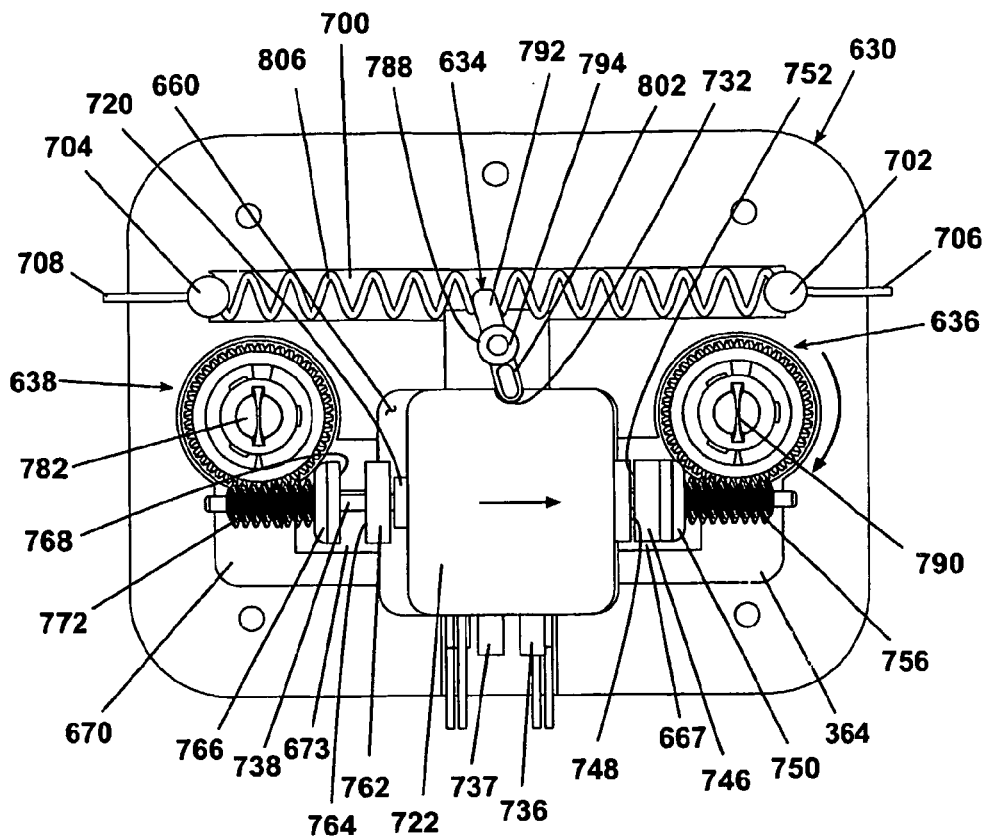
FIG. 53 is a plan view with the cover portion removed of the interior of the single motor tilt actuator assembly of FIG. 48 showing the motor assembly in a first operable position for tilting the reflective element in a first direction.

Referring to FIG. 53, a first electrical lead 702 is a generally cylindrical body mounted at a first end of the memory element receptacle 700 extending generally orthogonally upwardly therefrom, and having a first tab 706 extending radially therefrom away from the memory element receptacle 700 beyond the perimeter of the actuator casing 630. A second electrical lead 704 is a generally cylindrical body mounted at a second end of the memory element receptacle 700 extending generally upwardly therefrom in parallel spaced-apart juxtaposition to the first electrical lead 702, and having a second tab 708 extending radially therefrom away from the memory element receptacle 700 beyond the perimeter of the actuator casing 630. The tabs 706, 708 comprise electrical contacts for fixedly connecting electrical wires (not shown) to the leads 702, 704. The electrical leads 702, 704 are provided with suitable means for electrically connecting a memory element 806 as described herein to the leads 702, 704, such as soldering, welding, or threaded setscrews.

Figure 51:
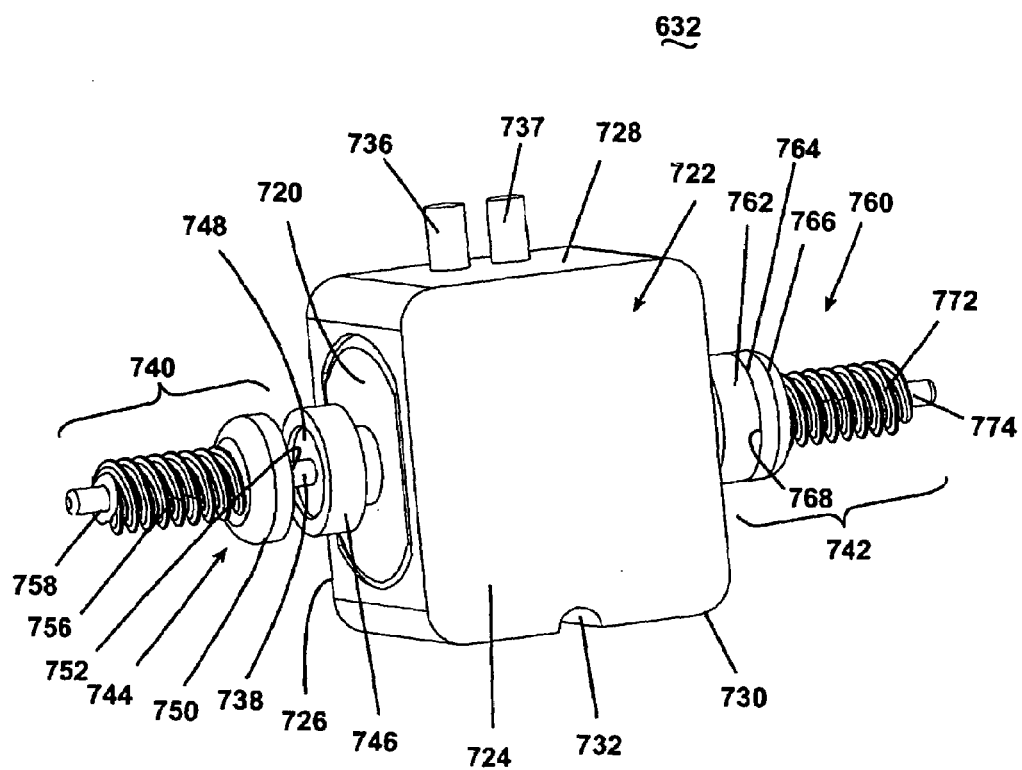
FIG. 51 is a close-up perspective view of a motor assembly comprising a part of the single motor tilt actuator assembly shown in FIG. 48.

In the preferred embodiment, as shown in FIG. 51, the single motor tilt actuator assembly 616 is powered by a 12-volt DC electric motor 720 connected to the vehicle electrical supply. The electric motor 720 is received in a motor casing 722 having a first sidewall 724, a second sidewall 726 in parallel juxtaposition therewith, a first end wall 728 and a second end wall 730 in parallel juxtaposition therewith, the end walls 728, 730 extending orthogonally from the side walls 724, 726 to form a generally cubic structure. A slot 732 is provided in the second end wall 730 extending transversely across the middle thereof. Extending orthogonally away from the first end wall 728 are a first contact post 736 and a second contact post 737 in parallel, spaced-apart juxtaposition. The posts 736, 737 comprise generally cylindrical bodies, or, alternatively, rectilinear bodies, which are rigidly attached to the first end wall 728. The side walls 724, 726 and the end walls 728, 730 define a motor chamber 734 for slidable receipt of the electric motor 720 therein. Optionally, one or more setscrews (not shown) can be threadably received in a setscrew aperture (not shown) in the first end wall 728 to fixedly retain the electric motor 720 in the motor chamber 734 in a conventional manner. The length of the motor casing 722 is somewhat less than the length of the motor assembly receptacle 660 and the height of the motor casing 722 is adapted for slidable receipt of the motor casing 722 in the motor assembly receptacle 660 so that the motor casing 722 can slidably translate along the motor assembly receptacle 660 as hereinafter described.

The motor 720 is provided with a motor shaft 738 having a first shaft portion 740 extending outwardly of the motor 720 in a first direction and a second shaft portion 742 extending outwardly of the motor 720 in a second direction coaxial with the first direction. A first drive clutch assembly 744 is adapted to be received over the first shaft portion 740 and comprises a drive element 746, a driven element 750, and a worm gear 756. The drive element 746 is a generally cylindrical body adapted for fixed coaxial attachment to the first shaft portion 740 and having a circular drive element face 748 oriented away from the motor 720. The driven element 750 is a somewhat conical shaped body adapted for coaxial attachment to the first shaft portion 740 and having a circular driven element face 752 oriented in coaxial juxtaposition with the drive element face 748. Extending axially from the driven element 750 is a worm gear 756. A shaft bore 758 extends axially through the driven element 750 and the worm gear 756 for slidable rotation of the driven element 750 and the worm gear 756 on the first shaft portion 740.

The second shaft portion 742 is provided with a second drive clutch assembly 760 which is identical to the first drive clutch assembly 744. The second drive clutch assembly 760 is adapted to be received over the second shaft portion 742 and comprises a drive element 762, a driven element 766, and a worm gear 772. The drive element 762 is a generally cylindrical body adapted for fixed coaxial attachment to the second shaft portion 742 and having a circular drive element face 764 oriented away from the motor 720. The driven element 766 is a somewhat conical shaped body adapted for coaxial attachment to the second shaft portion 742 and having a circular driven element face 768 oriented in coaxial juxtaposition with the drive element face 764. Extending axially from the driven element 766 is a worm gear 772. A shaft bore 774 extends axially through the driven element 766 and the worm gear 772 for slidable rotation of the driven element 766 and the worm gear 772 on the second shaft portion 742.

Figure 55:
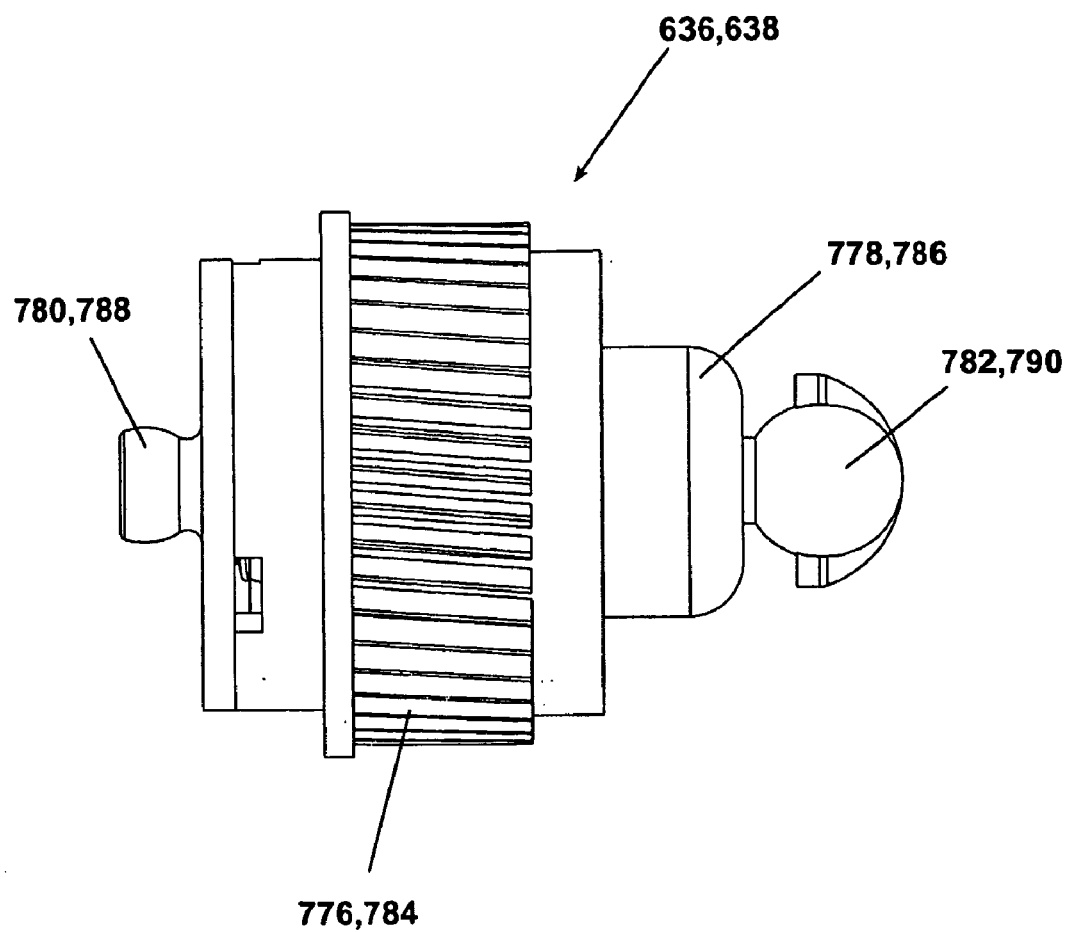
FIG. 55 is a side elevation view of an actuator comprising a portion of the single motor tilt actuator assembly of FIG. 48.

As shown in FIG. 55, the first actuator 636 comprises a generally cylindrically shaped first actuator gear 776 and a first output spindle 778 extending coaxially outwardly of the gear 776. Opposite the spindle 778 is a first actuator shaft 780 extending coaxially outwardly of the gear 776 and adapted for rotational communication with the shaft socket 678. The first output spindle 778 terminates in a ball connector 782 for connecting the first actuator 636 to the pane 620 in a generally conventional manner. The second actuator 638 comprises a generally cylindrically shaped second actuator gear 784 and a second output spindle 786 extending coaxially outwardly of the gear 784. Opposite the spindle 786 is a second actuator shaft 788 extending coaxially outwardly of the gear 784 and adapted for rotational communication with the shaft socket 694. The second output spindle 786 terminates in a ball connector 790 for connecting the second actuator 638 to the panel 620 in a generally conventional manner.

Figure 52:
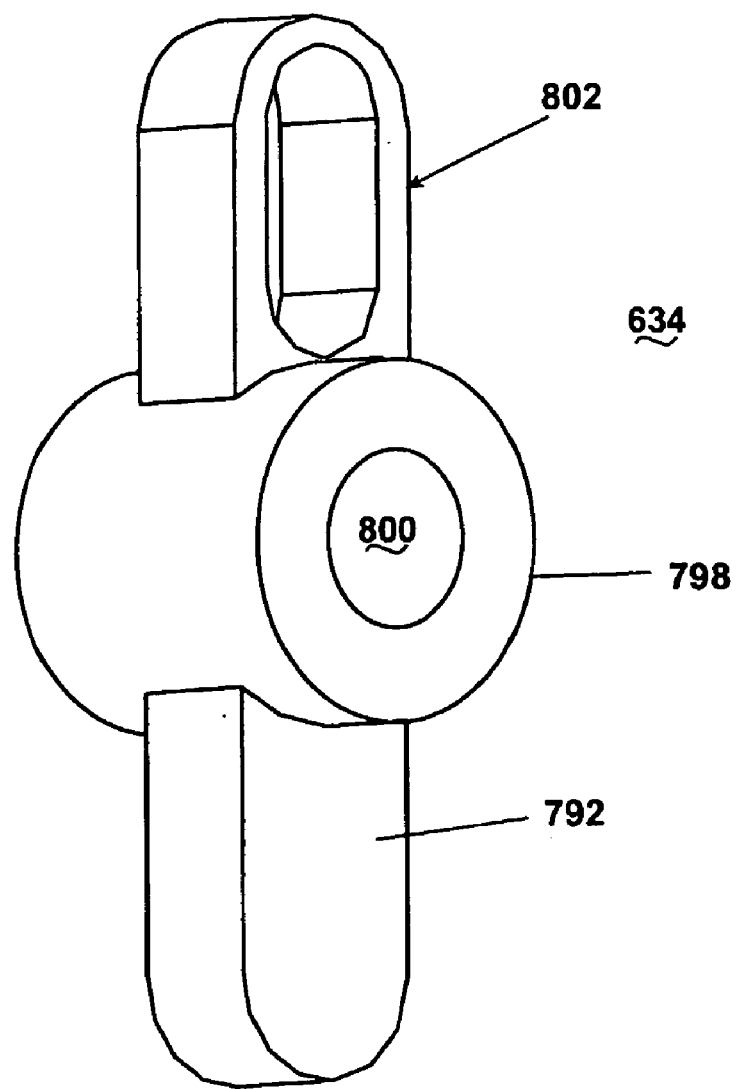
FIG. 52 is a close-up perspective view of a pivot assembly comprising a part of the single motor tilt actuator assembly shown in FIG. 48.

As shown also in FIG. 52, the pivot assembly 632 comprises a generally cylindrically shaped memory element arm 792. The memory element arm 792 is adapted for fixed attachment of a memory element 806 as hereinafter described, such as by soldering, welding, or threaded set screws. A generally cylindrical pivot bearing 798 is attached radially to the memory element arm 792 at a second end thereof, and having a bearing aperture 800 extending coaxially therethrough adapted to be pivotably received over the pivot shaft 694. Attached to the pivot bearing 798 and extending diametrically opposite the memory element arm 792 is a translating arm 802.

A memory element 806 comprises a helical spring-like member, preferably fabricated of a shape memory alloy, such as nickel-titanium, of a gauge and length suitable for the purposes described herein. Alternatively, the memory element 806 can comprise a pair of helical spring-like members of approximately equal length and approximately one-half the length of the memory element 806. Alternative memory elements include a bi-metal switch, a piezoelectric material, a ferromagnetic memory alloy, a thermal transition element, or a solenoid.

Figure 50B:
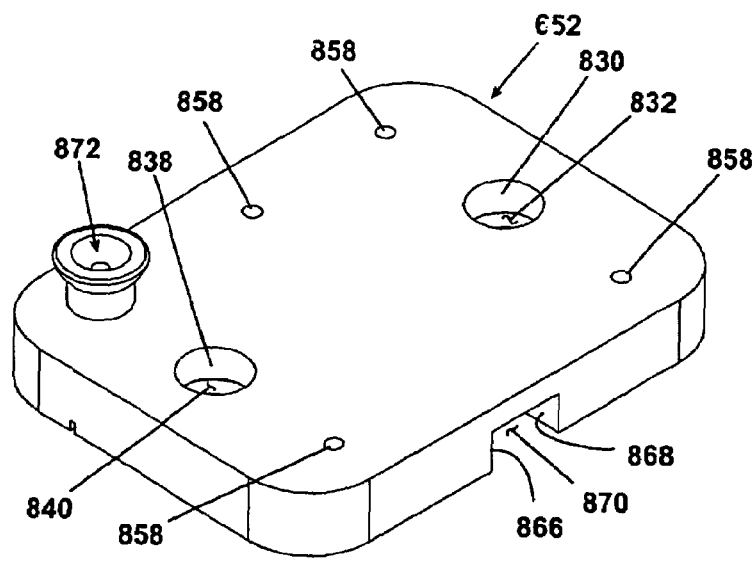
FIG. 50B is a close-up perspective view of the exterior of the cover portion shown in FIG. 48.
Figure 50A:
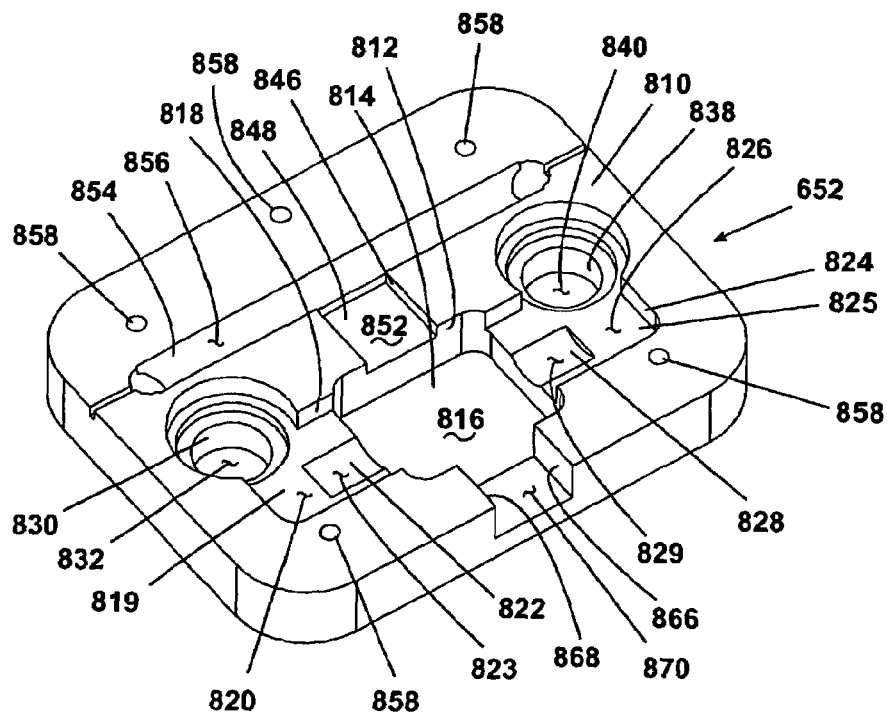
FIG. 50A is a close-up perspective view of the interior of the cover portion shown in FIG. 48.

As shown in FIGS. 50A and 50B, the cover portion 652 is a generally block-like body having a planar interior face 810. The cover portion 652 is provided with a motor assembly receptacle side wall 812 depending orthogonally from the face 810, which transitions to a motor assembly receptacle bottom wall 814 in spaced-apart, parallel juxtaposition to the interior face 810 to define a motor assembly receptacle 816 adapted for operable juxtaposition with the motor assembly receptacle 660. A first clutch/worm receptacle side wall 818 depends orthogonally from the interior face 810 and transitions to a first clutch/worm receptacle bottom wall 819 in parallel, spaced-apart juxtaposition with the interior face 810 to define a first clutch/worm receptacle 820 adapted for operable juxtaposition with the first clutch/worm receptacle 664. Depending orthogonally from the bottom wall 819 is a generally arcuate first clutch receptacle wall 822 which defines a first clutch receptacle 823 adapted for operable juxtaposition with the first clutch receptacle 667 of the base portion 650.

A second clutch/worm receptacle side wall 824 depends orthogonally from the interior face 810 and transitions to a second clutch/worm receptacle bottom wall 825 in parallel, spaced-apart juxtaposition with the interior face 810 to define a second clutch/worm receptacle 826 adapted for operable juxtaposition with the second clutch/worm receptacle 670 of the base portion 650. Depending orthogonally from the bottom wall 825 is a generally arcuate second clutch receptacle wall 828 which defines a second clutch receptacle 829 adapted for operable juxtaposition with the second clutch receptacle 673 of the base portion 650.

Depending orthogonally from the interior face 810 is a shift assembly slot side wall 846 which transitions to a shift assembly slot bottom wall 848 in parallel, spaced-apart juxtaposition with the interior face 810 to define a shift assembly slot 852.

Depending from the interior face 810 is a generally arcuate elongated memory element wall 854 which defines a memory element receptacle 856 adapted for operable juxtaposition with the memory element receptacle 700 of the base portion 650. The cover portion 652 is provided with at least one cover fastener aperture 858 extending therethrough adapted for axial alignment with a mating aperture 862 in the base portion 650. A cover fastener 860, such as a screw or bolt, is inserted into the cover fastener aperture 858 and threaded into the mating aperture 862 in the base portion 650 to secure the cover portion 652 to the base portion 650.

The cover portion 652 is provided with a first actuator aperture 832 extending therethrough and axially aligned with the first actuator receptacle 680 of the base portion 650. The cover portion 652 is also provided with a second actuator aperture 840 extending therethrough and axially aligned with the second actuator receptacle 688 of the base portion 650. The cover portion 652 is provided with an electrical lead slot 870 comprising an electrical lead slot side wall 266 depending orthogonally from the interior face 810, which transitions to an electrical lead slot bottom wall 868 in parallel, spaced-apart juxtaposition with the interior face 810 for extending electrical leads from the electric motor 720 to an external power supply. The cover portion 652 is provided with a conventional panel mount 872 for operable interconnection with the panel 620 in a generally conventional manner (FIG. 50B).

Figure 54:
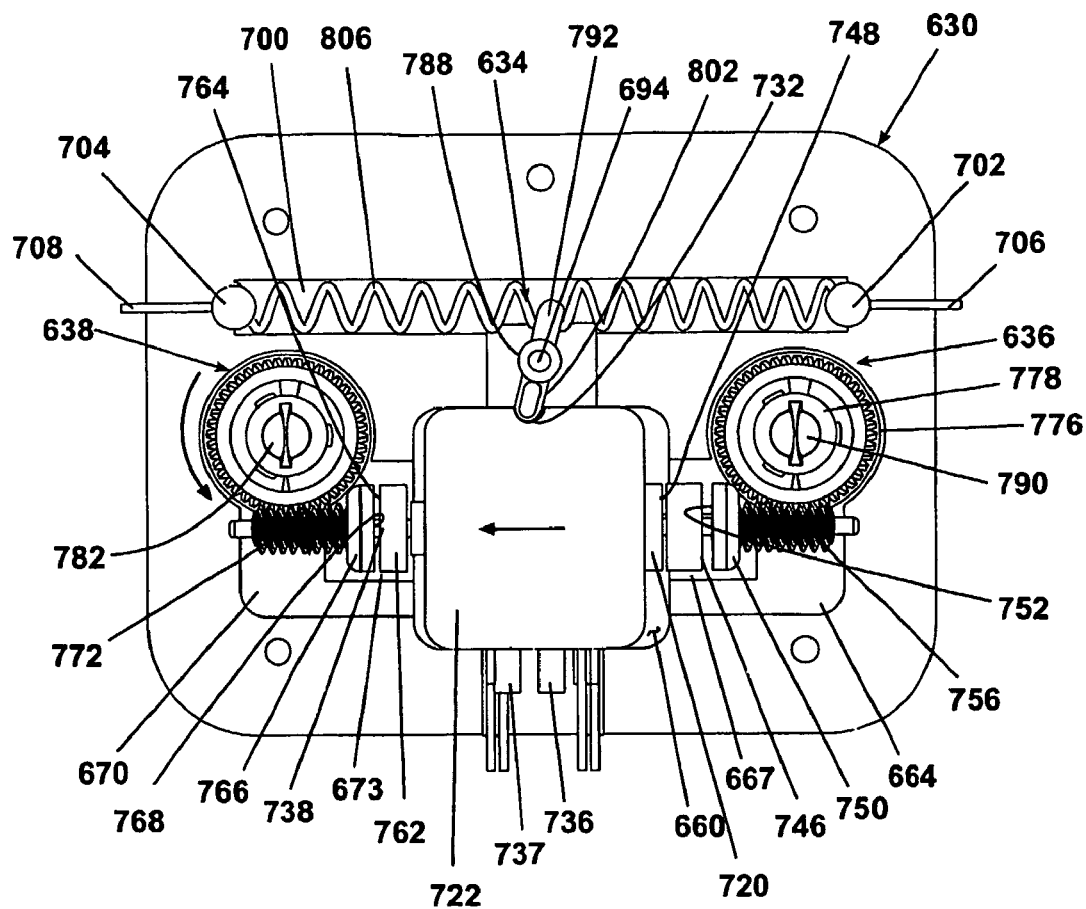
FIG. 54 is a plan view with the cover portion removed of the interior of the single motor tilt actuator assembly of FIG. 48 showing the motor assembly in a second operable position for tilting the reflective element in a second direction.

Referring to FIGS. 53 and 54, the single motor tilt actuator assembly 616 is assembled by placing the motor 720 in the motor casing 722 and inserting the first drive clutch assembly 744 over the first shaft portion 740 and the second drive clutch assembly 760 over the second shaft portion 742. This assembly is then inserted into the base portion 650 with a motor casing 722 slidably received in the motor assembly receptacle 660, the first drive clutch assembly 744 received in the first clutch/worm receptacle 664 and the second drive clutch assembly 760 received in the second clutch/worm receptacle 670. The motor casing 722 can slidably translate along the motor assembly receptacle 660. The driven elements 750, 766 will be received in the receptacles 667, 673 and prevented thereby from translating longitudinally, but will rotate freely relative to the shaft portions 740, 742.

The pivot assembly 634 is assembled by inserting the pivot bearing 698 over the pivot shaft 694 so that the translating arm 802 operably communicates with the slot 732 to translate the motor casing 722 along the motor assembly receptacle 660 when the pivot assembly 634 pivots about the shaft 694. The actuators 636, 638 are inserted into the actuator receptacles 680, 688, respectively, (FIG. 49) for operable communication of the first actuator gear 776 with the worm gear 756 and the second actuator gear 784 with the worm gear 772. As so assembled, rotation of the first driven element 750 and the worm gear 756 will urge the rotation of the first actuator gear 776 and the first actuator 636. Similarly, rotation of the second driven element 766 and the worm gear 772 will urge the rotation of the second actuator gear 784 and the second actuator 638. The rotation of the actuators 636, 638 will result in the horizontal and vertical tilting of the mounting panel 620 and, thus, the horizontal and vertical adjustment of the reflective element 622 of the rearview mirror assembly 10.

As shown in FIG. 53, the memory element 806 is fixedly attached to the memory element arm 792 so that an approximately equal length of the memory element 806 extends to either side of the memory element arm 792. A first end of the memory element 806 fixedly attached to the first electrical lead 802, and a second end of the memory element 806 is fixedly attached to the second electrical lead 806. As so assembled, the memory element 804 will be suspended between the electrical leads 702, 704 and the memory element arm 792.

Referring now to FIGS. 53A, 53B, 54A, and 54B, the electrical circuitry for operation of the actuator assembly 616 is shown. A first fixed lead 880 is a generally plate-like member fixedly retained in the base portion 650 and extending outwardly therefrom. A second fixed lead 882 to is a generally plate-like member fixedly retained in the base portion 650 and extending outwardly therefrom in parallel, spaced-apart juxtaposition with the first fixed lead 880. The first fixed lead 880 is provided with a first contact point 888 extending laterally outwardly of the plane of the first fixed lead 880. The second fixed lead 882 is provided with a second contact point 890 extending laterally outwardly of the plane of the second fixed lead 882. A first movable lead 884 is a generally plate-like member fixedly retained in cantilever fashion in the base portion 650 and extending outwardly therefrom in parallel, spaced-apart juxtaposition to the first fixed lead 880. The first movable lead 884 is adapted for flexure away from the first fixed lead 880 in response to the application of a force to the cantilever portion, and to contact the first contact point 888 in the absence of the application of such a force. A second movable lead 886 is a generally plate-like member fixedly retained in the cantilever fashion in the base portion 650 and extending outwardly therefrom in parallel, spaced-apart juxtaposition to the second fixed lead 882. The second movable lead 886 is adapted for flexure away from the second fixed lead 882 in response to the application of a force to the cantilever portion, and to contact the second contact point 890 in the absence of the application of such a force.

The first fixed lead 880 is electrically connected by a first positive power lead 892 to a controller 902 of a generally conventional type well-known in the industry for selectively delivering electrical current to one of several recipients which is, in turn, electrically connected to the vehicle power supply 894. The second fixed lead 882 is electrically connected by a second positive power lead 893 to the controller 902 which is, in turn, electrically connected to the vehicle power supply 894. A negative power lead 896 electrically connects the vehicle power supply 894 to the pivot assembly 634 for completion of an electrical circuit as hereinafter described. A first power lead 898 electrically connects the second movable lead 886 to the first tab 706. A second power lead 900 electrically connects the first movable lead 884 to the second tab 706. With the first contact point 888 contacting the first movable lead 884, a closed electrical circuit will be created comprising the power source 894, the controller 902, the first positive power lead 892, the first fixed lead 880, the first movable lead 884, the second power lead 900, the second tab 708, the second electrical lead 704, the memory element 806, the pivot assembly 634, and the negative power lead 896. Similarly, with the second contact 890 contacting the second movable lead 886, a closed electrical circuit will be created comprising the power source 894, the controller 902, the second positive power lead 893, the second fixed lead 882, the second movable lead 886, the first power lead 898, the first tab 706, the first electrical lead 702, the memory element 806, the pivot assembly 634, and the negative power lead 896. Flexure of either the first movable lead 884 to interrupt the electrical connection with the first contact point 888, or the second movable lead 886 to interrupt the electrical connection with the second contact point 890 will break the respective circuit.

Figure 53A:
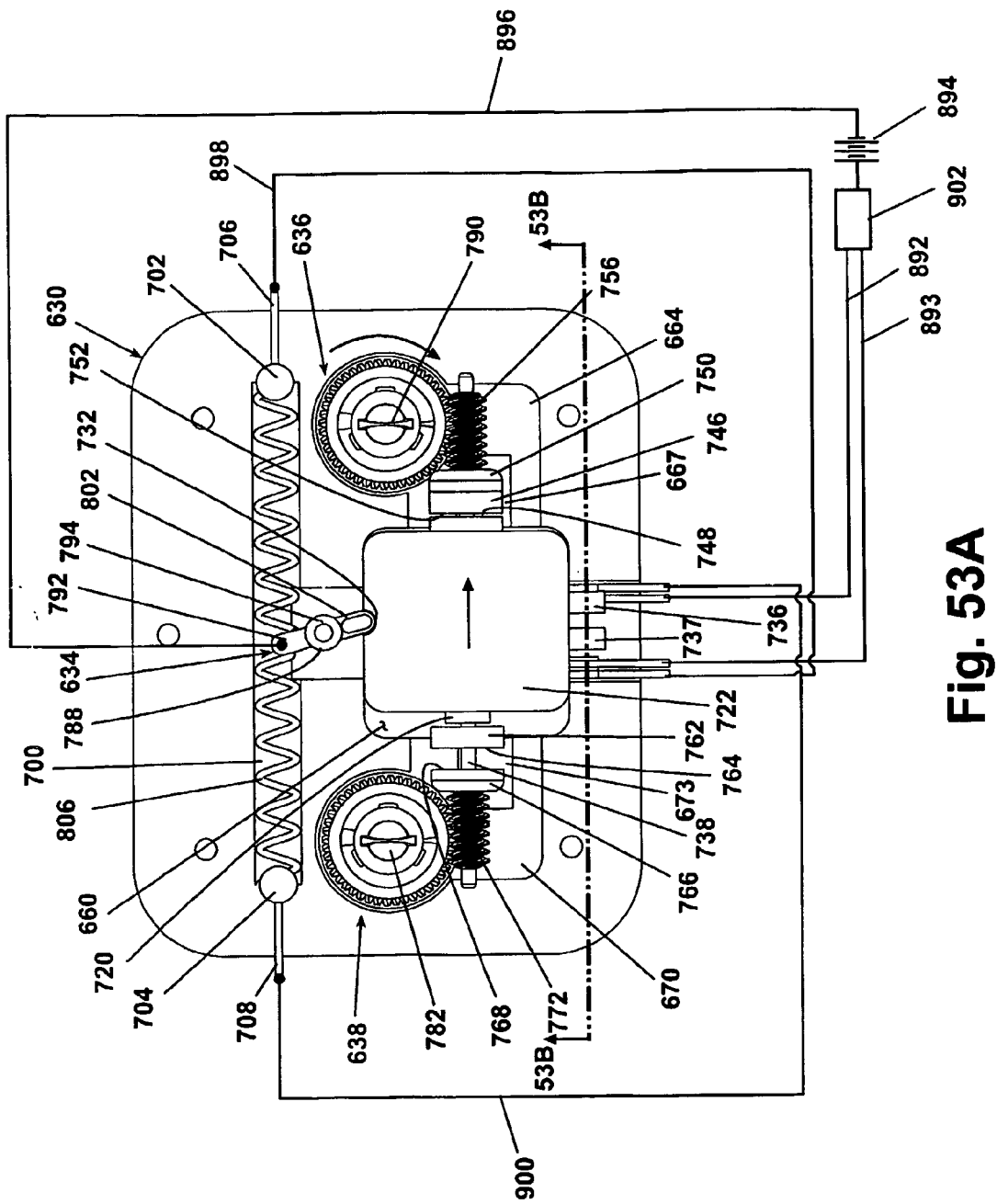
FIG. 53A is a plan view with the cover portion removed of the single motor tilt actuator assembly of FIG. 53 showing the configuration of electrical circuitry comprising a portion of the single motor tilt actuator assembly for tilting the reflective element in a first direction.
Figure 53B:
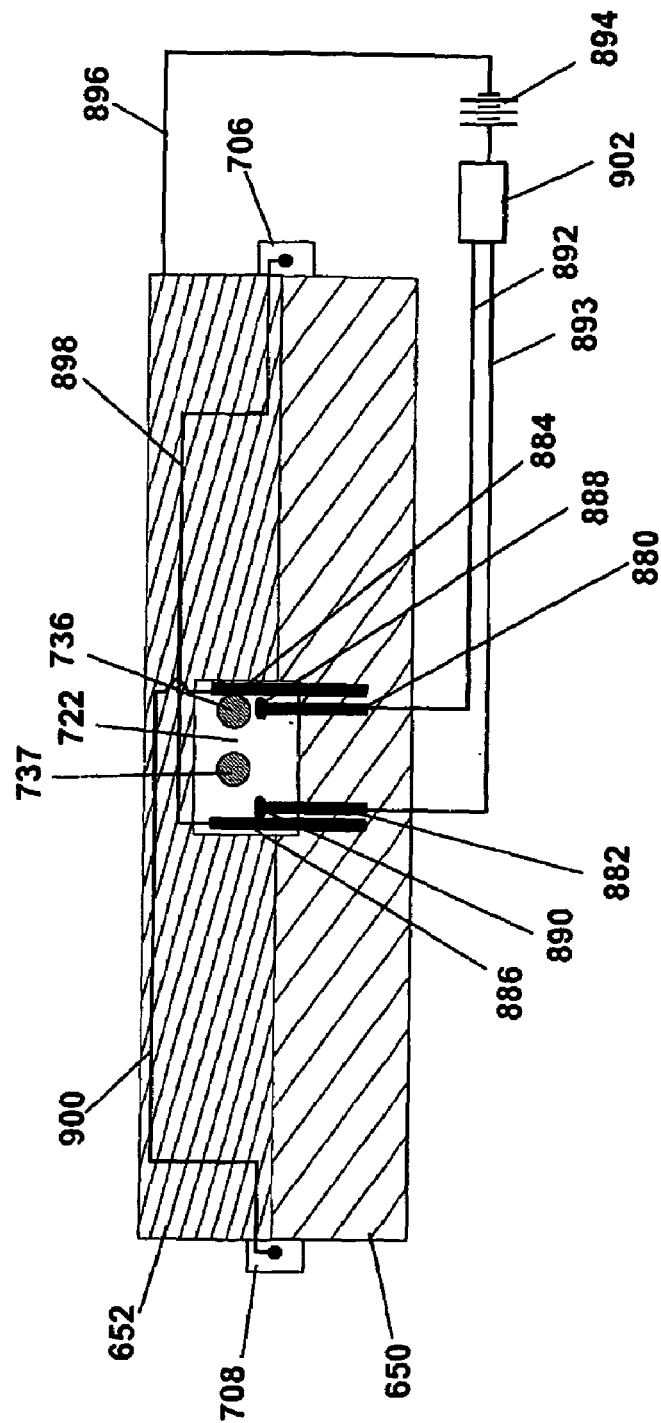
FIG. 53B is a sectional view of the single motor tilt actuator assembly with the cover portion attached to the base portion taken generally along line 53B-53B of FIG. 53A.

The operation of the actuator assembly 616 is based upon the energizing and de-energizing of one of the two above-described circuits. Referring to FIGS. 53, 53A, and 53B, it will be assumed, for illustrative purposes, that the vehicle operator has selected the activation of the first actuator 636 for movement of the reflective element 622. The controller 902 delivers current from the power source 894 to the first fixed lead 880. Current flows through the first contact point 888 to the first movable lead 884, from the first movable lead 884 through the second power lead 900 to the second tab 708 and the second electrical lead 704 into the memory element 806. The flow of current from the second electrical lead 704 into the pivot assembly 634 and the negative power lead 896 through the memory element 806 causes that portion of the memory element 806 suspended between the second electrical lead 704 and the pivot assembly 634 to contract. This contraction pivots the pivot assembly 634 in a counterclockwise direction, pivoting the memory element arm 792 toward the second electrical lead 704 as shown in FIG. 53A, thereby moving the motor casing 722 and motor 720 toward the first actuator 636 to urge the first drive element face 748 against the first driven element face 752. The rotation of the drive element face 748 will thus urge the rotation of the driven element face 752, which will urge the rotation of the worm gear 756 and the first actuator 636. At the same time, the first contact post 736 will be urged into contact with the first movable lead 884. As the motor casing 722 continues its movement toward the first actuator 636, the movable lead 884 will be bent away from the first contact point 888, thereby interrupting the electrical circuit providing current to the memory element 806. With the electrical circuit interrupted, the memory element 806 will return to a relaxed state, with the motor 720 remaining in operable communication with the first actuator 636.

Figure 54A:
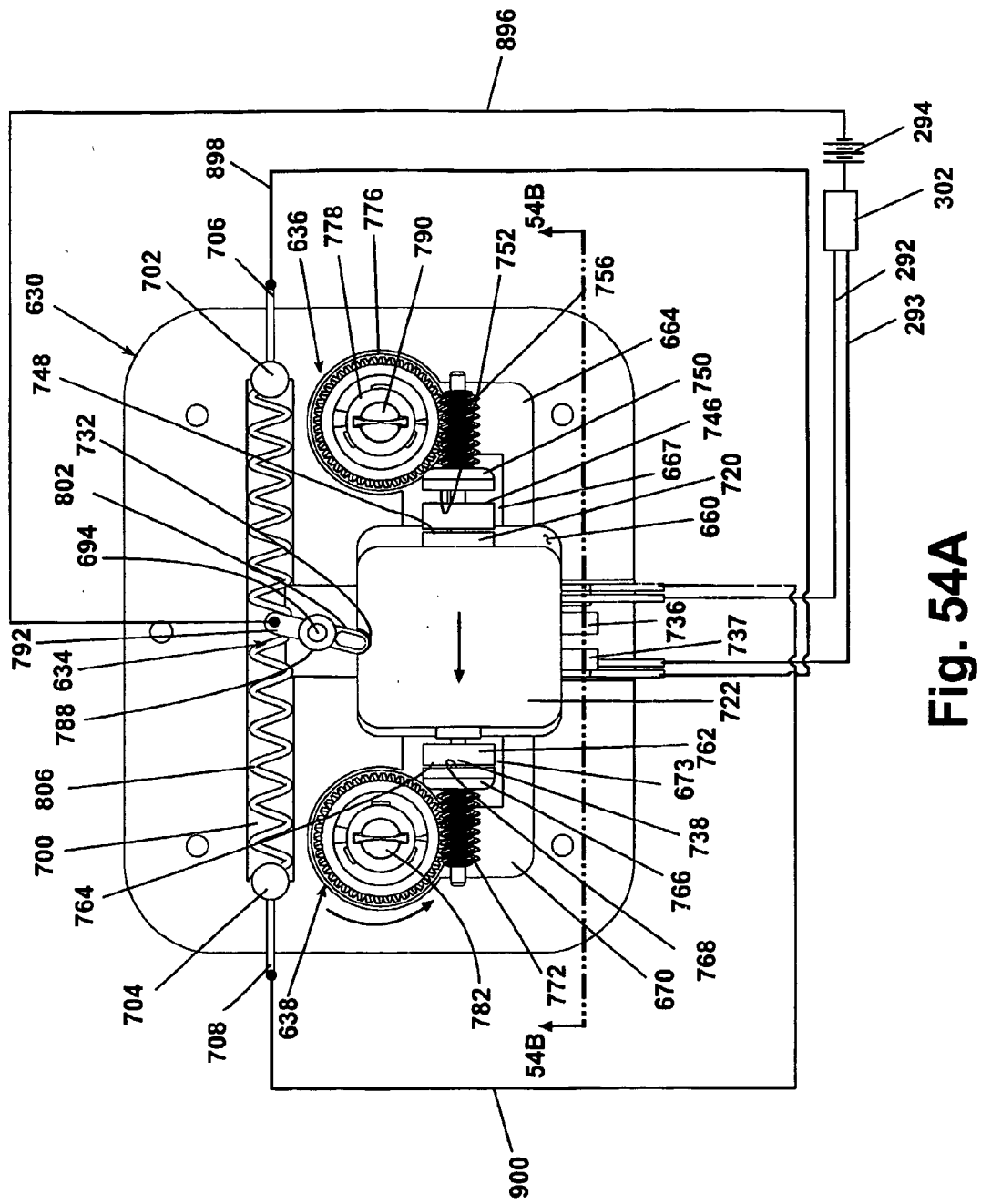
FIG. 54A is a plan view with the cover portion removed of the single motor tilt actuator assembly of FIG. 54 showing the configuration of electrical circuitry comprising a portion of the single motor tilt actuator assembly for tilting the reflective element in a second direction.
Figure 54B:
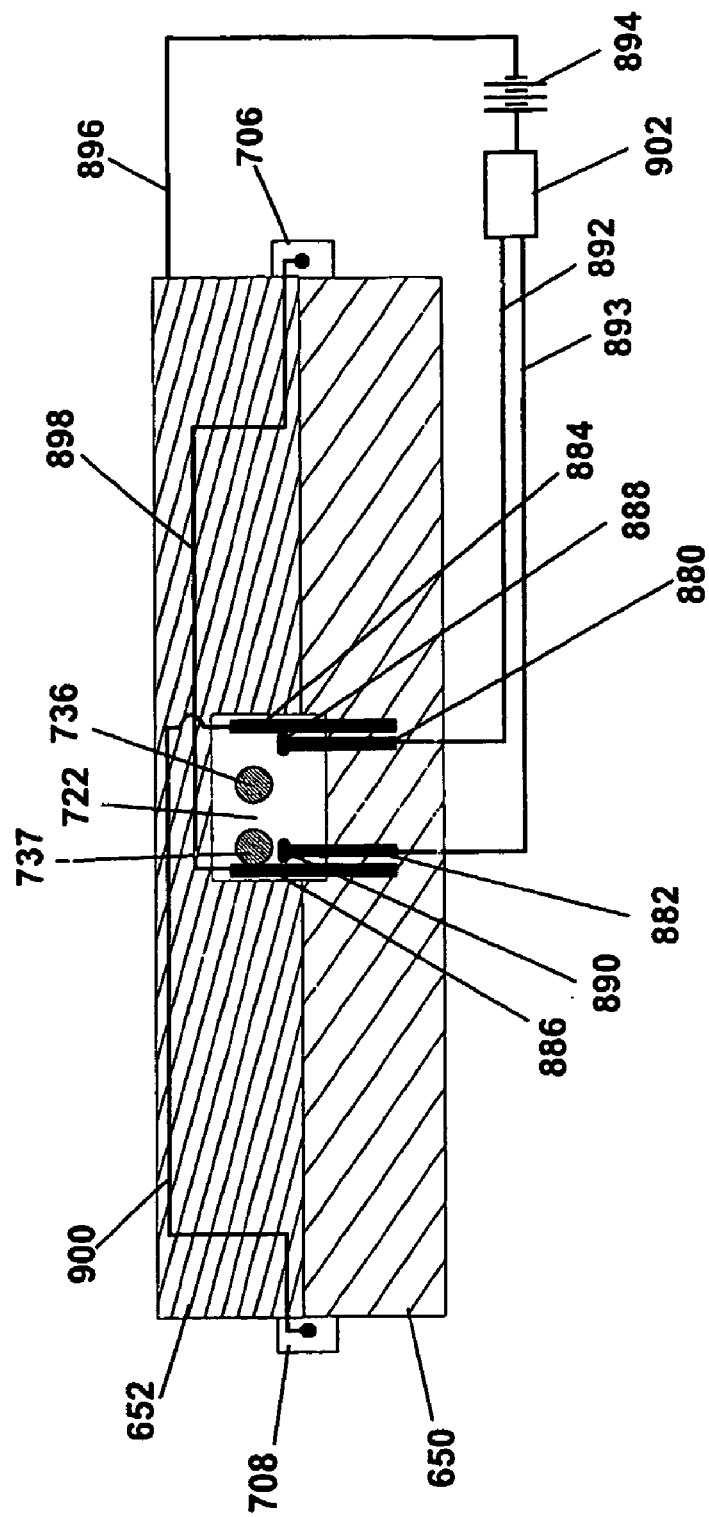
FIG. 54B is a sectional view of the single motor tilt actuator assembly with the cover portion attached to the base portion taken generally along line 54B-54B of FIG. 54A.

To actuate the second actuator 638, the controller 902 will be activated to deliver current from the power source 894 to the second fixed lead 882. As shown in FIGS. 54, 54A, and 54B, current flows through the second contact point 890 to the second movable lead 886, from the second movable lead 886 through the first power lead 898 to the first tab 706 and the first electrical lead 702 into the memory element 806. The flow of current from the first electrical lead 702 into the pivot assembly 634 and the negative power lead 896 through the memory element 806 causes that portion of the memory element 806 suspended between the first electrical lead 702 and the pivot assembly 634 to contract. This contraction pivots the pivot assembly 634 in a clockwise direction, pivoting the memory element arm 792 toward the first electrical lead 702 as shown in FIG. 53A, thereby moving the motor casing 722 and motor 720 toward the second actuator 638 to urge the second drive element face 764 against the second driven element face 768, which will urge the rotation of the worm gear 772 and the second actuator 638. At the same time, the second contact post 737 will be urged into contact with the second movable lead 886. As the motor casing 722 continues its movement toward the second actuator 638, the movable lead 886 will be bent away from the first contact point 898, thereby interrupting the electrical circuit providing current to the memory element 806. With the electrical circuit interrupted, the memory element 806 will return to a relaxed state, with the motor 720 remaining in operable communication with the second actuator 638. Continued operation of the motor 720 and the selected actuator 636, 638 will result in continued horizontal or vertical tilting of the reflective element 622 until the desired orientation is obtained and the current to the motor 720 is terminated by the vehicle operator.

Figure 56:
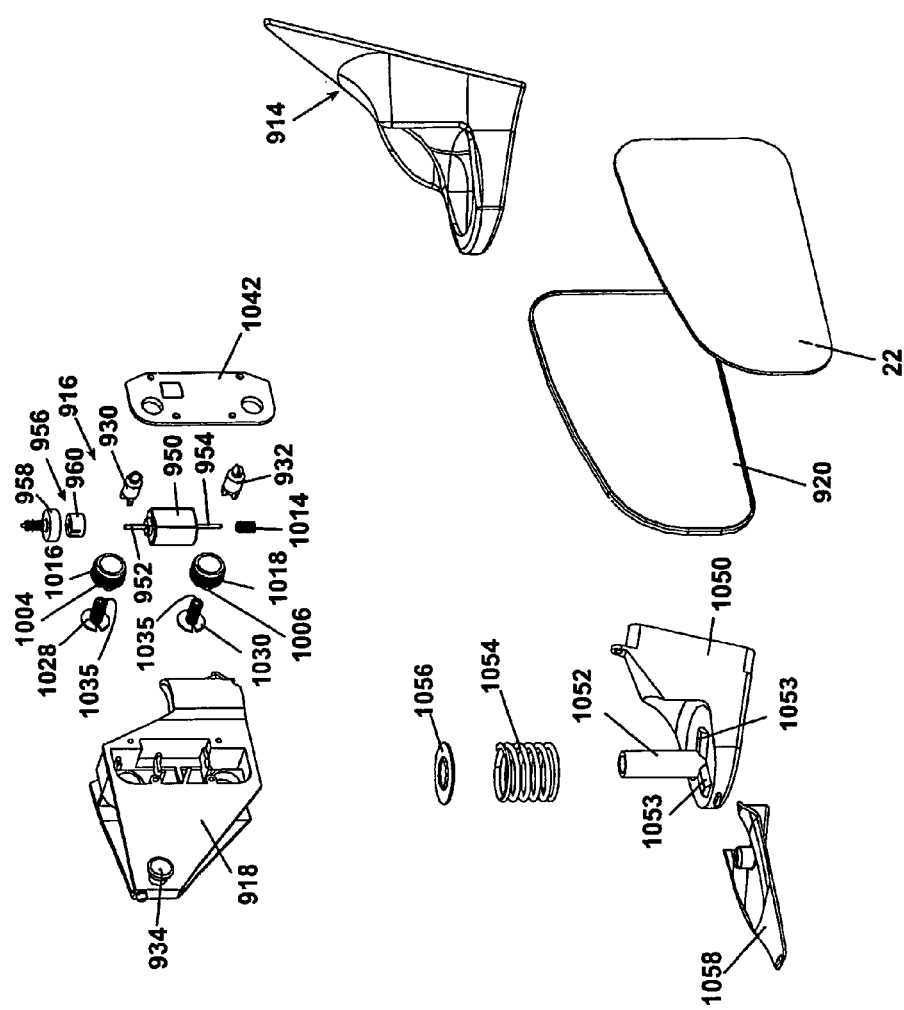
FIG. 56 is an exploded view of a fifth embodiment of the mirror assembly of FIG. 1, the mirror assembly including a tilt actuator.

As shown in FIG. 56, a fifth embodiment of the rearview mirror assembly 10 comprises a tilt actuator assembly 916, a mounting panel 920, a reflective element or mirror 22, and a shell bracket 18 for mounting the tilt actuator assembly 916 as hereinafter described.

Figure 57:
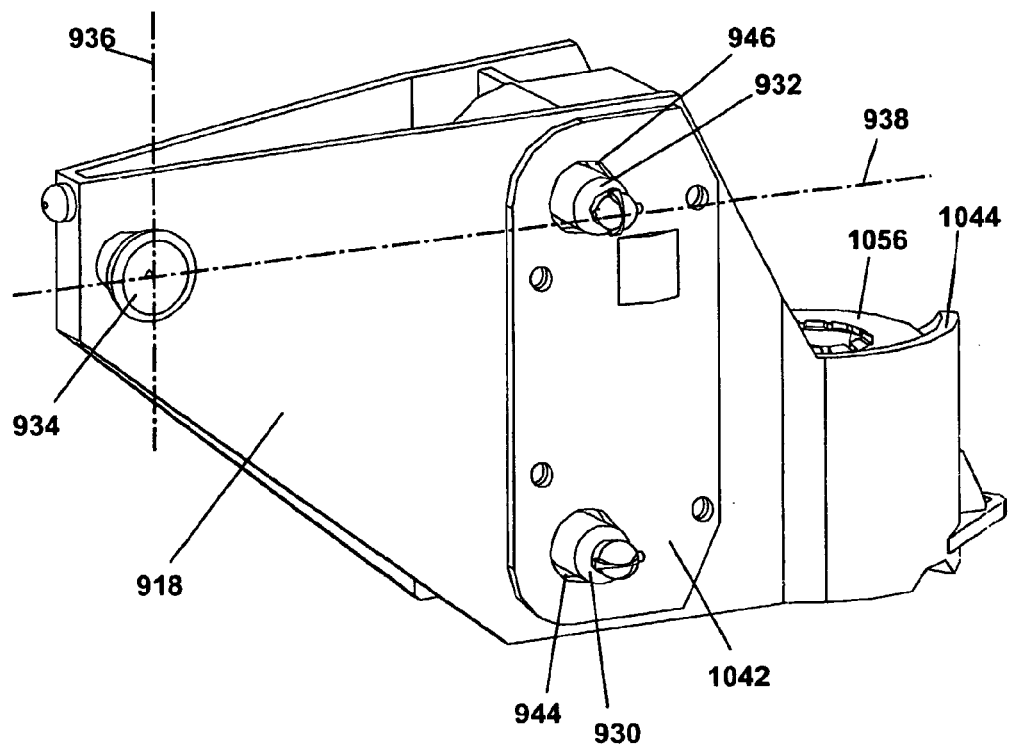
FIG. 57 is a perspective view of the tilt actuator shown in FIG. 56.
Figure 58:
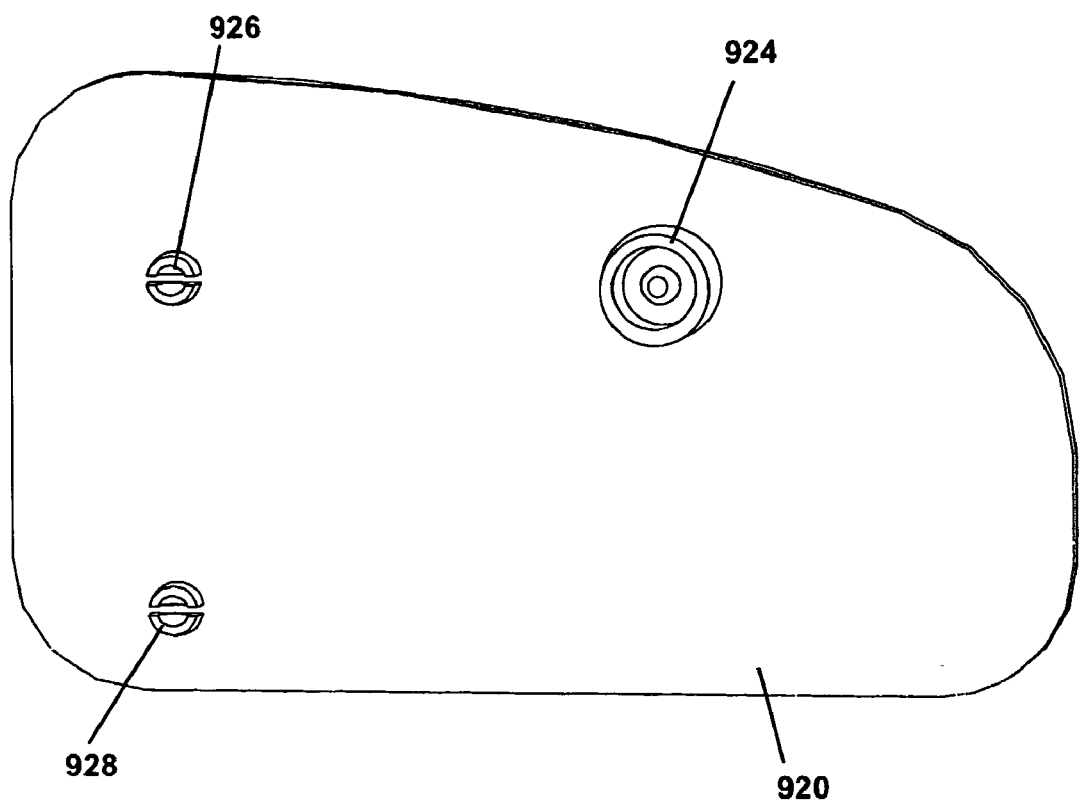
FIG. 58 is a perspective view of a first embodiment of a mirror panel comprising a portion of the assembly shown in FIG. 56.

As shown in FIGS. 56 and 57, the mounting panel 920 is a platelike body having a somewhat cylindrical pivot mount receptacle 924, a high-speed actuator spindle mount 926, and a low-speed actuator spindle mount 928 in spaced apart juxtaposition. The pivot mount receptacle 924 is adapted for snap fit receipt of a panel pivot mount 934 as hereinafter described. The spindle mounts 926, 928 are adapted for snap-fit receipt of universal pivot heads 944, 946, respectively, comprising a part of a high-speed actuator spindle 930 and a low-speed actuator spindle 932, respectively, as hereinafter described. The mounting panel 920 fixedly mounts the reflective element 22 thereby enabling the reflective element 22 to tilt vertically and horizontally with the tilting of the panel 920, thus adjusting the driver's field of view. The tilt actuator assembly 916, the panel 920, and the reflective element 22, are encased within the housing 14 in a generally conventional manner to comprise the mirror assembly 10.

The tilt actuator assembly 916 is shown in FIGS. 56-61 and 63-64, and comprises a motor 950, a high-speed actuator spindle 930, a low-speed actuator spindle 932, a clutch assembly 956 comprising a drum assembly 958 and a clutch wheel assembly 960, and operably interconnected gears and spindles as hereinafter described. The motor 950, the actuator spindles 930, 932, the clutch assembly 956, and the gears and spindles are enclosed within a tilt actuator receptacle 1040 in the shell bracket 918. These components can alternatively be mounted into a receptacle molded into the housing 14, or another structure capable of securing each component in operable interconnection for operation of the rearview mirror assembly 10 as hereinafter described.

The motor 950 is preferably a generally conventional variable-speed 12-volt DC electric motor having sufficient power for operation of the mirror assembly 10 as described herein. The motor 950 is connected to the vehicle electrical system through a conventional controller (not shown) that can provide electrical power in selected voltages for operating the motor 950 at correspondingly selected speeds. For example, such a controller can selectively switch between either of two circuits, a first circuit for low speed operation and a second circuit for high-speed operation, providing current to the motor 950. The voltage in the low speed circuit can be selectively reduced by inserting a resistor in the low speed circuit in series between the power supply and the motor 950; the reduced voltage results in the lower angular velocity of the motor 950.

Figure 59:
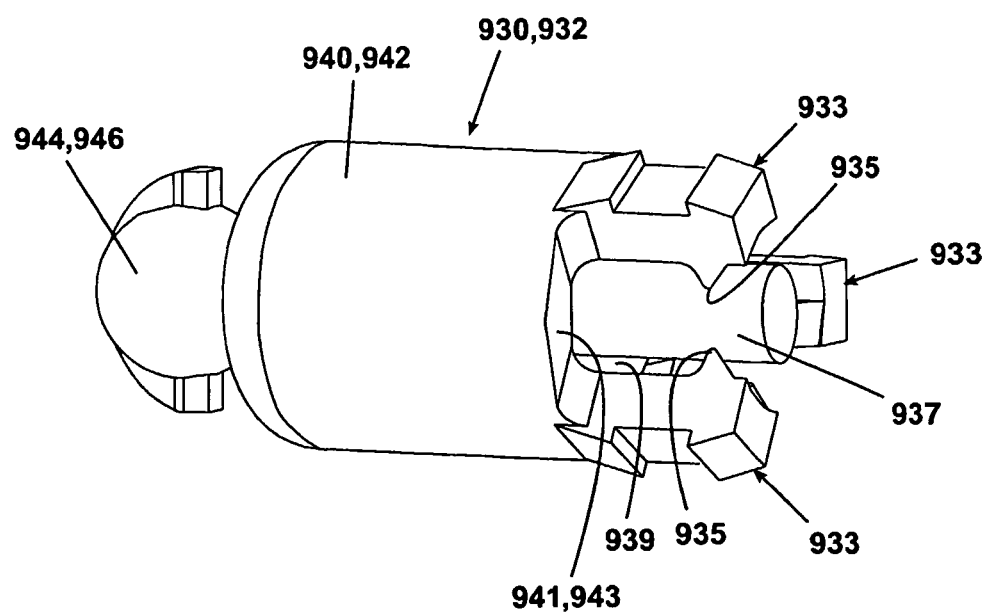
FIG. 59 is a close-up perspective view of an actuator spindle comprising a portion of the tilt actuator shown in FIG. 56.

Referring to FIG. 59, the high-speed actuator spindle 930 is an elongated, generally cylindrical body comprising a universal pivot head 944 at a distal end thereof, an annular spindle wall 941 having an exterior smooth shaft 940 at an intermediate portion of the spindle 930, and a plurality of fingers 933 extending longitudinally at a proximal end thereof. Each finger 933 is provided with a radially directed tooth 935 extending toward the center axis of the spindle 930. A central shaft 937 extends coaxially into the spindle 93C from the proximal end of the spindle 930 to the universal pivot head 944 to form an annulus 939 between the shaft 937 and the spindle wall 941. The low-speed actuator spindle 932 is identical to the high-speed actuator spindle 930, and is an elongated, generally cylindrical body comprising a universal pivot head 946 at a distal end thereof, an annular spindle wall 943 having an exterior smooth shaft 942 at an intermediate portion of the spindle 932, and a plurality of fingers 933 extending longitudinally at a proximal end thereof. Each finger 933 is provided with a radially directed tooth 935 extending toward the center axis of the spindle 930. A central shaft 937 extends coaxially into the spindle 932 from the proximal end of the spindle 932 to the universal pivot head 946 to form an annulus 939 between the shaft 937 and the spindle wall 943. The universal pivot heads 944, 946 are adapted for pivotable snap-fit mounting to the panel 920 through the spindle mounts 926, 928, respectively. The pivot heads 944, 946 are adapted to matingly communicate with the spindle mounts 926, 928, respectively, to prevent the pivot heads 944, 946 from rotating about the longitudinal axes of the spindles 930, 932, but enable the panel 920 to pivot horizontally and vertically relative to the pivot heads 944, 946.

A high-speed output gear 1016 comprises a generally cylindrical sleeve-like body having a high-speed actuator shaft aperture 1024 extending longitudinally through the center thereof, a cylindrical exterior threaded portion 1020 extending around the periphery of the output gear 1016, and a plurality of posts 1004 extending longitudinally from a distal end thereof. The high-speed actuator shaft aperture 1024 is adapted for slidable communication with the threaded shaft 940. A low-speed output gear 1018 is identical to the high-speed output gear 1016 and comprises a generally cylindrical sleeve-like body having a low-speed actuator shaft aperture 1026 extending longitudinally through the center thereof, a cylindrical exterior threaded portion 1022 extending around the periphery of the output gear 1018, and a plurality of posts 1006 extending longitudinally from a distal end thereof. The low-speed actuator shaft aperture 1026 is adapted for slidable communication with the threaded shaft 942.

A high-speed spindle driver 1028 comprises a generally elongated, cylindrical body comprising an annular threaded shaft 1032 adapted for threadable communication with the teeth 935 of the high-speed actuator spindle 930. A circular flange 1036 is rigidly connected in coaxial alignment with and orthogonal to the shaft 1032 at a distal end thereof. A low-speed spindle driver 1030 comprises a generally elongated, cylindrical body comprising an annular threaded shaft 1034 adapted for threadable communication with the low-speed actuator spindle 932. A circular flange 1038 is rigidly connected in coaxial alignment with and orthogonal to the shaft 1034 at a distal end thereof. The flanges 1036, 1038 are provided with a plurality of slots 1046, 1048, respectively, adapted for operable communication with the posts 1004, 1006, respectively.

The high-speed output gear 1016 is inserted over the high-speed spindle driver 1028 so that the posts 1004 are slidably retained in the slots 1046. The high-speed actuator spindle 930 is threaded over the threaded shaft 1032 by threadably engaging the teeth 935 with the threads of the threaded shaft 1032. The threaded shaft 1032 is slidably inserted over the shaft 937 to occupy the annulus 939. Rotation of the high-speed output gear 1016 will urge the rotation of the high-speed spindle driver 1028, which will, in turn, urge linear movement of the high-speed actuator spindle 930 along the threaded shaft 1032. Similarly, the low-speed output gear 1018 is inserted over the low-speed spindle driver 1030 so that the posts 1006 are slidably retained in the slots 1048. The low-speed actuator spindle 932 is threaded over the threaded shaft 1034 by threadably engaging the teeth 935 with the threads of the threaded shaft 1034. The threaded shaft 1034 is slidably inserted over the shaft 937 to occupy the annulus 939. Rotation of the low-speed output gear 1018 will urge the rotation of the low-speed spindle driver 1030, which will, in turn, urge linear movement of the low-speed actuator spindle 932 along the threaded shaft 1034. The assembly comprising the high-speed actuator spindle 930, the high-speed spindle driver 1028, and the high-speed output gear 1016 is rotatably received in a high-speed spindle driver well 1041 formed in the shell bracket 918, shown in FIGS. 63 and 64. The assembly comprising the low-speed actuator spindle 932, the low-speed spindle driver 1030, and the low-speed output gear 1018 is rotatably received in a low-speed spindle driver well 1043 formed in the shell bracket 918, shown in FIGS. 63 and 64.

The motor 950 is preferably electrically powered and comprises a high-speed shaft 952 and a low-speed shaft 954. The motor is suitably held in the shell bracket 918 for operable communication of the high speed shaft 952 with the high-speed output gear 1016 and the low-speed shaft 954 with the low-speed output gear 1018. A low-speed worm gear 1014 is frictionally and coaxially retained on the low-speed shaft 954, and operably communicates with the low-speed output gear 1018 so that rotation of the low-speed worm gear 1014 will urge lie rotation of the low-speed output gear 1018.

Figure 61:
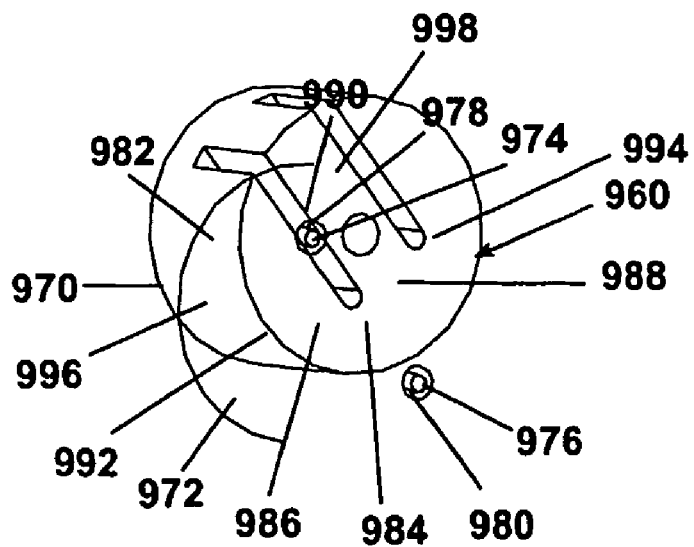
FIG. 61 is a close-up perspective view of a clutch wheel assembly comprising a component of the tilt actuator shown in FIG. 56.

The clutch wheel assembly 960 is shown in FIGS. 57 and 61. The clutch wheel assembly 960 comprises a circular plate 970 and an elastomeric body 972. The circular plate 970 comprises a circular, thin plate-like body having a center axle aperture (not shown) extending therethrough and a plate surface 982. Posts 974, 976 extend orthogonally from the plate surface 982 in radial, spaced-apart juxtaposition. The elastomeric body 972 comprises a cylindrical body having a center axle aperture 984 extending therethrough and post apertures 978, 980 extending therethrough for frictional receipt of the posts 974, 976, respectively. A first slot 986 extends through the elastomeric body 972 partially along a chord of the elastomeric body 972 to form a first wing portion 992 having a first wing face 996. A second slot 988 extends through the elastomeric body 972 partially along a chord of the elastomeric body 972 to form a second wing portion 994 having a second wing face 998. The first slot 986 is in parallel, spaced-apart juxtaposition with the second slot 988, to form a center block 990 having the post aperture 978 and the axle aperture 984 therein. The elastomeric body 972 is mounted to the circular plate 970 by insertion of the posts 974, 976 into the post apertures 978, 980, respectively. The connection of the center block 990, the first wing portion 992, and the second wing portion 994 forms a hinge 1000 which enables the first wing portion 992 and the second wing portion 994 to translate centrifugally outwardly in slidable movement relative to the plate surface 982.

Figure 60:
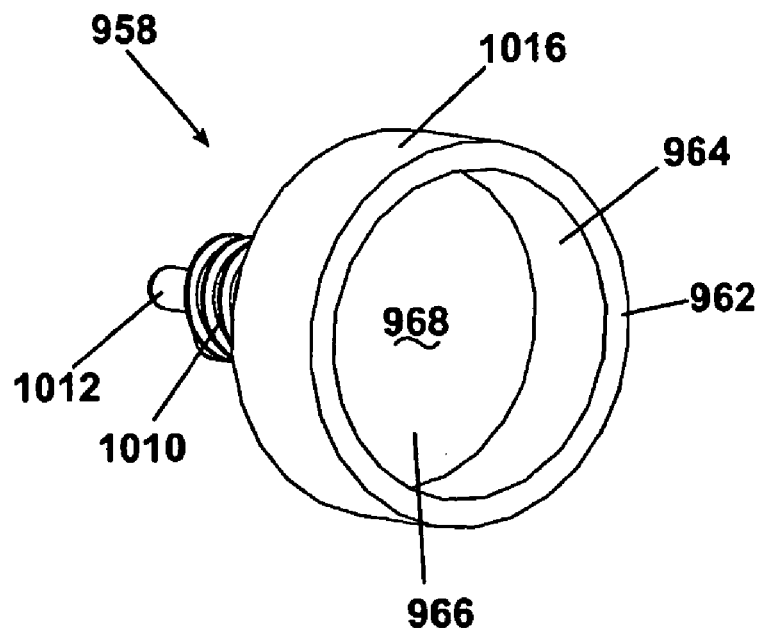
FIG. 60 is a close-up perspective view of a drum assembly comprising a component of the tilt actuator shown in FIG. 56.

Referring now to FIGS. 57 and 60, the drum assembly 958 comprises an annular drum wall 962 terminating in a circular wall 966 rigidly connected to the high-speed worm gear 1018 and a drum axle 1012 extending coaxially from the circular wall 966. The annular drum wall 962 has an inner surface 964 and defines a cavity 968. The elastomeric body 972 is adapted for slidable insertion into the cavity 968 so that the wing faces 996, 998 slidably communicate with the inner surface 964. At low angular velocities, the elastomeric body 972 will rotate within the cavity 968 with the wing faces 996, 998 in slidable contact with the inner surface 964. At high angular velocities, the wing portions 992, 994 will be urged outwardly so that the wing faces 996, 998 will be in frictional communication with the inner surface 964, thus urging the rotation of the drum assembly 958 with rotation of the elastomeric body 972. The elastomeric body 972 is frictionally and coaxially attached to the high-speed shaft 952 for rotation of the elastomeric body 972 with rotation of the high-speed shaft 952. The drum axle 1012 is journaled into a suitable bearing (not shown) in the tilt actuator receptacle 1040 for operable communication of the high-speed worm gear 1010 with the high-speed output gear 1016 so that rotation of the high-speed worm gear 1010 will urge rotation of the high-speed output gear 1016.

A plate-like cover plate 1042 is adapted to seal the tilt actuator receptacle 1040 and is provided with a high-speed actuator spindle aperture 1060 and a low-speed actuator spindle aperture 1062 for insertion of the high-speed actuator spindle 930 and the low-speed actuator spindle 932, respectively, therethrough. The cover plate 1042 is mounted to the shell bracket 918 using suitable fasteners, such as screws, or a snap-fit assembly, with an appropriate weathertight seal, such as a cover gasket, thereby forming a weathertight enclosure for the motor 950 and operable components of the tilt actuator assembly 916.

Figure 63:
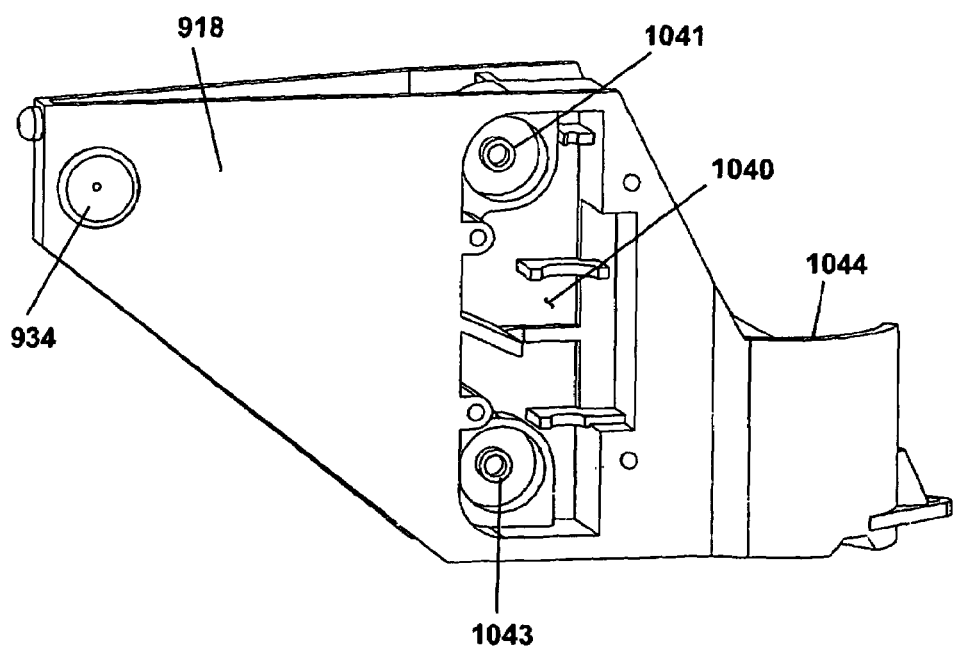
FIG. 63 is a close-up perspective view of a shell bracket comprising a component of the tilt actuator shown in FIG. 56.
Figure 64:
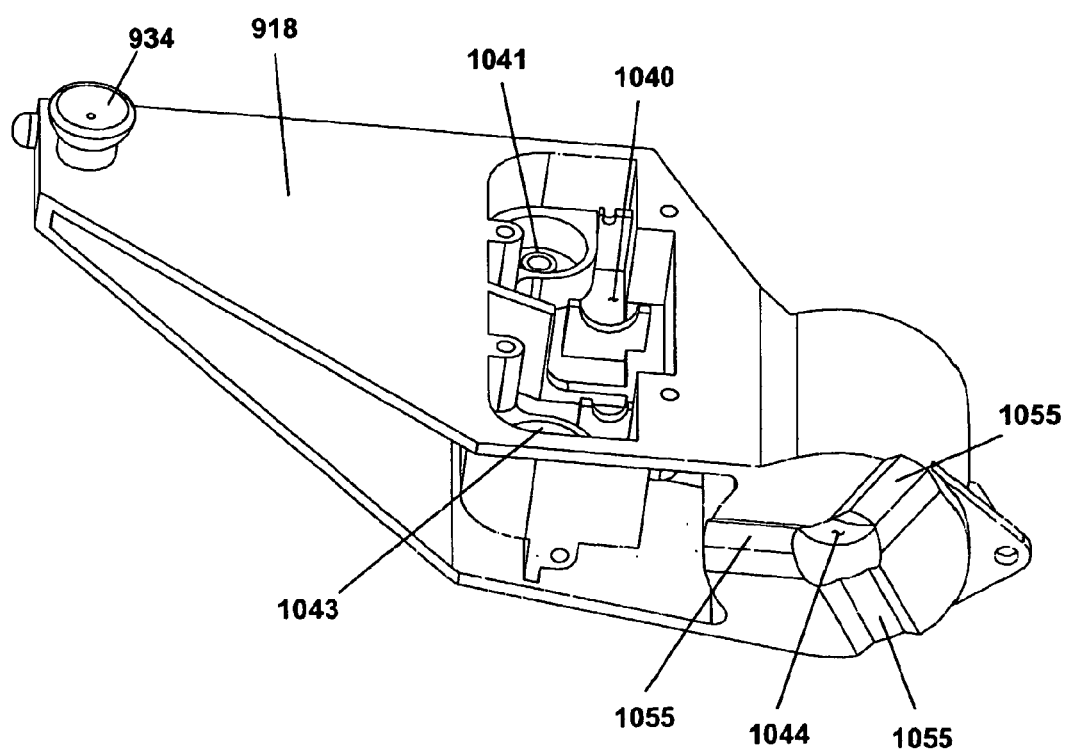
FIG. 64 is a close-up perspective view of the underside of the shell bracket shown in FIG. 63.

As shown in FIGS. 57, 63, and 64, the shell bracket 918 comprises an irregularly shaped body having the panel pivot mount 934 at a first end, a pivot post chamber 1044 at a second end and the tilt actuator receptacle 1040 intermediate the first and second ends. A conventional antirotation assembly (not shown) well-known in the industry is also provided to prevent rotation of the panel 920 about an axis extending through the panel pivot mount 934 orthogonal to the plane of the panel 920 while allowing vertical and horizontal tilting of the panel 920 as herein described. The pivot post chamber 1044 at a lower portion thereof terminates in a bottom wall having a plurality of ratchet tooth slots 1055, shown in FIG. 64 as numbering three. A pivot post bracket 1050 is an irregularly shaped body comprising a pivot post 1052 and a plurality of ratchet teeth 1053, shown in FIG. 57 as numbering three. The pivot post 1052 is adapted to be inserted into the pivot post chamber 1044 for pivotable rotation of the shell bracket 918 relative to the pivot post bracket 1050. A spring 1054 is inserted into the pivot post chamber 1044 over the pivot post 1052 and retained around the pivot post 1052 by a washer-like retainer 1056 inserted over the pivot post 1052 and frictionally retained thereon, similar to a compression nut mechanism. The shell bracket 918 can be pivoted relative to the pivot post bracket 1050 with the engagement of the ratchet teeth 1053 in the ratchet tooth slots 1055 retaining the shell bracket 918 in selected positions. Compression of the spring 1054 will occur during translation of the ratchet teeth 1053 relative to the ratchet tooth slots 1055, and will tend to retain the ratchet teeth 1053 in the ratchet tooth slots 1055 in the absence of any pivotal force on the shell bracket 918.

Figure 62:
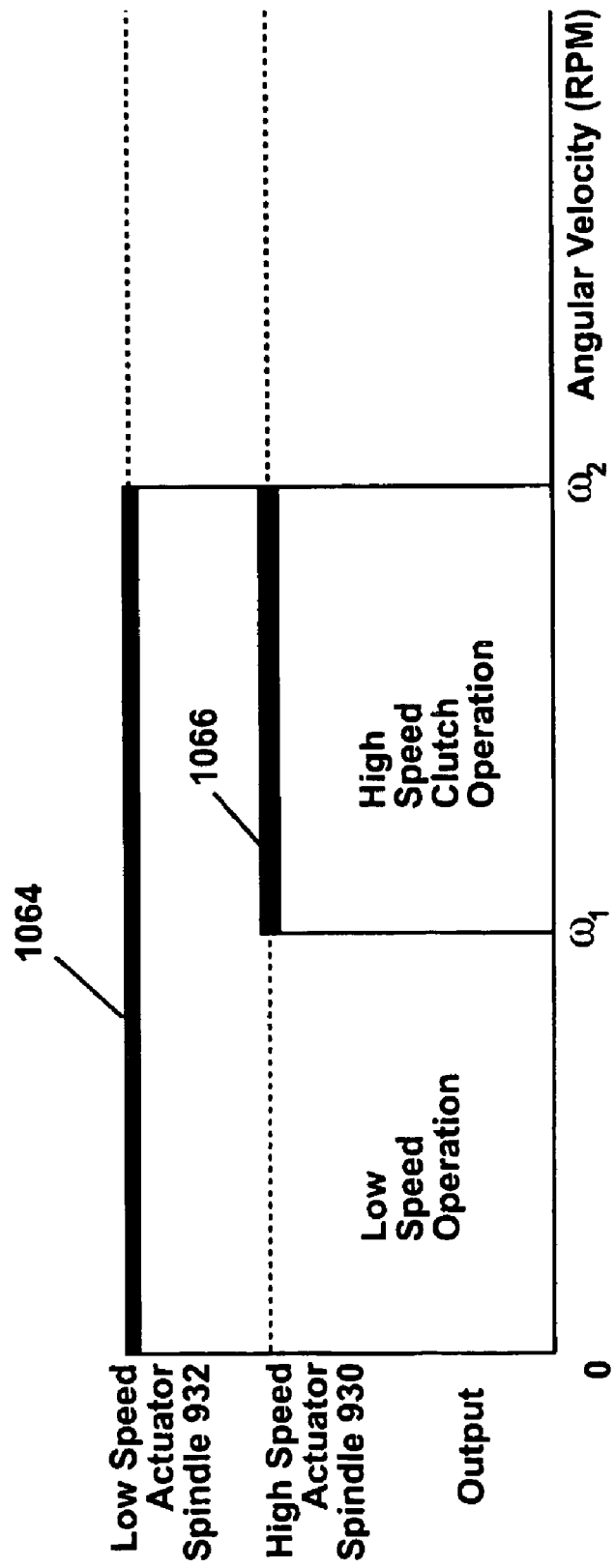
FIG. 62 is a graph depicting rotation of output shafts of the tilt actuator of FIGS. 56-57.

Referring now to FIG. 62, at an angular velocity between 0 and $\omega_1$ rpm, the low-speed actuator spindle 932 will be actuated. The motor 950 will turn the high-speed shaft 952 and the low-speed shaft 954 at the same angular velocity. The low-speed shaft 954 will turn the low-speed worm gear 1010, which will turn the low-speed output gear 1018. The low-speed output gear 1018 will urge the rotation of the low-speed spindle driver 1030, which will urge the linear movement of the low-speed actuator spindle 932, as previously described herein. The high-speed shaft 952 will rotate the clutch assembly 956. However, the angular velocity of the clutch wheel assembly 960 will be insufficient for the wing portions 992, 994 to move outwardly for frictional communication of the wing faces 996, 998 with the inner surface 964 of the drum assembly 958. This is characterized as the low-speed output line 1064 in FIG. 62.

At angular velocities greater than $\omega_1$ rpm, the low-speed actuator spindle 932 will continue to move as previously described, and as characterized as line 1064. However, the angular velocity of the clutch wheel assembly 960 will be sufficient for the wing portions 992, 994 to move outwardly for frictional communication of the wing faces 996, 998 with the inner surface 964, thus urging the linear movement of the high-speed actuator spindle 930 as previously described herein. This is characterized as the high-speed output line 1066 in FIG. 62.

Figure 65:
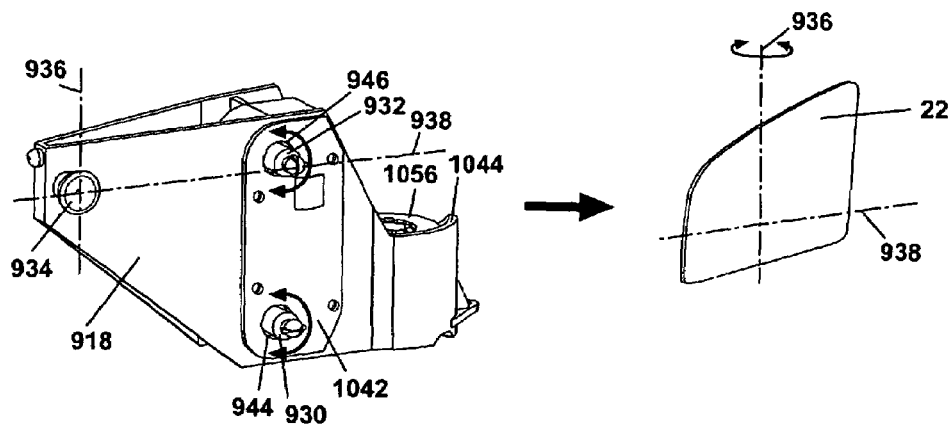
FIG. 65 is a schematic view of the tilt actuator of FIGS. 56-57 having a pair of rotating shafts which, in turn, causes a mirror interconnected thereto to rotate in a first direction.
Figure 66:
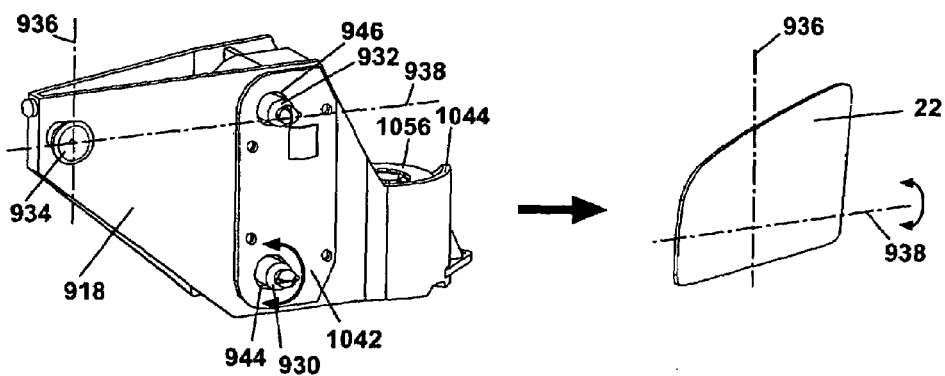
FIG. 66 is a schematic similar in orientation to FIG. 65 in which only one of the shafts rotates which, in turn, causes a mirror interconnected thereto to rotate in a second direction due to the offset positioning of the mirror pivot relative to the shafts.

Referring to FIGS. 56 and 65, at angular velocities less than $\omega_1$ rpm, only the low-speed actuator spindle 932 will move inwardly or outwardly. The panel 920 will be effectively immovably pinned to the tilt actuator assembly 916 at the connection of the high-speed actuator spindle 930 and the panel pivot mount 934. The panel 920 will pivot about the horizontal axis 938 for upward and downward adjustment of the reflective element 22. Referring to FIGS. 56 and 66, at angular velocities greater than $\omega_1$ rpm, both actuator spindles 930, 932 will move inwardly or outwardly. The panel 920 will be effectively immovably pinned only to the panel pivot mount 934. The panel 920 will pivot about the vertical axis 936 for inward and outward adjustment of the reflective element 22. It will be obvious that, for proper adjustment of the mirror, the motor 950 and gearing described herein must urge linear movement of the actuator spindles 930, 932 in the same direction and at the same rate when both actuator spindles 930, 932 are operated at an angular velocity greater than $\omega_1$ rpm. A conventional electrical brake circuit can be employed to counter the inertial effects of the operation of the assembly, thereby avoiding unwanted "runover" movement when the assembly is stopped or the speed is changed.

Figure 67:
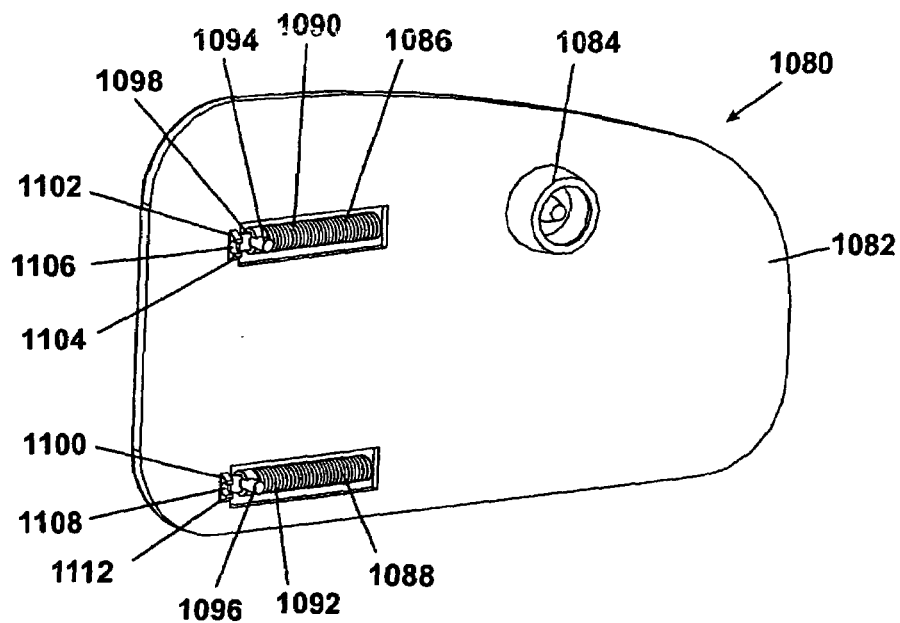
FIG. 67 is a perspective view of a second embodiment of a mirror panel comprising a portion of the assembly shown in FIG. 56 in which actuator spindles are formed as a part of the mirror panel.
Figure 68:
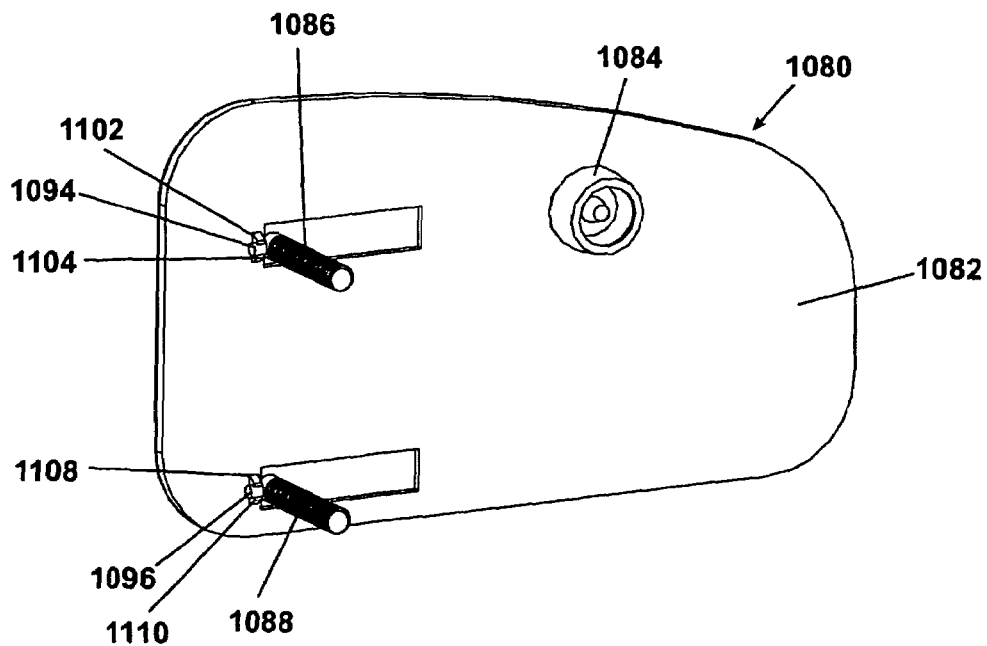
FIG. 68 is a perspective view similar in orientation to FIG. 67 in which the actuator spindles are pivoted outwardly of the mirror panel for operable interconnection with the tilt actuator of FIGS. 56-57.

Referring now to FIGS. 67 and 68, a second embodiment of the connection of the actuator spindles 930, 932 to the panel 920 is shown. The second embodiment of the panel 1080 shown in FIGS. 67 and 68 replaces the previously described panel 920. The previously-described actuator spindles 930, 932 and spindle drivers 1028, 1030 are not used. The output gears 1016, 1018 are replaced with identical output gears (not shown) except that the replacement output gears are provided with internal threads adapted to threadably engage threaded spindles attached to the panel 1080 as hereinafter described. All other components and the operation of the assembly are as previously described.

As shown in FIGS. 67 and 68, the panel 1080 comprises a rear face 1082 from which extends a pivot mount receptacle 1084 for operable communication with the previously-described panel pivot mount 934. A high-speed actuator spindle 1086 is connected to the panel 1080 through a living hinge 1098. The high-speed actuator spindle 1086 comprises a threaded shaft 1090 and a locking post 1094 extending orthogonal to the longitudinal axis of the threaded shaft 1090 adjacent the living hinge 1098. Similarly, a low-speed actuator spindle 1088 is connected to the panel 1080 through a living hinge 1100. The low-speed actuator spindle 1088 comprises a threaded shaft 1092 and a locking post 1096 extending orthogonal to the longitudinal axis of the threaded shaft 1092 adjacent the living hinge 1100. The actuator spindles 1086, 1088, including the threaded shafts 1090, 1092, and the locking post 1094, 1096, are integrally formed during the fabrication of the panel 1080 and are adapted to be rotated outwardly of the rear face 1082 through the living hinges 1098, 1100, as shown in FIG. 68. Adjacent the living hinge 1098 are a first finger 1102 and a second finger 1104 in generally parallel, spaced apart juxtaposition extending outwardly of the rear face 1082, defining a channel 1106 which is adapted to snappingly receive the locking post 1094 when the actuator spindle 1086 is rotated outwardly of the rear face 1082. Similarly, adjacent the living hinge 1100 are a first finger 1108 and a second finger 1110 in generally parallel, spaced apart juxtaposition extending outwardly of the rear face 1082, defining a channel 1112 which is adapted to snappingly received the locking post 1096 when the actuator spindle 1088 is rotated outwardly of the rear face 1082.

The threaded shafts 1090, 1092 are threadably inserted into the replacement output gears and will be urged outwardly or inwardly as the output gears are rotated. The output gears threadably engage the worm gears 1010, 1014 to be rotated with the rotation of the worm gears 1010, 1014. Thus, as the low-speed worm gear 1014 is rotated, the low-speed actuator spindle 1088 will be urged inwardly or outwardly, thus resulting in movement of the panel 920 about the horizontal axis 938, adjusting the mirror upwardly and downwardly. As both the low-speed worm gear 1014 and the high-speed worm gear 1010 are rotated, the low-speed actuator spindle 1088 and the high-speed actuator spindle 1086 will be urged inwardly or outwardly, thus resulting in movement of the panel 920 about the vertical axis 936, adjusting the mirror inwardly and outwardly.

Figure 69:
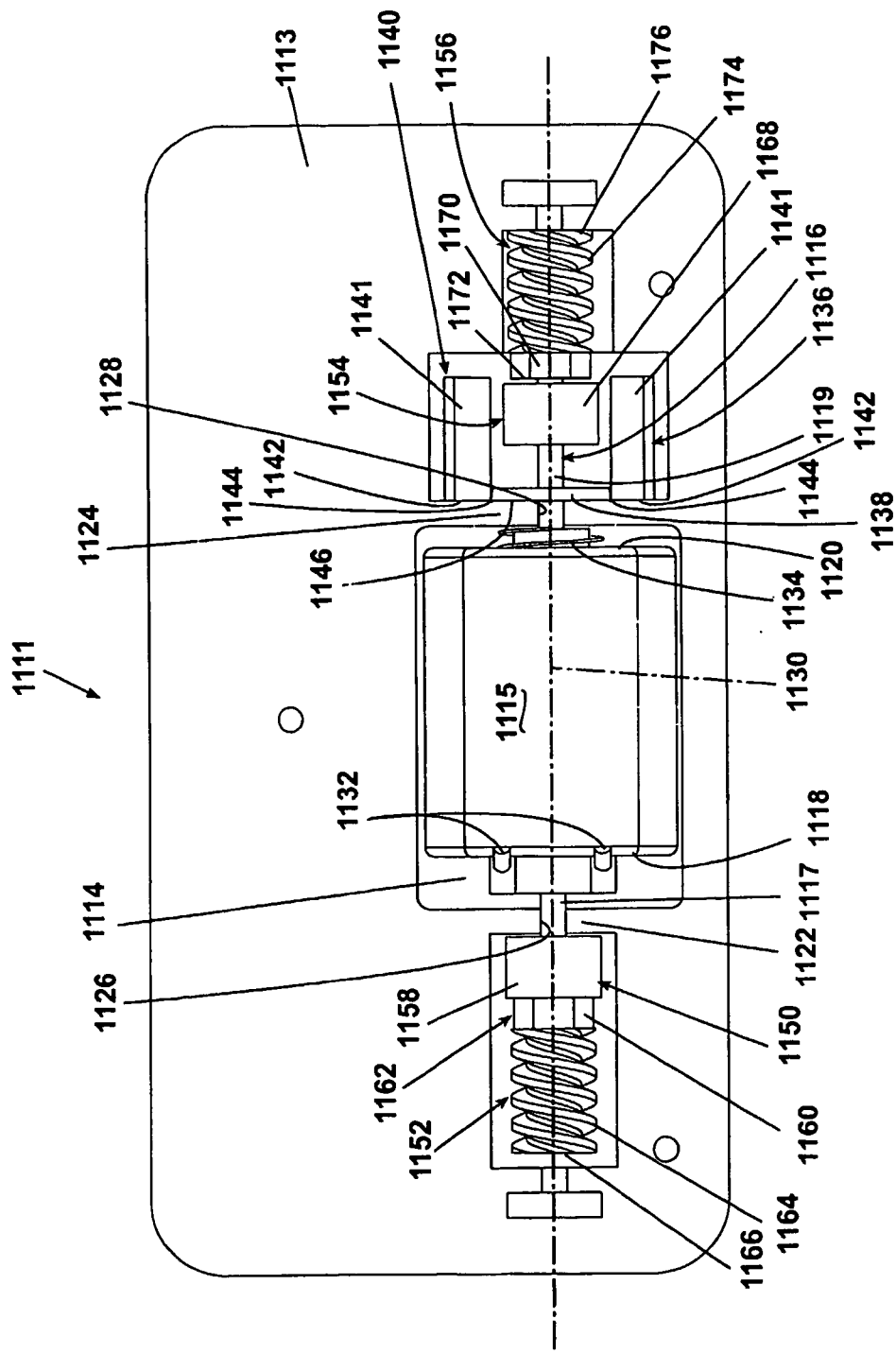
FIG. 69 is a plan view of a third embodiment of a motor assembly according to the invention.
Figure 70:
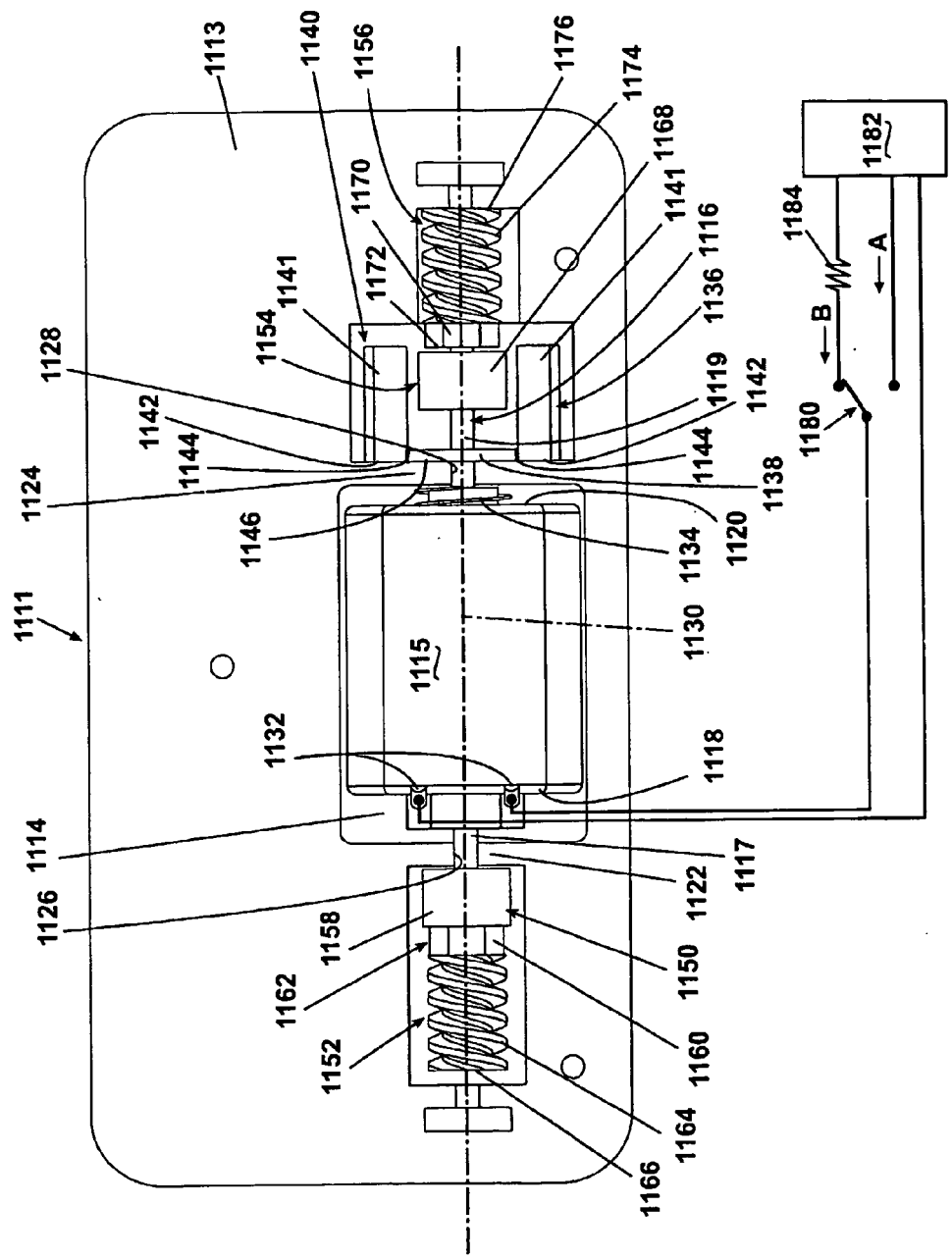
FIG. 70 is a plan view of the motor assembly of FIG. 69 showing electrical circuitry in schematic form, at a lower voltage.
Figure 71:
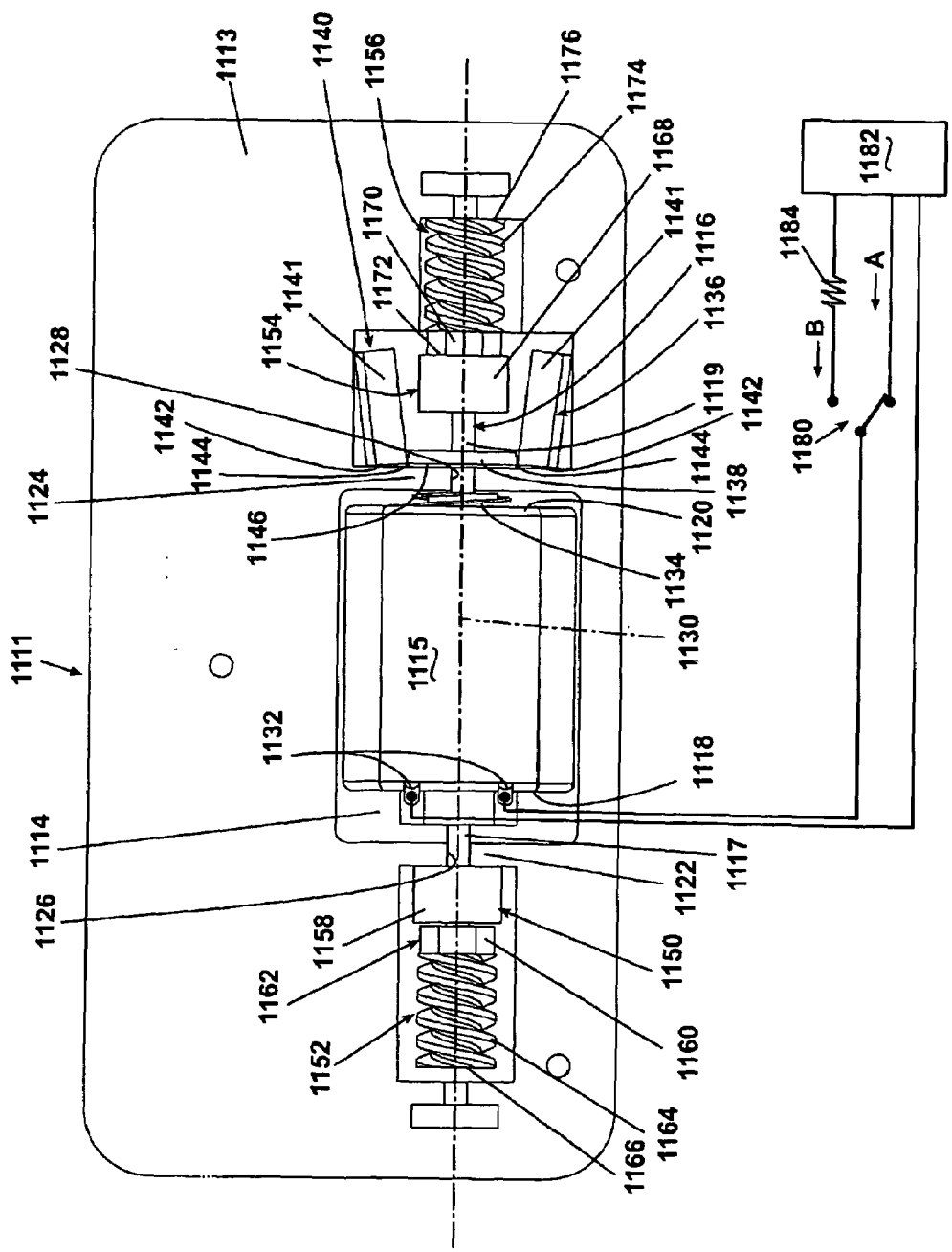
FIG. 71 is a plan view of the motor assembly of FIG. 69 showing electrical circuitry in schematic form, at a higher voltage.

A sixth embodiment of a motor assembly 1111 is illustrated in FIGS. 69-71. The motor assembly 1111 comprises a case 1113 having a compartment 1114 that holds a motor 1115. The motor 1115 in this instance is an electric motor with a single shaft 1116 extending all the way therethrough so that a first portion 1117 extends on the one hand from a first end 1118 of the motor 1115, and a second portion 1119 extends on the other hand from a second end 1120. The compartment 1114 is bounded in part by a first wall 1122 and an oppositely disposed second wall 1124. An aperture 1126 in the first wall 1122 is aligned with an aperture 1128 in the second wall 1124. The motor 1115 rests in the compartment 1114 with the shaft 1116 extending from the first end 1118 also extending through the aperture 1126, and the shaft 1116 extending from the second end 1120 also extending through the aperture 1128. The compartment 1114 is larger than the motor 1115 so that the motor can move linearly within the compartment along a longitudinal axis 1130 of the shaft 1116.

The motor 1115 has electrical contacts 1132 adapted to connect to a source of current for driving the motor. A spring 1134 is disposed between the second end 1120 and the second wall 1124 to bias the motor 1115 toward the first wall 1122.

Outside the compartment second wall 1124, a movable fly 1136 is securely mounted to the second portion 1119 of the shaft 1116 and rotates with the shaft 1116. The movable fly 1136 comprises an arm 1138 that extends radially from the shaft 1116 and a pair of wings 1140, each of which has a free end 1141 extending axially from an end 1142 of the arm 1138. Each end 1142 is hinged relative to the rest of the arm 1138 at joints 1144. Preferably, the movable fly 1136 is plastic and the joints 1144 ae living hinges in the sense that the thickness of the arm 1138 at each joint 1144 is thin enough to enable each end 1142 to rotate about an axis of the corresponding joint 1144. Also, preferably, the wings 1140 are weighted. The arm 1138 bears against an outer surface 1146 of the compartment wall 1124. Inasmuch as the arm 1138 (or at least a portion of it) will thus rotate with the shaft 1116 against the outer surface 1146, the outer surface 1146 will be lubricated. Such lubrication can be accomplished by any well-known means, such as by the addition of a fluid lubricant, by rendering the outer surface essentially frictionless, or by adding a frictionless material such as Teflon between the outer surface 1146 and the arm 1138.

Outside the compartment first wall 1122, a first clutch 1150 is mounted to the portion 1117 of the shaft 1116. The first clutch 1150 is adapted to engage a first output shaft 1152 (which can optionally be integral with the shaft 1116, 1117) with the motor shaft 1116 and be driven by it. Similarly, the second clutch 1154 is mounted to the portion 1119 of the shaft 1116 outboard of the arm 1138. The second clutch 1154 is adapted to engage a second output shaft 1156 with the motor shaft 1116. In accordance with the invention, when the first output shaft 1152 is engaged, the second output shaft 1156 is disengaged; and conversely, when the second output shaft 1156 is engaged, the first output shaft 1152 is disengaged.

The first clutch 1150 comprises a clutch plate 1158 securely mounted to the portion 1117 of shaft 1116 to rotate with it. In this embodiment, the first output shaft 1152 comprises a bearing plate 1160 at a first end 1162 and a worm gear 1164 extending from the bearing plate 1160 to a second end 1166. The end 1166 is rotatably mounted to the case 1113, although it could just as easily be mounted to any other fixed point. The end 1162 is adapted to rotate freely on the shaft 1116, but since the spring 1134 biases the motor 1115 and the shaft 1116 toward the first output shaft 1152, the clutch plate 1158 is urged into frictional contact with the bearing plate 1160, which causes the first output shaft 1152 to rotate with and be driven by the motor shaft 1116.

The second clutch 1154 comprises a clutch plate 1168 securely mounted to the portion 1119 of the shaft 1116 to rotate with it. In this embodiment, the second output shaft 1156 comprises a bearing plate 1170 at a first end 1172 and a worm gear 1174 extending from the bearing plate 1170 to a second end 1176. The end 1176 is rotatably mounted to the case 1113, although it could just as easily be mounted to any other fixed point. The end 1172 is adapted to rotate freely on the shaft 1116, and since the spring 1134 biases the motor 1115 and the shaft 1116 toward the first output shaft 1152, the clutch plate 1168 is urged away from contact with the bearing plate 1170. Thus, in this position, the motor shaft 1116 does not drive the second output shaft 1156.

However, it will be apparent that as the speed of rotation of the shaft 1116 increases, i.e., when the motor 1115 runs at a higher speed, centrifugal force acting on the wings 1140 of the movable fly 1136 urges the free ends 1141 of the wings to move radially outwardly from the shaft 1116 as shown in FIG. 71. This motion tends to cause the ends 1142 of the arm 1138 to rotate about the hinges 1144, and as the ends 1142 bear against the outer surface 1146 of the compartment wall 1124, the center portion of the arm 1138 is urged away from the compartment wall 1124. And since the arm 1138 is securely mounted to the shaft 1116, the shaft 1116 and motor 1115 are pulled along the longitudinal axis 1130 against the bias of the spring 1134. As the shaft 1116 and the motor 1115 move against the spring bias, the first clutch plate 1158 moves away from the bearing plate 1160, and the second clutch plate 1168 moves toward the bearing plate 1170 on the second output shaft 1156. When the rotation of the shaft 1116 is fast enough, the first clutch 1150 disengages the first output shaft 1152, releasing it from the shaft 1116 and the motor 1115, and the second clutch 1160 engages the second output shaft 1156 so that the motor 1115 then drives the second output shaft.

Controlling the speed of the motor 1115 can be accomplished in any well-known manner such as by varying the resistance or the voltage of a direct current supplied to the motor 1115. The control circuit in one embodiment of the invention is shown in FIG. 70 where a two-position switch 1180 will direct current from a power source 1182 at a given voltage A, or alternatively through a resistor 1184 at a different voltage B, lower than voltage A. When current is supplied to the motor 1115 at the lower voltage B, rotation of the shaft 1116 is not fast enough to cause the movable fly 1136 to disengage the first clutch 1150. Thus, the motor 1115 will continue to drive the first output shaft 1152. However, as shown in FIG. 71, when current is supplied to the motor 1115 at the higher voltage A, rotation of the shaft 1116 is fast enough to cause the movable fly 1136 to disengage from the first clutch 1150 and engage the second clutch 1154 so that the motor 1115 will then drive the second output shaft 1156. With this structure, a user can selectively determine which output shaft 1152, 1156 the motor 1115 will drive by simply positioning the switch 1180.

Figure 72:
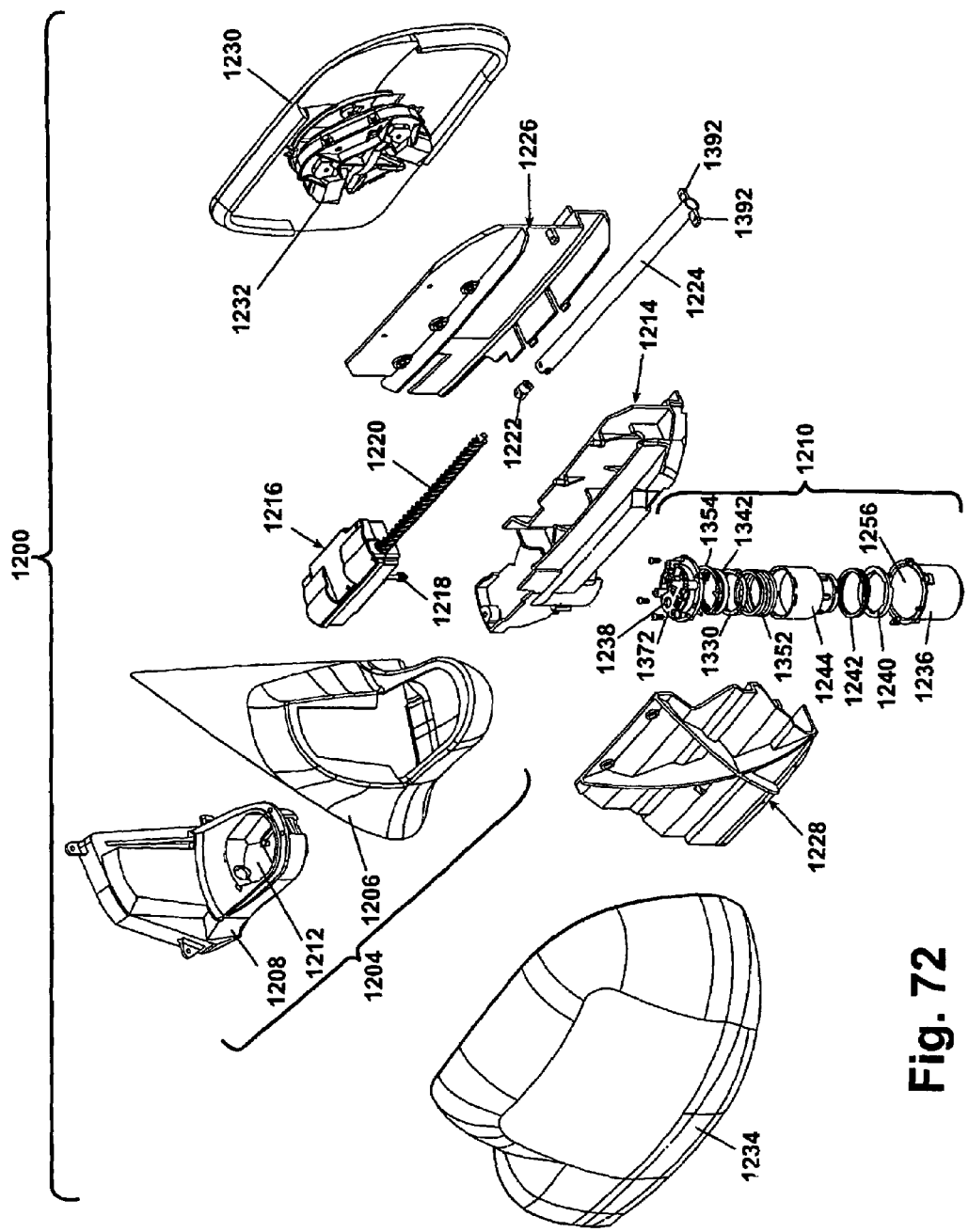
FIG. 72 is an exploded view of a rearview mirror assembly illustrating the major components including a drive assembly connecting a mirror assembly to a support bracket with a pivot mechanism for rotating and an extension mechanism for extending the mirror assembly relative to a vehicle.
Figure 86:
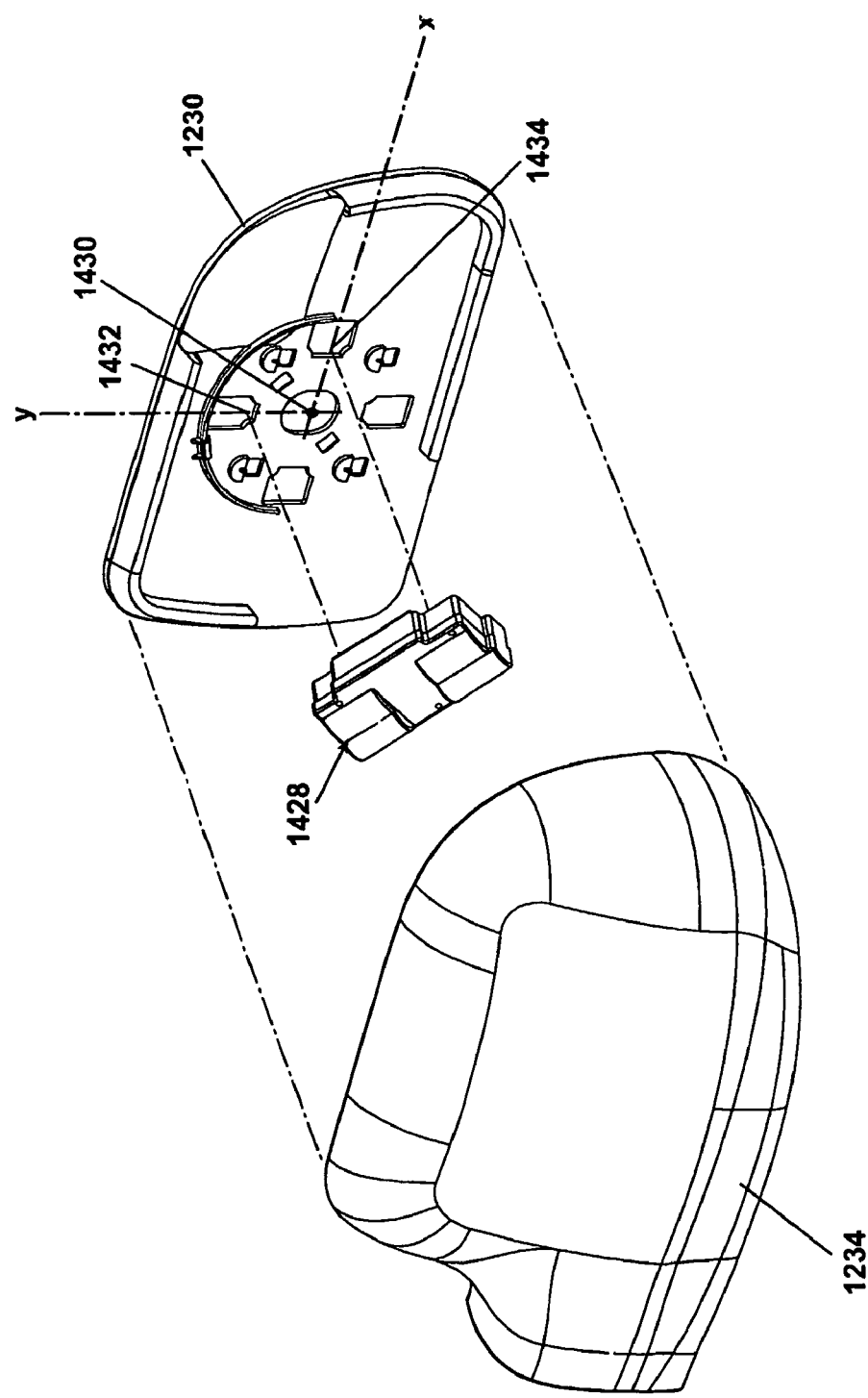
FIG. 86 is an exploded view of a portion of an alternate embodiment of the rearview mirror assembly of FIG. 72 showing the use of a motor according to the invention in a mirror tilt actuator.
Figure 87:
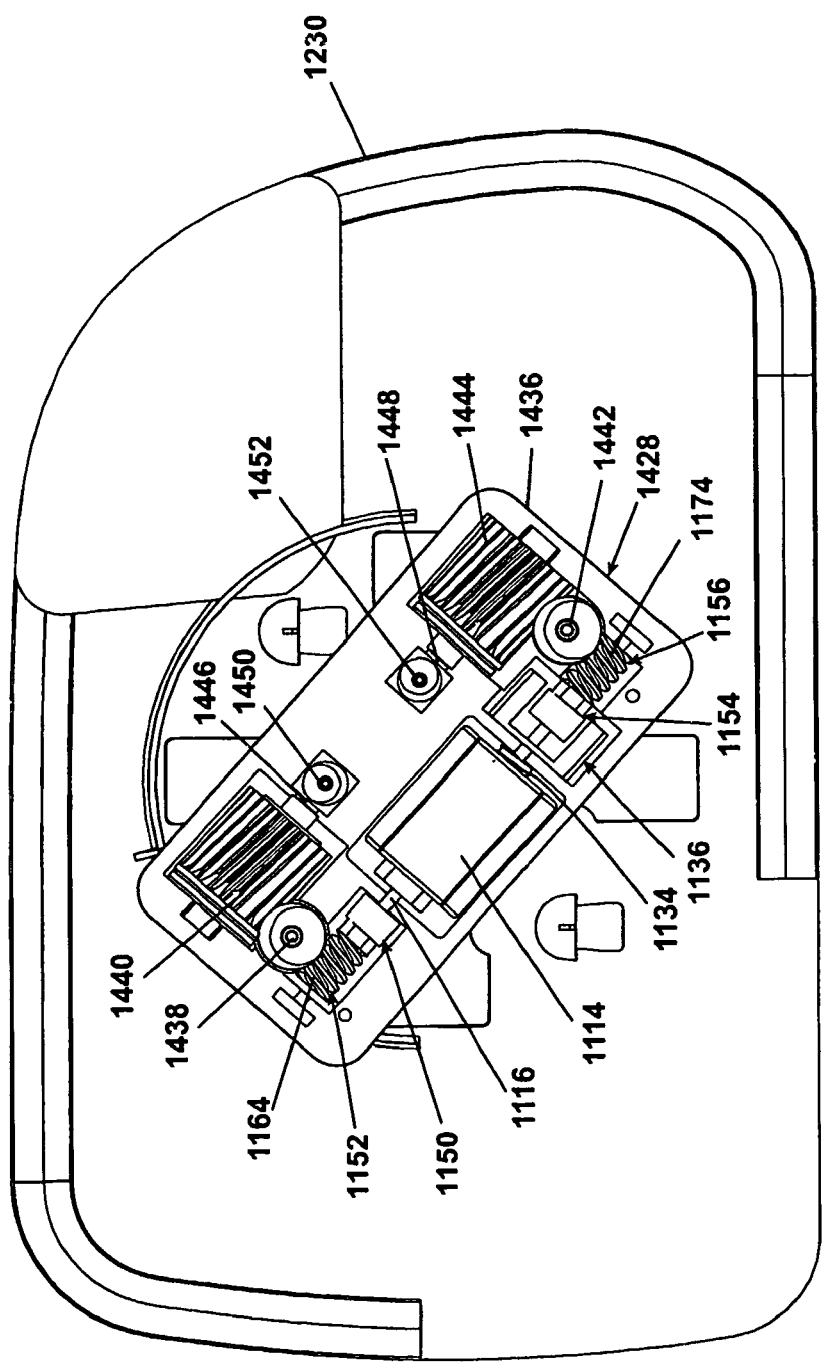
FIG. 87 is a plan view of the mirror tilt actuator of FIG. 86 with the motor cover removed for clarity.

The invention will have applicability in any situation where it is desirable to drive at least two independent outputs from a single motor. One such application is illustrated in FIG. 72 in a vehicle rear view mirror 1200. This application shows the use of a motor according to the invention in two environments: (1) as a driver for a power fold and extend function of the rearview mirror 1200, and (2) as a driver for a tilt adjustment mechanism of the rearview mirror. The power fold and extend embodiment is illustrated in FIGS. 72-85 and the tilt adjustment mechanism is illustrated in FIGS. 86-87. In the former, one output shaft of the motor drives the power fold function and the other output shaft drives the power extend function. Similarly, in the tilt adjustment mechanism, one output shaft drives mirror rotation about one axis and the other output shaft drives mirror rotation about another axis.

Looking first at FIGS. 72-85, the rearview mirror 1200 comprises a support 1204 adapted to mount to the vehicle 12, and which is made of a cover 1206 and a mirror receptacle 1208, nested within the cover 1206. A pivot mechanism 1210 is fixedly secured in a socket 1212 in the mirror receptacle 1208. A carriage arm 1214 pivots on the pivot mechanism 1210 and carries a motor assembly 1216 according to the invention. A power fold drive shaft 1218 and a power extend drive shaft 1220' extend from the motor assembly 1216. The power fold drive shaft 1218 engages the pivot mechanism 1210 in a manner hereinafter described to cause the carriage arm 1214 to pivot relative to the support 1204. The power extend drive shaft 1220 is a worm screw that carries a threaded nut 1222 secured to a shaft 1224. A carriage bracket 1226 and a shell bracket 1228 are mounted to each other and to the shaft 1224. The carriage bracket 1226 carries a conventional mirror assembly 1230 which may or may not include a tilt mechanism 1232. The shell bracket 1228 provides support for a mirror housing 1234.

Figure 73:
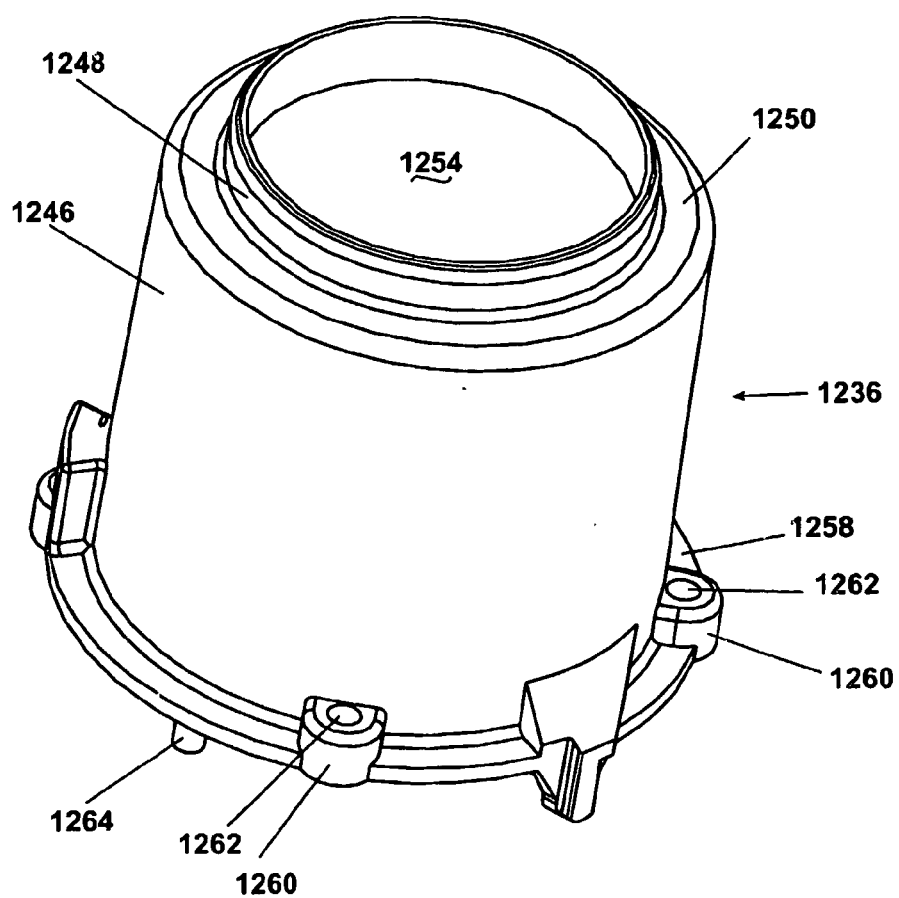
FIG. 73 is a perspective view of an outer housing comprising a portion of the pivot mechanism of FIG. 72.
Figure 74:
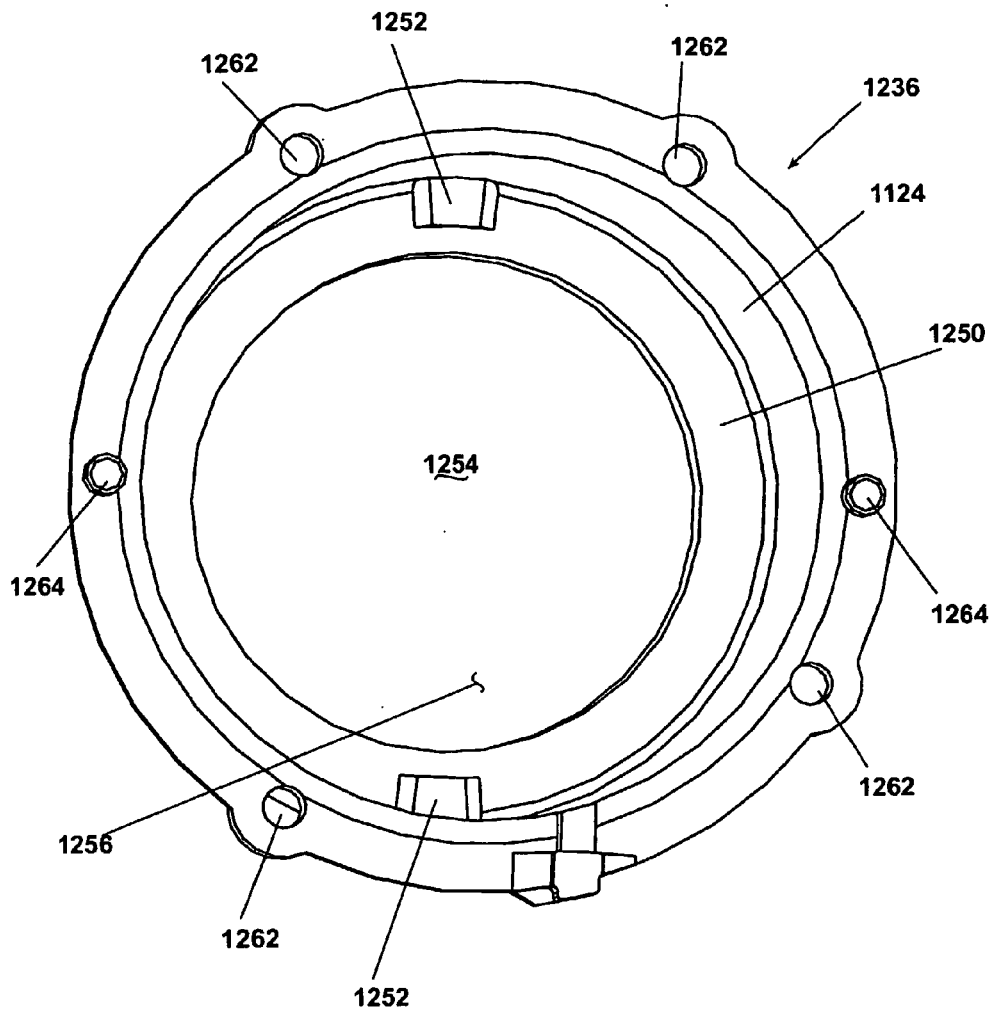
FIG. 74 is a perspective view of the interior of the outer housing of FIG. 73.

Looking more closely at FIG. 72, the pivot mechanism 1210 comprises an outer housing 1236 and a cover 1238 which enclose a ramp 1240, a wave spring 1242, and an actuator sub 1244. Referring also to FIGS. 73 and 74, the outer housing 1236 is a generally cylindrically-shaped body comprising a cylindrical wall 1246 and a collar 1248 connected to the cylindrical wall 1246 by an annular wall 1250 and coaxial therewith. The annular wall 1250 extends orthogonally inwardly from the cylindrical wall 1246 to the collar 1248. Referring to FIG. 74, the inner surface of the annular wall 1250 is provided with a pair of diametrically-opposed inner bosses 1252 extending downwardly from the annular wall 1250. The collar 1248 comprises a generally ring-shaped structure defining a circular opening 1254. The cylindrical wall 1246 defines a cylindrical chamber 1256. Extending orthogonally outwardly from the cylindrical wall 1246 at an opposite end from the collar 1248 is a base ring 1258 circumscribing the cylindrical wall 1246. The base ring 1258 is provided with a plurality of mounting bosses 1260 spaced above the periphery of the cylindrical wall 1246 and having a mounting bore 1262 extending therethrough generally parallel to the longitudinal axis of the outer housing 1236. Extending downwardly from the base ring 1258 are a pair of diametrically-opposed mounting pegs 1264 generally parallel to the longitudinal axis of the outer housing 1246.

Referring now to FIGS. 75-79, the ramp 1240 is a ring-like body comprising a pair of diametrically-opposed thin ring segments 1266 in alternating juxtaposition with a pair of diametrically-opposed raised segments 1268. The raised segments 1268 transition to the thin ring segments 1266 in a first inclined face 1270 and a second inclined face 1272. The thin ring segments 1266 and the raised segments 1268 define a circular inner wall 1274 defining a generally circular center opening 1276. Regularly spaced along the inner wall 1274 are a plurality of notches 1278. In the embodiment shown in FIG. 75, six notches 1278 are shown in diametrically-opposed pairs. One pair of notches 1278 bisect the raised segments 1268, and the remaining notches 1278 are formed at each end of the thin ring segments 1266.

The wave spring 1242 is a generally helical spring formed of a flat ribbon of metal, preferably spring steel having alternating crest portions 1280 and trough portions 1282. The spring 1242 is formed so that the trough portions 1282 of one coil contact the crest portions 1280 of the adjoining coil. Preferably, the portions in contact with one another are fixedly connected, such as by spot welding. The spring 1242 defines a circular center opening 1284.

The actuator sub 1244 is a generally cylindrically-shaped body comprising a generally cylindrical lower housing 1286 and a generally cylindrical upper housing 1288. The lower housing 1286 comprises a lower cylindrical wall 1290 transitioning to an inwardly-extending annular wall 1292 which, in turn, transitions to an upper cylindrical wall 1294 of the upper housing 1288. The lower cylindrical wall 1290 is provided with a plurality of peripheral slots 1296 spaced thereabout at an opposite end from the upper housing 1288. The upper cylindrical wall 1294 transitions to an annular top wall 1298 having a depending inner peripheral wall 1310 defining a circular opening 1312. The upper cylindrical wall 1294 is provided with a plurality of regularly-spaced ribs 1314 extending longitudinally along the upper cylindrical wall 1294 from the annular wall 1292. The ribs 1314 are adapted to slidably engage the notches 1278 in the ramp 1240 when the upper housing 1288 is inserted through the center opening 1276. A plurality of seats 1316 are spaced regularly around the upper housing 1288 at the inner face of the top wall 1298 and the upper cylindrical wall 1294. Preferably, the seats 1316 are spaced at 120 degrees around the periphery of the upper cylindrical wall 1294. Upper housing sockets 1318 comprise circular apertures through the top wall 1298 at regularly-spaced intervals. Preferably, the sockets 1318 are spaced at 120 degrees around the top wall 1298.

Figure 80:
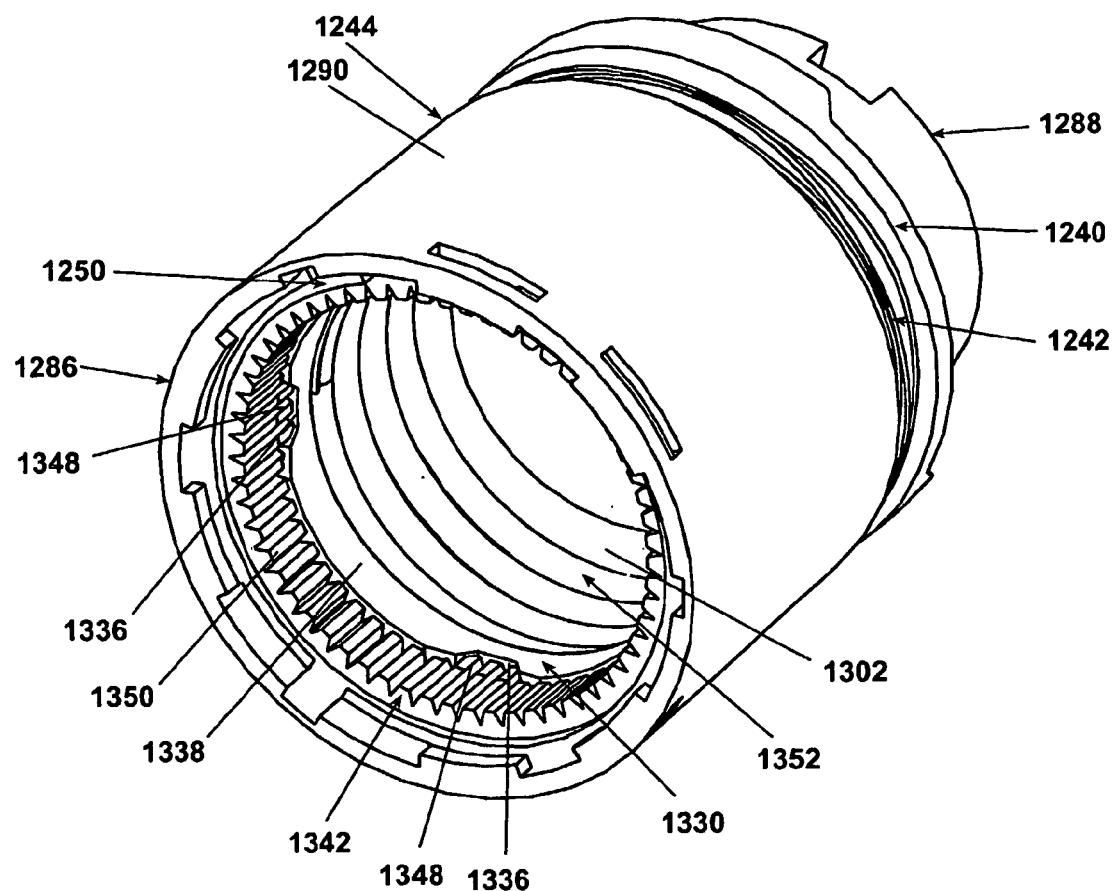
FIG. 80 is a perspective view of the interior of the actuator sub of FIG. 75 showing the spring, the actuator sub ring, the ring gear, and a C-ring installed therein.
Figure 81:
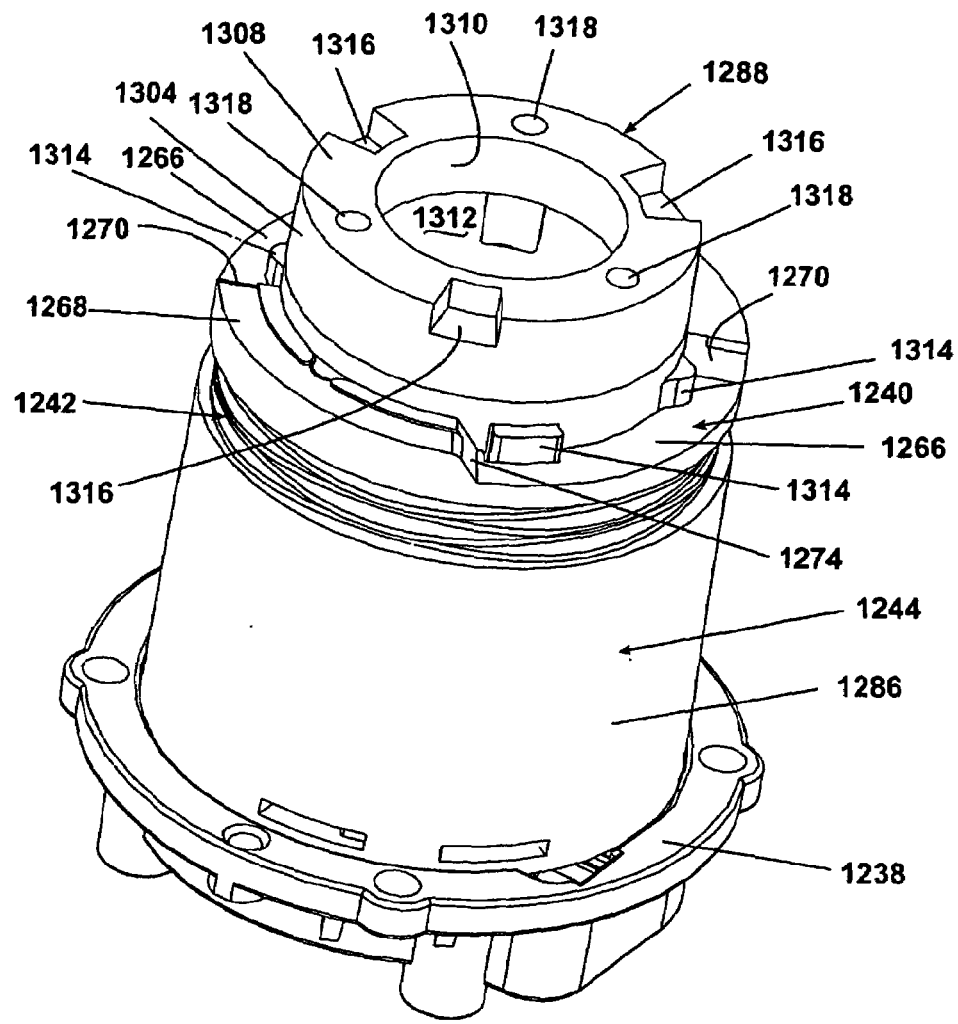
FIG. 81 is a perspective view of the assembled pivot mechanism of FIG. 72.
Figure 82:
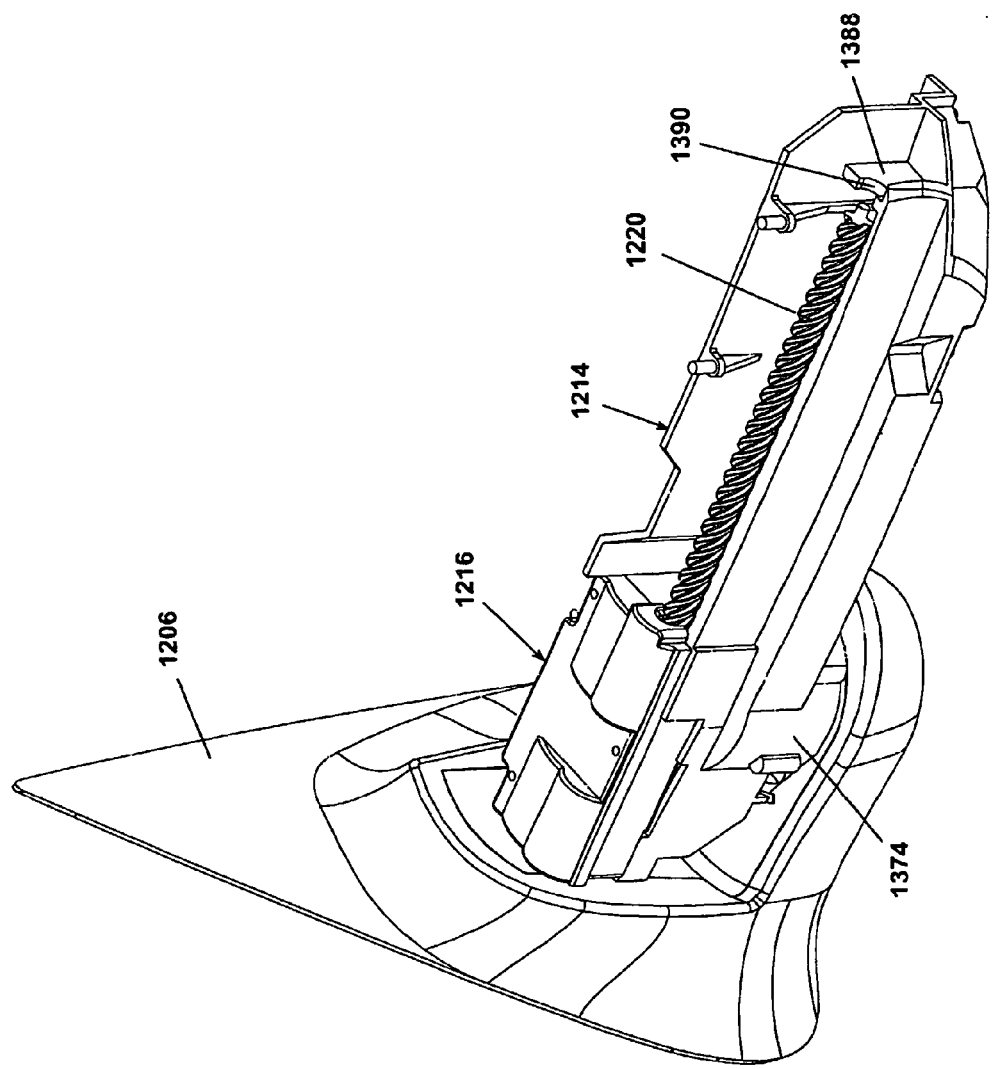
FIG. 82 is a perspective view of a portion of the drive assembly of FIG. 72 related to the extend function.

As shown in FIGS. 80 and 81, the wave spring 1242 is placed over the upper housing 1288 so that the upper housing 1288 extends through the center opening 1284. The ramp 1240 is then placed over the upper housing 1288 to abut the wave spring 1242 so that the upper housing 1288 extends through the center opening 1276. The wave spring 1240 will urge the ramp 140 in a direction away from the annular wall 1292.

Figure 78:
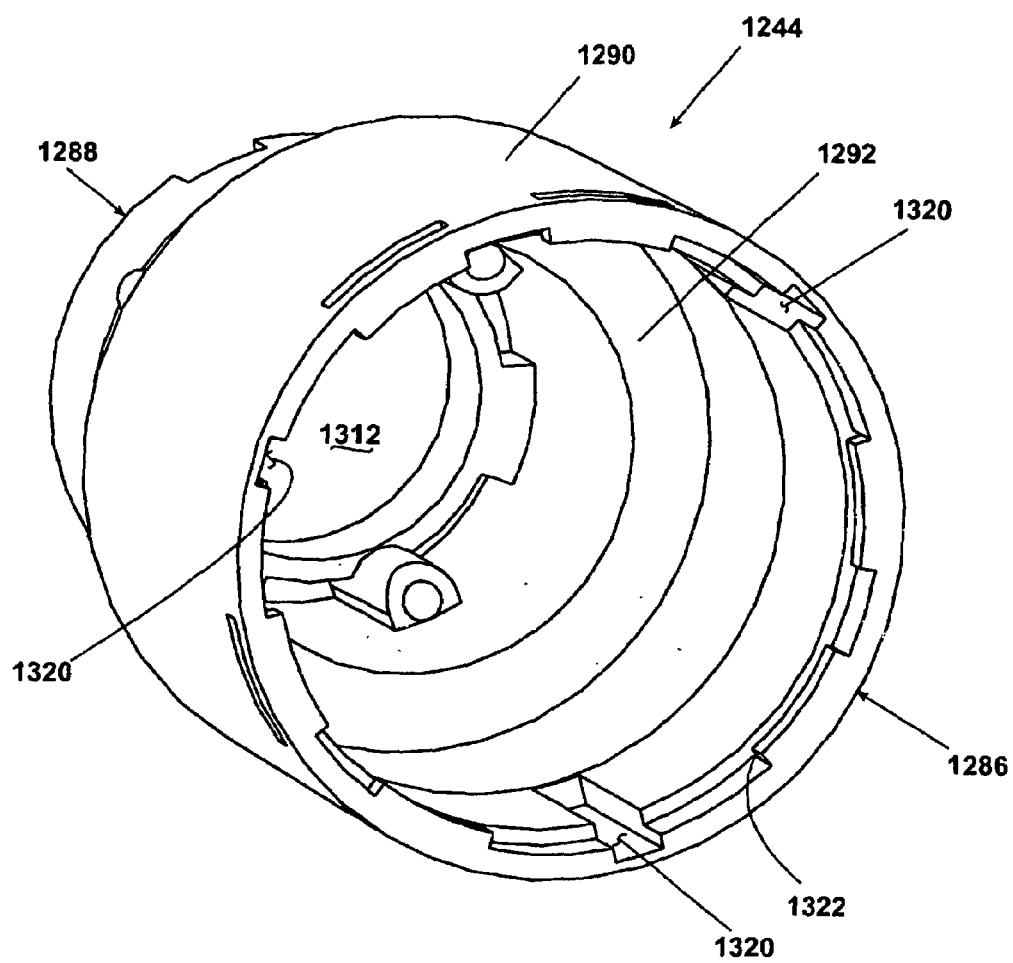
FIG. 78 is a perspective view of the interior of the actuator sub of FIG. 75.
Figure 79:
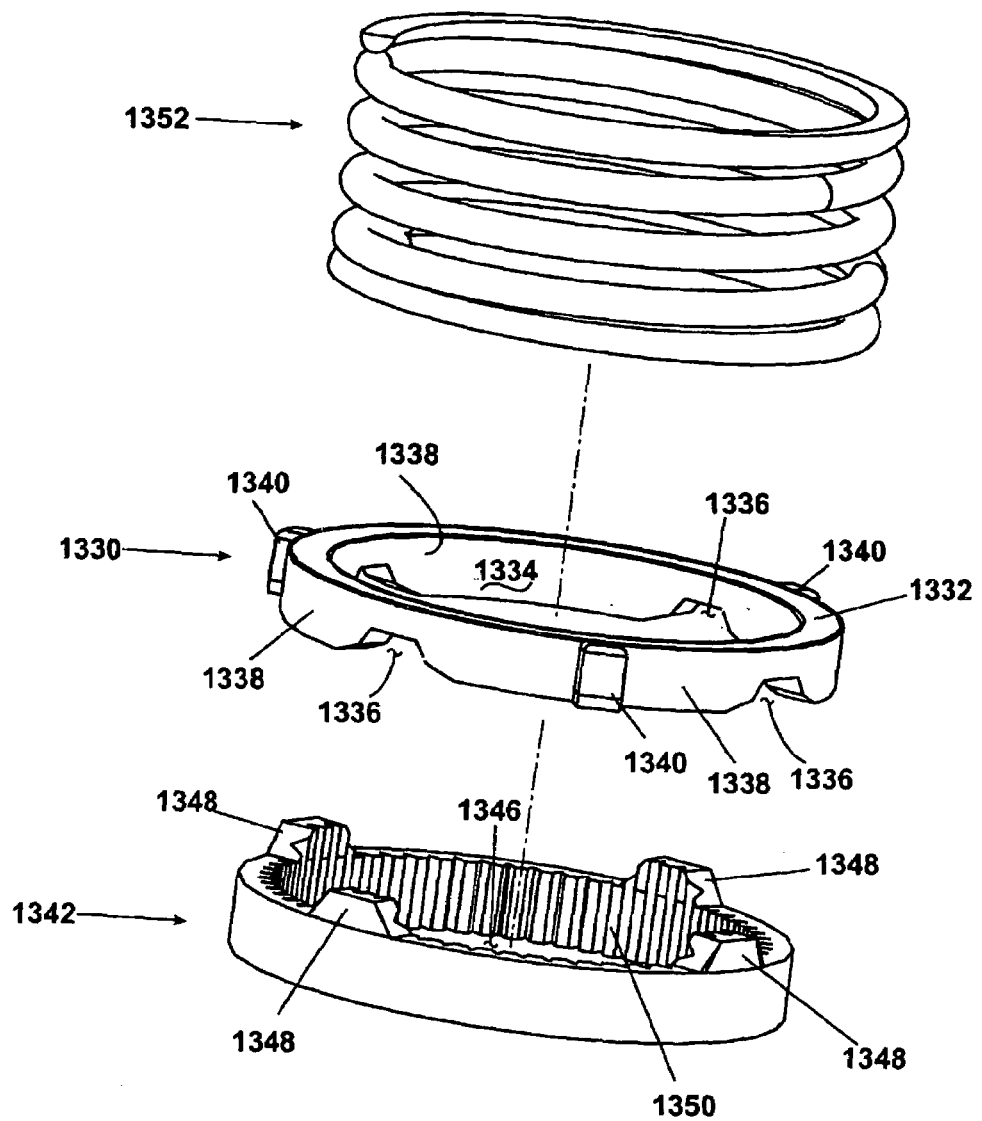
FIG. 79 is an exploded view of a spring, an actuator sub ring, and a ring gear comprising a portion of the pivot mechanism of FIG. 72.

Referring to FIG. 78, a plurality of actuator sub ring channels 1320 comprise longitudinal channels in the inner portion of the lower cylindrical wall 1290 generally parallel to the longitudinal axis of the actuator sub 1244. The channels 1320 extend along the lower cylindrical wall 1290 from the open end of the actuator sub 1244. In this embodiment, three channels 1320 are spaced at 120 degrees along the interior of the lower cylindrical wall 1290. A circumferential C-ring channel 1322 extends around the periphery of the lower cylindrical wall 1290 along the inner surface thereof adjacent the opening to the actuator sub 1244.

Referring again to FIGS. 79-80, an actuator sub ring 1330 is a generally ring-like body comprising an annular wall 1332 defining a circular opening 1334. A plurality of slots 1336 are cut into the ring 1330 at regularly spaced intervals, preferably 90 degrees, to define segments 1338. A plurality of outwardly-extending ribs 1340 is spaced about the outer periphery of the ring 1330, preferably at 120 degrees. The actuator sub ring 1330 is adapted to be slidably inserted into the actuator sub 1244 and the ribs 1340 are adapted to be slidably inserted into the actuator sub ring channels 1320 as shown in FIG. 80.

A ring gear 1342 comprises an annular body 1344 defining a circular opening 1346. An upper surface of the annular body 1344 includes a plurality of bosses 1348, preferably at regularly-spaced radial locations thereon. In the preferred embodiment, four bosses 1348 are spaced at intervals of 90 degrees. The inner surface of the annular body 1344 is provided with a plurality of teeth 1350 in longitudinal alignment with the axis of the ring gear 1342. The bosses 1348 are adapted to slidably engage the slots 1336 in the actuator sub ring 1330. The ring gear 1342 is adapted to be slidably inserted into the actuator sub 1244, as shown in FIG. 80.

As also shown in FIG. 80, a spring 1352 comprises a generally conventional helical spring adapted to be slidably inserted into the actuator sub 1244 and abut the annular wall 1332 and the actuator sub ring 1330. A conventional C-ring 1354 is adapted to be retained within the C-ring channel 1322 in a generally conventional manner. As shown in FIG. 80, the spring 1352 is slidably inserted into the actuator sub

1244 to abut the annular wall 1292. The actuator sub ring 1330 is then inserted into the actuator sub 1244 so that the ribs 1340 slidably communicate with the actuator sub ring channels 1320, to abut the slots 1336 extending away from the spring 13520. The ring gear 1342 is then slidably inserted into the actuator sub 1244 so that the bosses 1348 engage the slots 1336. The spring 1352, the actuator sub ring 1330, and the ring gear 1342 are retained in the actuator sub 1244 by compressively inserting the C-ring 1354 into the C-ring channel 1322.

Figure 75:
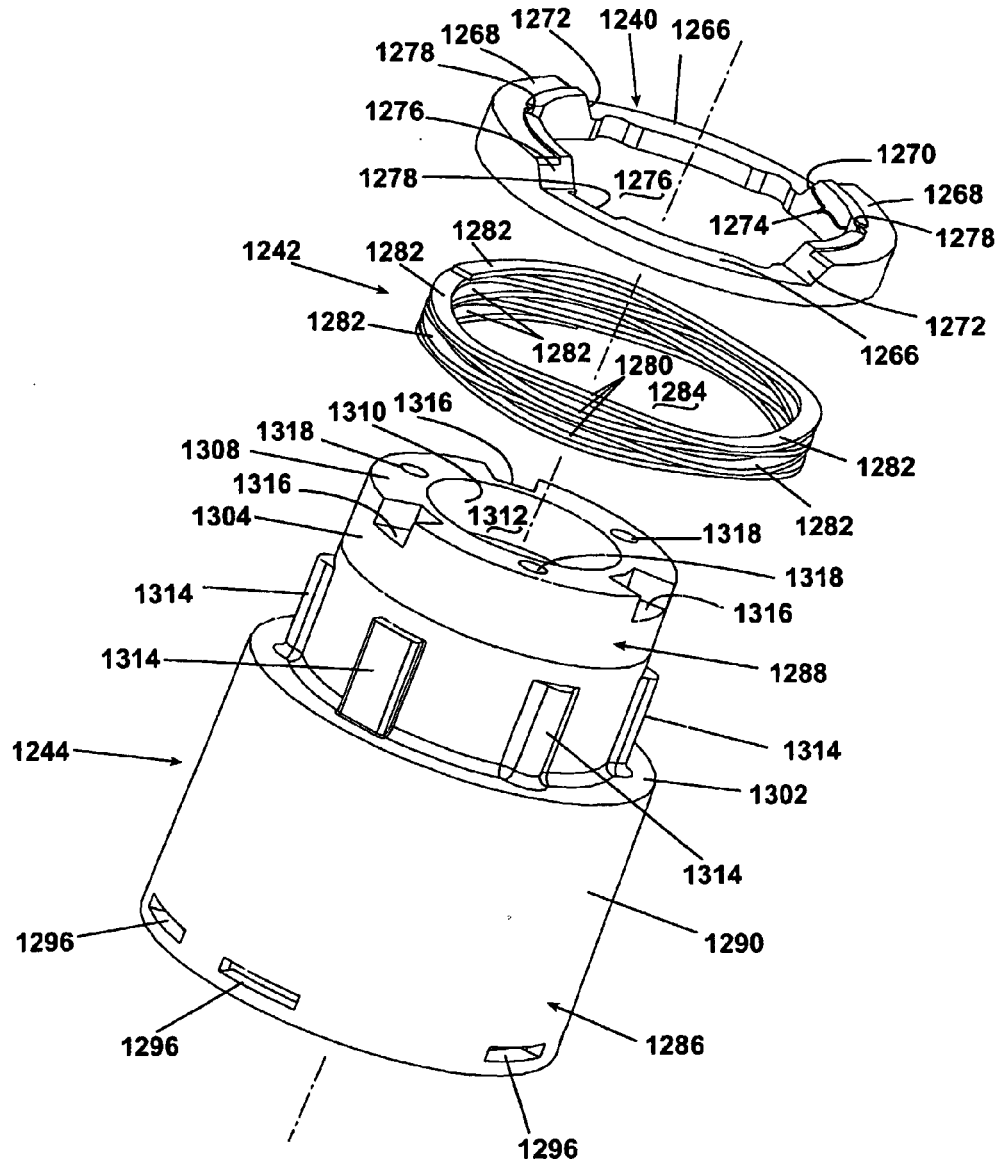
FIG. 75 is an exploded view of a ramp, a wave spring, and an actuator sub comprising a portion of the pivot mechanism of FIG. 72.
Figure 76:
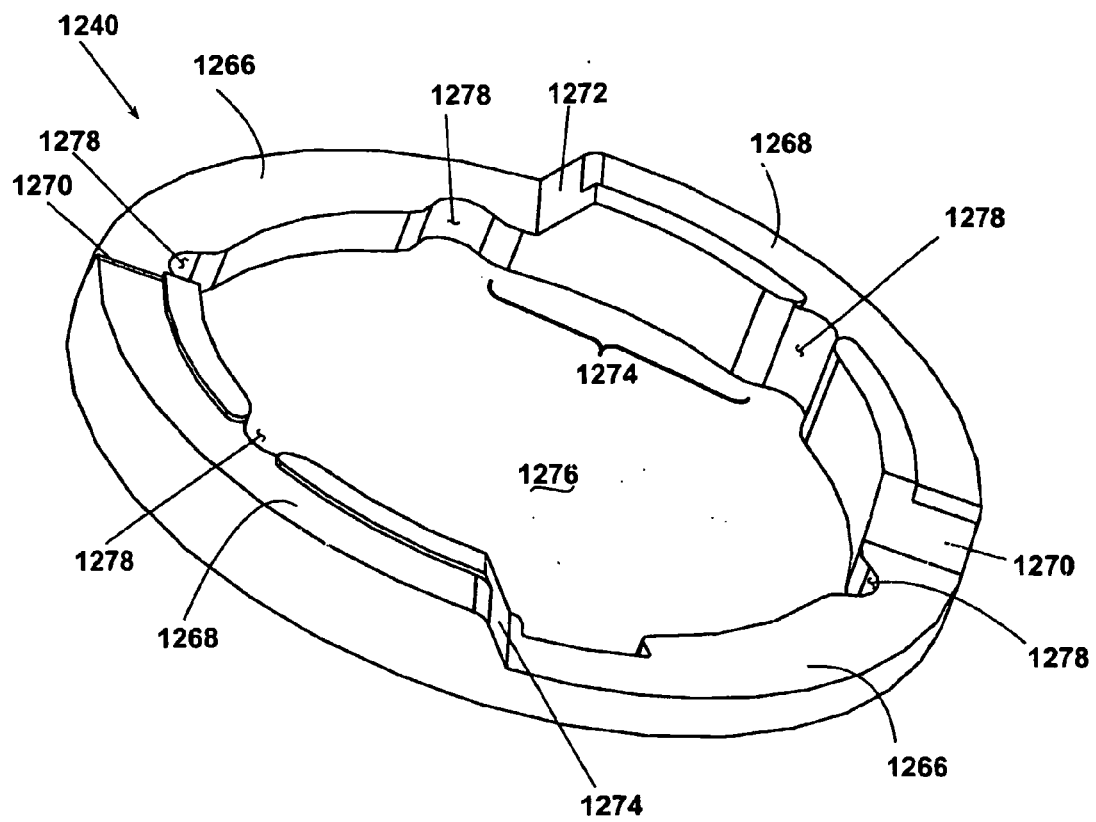
FIG. 76 is a perspective view of the ramp of FIG. 75.
Figure 77:
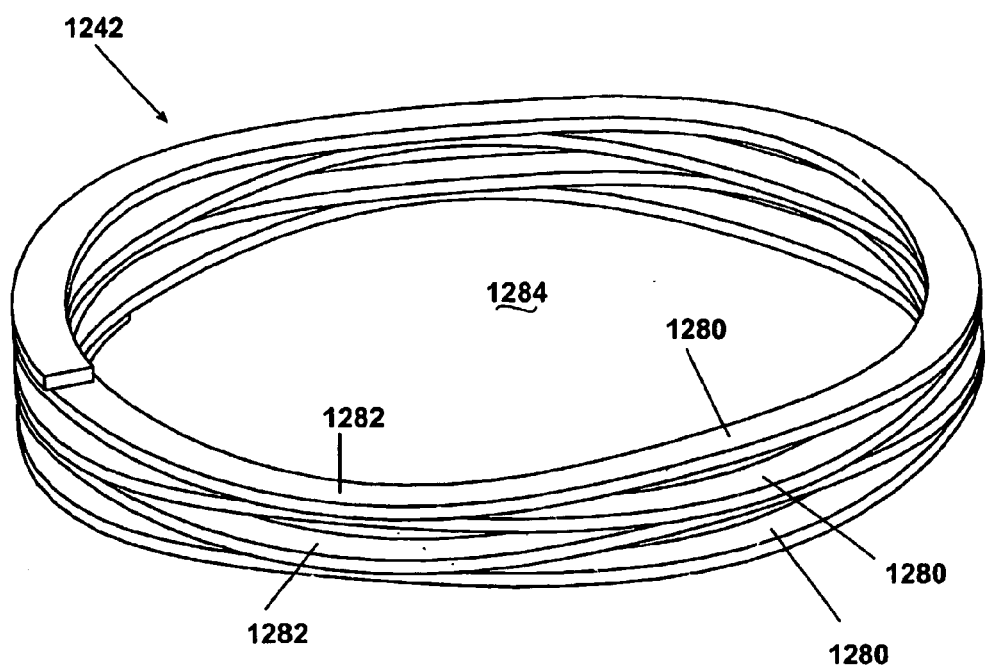
FIG. 77 is a perspective view of the wave spring of FIG. 75.

The pivot mechanism 1210 is assembled as shown in FIGS. 72 and 75. The wave spring 1242 is inserted over the upper housing 1288 of the actuator sub 1244. The ramp 1240 is then inserted over the upper housing 1288 of the actuator sub 1244 to abut the wave spring 1242 so that the raised segments 1268 extend axially away from the lower housing 1286. The spring the 1352, the actuator sub ring 1330, and the ring gear 1342 are assembled into the lower housing 1286 of the actuator sub 1244 as previously described and retained therein with the C-ring 1354. The assembled actuator sub 1244 is then inserted into the outer housing 1236 so that the upper housing 1288 extends through the opening 1254 and the actuator sub 1244 is in slidable communication with the outer housing 1236 for rotational movement relative thereto. The cover 1238 is secured to the outer housing 1236 to retain the actuator sub 1244 therein. The cover 1238 has a hole 1372 to receive the power fold drive shaft 1218. The seats 1316 and sockets 1318 in the top wall 1298 of the actuator sub 1244 are used to locate and secure the actuator sub 1244 in the socket 1212.

Referring now to FIGS. 72, and 82-84, the carriage arm 1214 has a turret 13742 sized to fit over the cover 1238 and outer housing 1236 of the pivot mechanism 1210 and rotate relative thereto. The carriage arm 1214 includes a seat 1376 sized and shaped to receive and retain the motor assembly 1216. An aperture 1378 in a bottom wall 1379 of the seat 1376 is open to the turret 1374 and positioned to be in registry with the hole 1372 in the cover 1238 of the pivot mechanism 1210. When the motor assembly 1216 is seated in the seat 1376, the power fold drive shaft 1218 extends downwardly through the aperture 1378 and the hole 1372 into the pivot mechanism 1210. A gear 1380 on the power fold drive shaft 1218 engages the teeth 1350 of the ring gear 1342.

The carriage arm 1214 also includes an elongated channel 1382 which receives the power extend drive shaft 1220, which in turn carries the threaded nut 1222 and the shaft 1224. A pair of upstanding pins 1384 extend upwardly from the channel 1382 adjacent to one side and some guide surfaces 1386 are provided on the outside of the channel 1382. The distal end of the channel 1382 has a seat 1388 with a semi-circular bearing surface 1390 therein. The shaft 1224 is sized to reciprocate on the bearing surface 1390 of the seat 1388, which provides support for the shaft 1224 as it moves with the nut 1222 by the power extend drive shaft 1220.

Figure 85:
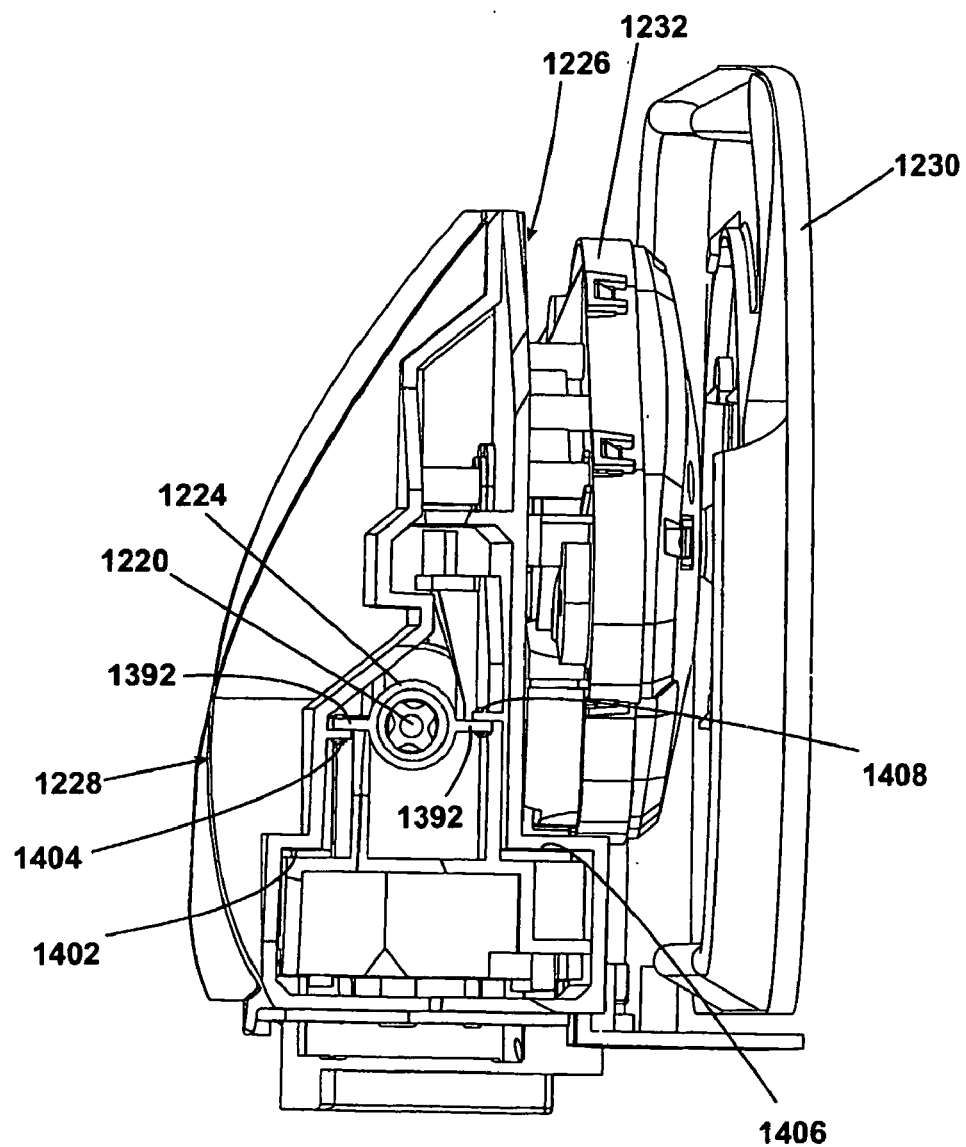
FIG. 85 is an end view of the rearview mirror assembly of FIG. 72 with the housing removed for clarity.

Looking also at FIG. 85, the shell bracket 1228 is secured by conventional means to the carriage bracket 1226 with the carriage arm 1214 between them. The shaft 1224 has pair of wings 1392 at its distal end. The shell bracket 1228 has a bearing surface 1402 adapted to ride on one of the guide surfaces 1386 of the carriage arm 1214. It also has a mounting tab 1404 positioned to connect to one of the wings 1392 of the shaft 1224. The carriage bracket 1226 also has a guide surface 1406 adapted to ride on another of the guide surfaces 1386 of the carriage arm 1214, and it also has a mounting tab 1408 positioned to connect to the other of the wings 1392 of the shaft 1224. It will be apparent that with this structure, as the shaft 1224 moves, so does the shell bracket 1228 and the carriage bracket 1226.

Figure 83:
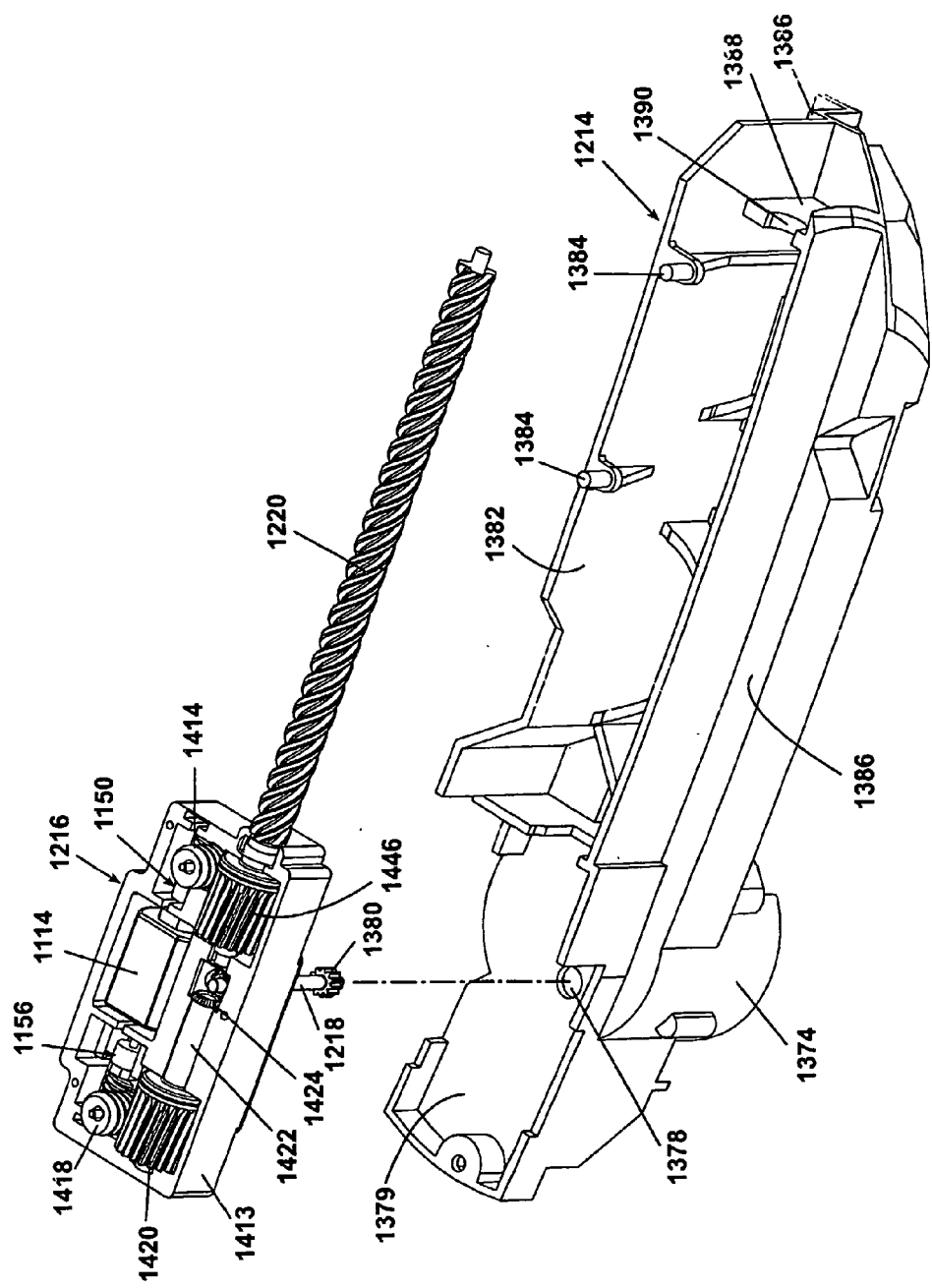
FIG. 83 is a perspective exploded view of some of the components shown in FIG. 81, including the motor according to the invention with the cover removed in relation to the drive assembly.
Figure 84:
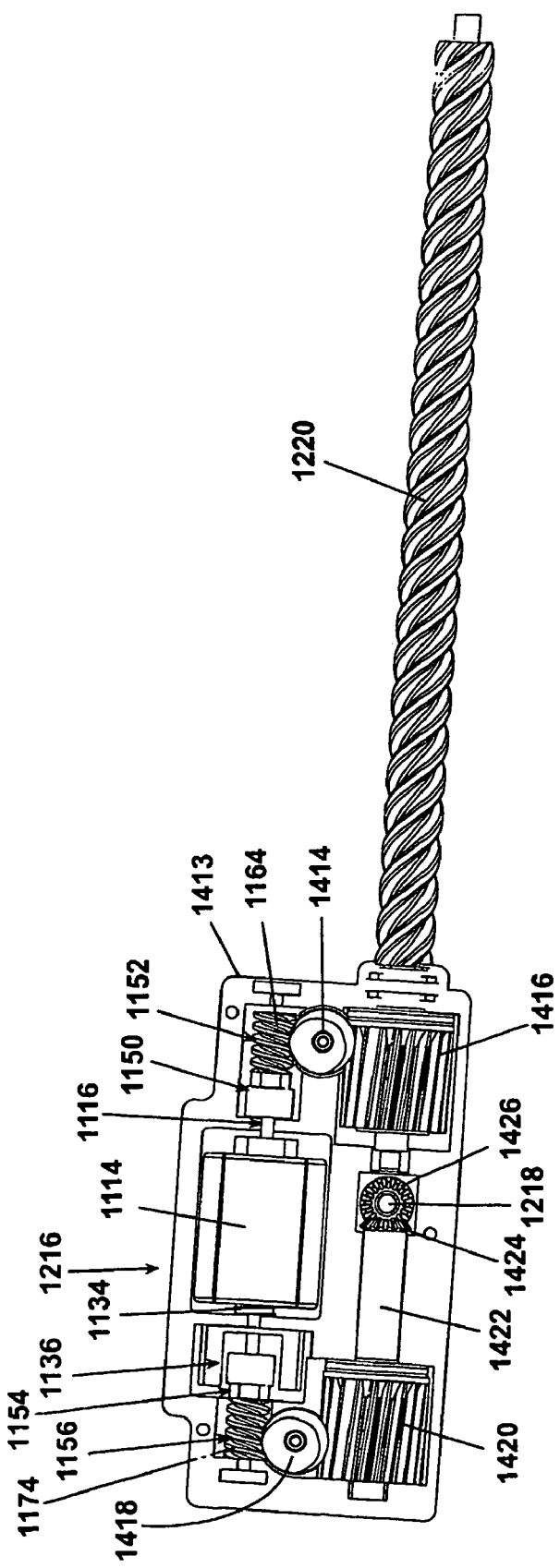
FIG. 84 is a plan view of the motor assembly of FIGS. 82 and 83 with the extend output screw.

Looking now more closely at FIGS. 83 and 84, the motor assembly 1216 will be described, as it is adapted to the present application in the rearview mirror 1200. Components described above with respect to the motor assembly 1216 according to the invention and used herein will bear like numerals for ease of reference. The motor assembly 1216 comprises a case 1413 in which the motor 1115, drive shaft 1116, and spring 1134 are disposed as described above. The spring 1134 biases the motor 1115 so that the first clutch 1150 engages the first output shaft 1152 in driving engagement with the drive shaft 1116 at low motor speed. Simultaneously, the second clutch 1154 disengages the second output shaft 1156 from the drive shaft 1116. At a higher motor speed, the fly 1136 causes the motor 1115 to move against the bias of the spring 134 so that the clutch 1154 engages the second output shaft 1156 with the drive shaft 1116 and disengages the first output shaft 1152 from the drive shaft 1116.

A first transfer gear 1414 is disposed adjacent to the worm gear 1164 on the first output shaft 1152 to transfer power to a first drive gear 1416. The transfer gear 1414 will have a toothed portion to engage the worm gear 1174 and a worm portion to engage the first drive gear 1416. Similarly, a second transfer gear 1418 is disposed adjacent to the worm gear 1174 on the second output shaft 1156 to transfer power to a second drive gear 1420. Like the first transfer gear 1414, the second transfer gear 1418 will have a toothed portion to engage the worm gear 1174 and a worm portion to engage the second drive gear 1420. The second drive gear 1420 further has an extension shaft 1422 that terminates in a first pinion gear 1424 which engages a second pinion gear 1426 at the upper end of the power fold drive shaft 1218. The first drive gear 1416 is connected axially to the power extend drive shaft 1220.

Operation of the power extend function is accomplished by energizing the motor 1115 at a low voltage B, thus driving the first output shaft 1152 and the power extend shaft 1220 via the first transfer gear 1414 and the first drive gear 1416. Rotation of the power extend shaft 1220 causes the threaded nut 1222 to traverse the shaft 1220, depending upon the direction of rotation. As the nut 1222 moves, so does the shaft 1224 and also the rest of the mirror structure connected thereto by way of the shell bracket 1228 and the carriage bracket 1226. When the motor 1115 is operated in one direction, the mirror assembly 1230 is thus urged away from the mirror support 1204, and when the motor 1115 is operated in the opposite direction, the mirror assembly 1230 is urged toward the mirror support 1204.

When the motor 1115 is energized at a high voltage A, centrifugal force on the fly 1136 due to higher speed of the motor 1115 causes disengagement of the first output shaft 1152 and engagement of the second output shaft 1156, driving the power fold drive shaft 1218 via the second transfer gear 1418, the second drive gear 1420, the extension shaft 1422 and the pinion gears 1424, 1426. Rotation of the gear 1380 on the power fold drive shaft 1218 acting against the teeth 1350 of the ring gear 1342 in the pivot mechanism 1210 walks the gear 1380 around the ring gear 1342, causing the entire carriage arm 1214 to rotate relative to the pivot mechanism 1210.

If the mirror assembly 1230 is forcibly pivoted, such as would occur if it were to strike an immovable object, the actuator sub ring 1330 is separated from engagement with the ring gear 1342. The actuator sub ring 1330 can ride against the underside of the ring gear 1342 against the bias of the spring 1352 until the detents 1348 re-engage with the slots 1336 on the actuator sub ring 1330 whereupon the motor 115 can once again drive the rotation of the carriage arm 1214.

Turning now to the application of the motor assembly 111 according to the invention in a tilt adjustment mechanism, a relevant embodiment is shown in FIGS. 86 and 87, wherein components described above with respect to the motor assembly 1111 according to the invention and used herein will bear like numerals for ease of reference. Here a motor assembly 1428 is shown adapted for mounting to the mirror assembly 1230 to actuate adjustment of the mirror position about a single pivot point 1430 by a first drive connection 1432 on a first axis "x" and a second drive connection 1434 on a second axis "y." It will be apparent that movement at the first connection 1432 will cause rotation about the x-axis and movement at the second connection 1434 will cause rotation about the y-axis. The mirror assembly 1230 along with the tilt adjustment mechanism is encased in a mirror housing 1234.

The mirror assembly 1428 comprises a case 1436 in which the motor 1115, the drive shaft 1116, and the spring 1134 are disposed as described above. The spring 1134 biases the motor 1115 so that the first clutch 1150 engages the first output shaft 1152 in driving engagement with the drive shaft 1116 at a low motor speed. Simultaneously, the second clutch 1154 disengages the second output shaft 1156 from the drive shaft 1116. At a higher motor speed, the fly 1136 causes the motor 1115 to move against the bias of the spring 1134 so that the clutch 1154 engages the second output shaft 1156 with the drive shaft 1116 and disengages the first output shaft 1152 from the drive shaft 1116.

A first transfer gear 1438 is disposed adjacent to the worm gear 1164 on the first output shaft 1152 to transfer power to a first drive gear 1440. The first transfer gear 1438 will have a toothed portion to engage the worm gear 1164 and a worm portion to engage the first drive gear 1440. Similarly, a second transfer gear 1442 is disposed adjacent to the worm gear 1174 on the second output shaft 1156 to transfer power to a second drive gear 1444. Like the first transfer gear 1438, the second transfer gear 1442 will have a toothed portion to engage the worm gear 1174 and a worm portion to engage the second drive gear 1444. The first and second drive gears 1440, 1444 each have a pinion gear 1446, 1448, respectively, that drive shafts 1450, 1452. The shafts 1450, 1452 are connected to the first and second connections 1432, 1434, respectively.

Operation of the tilt adjustment function is accomplished by energizing the motor 1115 at a low voltage B, thus driving the first output shaft 1152 and the connection shaft 1450 via the first transfer gear 1438 and the first drive gear 1440. When the motor 1115 is energized at a high voltage A, centrifugal force on the fly 1136 due to higher speed of the motor 1115 causes disengagement of the first output shaft 1152 and engagement of the second output shaft 1156, driving the connection shaft 1452 via the second transfer gear 1442 and the second drive gear 1444. Preferably, the motor 1115 is reversible so that rotation about x and y-axes can be accomplished in both directions.

Of course, the actuation of the tilt adjustment function can also be accomplished with fewer gears, such as by eliminating the reduction gears 1440, 1444 (and their child gears) and driving the mirror carrier directly from the shafts 1438, 1442. An example of a linear screw assembly for performing the mirror tilt function is shown in commonly-assigned U.S. patent application Ser. No. 60/319,176, filed Apr. 9, 2002, which is incorporated herein by reference. A basic embodiment of the mounting between the motor and the mirror carrier for the tilt adjustment function is shown in U.S. Pat. No. 4,740,068, issued Apr. 26, 1988, which is incorporated herein by reference.

It should be understood that the output shafts on the motor assembly are not limited to worm gears. In the illustrated applications, the motor assembly can be adapted to operate only the power fold function or only the power extend function. The arm 1138 on the drive shaft 1116 is not limited to having living hinges. The arm can be flexible enough to bow without hinges to accomplish the same result.

Figure 88:
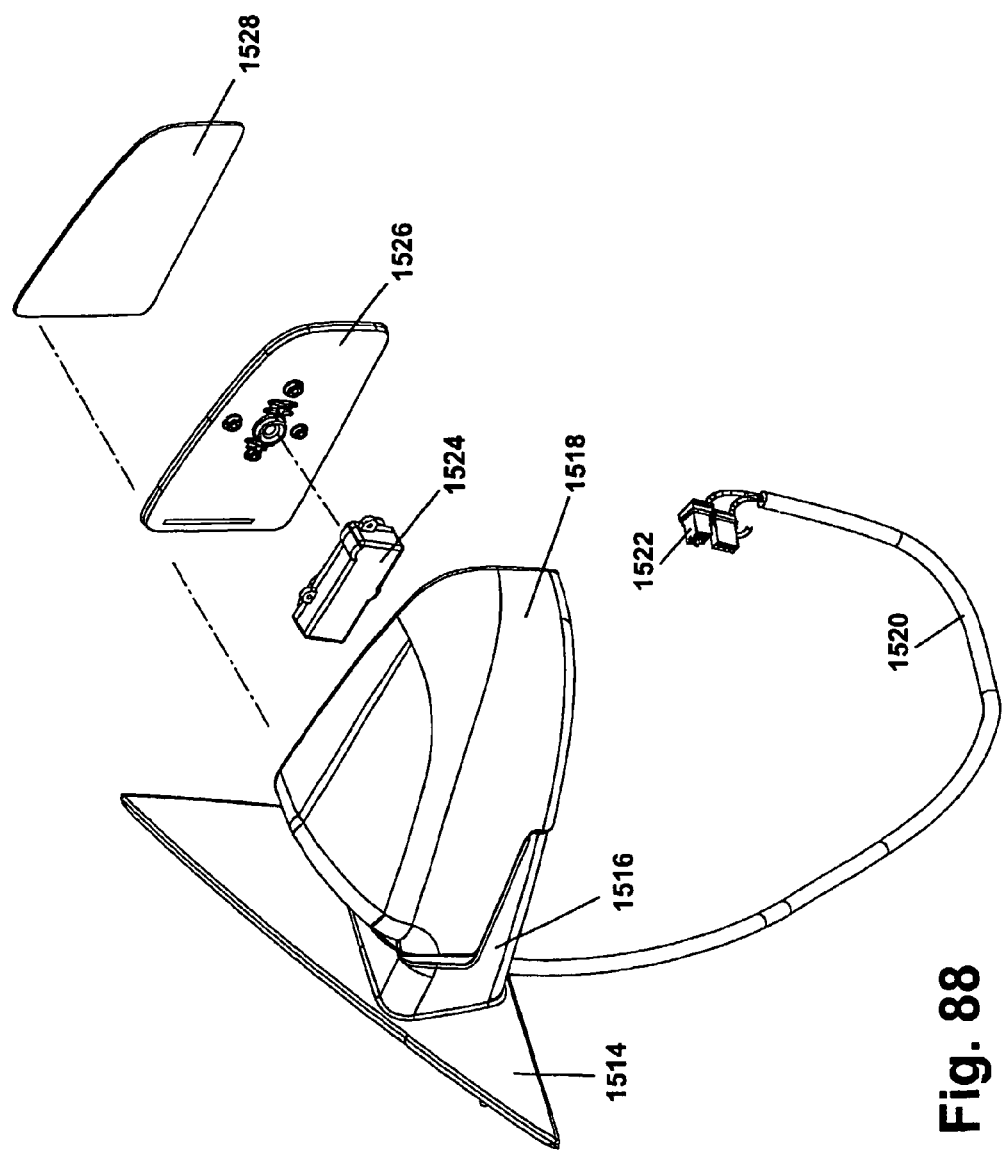
FIG. 88 is an exploded view of a sixth embodiment of the mirror assembly of FIG. 1 showing a tilt actuator for selectively tilting a reflective element about a horizontal axis and a vertical axis using a single motor selectively operated at either a high-speed or a low speed.

Referring now to FIGS. 88-100, a seventh embodiment of a motorized actuator assembly 1524 according to the invention is shown comprising a portion of a mirror assembly comprising a mounting panel 1514 for mounting the mirror assembly to the vehicle 12, a base 1516, a shell 1518 enclosing the actuator assembly 1524, a glass case 1526, and a reflective element 1528. The actuator assembly 1524 is electrically connected through a wire harness 1520 and a plug-type connector 1522 to controls (not shown) inside the vehicle 12. The actuator assembly 1524 comprises a single-motor actuator assembly for adjusting the tilt of the reflective element 1528 about horizontal and vertical axes. As shown in FIGS. 88 and 94, the actuator assembly 1524 can be of any suitable shape to accommodate the various components described herein and the mounting of the actuator assembly 1524 in the shell 1518, and can be mounted to a frame 1530 enclosed within the shell 1518.

Conceptually, the single motor actuator assembly 1524 comprises a direct-current electric motor powered from the vehicle's 12-volt system, a speed-sensitive clutch mechanism, and a pair of actuators which operably communicate with the motor and the clutch mechanism. The motor is adapted for operation at either a high speed or a low speed. A resistance element, such as a conventional electrical resistor, in series with the motor is used for low speed operation as hereinafter described.

Figure 89:
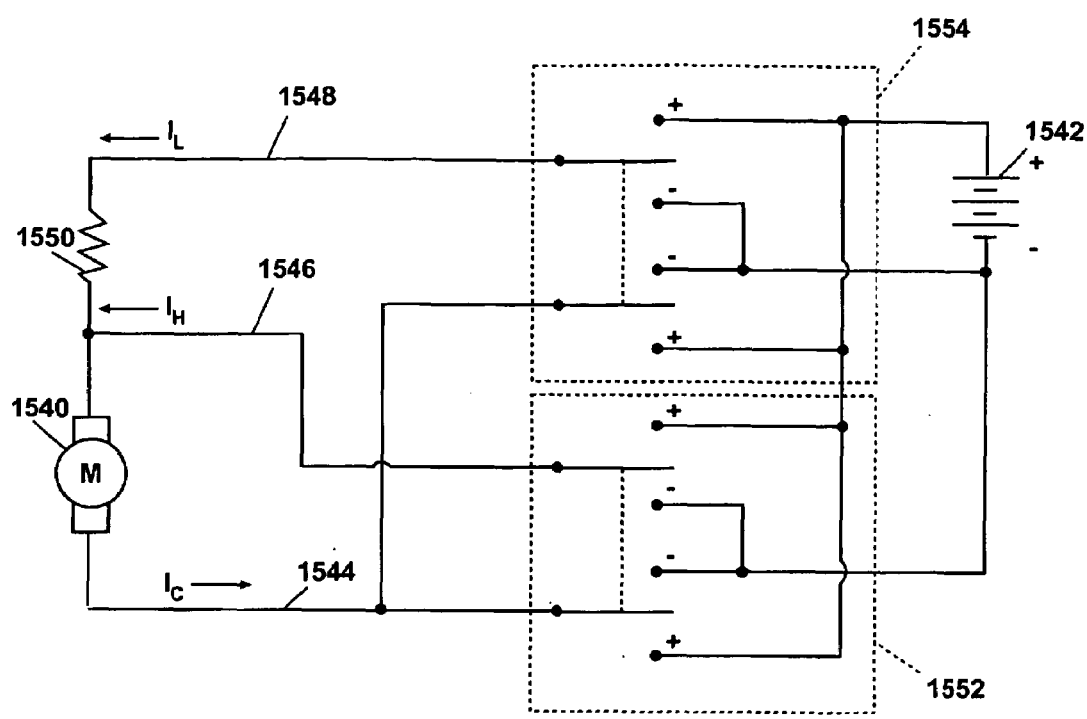
FIG. 89 is a schematic view of a wiring diagram for the tilt actuator of FIG. 88 having a resistor selectively connected in series with the motor wherein the motor is operated at a high-speed when the resistor is not electrically connected with the motor, and at a low speed when the resistor is electrically connected with the motor.

FIG. 89 shows a schematic representation of the motor speed control. The motor 1540 is electrically connected to the vehicle's 12-volt power supply 1542 through a common lead 1544 and suitable low- and high-speed leads 1546 and 1548. A pair of switches 1552 and 1554, shown in the drawings as conventional double-throw, center-off, switches, are used to selectively activate or deactivate the motor 1540. The double-throw switches 1552 and 1554 are preferably employed so that the motor 1540 can be operated in both directions, i.e., the electrical connections between the power supply 1542 and the motor 1540 being suitable so that, when the switches 1552 and 1554 are thrown in either direction, the particular resulting polarity will operate the motor in the desired direction.

When the switch 1552 is closed (and the switch 1554 located in the center-off position), current, represented by the arrow labeled $I_H$, will flow from the power source 1542 through the high-speed lead 1546 to the motor 1540, to return via the common lead 1544, represented by the arrow labeled $I_C$, in a complete circuit. With this circuit, the motor 1540 will turn at a first, high speed. As shown also in FIG. 89, a resistance element, such as a conventional electrical resistor 1550, is electrically connected to the vehicle's 12-volt power supply 1542 through the common lead 1544 and a low speed lead 1548 in series with the motor 1540. Current flow through the resistor 1550 is controlled through a switch 1554.

When the switch 1554 is closed (and the switch 1552 located in the center-off position), current, represented by the arrow labeled $I_L$, will flow from the power source 1542 through the low-speed lead 1548 to the motor 1540, to return via the common lead 1544, represented by the arrow labeled $I_C$, in a complete circuit. With this circuit, the motor 1540 will turn at a second, low speed due to the added resistance of the drop resistor 1550, i.e., causing a voltage drop across the motor 1540.

The lower current through the motor 1540 will cause the motor 1540 to turn at a low speed. Thus, simply by selectively activating and deactivating the switches 1552 and 1554, current flow through the motor 1540 can be controlled, thereby alternating the speed of the motor 1540 between a high speed and a low speed, respectively. It will be readily apparent to one of ordinary skill in the art that the resistor 1550 can comprise a conventional resistor of suitable resistance for the purposes described herein, or some other electrical device performing a selected function but also having a resistance value suitable for the purposes described herein.

Figure 90:
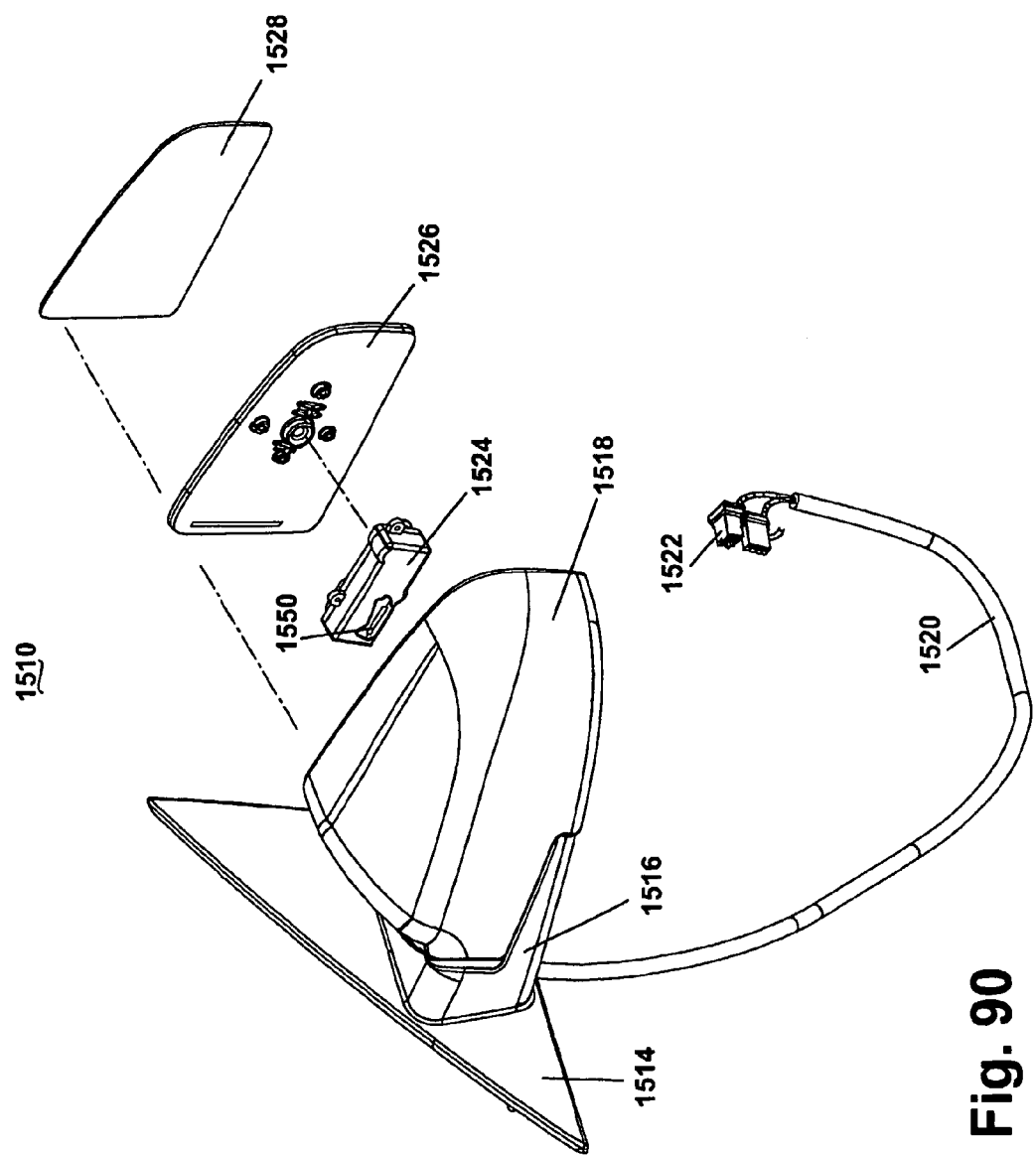
FIG. 90 is substantially the view shown in FIG. 88 with the actuator partially cut away to show the resistor mounted therein.
Figure 91:
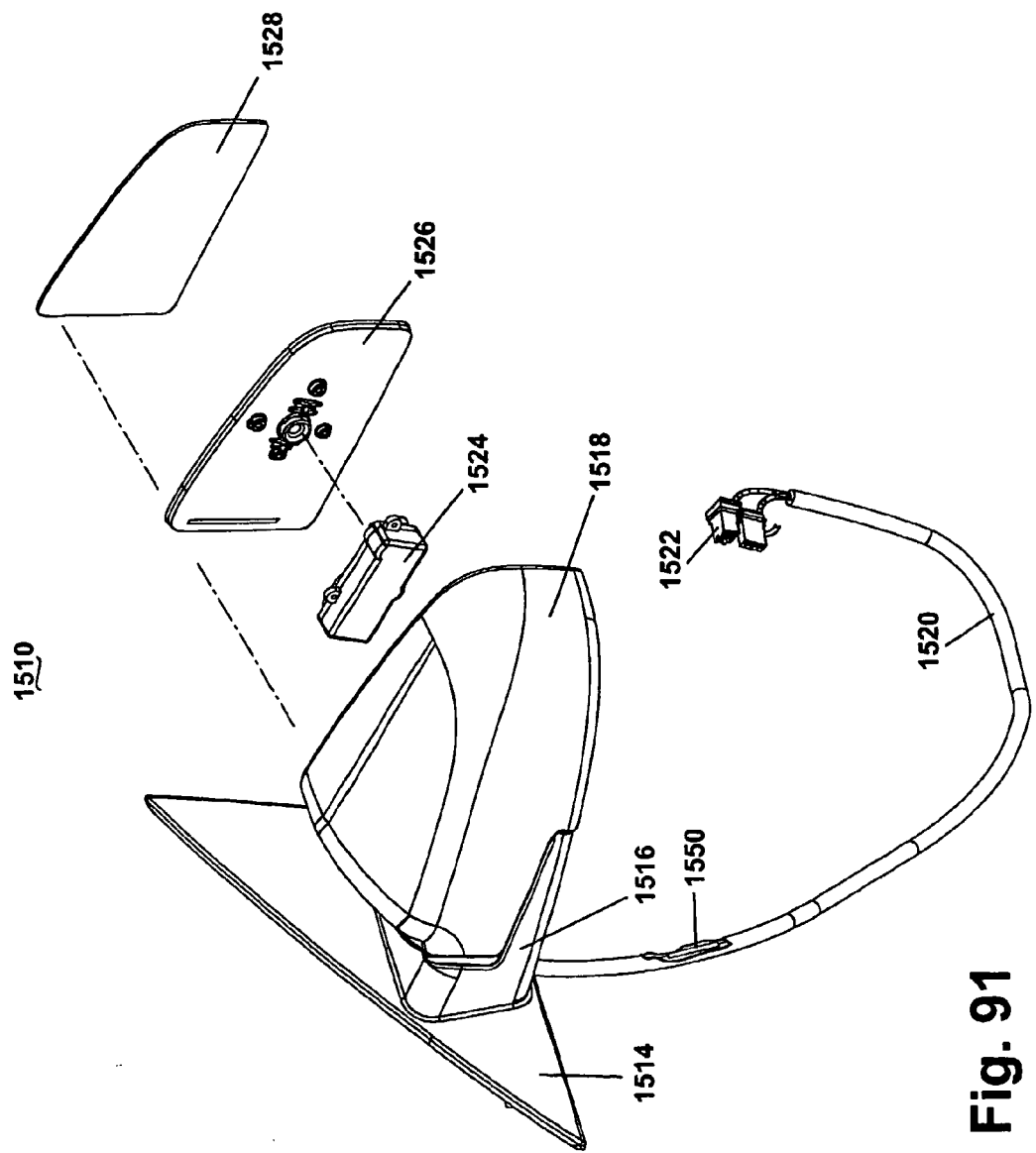
FIG. 91 is substantially the view shown in FIG. 88 showing the resistor mounted within a wire harness comprising a portion of the mirror assembly.
Figure 92:
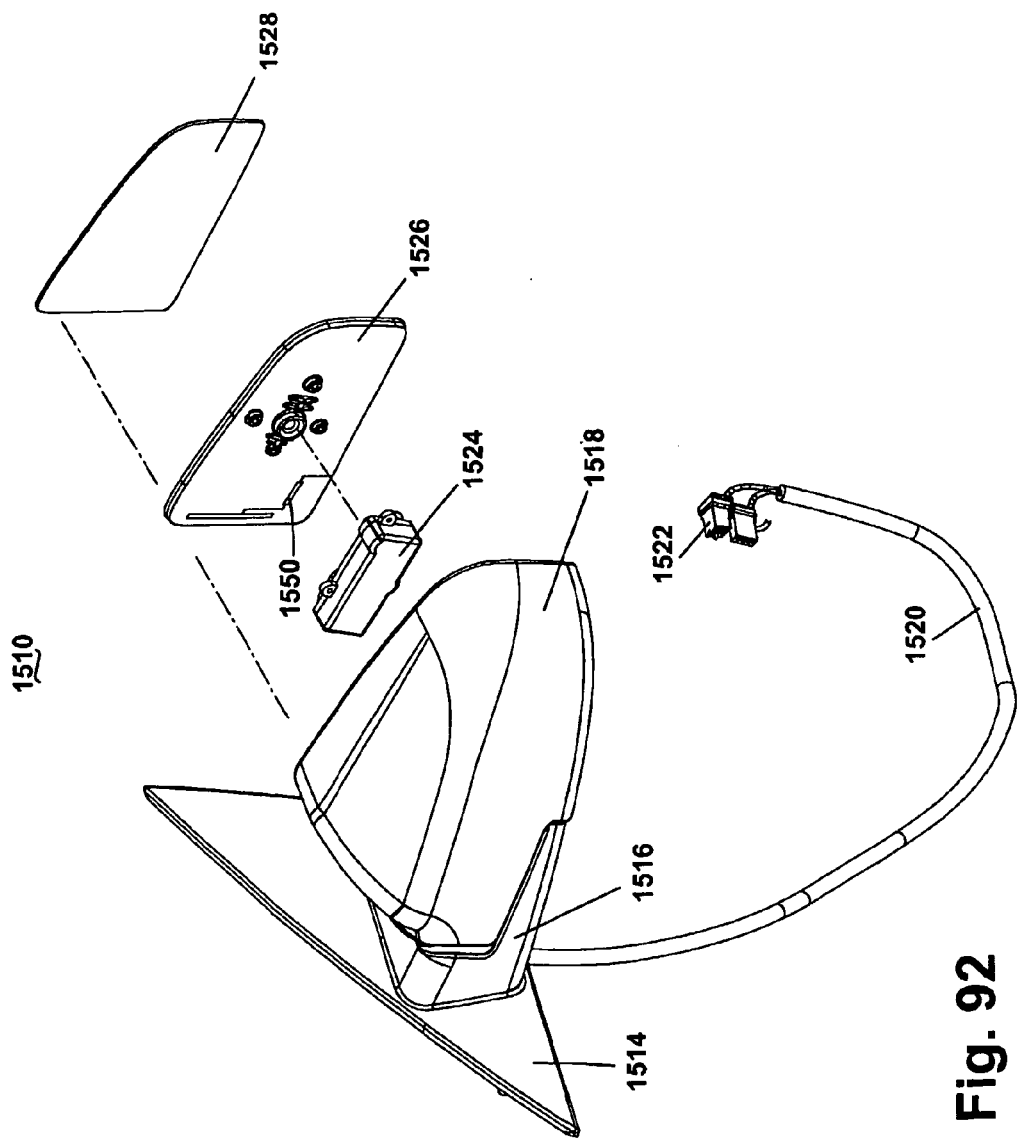
FIG. 92 is substantially the view shown in FIG. 88 showing the resistor mounted to a glass case comprising a portion of the mirror assembly.

The resistor 1550 can be electrically tied into the control circuitry at various locations, provided that the basic circuit configuration shown in FIG. 89 is maintained. FIG. 90 shows the resistor 1550 electrically connected at the actuator 1524 in proximity to the motor 1540. FIG. 91 shows the resistor 1550 incorporated into the wire harness 1520. FIG. 92 shows the resistor mounted to the glass case 1526, such as in mirror assemblies that include puddle lights, mirror mounted turn signals, or electrochromic mirrors.

Figure 93:
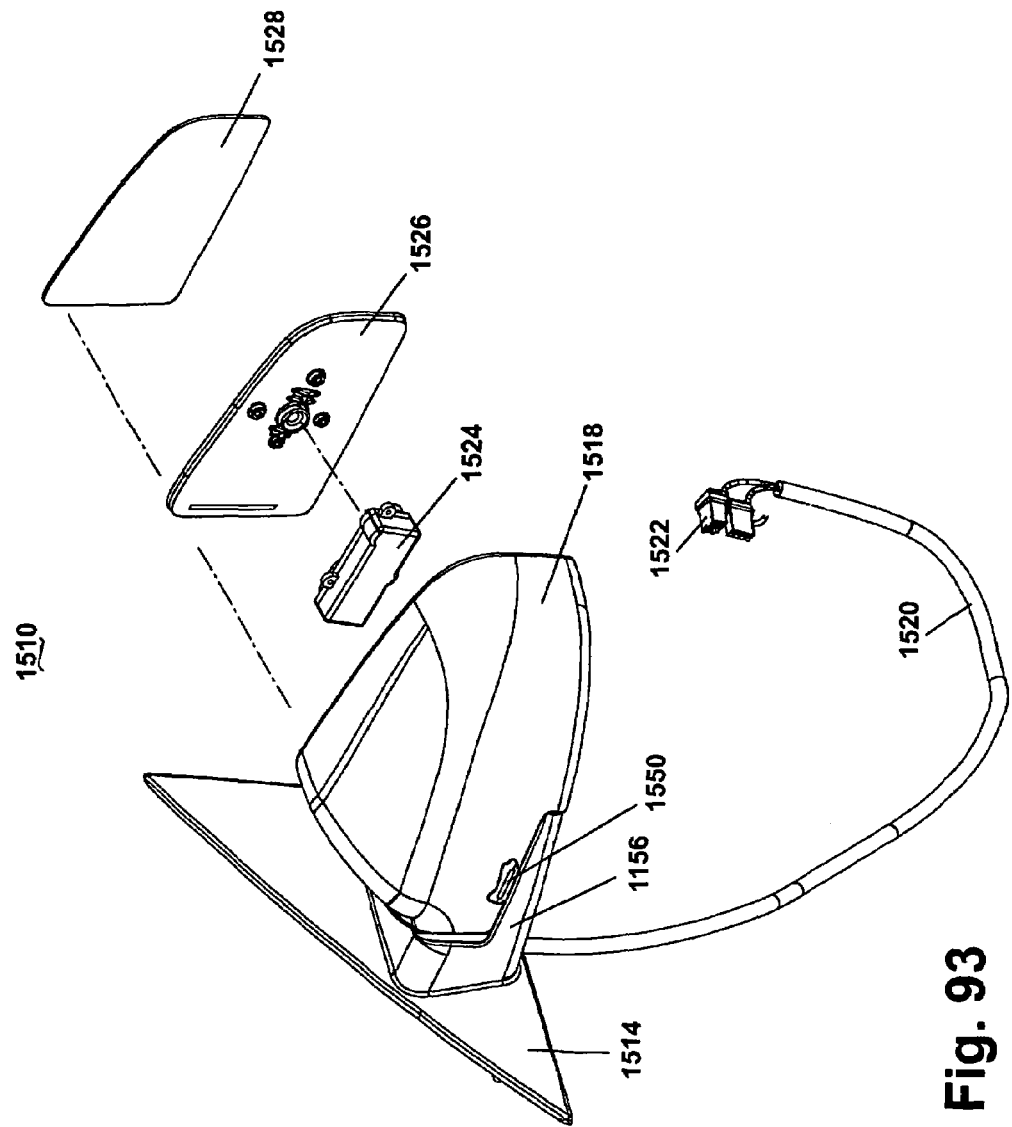
FIG. 93 is substantially the view shown in FIG. 88 showing the resistor mounted to a shell comprising a portion of the mirror assembly.
Figure 94:
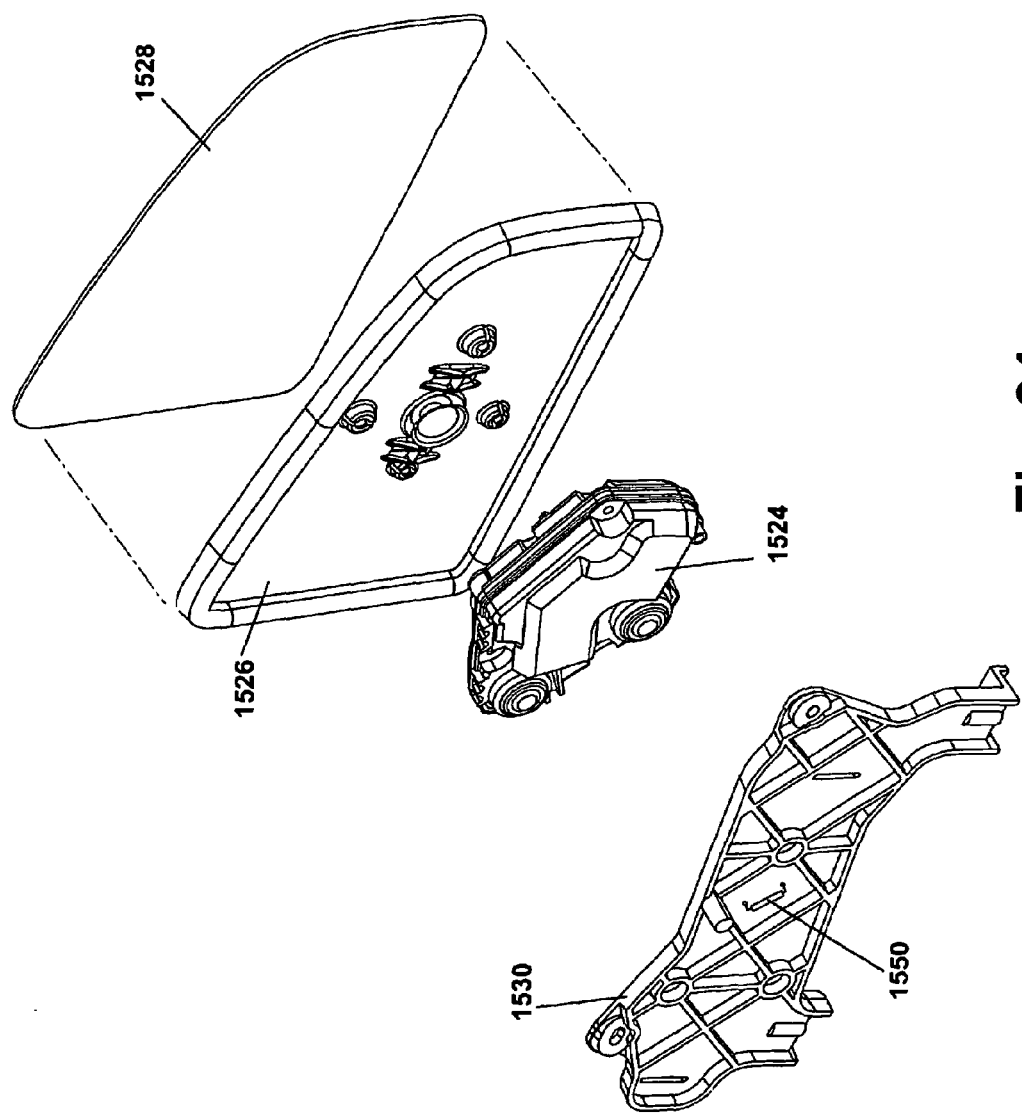
FIG. 94 is an exploded view of a portion of the mirror assembly of FIG. 1 showing the resistor mounted to a frame comprising a portion of the mirror assembly.
Figure 95:
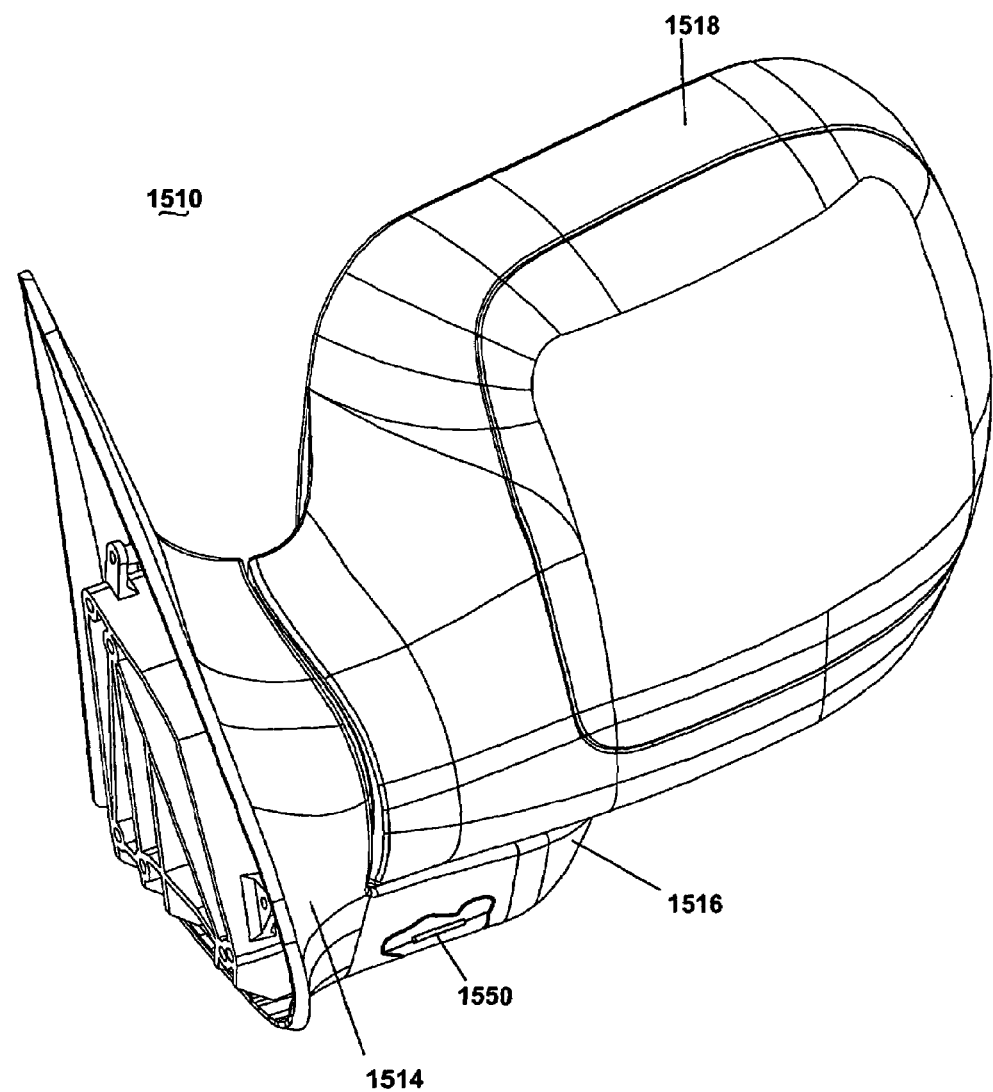
FIG. 95 is a perspective view of a portion of the mirror assembly of FIG. 1 showing the resistor mounted to a base comprising a portion of the mirror assembly.
Figure 96:
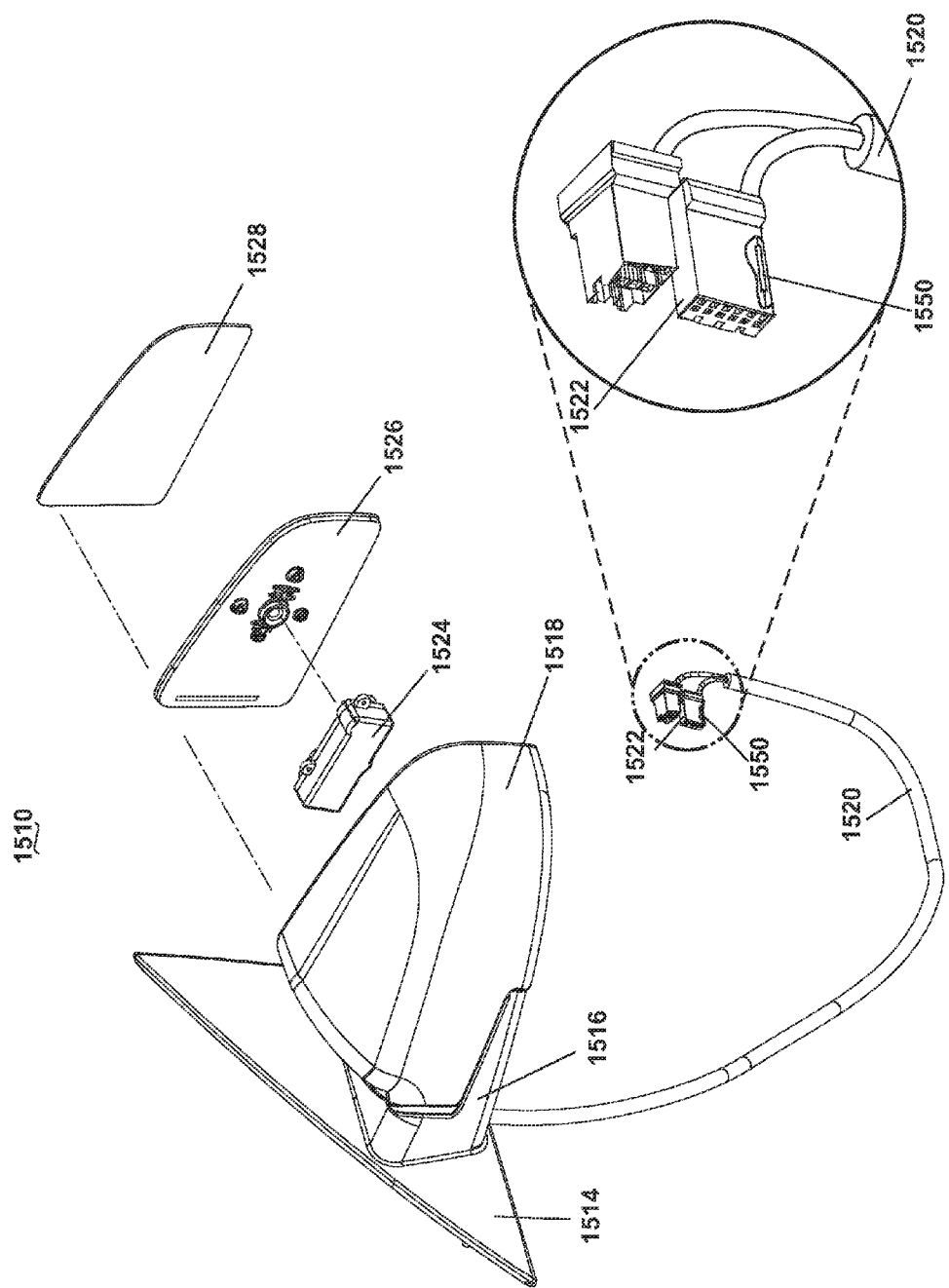
FIG. 96 is substantially the view shown in FIG. 88 showing the resistor mounted to a connector comprising a portion of the mirror assembly.
Figure 97:
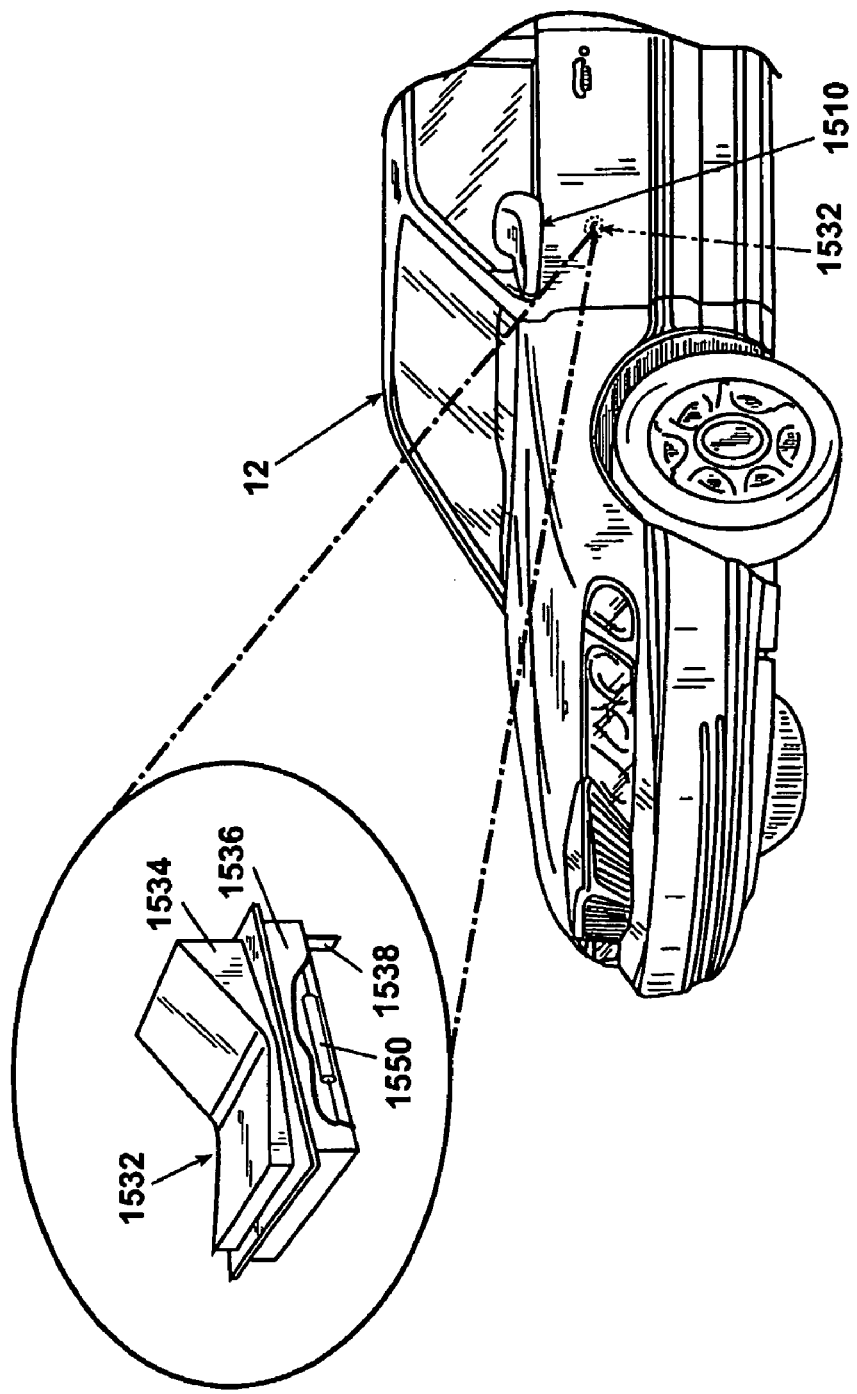
FIG. 97 is a perspective view of a tilt actuator switch comprising a portion of the mirror assembly of FIG. 1 with a portion cut away to show the resistor mounted therein.
Figure 98:
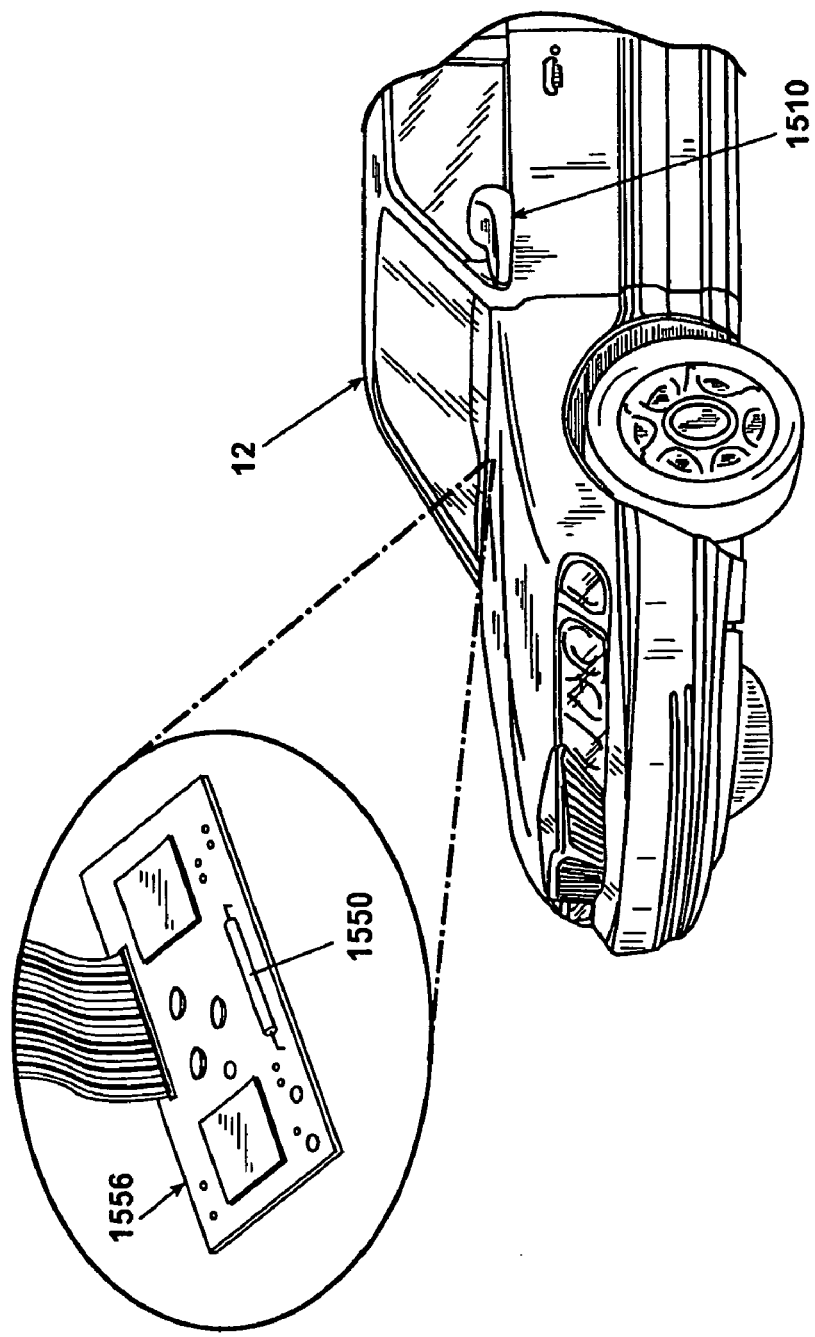
FIG. 98 is a perspective view of the motor vehicle shown in FIG. 1 showing the resistor 50 mounted to a control unit for control of the mirror assembly.

FIG. 93 shows the resistor 1550 mounted within the shell 1518. FIG. 94 shows the resistor 1550 mounted in the frame 1530 to which the actuator 1524 is mounted. FIG. 95 shows the resistor 1550 mounted within the base 1516. FIG. 96 shows the resistor 1550 mounted within the connector 1522. FIG. 97 shows a switch assembly 1532 for operating the tilt actuator 1524 comprising a toggle switch 1534 mounted in a switch base 1536 having electrical connectors 1538. The resistor 1550 is mounted in the switch base 1536 and is electrically connected to the appropriate connector 1538. FIG. 98 shows a control unit or memory board 1556 comprising a portion of the control mechanism for the mirror assembly with the resistor 1550 mounted therein. It will be readily apparent to one of ordinary skill in the art that the resistor 1550 can be mounted in any convenient location in the vehicle 12 appropriate to its use as described herein.

Figure 99:
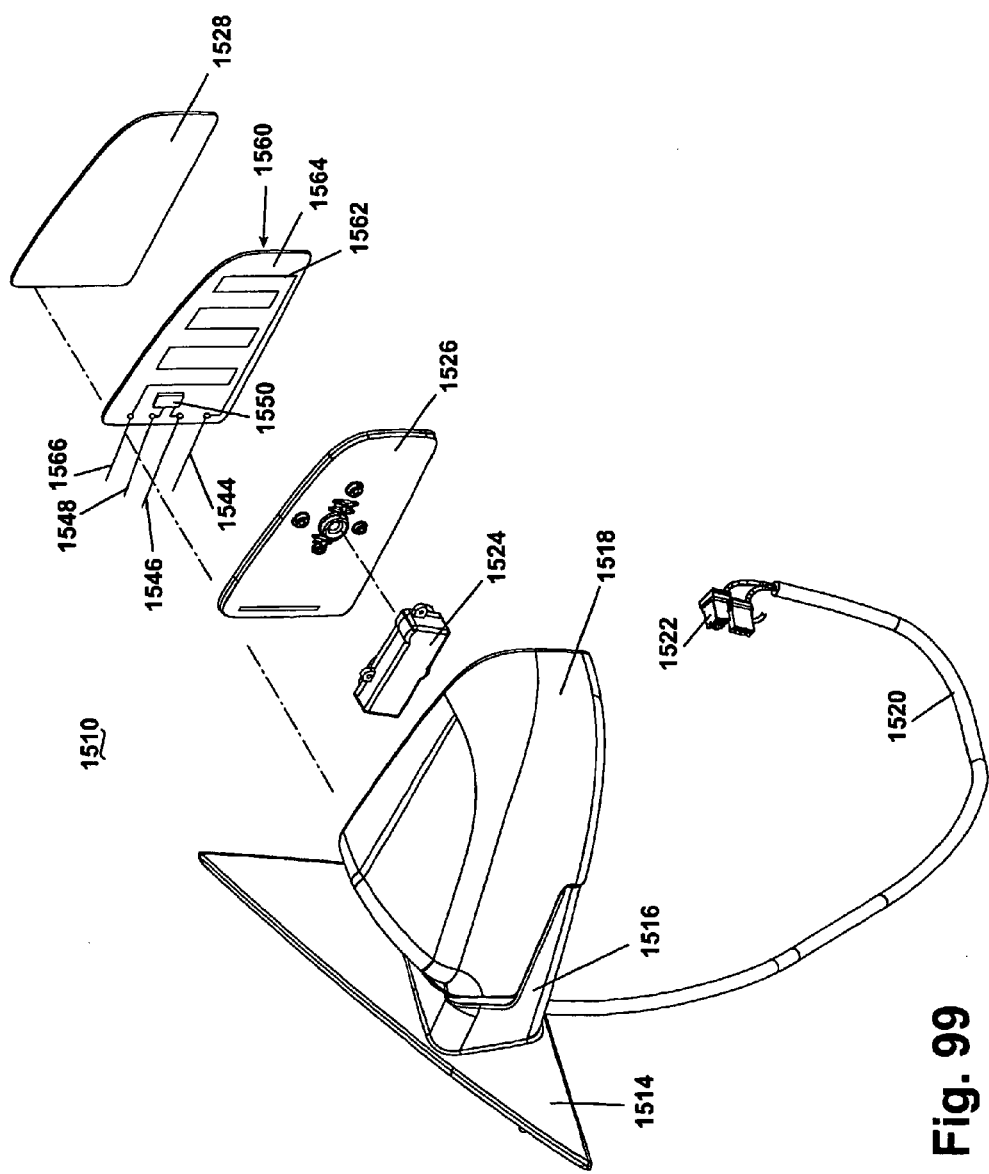
FIG. 99 is an exploded view of the mirror assembly of FIG. 1 comprising a mirror heater element incorporating the resistor.
Figure 100:
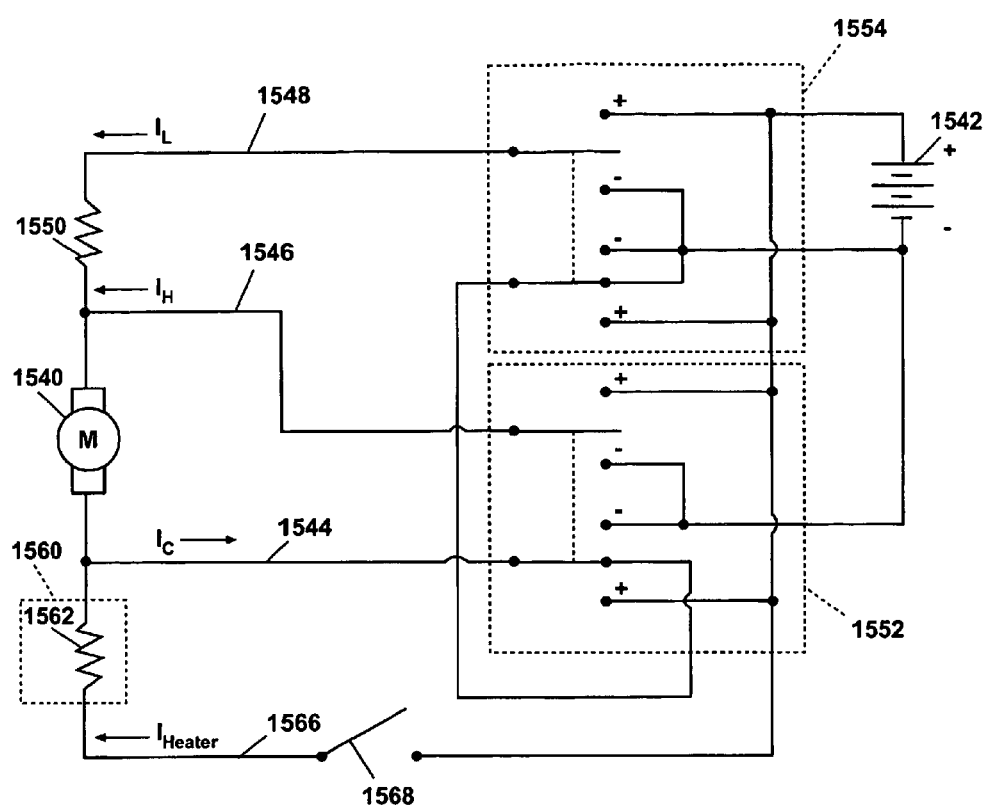
FIG. 100 is a schematic view of a wiring diagram for the tilt actuator and mirror heater element of FIG. 99.

FIG. 99 shows an embodiment of the previously described mirror assembly additionally comprising a mirror heating assembly 1560 for defrosting the reflective element 1528. The mirror heating assembly 1560 comprises a heater 1562 mounted to a panel 1564 to which the reflective element 1528 is mounted. The heater 1562 is electrically connected to the common lead 1544 and to a heater feed 1566. The resistor 1550 is mounted to the panel 1564 and electrically connected to the common lead 1544 and to the low-speed lead 1548 as previously described. FIG. 100 shows a schematic of the circuitry for this second embodiment.

The circuitry shown in FIG. 100 incorporates the circuitry of FIG. 89 with the addition of the heater 1562 which is electrically connected to the power supply 1542 through the heater feed 1566 and a generally conventional heater switch 1568. As shown in FIG. 100, the heater 1562 can be operated by closing the heater switch 1568 independent of the operation of the motor 1540. The motor 1540 can be operated at a high speed with the closing of the high-speed switch 1552, or at a low speed with the closing of the low-speed switch 1554, independent of the operation of the heater 1562. While the circuit of FIG. 100 shows an example where the motor 1540 and the heater 1568 are operated exclusively of one another (i.e., when the motor 1540 is actuated, the heater 1562 is disconnected), it will be readily apparent that both the motor 1540 and the heater 1562 can be connected together to operate simultaneously as operating conditions or available voltage permit. When the heater switch 1568 is closed, the current $I_{Heater}$ will flow through to the common lead 1544 alone, or in conjunction with either the high or low-speed current $I_H$ or $I_L$.

Figure 101:
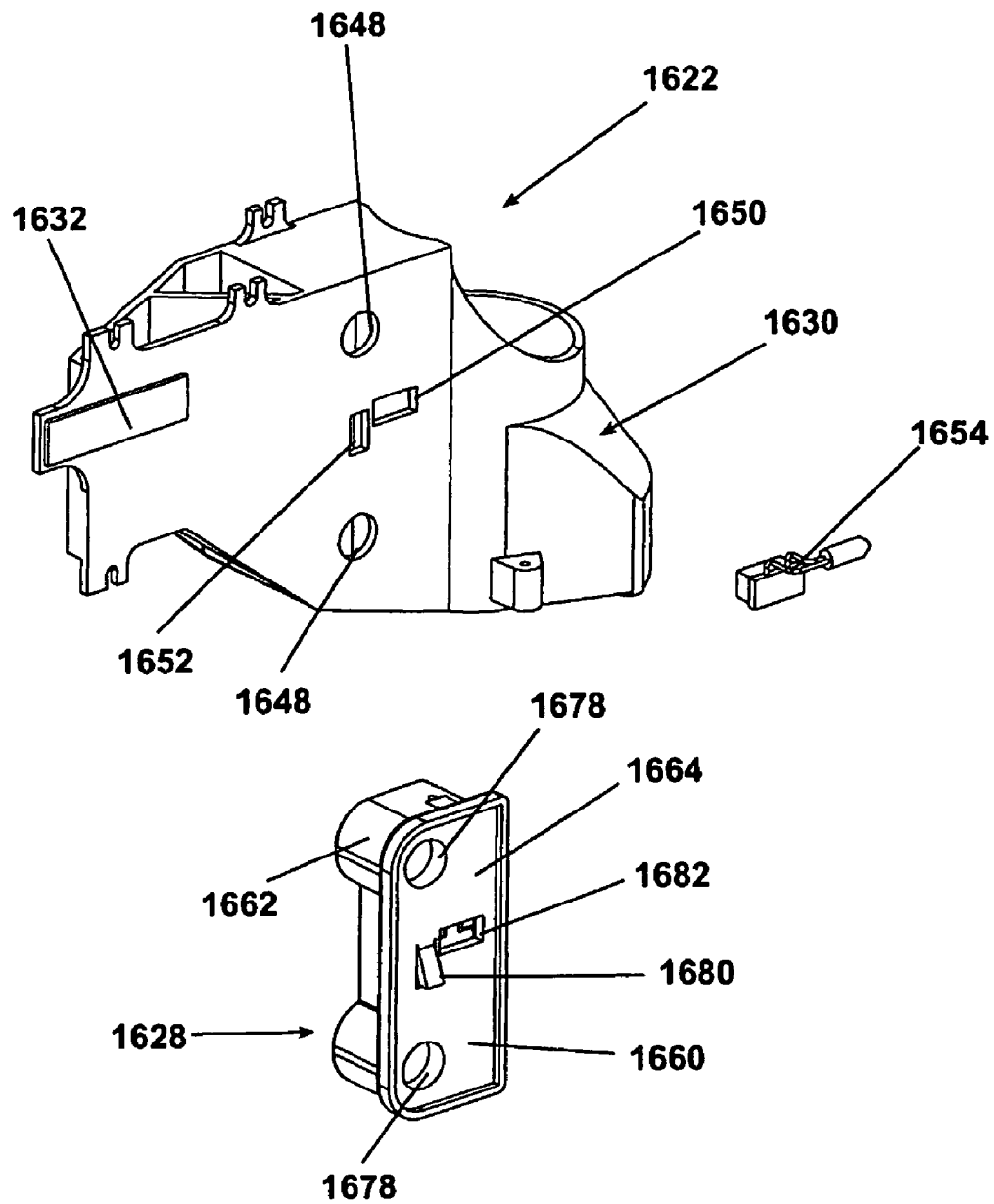
FIG. 101 is an exploded view of a mounting frame and a single-motor modular tilt actuator assembly comprising a seventh embodiment of the mirror assembly of FIG. 1 in which the modular tilt actuator assembly can be inserted upwardly into a chamber in the mounting frame from the exterior of the mirror assembly.
Figure 102:
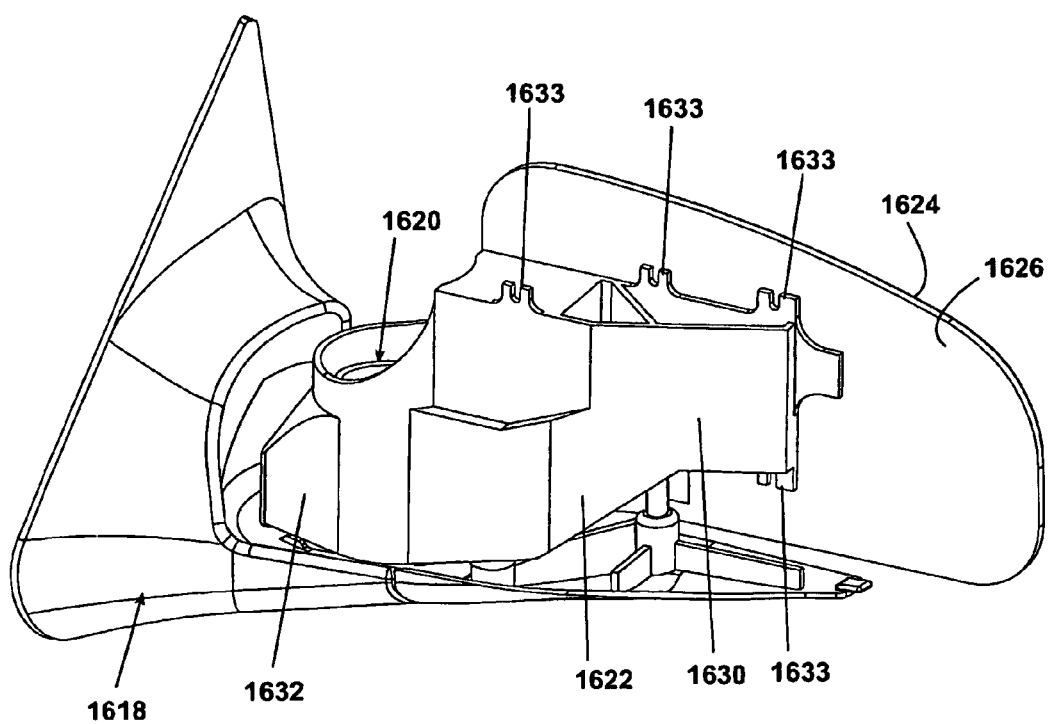
FIG. 102 is a close-up perspective view of the interior of a mirror assembly showing the mounting frame of FIG. 101.
Figure 103:
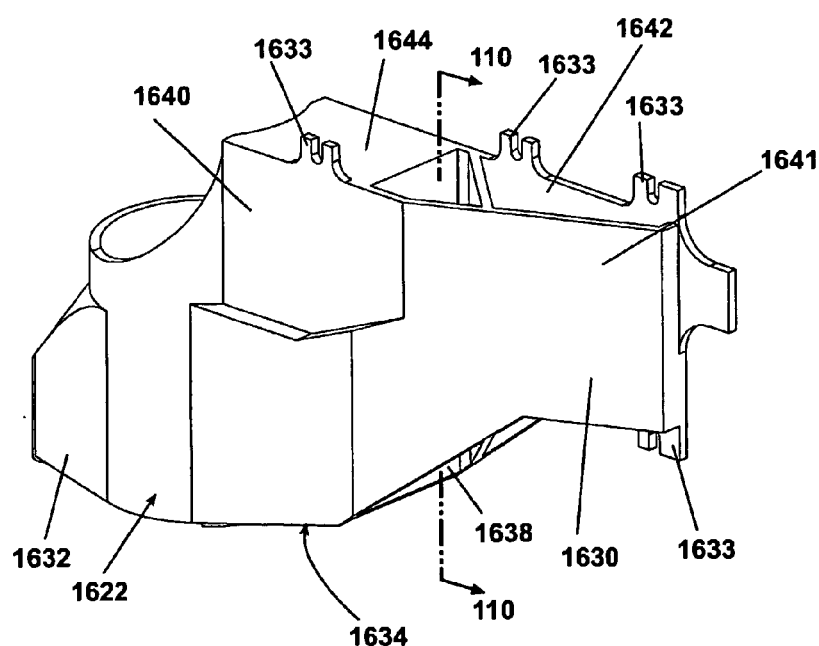
FIG. 103 is a first perspective view of an obverse side of the mounting frame shown in FIG. 102.
Figure 104:
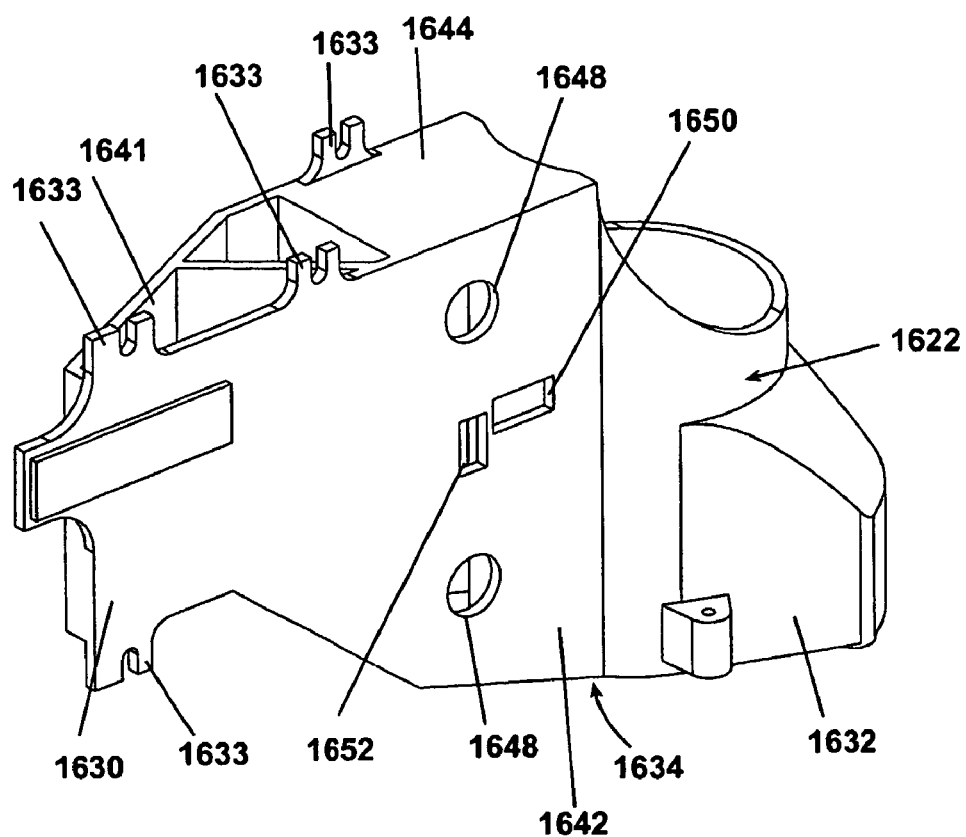
FIG. 104 is a second perspective view of a reverse side of the mounting frame shown in FIG. 102.

Referring now to FIG. 101, a seventh embodiment of the mirror assembly is shown which is similar in many respects to the previous embodiments of the mirror assembly described herein but comprises an alternate mounting frame 1622 and a modular tilt actuator assembly 1628. As shown also in FIG. 109, the mirror assembly comprises an enclosure 1614, a reflective element assembly 1616 comprising a reflective element 1624, and a base assembly 1618 similar to the prior embodiments of the mirror assembly, and the tilt actuator assembly 1628 as hereinafter described. In the preferred embodiment, the reflective element assembly 1616 is pivotably attached to the base assembly 1618 through a pivot assembly for pivotal movement of the reflective element assembly 1616 relative to the base assembly 1618, and folding of the mirror assembly inward adjacent the vehicle door panel. Optionally, the reflective element assembly 1616 can be fixedly attached to the base assembly 1618.

Referring to FIGS. 102-106, the mounting frame 1622 is a generally irregularly-shaped, somewhat oblong body having a mounting end 1630 and a pivot end 1632 which supports the reflective element 1624 and mounts the tilt actuator assembly 1628 as hereinafter described. The reflective element 1624 is pivotably mounted to the mounting end 1630 in a generally conventional manner. The pivot end 1632 is adapted for pivotal rotation of the mounting frame 1622 relative to the base assembly 1618. An example of such a pivot assembly and its operation is shown and described in U.S. patent application Ser. No. 60/319,508, filed Aug. 29, 2002, entitled "Vehicular Mirror With Simplified Powered Folding Mechanism," which is incorporated herein by reference.

The mounting frame 1622 comprises an actuator chamber 1634 intermediate the mounting end 1630 and the pivot end 1632, adapted to slidably receive the tilt actuator assembly 1628. The actuator chamber 1634 is defined by an arcuate proximal wall 1636 comprising a portion of the pivot end 1632, and a distal wall 1638 in generally parallel, spaced-apart juxtaposition. An anterior wall 1640 and a posterior wall 1642 extend orthogonally from the distal wall 1638 in generally parallel, spaced-apart juxtaposition. The anterior wall 1640 transitions to an inclined wall 1641 which intersects the posterior wall 1642 to form the mounting end 1630. As shown in FIG. 10, a medial wall 1645 extends through the mounting end 1630 orthogonal to the inclined wall 1641 and the posterior wall 1642 to form a generally H-shaped cross-section in the mounting end 1630.

Figure 105:
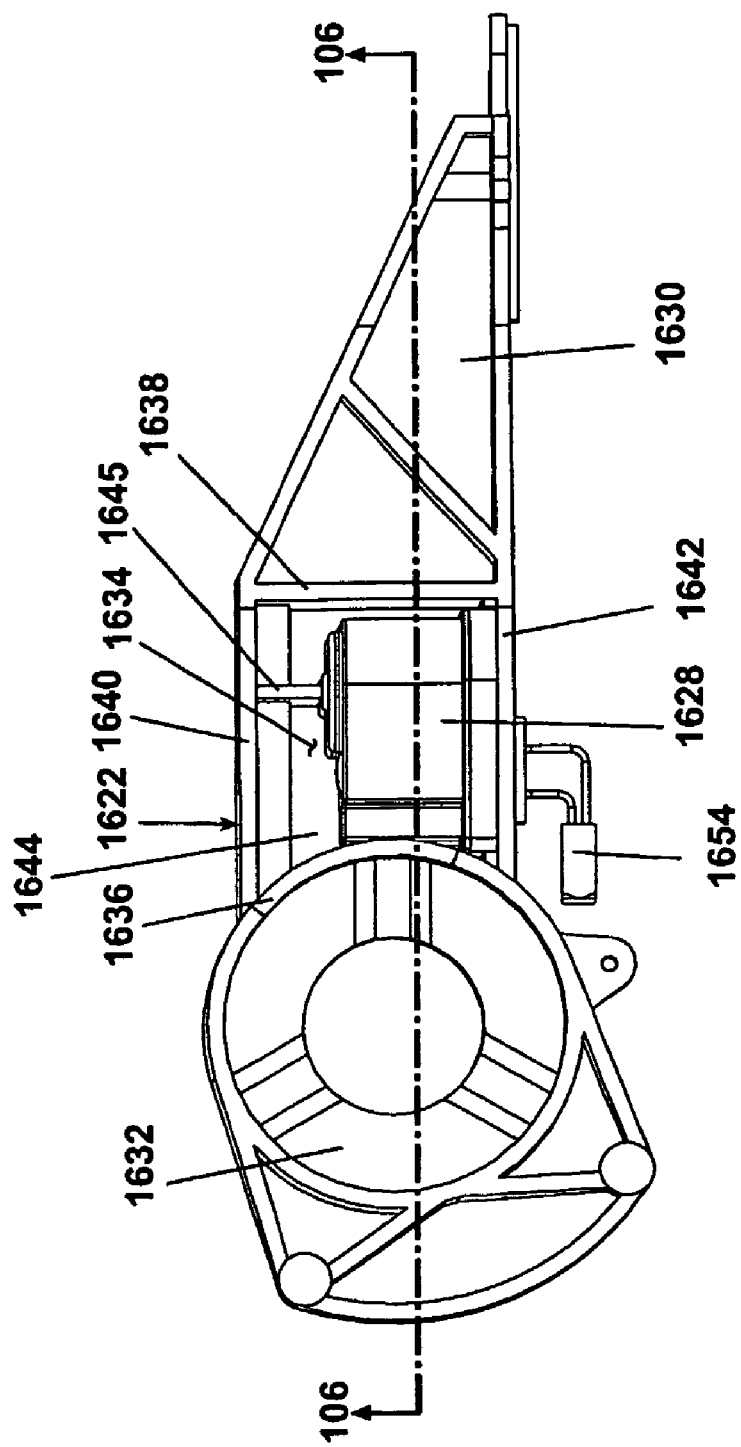
FIG. 105 is a plan view from underneath of the mounting frame shown in FIG. 103 showing the tilt actuator assembly installed in the mounting frame.

As shown in FIG. 105, at least one spacer 1656 extends orthogonally from the anterior wall 1640 into the actuator chamber 1634. An upper portion of the actuator chamber 1634 is closed by an upper wall 1644 extending orthogonally from the walls 1636-1642. A lower portion of the actuator chamber 1634 opposite the upper wall 1644 comprises an opening 1646. Referring specifically FIG. 104, the posterior wall 1642 is provided with a pair of vertically spaced-apart jackscrew apertures 1648, a rectangular plug slot 1650, and a rectangular snap-fit slot 1652, each of which extends therethrough to the actuator chamber 1634. The mounting frame 1622 is also provided with a plurality of suitably-positioned mounting ears 1633 for attaching the enclosure 1614, wiring, and other appurtenant devices to the mounting frame 1622.

Figure 106:
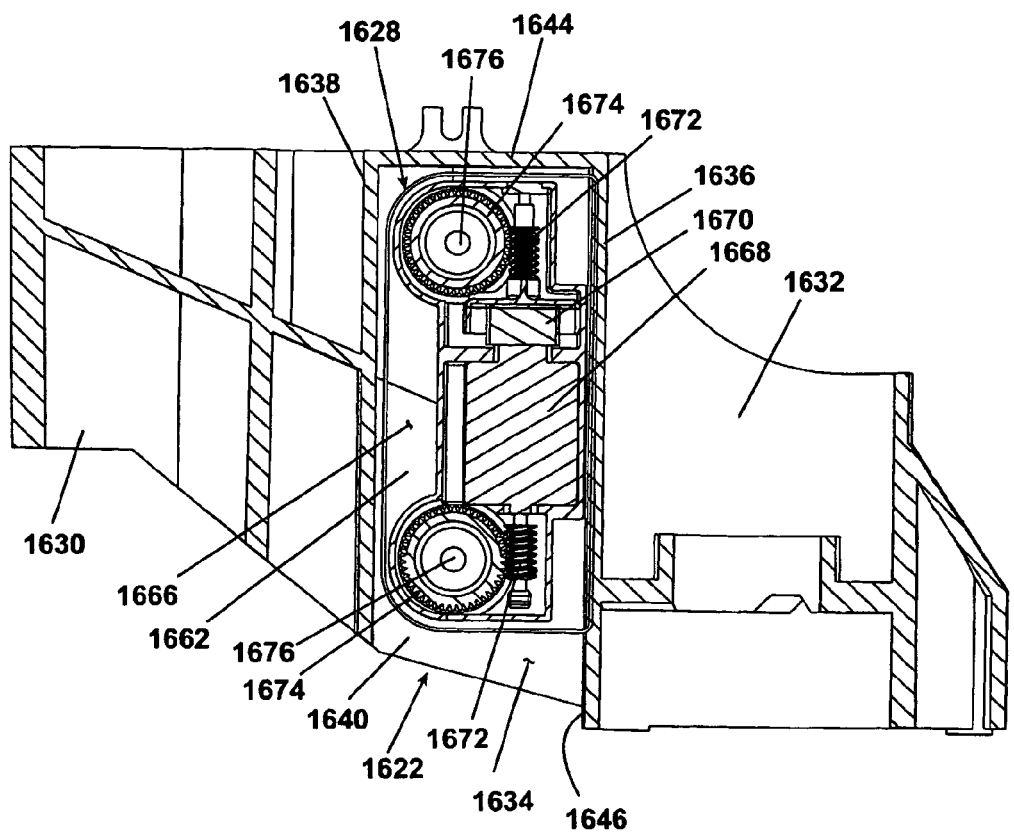
FIG. 106 is a sectional view of the mounting frame and tilt actuator assembly taken along line 106-106 of FIG. 105.
Figure 107:
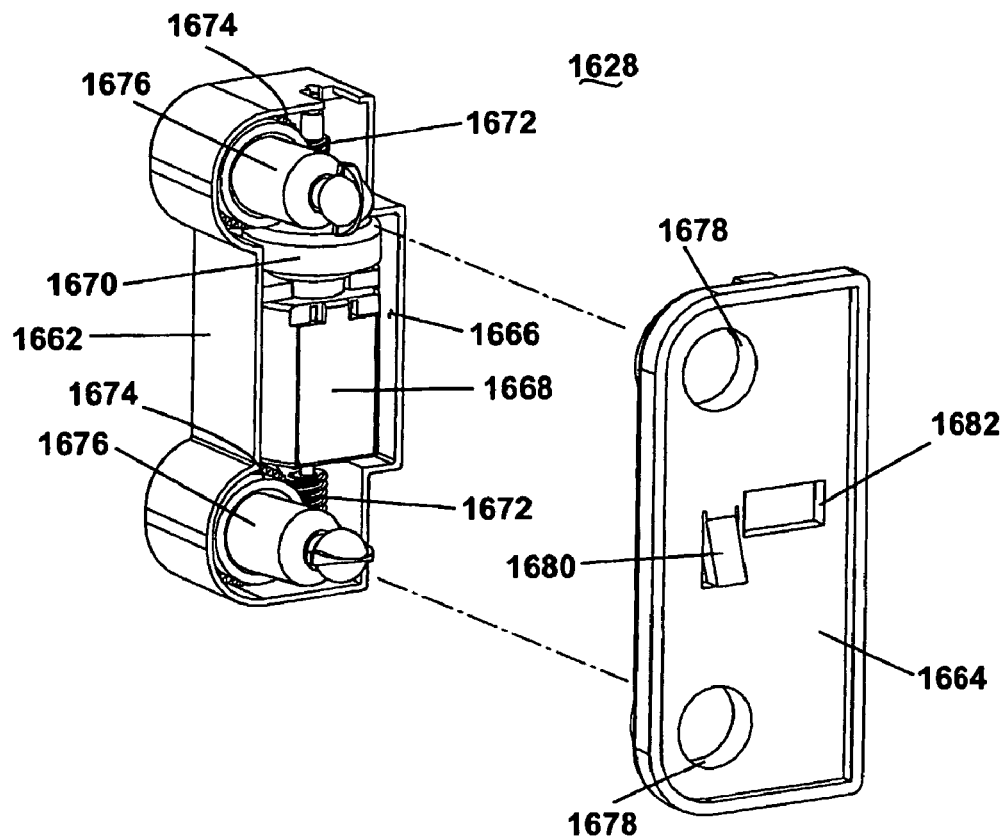
FIG. 107 is an exploded view of the tilt actuator assembly of FIG. 101 showing an assembly of operable components housed in an actuator case comprising an enclosure and a cover.
Figure 108:
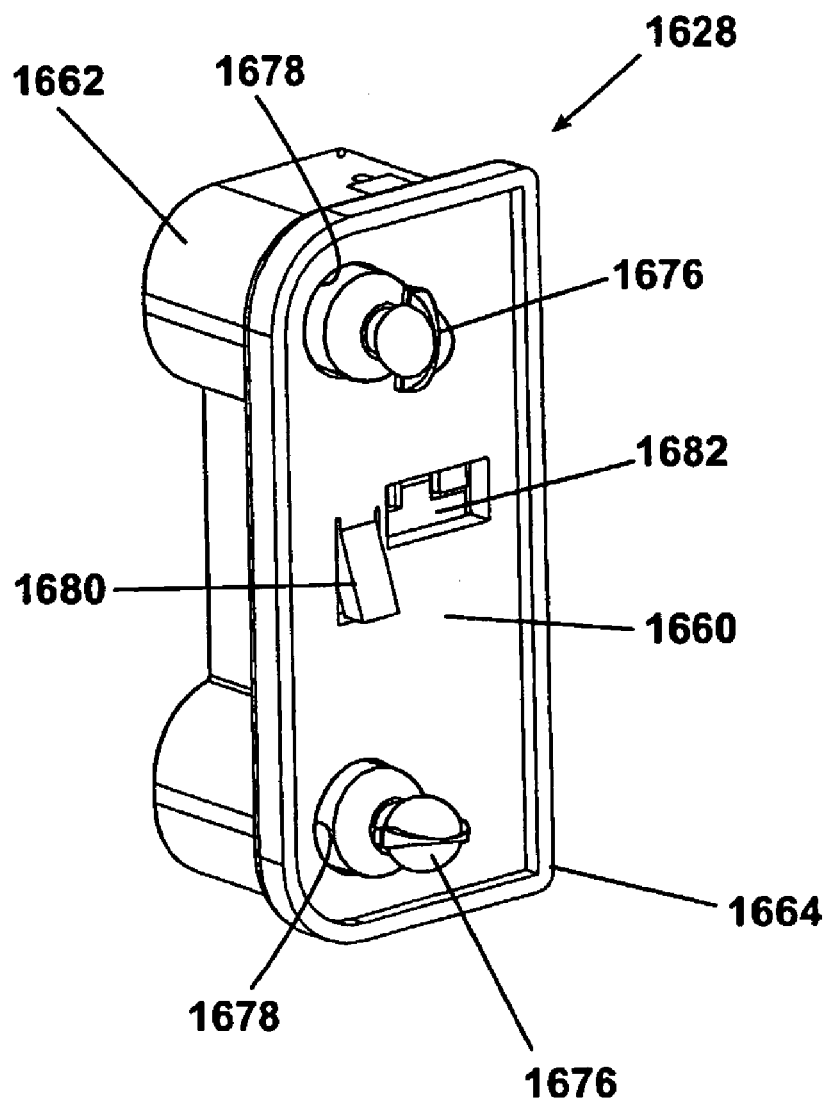

The tilt actuator assembly 1628 is shown in FIGS. 106-108, and comprises a generally oblong, box-like actuator case 1660 comprising an enclosure base 1662 and a removable mating cover 1664 forming an enclosed chamber 1666 when the cover 1664 is installed on the enclosure base 1662, for enclosing a motor 1668, a clutch assembly 1670, a pair of worm gears 1672 driving mating drive gears 1674, which in turn drive a pair of generally parallel, spaced-apart jackscrews 1676, as described herein with respect to several of the prior embodiments. The cover 1664 is provided with an inclined snap finger 1680 which is adapted with a resilient living hinge for inward elastic deflection of the snap finger 1680, a plug slot 1682 extending therethrough and adapted for juxtaposed alignment with the plug slot 1650 in the mounting frame 1622, and a pair of spaced-apart jackscrew apertures 1678 extending therethrough and adapted for juxtaposed alignment with the jackscrews apertures 1648 for slidable insertion of the jackscrews 1676 therethrough. The actuator case 1660 is adapted for slidable communication with the mounting frame 1622 by insertion of the actuator case 1660 into the actuator chamber 1634 so that the cover 1664 is in slidable communication with the posterior wall 1642 and the spacers 1656 are in slidable communication with the enclosure base 1662 to urge the cover 1664 against the posterior wall 1642, as shown in FIG. 105. The actuator case 1660 will be held in the actuator chamber 1634 by the interference fit of the snap finger 1680 in the snap-fit slot 1652. The jackscrews 1676 will extend through the jackscrew apertures 1648, 1678 for operable attachment of the reflective element assembly 1616. A generally conventional electrical plug connector 1654 provides electrical communication with the vehicle's power supply and control system for powering and controlling the tilt actuator assembly 1628. As shown in FIGS. 105 and 108, the plug connector 1654 is inserted through the plug slots 1650, 1682 into a mating receptacle (not shown) iii the motor 1668 for providing power and control of the tilt actuator assembly 1628.

Figure 109:
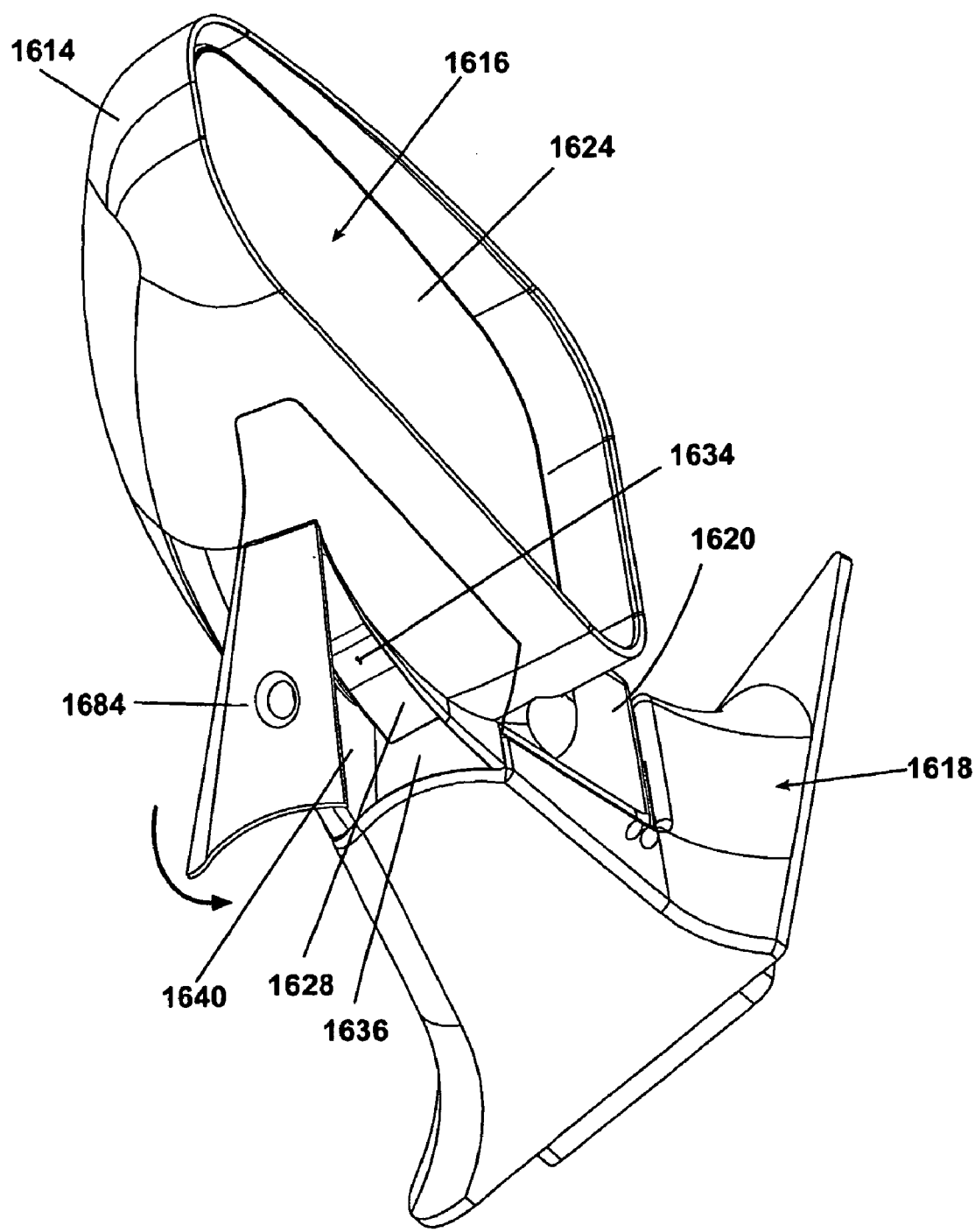

Referring now to FIG. 109, the enclosure 1614 is provided with a hinged access door 1684 for access to the actuator chamber 1634. The access door 1684 is hingedly attached to the enclosure 1614 for providing access to the actuator chamber 1634 when the access door 1684 is in an open position, thus enabling the insertion and removal of the tilt actuator assembly 1628 from the actuator chamber 1634. The access door 1684 is retained in a closed position through a generally conventional closure mechanism, such as a snap-fit closure or by an interference fit (not shown).

Figure 111:
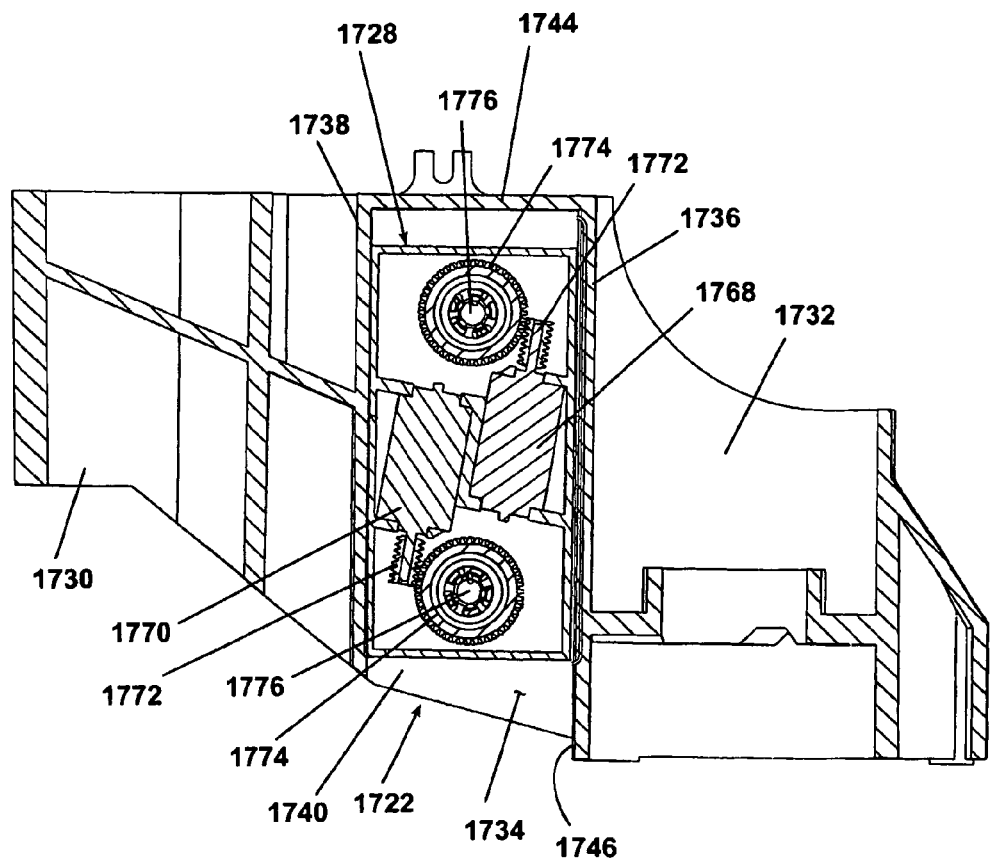
Figure 112:
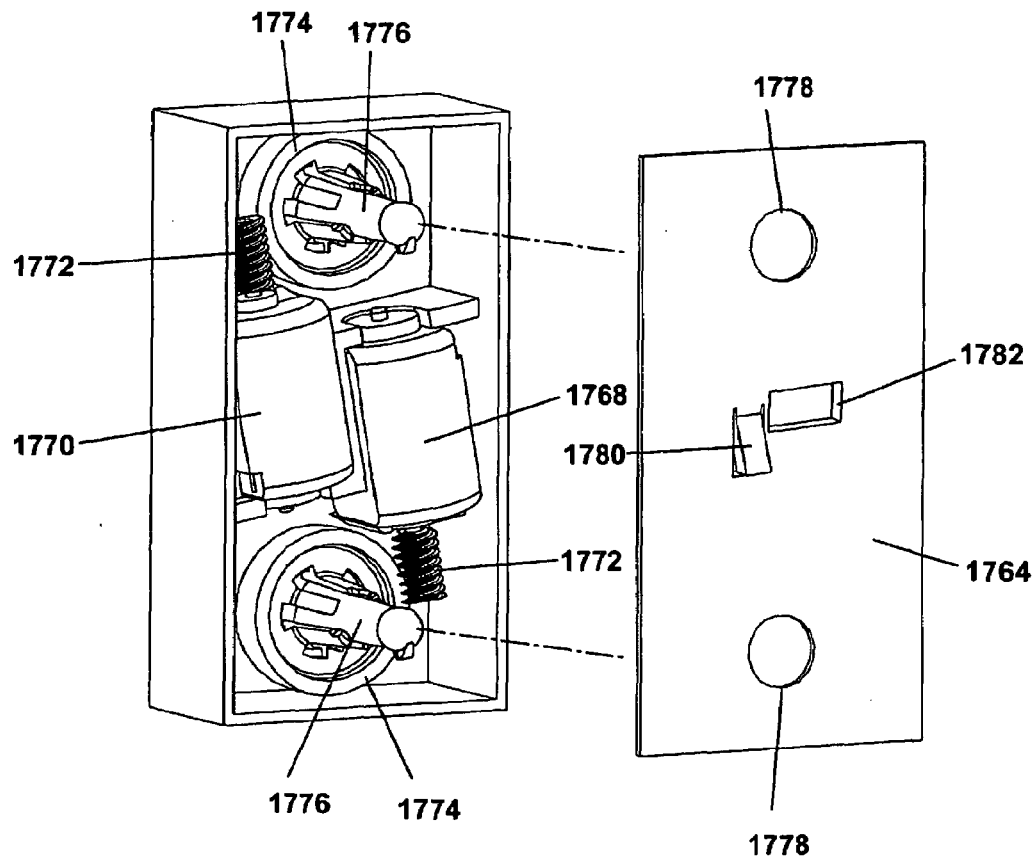
Figure 113:
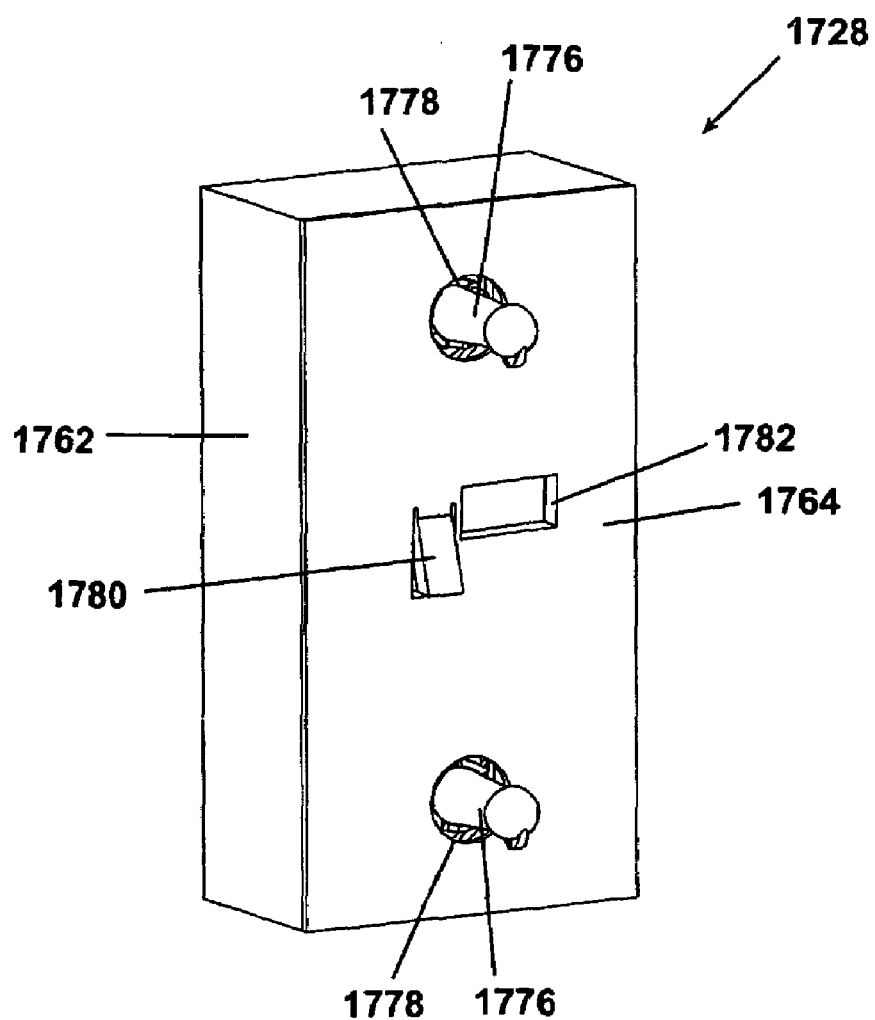

FIGS. 111-113 show an alternate embodiment of a mounting frame 1722 and a modular tilt actuator assembly 1728, which is similar in all essential respects to the mounting frame 1622 and the modular tilt actuator assembly 1628 except that the tilt actuator assembly 1728 comprises a dual-motor actuator.

As shown in FIG. 111, the mounting frame 1722 is a generally irregularly-shaped, somewhat oblong body having a mounting end 1730 and a pivot end 1732. The mounting frame 1722 comprises an actuator chamber 1734 intermediate the mounting end 1730 and the pivot end 1732, adapted to slidably receive the tilt actuator assembly 1728, which differs from the actuator chamber 1634 only in having a shape suitable for the receipt of the tilt actuator assembly 1728 therein. The actuator chamber 1734 is defined by an arcuate proximal wall 1736 comprising a portion of the pivot end 1732, and a distal wall 1738 in generally parallel, spaced-apart juxtaposition. An anterior wall 1740 and a posterior wall (not shown; analogous to the anterior wall 1640 and the posterior wall 1642, respectively) extend orthogonally from the distal wall 1738 in generally parallel, spaced-apart juxtaposition. The anterior wall 1740 transitions to an inclined wall (not shown; analogous to the inclined wall 1641) which intersects the posterior wall to form the mounting end 1730. Similar to the mounting frame 1622 shown in FIG. 110, a medial wall extends through the mounting end 1730 orthogonal to the inclined wall and the posterior wall to form a generally H-shaped cross-section in the mounting end 1730.

An upper portion of the actuator chamber 1734 is closed by an upper wall 1744. A lower portion of the actuator chamber 1734 opposite the upper wall 1744 comprises an opening 1746. Similar to the mounting frame 1622, the posterior wall is provided with a pair of vertically spaced-apart jackscrew apertures (not shown), a rectangular plug slot (not shown), and a rectangular snap fit slot (not shown), each of which extends therethrough to the actuator chamber 1734. The mounting frame 1722 is also provided with a plurality of suitably-positioned mounting ears for attaching the enclosure, wiring, and other appurtenant devices to the mounting frame 1722.

The tilt actuator assembly 1728 comprises a generally oblong, box-like actuator case 1760 comprising an enclosure base 1762 and a removable mating cover 1764 forming an enclosed chamber 1766 when the cover 1764 is installed on the enclosure base 1762, for enclosing a first motor 1768 for tilting the reflective element assembly 1716 about a first axis, a second motor 1770 for tilting the reflective element assembly 1716 about a second axis, a pair of worm gears 1772 driving mating drive gears 1774, which in turn drive a pair of generally parallel, spaced-apart jackscrews 1776. The cover 1764 is provided with an inclined snap finger 1780 which is adapted with a resilient living hinge for inward elastic deflection of the snap finger 1780, a plug slot 1782 extending therethrough and adapted for juxtaposed alignment with the plug slot in the mounting frame 1722, and a pair of spaced-apart jackscrew apertures 1778 extending therethrough and adapted for juxtaposed alignment with the jackscrews apertures in the mounting frame for slidable insertion of the jackscrews 1776 therethrough.

The single-motor tilt actuator assembly described herein replaces two motor assemblies in a conventional remote-controlled rear view mirror assembly with a single motor assembly and a simple clutch mechanism which are capable of precisely adjusting the mirror in both the vertical and horizontal directions. The improved rear view mirror assembly is lighter weight and less expensive than the prior art assemblies, yet retains the simplicity of operator control of the prior art assemblies. The use of a single motor assembly results in fewer parts, thereby minimizing potential motor/parts failure and lowering costs, and also reduces the volume of the mirror assembly dictated by the enclosure of two motor assemblies within the rear view mirror shell. Additionally, the relative positioning of the actuator shafts and the panel pivot mount provides a compact configuration of the tilt actuator assembly, further reducing the size of the rearview mirror and its weight. The use of metal clutch components minimizes the adverse effects of temperature on the performance of the actuator.

The incorporation of a resistance element into the single-motor tilt actuator circuitry provides for control of the speed of the tilt actuator motor through the addition of a simple resistor. The resistance element enables the motor speed to be accurately controlled. The use of a resistance element eliminates weight, cost, and durability problems associated with more complicated mechanical or electro-mechanical devices.

The use of a modular tilt actuator assembly 1628 enables the tilt actuator assembly to be readily installed and, when required, removed and reinstalled in the mirror assembly, thereby eliminating the need to completely disassemble the mirror assembly in order to repair or replace the tilt actuator assembly 1628, thereby minimizing the cost of repairs and replacements. The capability of removing the tilt actuator assembly 1628 from the mirror assembly through an access door 1684 in the enclosure 1614 will simplify repairs and maintenance, minimizing the time during which the vehicle is out of service, and reducing the cost of maintenance and repair.

Additionally, the moment of inertia of the H-shaped cross-section of the mounting end 1630 is greater than for prior art mounting frames, thereby increasing the stiffness of the mounting end 1630 while the decreasing the overall weight of the mounting frame 1622. The moment of inertia of the H-shaped cross-section is as much as 34 percent greater than the moment of inertia for prior art mounting frames. Further weight reduction is realized to the use of only one motor in the tilt actuator assembly 1628. Furthermore, the installation of the tilt actuator assembly 1628 in the interior of the mounting frame 1622 locates the majority of the mirror assembly weight closer to the base assembly 1618, further reducing bending torque acting on the mounting end 1630.

Additional advantages are realized in the fabrication of the mounting frame 1622. The mounting frame 1622 is formed using a die-molding process comprising two dies. The H-shaped cross-section of the mounting frame 1622 enables the direction of movement of the dies to be changed. Prior art mounting frames are molded using a process in which the dies moved in a direction normal to the plane of the reflective element 1624 or the plane of the posterior wall 1642. The mounting frame 1622 having the H-shaped cross-section can be molded using dies moving in a direction parallel to the plane of the reflective element 1624 (a vertical direction when viewing the mounting frame 1622 in its normal orientation in the mirror assembly). The depending legs of the H-shaped cross-section provide a more effective water barrier, and enable better contact for a sealing surface for the enclosure 1614.

It is another feature of this invention that the H-shaped cross section leaves the mounting frame in better condition to handle the stresses and torques encountered during use of the mirror assembly. Contrary to prior art mirror assemblies, which may have formed recesses in one or more of the planar faces of a prior art mirror bracket, the mirror mounting frame of the present invention has relatively uninterrupted planar surfaces which leaves the mounting frame in better condition to handle operating forces as described above.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A mirror assembly for a vehicle comprising:
   a base assembly for attaching the mirror assembly to the vehicle;
   a support frame having an H-shaped cross section in at least a portion thereof, rotatably attached to the base assembly for rotation about a generally vertical axis and supporting a reflective element, the support frame having an inboard portion proximal to the base assembly and an outboard portion distal of the base assembly;
   the reflective element having an inboard portion proximal to the base assembly, an outboard portion distal of the base assembly, and a generally vertical medial axis separating the inboard portion and the outboard portion;
   a pivot connection provided substantially along the medial axis of the reflective element for movably coupling the reflective element to the support frame; and
   an actuator attached to the inboard portion of the support frame, and operably coupled with the reflective element to provide adjustable movement of the reflective element about at least two axes.

2. The mirror assembly of claim 1 wherein the actuator includes at least one motor adapted to impart pivotal movement to the reflective element about the at least two axes.

3. The mirror assembly of claim 1 wherein the actuator has a first moveable actuator rod mounted to the reflective element and a second moveable actuator rod mounted to the reflective element, the second moveable actuator rod being vertically spaced from the first moveable actuator rod.

4. The mirror assembly of claim 3 wherein the pivot connection, the first moveable actuator rod and the second moveable actuator rod are positioned at vertices of a right triangular configuration with respect to the support frame.

5. The mirror assembly of claim 4 wherein movement of the first moveable actuator rod positions the reflective element about one of the at least two axes.

6. The mirror assembly of claim 5 wherein movement of the second moveable actuator rod positions the reflective element about another of the at least two axes.

7. The mirror assembly of claim 5 wherein generally contemporaneous movement of the first and second moveable actuator rods positions the reflective element about another of the at least two axes.

* * * * *

UNITED STATES PATENT AND TRADEMARK OFFICE
CERTIFICATE OF CORRECTION

PATENT NO. : 7,322,710 B2 Page 1 of 1
APPLICATION NO. : 10/510801
DATED : January 29, 2008
INVENTOR(S) : Foote et al.

It is certified that error appears in the above-identified patent and that said Letters Patent is hereby corrected as shown below:

Column 45, line 2, reads: "...and a power extend drive shaft 1220' extend from the motor..."

It should read: --...and a power extend drive shaft 1220 extend from the motor...--

Column 52, line 53 reads: "As shown in FIG. 10, a medial wall 1645 extends through..."

Figure 110:
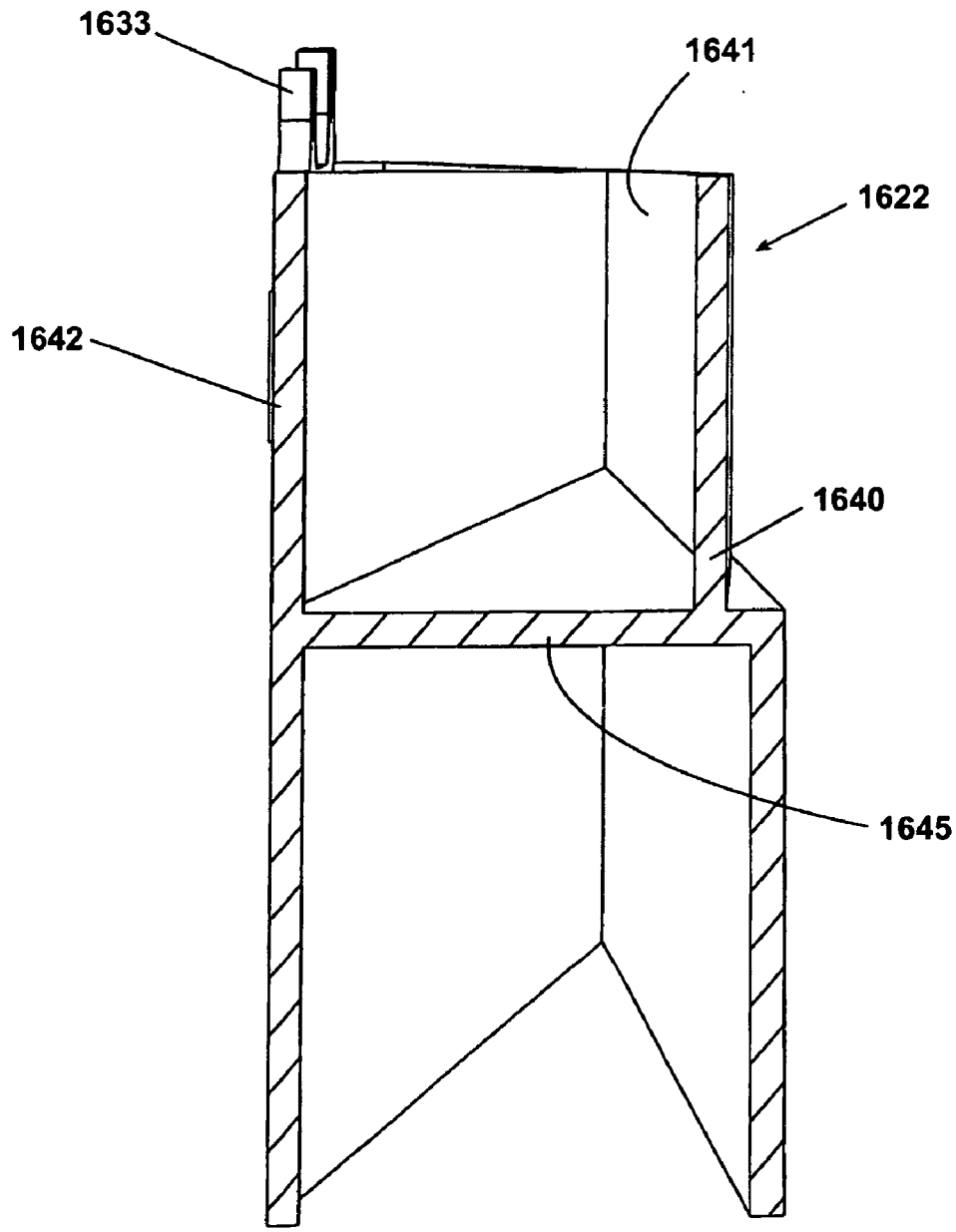

It should read: --As shown in FIG. 110, a medial wall 1645 extends through...--

Signed and Sealed this

Twenty-seventh Day of May, 2008

JON W. DUDAS
*Director of the United States Patent and Trademark Office*